(12) United States Patent
Kadowaki et al.

(10) Patent No.: US 8,859,062 B2
(45) Date of Patent: Oct. 14, 2014

(54) MULTILAYER PROPYLENE RESIN SHEET AND HEAT-TREATABLE PACKAGING MATERIAL USING SAME

(75) Inventors: Yuji Kadowaki, Yokkaichi (JP); Gen Kanai, Yokkaichi (JP)

(73) Assignee: Japan Polypropylene Corporation, Tokyo (JP)

(*) Notice: Subject to any disclaimer, the term of this patent is extended or adjusted under 35 U.S.C. 154(b) by 0 days.

(21) Appl. No.: 13/203,626

(22) PCT Filed: Mar. 15, 2010

(86) PCT No.: PCT/JP2010/054363
§ 371 (c)(1),
(2), (4) Date: Aug. 26, 2011

(87) PCT Pub. No.: WO2010/107003
PCT Pub. Date: Sep. 23, 2010

(65) Prior Publication Data
US 2011/0311742 A1 Dec. 22, 2011

(30) Foreign Application Priority Data

Mar. 17, 2009 (JP) ................. 2009-063803
Aug. 26, 2009 (JP) ................. 2009-195035
Feb. 9, 2010 (JP) ................. 2010-026364

(51) Int. Cl.
| | | |
|---|---|---|
| B29D 22/00 | (2006.01) | |
| B65D 85/808 | (2006.01) | |
| C08L 51/06 | (2006.01) | |
| C08L 23/14 | (2006.01) | |
| C08L 53/00 | (2006.01) | |
| B32B 27/32 | (2006.01) | |
| A61J 1/10 | (2006.01) | |

(52) U.S. Cl.
CPC ............... *C08L 51/06* (2013.01); *B65D 85/808* (2013.01); *C08L 23/142* (2013.01); *C08L 2314/06* (2013.01); *A61J 1/10* (2013.01); *C08L 53/00* (2013.01); *B32B 27/32* (2013.01); *C08L 2205/02* (2013.01)
USPC ........................................ 428/35.2; 428/35.7

(58) Field of Classification Search
USPC ................................. 428/35.2, 35.7
See application file for complete search history.

(56) References Cited

U.S. PATENT DOCUMENTS

| | | | |
|---|---|---|---|
| 2002/0043643 A1* | 4/2002 | Korehisa et al. ................. | 252/71 |
| 2003/0027950 A1 | 2/2003 | Uchino et al. | |
| 2005/0113517 A1 | 5/2005 | Tayano et al. | |
| 2007/0082185 A1* | 4/2007 | Ikeno et al. .................... | 428/213 |

FOREIGN PATENT DOCUMENTS

| | | | |
|---|---|---|---|
| EP | 1 241 188 A1 | | 9/2002 |
| JP | 9 75444 | | 3/1997 |
| JP | 9 99036 | | 4/1997 |
| JP | 9 308682 | | 12/1997 |
| JP | 9 324022 | | 12/1997 |
| JP | 10 152596 | | 6/1998 |
| JP | 2000 272059 | | 10/2000 |
| JP | 2006021504 A | * | 1/2006 |
| JP | 2006 307072 | | 11/2006 |
| JP | 2006 307120 | | 11/2006 |
| JP | 2007 245490 | | 9/2007 |
| JP | 2008 524391 | | 7/2008 |

OTHER PUBLICATIONS

Machine Translation of JP 2006-021504 A; 2006.*
Machine Translation of JP 2006-307120 A; 2006.*
International Search Report Issued Apr. 6, 2010 in PCT/JP10/054363 filed Mar. 15, 2010.
U.S. Appl. No. 13/822,404, filed Mar. 12, 2013, Kanai, et al.
Extended European Search Report issued Mar. 5, 2014, in European Patent Application No. 10753495.0.

* cited by examiner

*Primary Examiner* — James Yager
(74) *Attorney, Agent, or Firm* — Oblon, Spivak, McClelland, Maier & Neustadt, L.L.P.

(57) ABSTRACT

The invention provides a multilayer sheet and a heat-treatable packaging material which have excellent flexibility, transparency, impact resistance, heat resistance, heat-sealability and cleanliness, which are endowed with a good formability without readily incurring drawbacks such as external defects and thickness fluctuations when subjected to multilayer formation, and which, even at a reduced thickness, have an excellent sheet substrate strength decrease-inhibiting effect.
The multilayer sheet is a multilayer propylene resin sheet composed of at least two layers of an inner layer (1) and an outer layer (2), wherein the inner layer (1) is made of a resin composition (X) containing from 60 to 90 wt % of (A) a propylene resin composition which includes from 30 to 70 wt % of (A1) a specific propylene-α-olefin random copolymer component and from 70 to 30 wt % of (A2) a propylene-ethylene random copolymer component, from 40 to 10 wt % of (B) an ethylene-α-olefin copolymer, and from 1 to 25 wt % of (C) a propylene resin, and the outer layer (2) is made of a specific propylene resin composition Y. The heat-treatable packaging material can be obtained from the multilayer propylene resin sheet.

9 Claims, No Drawings

MULTILAYER PROPYLENE RESIN SHEET AND HEAT-TREATABLE PACKAGING MATERIAL USING SAME

TECHNICAL FIELD

The present invention relates to a multilayer sheet and to a heat-treatable packaging material which uses the same. More specifically, the invention relates both to a multilayer propylene resin sheet which, even when subjected to heat treatment under applied pressure such as pressurized steam treatment or pressurized hot-water treatment, has an excellent heat resistance and thus does not readily incur deformation or internal fusion, yet is endowed with a good transparency, flexibility and impact resistance; and also to a heat-treatable packaging material which uses the same.

BACKGROUND ART

The performance characteristics desired in retortable packaging materials and in packaging bags that must be sterilized under pressurized treatment, such as intravenous bags (IV bags), include transparency to allow the contents to be checked, flexibility to enable liquid discharge without forming an air vent, low-temperature impact resistance so that the bag does not rupture during low-temperature storage and low-temperature transport to preserve the quality of the contents, heat resistance so that deformation and fusion do not occur even when sterilization at 121° C. is carried out, and fabricability such as heat-sealability to facilitate bag-making.

With regard to IV bags in particular, vinyl chloride resins were formerly used as a material that satisfies the above performance characteristics. However, owing to the leaching out of plasticizers and waste disposal problems, and also to recent concerns over the global environment, such resins have been replaced with polyolefin resins.

IV bags composed primarily of polyethylene, though endowed with an excellent flexibility and impact resistance, have a poor heat resistance and thus give rise to appearance defects such as deformation at a sterilization temperature of 121° C. (overkill conditions), making them incapable of functioning satisfactorily as IV bags (see, for example, Patent Document 1). On the other hand, IV bags composed primarily of polypropylene have a good heat resistance, but are hard as an IV bag material and have an inadequate impact resistance at low temperatures, as a result of which these too are unable to satisfy the above performance characteristics (see, for example, Patent Document 2).

Art has thus been disclosed in which flexibility and impact resistance are conferred by the addition of an elastomeric component to polypropylene (see, for example, Patent Document 3). However, problems with this approach are that the heat resistance of polypropylene is sacrificed, low-molecular-weight ingredients bleed out following sterilization, and the transparency worsens. Art involving the addition of a styrene-based elastomer as the elastomeric component has also been disclosed (see, for example, Patent Document 4), but blocking tends to arise and the productivity leaves much to be desired. Moreover, styrene-based elastomers are more expensive than olefinic elastomers, leading to cost-related issues as well.

Unrelated to the above, polypropylene block copolymers in which an elastomeric component is added by continuous polymerization using a Ziegler-Natta catalyst have been developed (see, for example, Patent Document 5). Unsurprisingly, however, bleedout arises following sterilization, and the transparency is poor. Water-cooled blown films composed of a propylene-ethylene block copolymer having an elastomeric component added thereto and obtained by continuous polymerization using a metallocene catalyst have also been disclosed (see, for example Patent Document 6). However, these do not yet have a sufficient low-temperature impact resistance. In addition, films for medical use which contain a heterogeneous blend of resins have been disclosed (see, for example, Patent Document 7), but these too have lacked an adequate impact resistance at low temperature.

Hence, although there exists a need for IV bag materials which strike a good balance among the properties of heat resistance, transparency, flexibility and impact resistance, and which moreover are low-cost, materials satisfying such a need have not previously been found.

Moreover, the IV bag-making process includes the steps of welding injection-molded parts such as a spout, a discharge port and an injection port to the bag, which requires melting of the film for sufficient fusion to take place. For this purpose, heat sealing is carried out under very harsh conditions (e.g., high temperature, high pressure, long duration). In a fully melted state, the molten resin ends up sticking to the sealing bar, inevitably worsening productivity. To address this problem, technology has been disclosed wherein the outer layer and the inner layer of a laminated film are provided with different melting points, enabling the inner layer to be melted while the outer layer remains solid (see, for example, Patent Document 7). The inner layer is made of a polyethylene resin and can thus withstand a sterilization temperature of 115° C.; however, at 121° C. sterilization, the inner faces of the film end up sticking to each other ("internal fusion"). Hence, the heat resistance is inadequate.

CITATION LIST

Patent Literature

Patent Literature 1: JP-A-H9-308682
Patent Literature 2: JP-A-H9-99036
Patent Literature 3: JP-A-H9-75444
Patent Literature 4: JP-A-H9-324022
Patent Literature 5: JP-A-2006-307072
Patent Literature 6: JP-A-2008-524391
Patent Literature 7: JP-A-2007-245490

SUMMARY OF THE INVENTION

Technical Problem

To provide a good balance of the performance characteristics such as transparency, heat resistance and flexibility required of heat-treatable packaging bags, it is effective to use a combination of a propylene-α-olefin random copolymer exhibiting heat resistance with a propylene-ethylene random copolymer which has a specific amount of ethylene added thereto, is obtained using a metallocene catalyst, and is capable of having a flexibilizing effect without a loss of transparency. Also, because polyolefins obtained using a metallocene catalyst have extremely low levels of low-molecular-weight components and low-crystallinity components, they have an excellent cleanliness, and can thus be regarded as highly suitable for food and medical-related applications.

On the other hand, there is a possibility that, in this state, such polyolefins will have an inadequate low-temperature impact resistance.

Accordingly, the present invention provides multilayer sheets which are endowed with excellent flexibility, transparency, impact resistance, heat resistance and cleanliness, and are also capable of withstanding harsh heat-sealing conditions during bag-making. The invention also provides heat-treatable packaging bags which use such multilayer sheets.

Solution to Problem

The inventors have conducted various investigations and analyses with the aim of arriving at a solution to the above problems. As a result, they have discovered that these problems can be satisfactorily resolved by compounding in an outer layer a propylene resin having a specific melting peak temperature, and by blending in an inner layer a specific amount of a mixture of a propylene-α-olefin copolymer component having a specific melting peak temperature and a propylene-ethylene random copolymer component having a specific ethylene content (the mixture having a single tan δ peak at or below 0° C.) with a specific amount of an ethylene-α-olefin copolymer having a specific density and a specific melt flow rate. The inventors ultimately arrived at the present invention upon learning that the above resin formulations and layer compositions enable the performance characteristics required in a heat-treatable packaging bag to be obtained in a good balance and at a high level.

That is, in a first aspect, the invention provides a multilayer propylene resin sheet of at least two layers composed of an inner layer and an outer layer, wherein the respective layers satisfy the following conditions:

(1) the inner layer is made of (X) a propylene resin composition including:
from 60 to 90 wt % of (A) a propylene resin composition which satisfies the conditions of
  (A-i) containing from 30 to 70 wt % of a (A1) propylene-α-olefin random copolymer component having a melting peak temperature (Tm (A1)) of from 125 to 145° C., and from 70 to 30 wt % of (A2) a propylene-ethylene random copolymer component having an ethylene content (E [A2]) of from 7 to 17 wt % and obtained using a metallocene catalyst,
  (A-ii) having a melt flow rate (MFR (A), at 230° C. and 2.16 kg) in a range of from 0.5 to 20 g/10 min, and
  (A-iii) having, in a temperature-loss tangent (tan δ) curve obtained by dynamic mechanical analysis (DMA), a single peak at or below 0° C. on the tan δ curve representing a glass transition observed in a range of from −60 to 20° C., and from 40 to 10 wt % of (B) an ethylene-α-olefin copolymer which satisfies the conditions of
  (B-i) having a density in a range of from 0.860 to 0.910 g/cm³, and
  (B-ii) having a melt flow rate (MFR (B), at 190° C. and 2.16 kg) in a range of from 0.1 to 20 g/10 min; and
(2) the outer layer is made of (Y) a propylene resin composition including (D) a propylene resin having a melting peak temperature (Tm (D)) in a range of from 135 to 170° C.

In a second aspect, the invention provides the multilayer propylene resin sheet according to the first aspect of the invention, wherein the respective layers satisfy the following conditions:

(1) The inner layer is made of (X) a propylene resin composition including:
from 45 to 89 wt % of (A) a propylene resin composition which satisfies the conditions of
  (A-i) containing from 30 to 70 wt % of (A1) a propylene-α-olefin random copolymer component having a melting peak temperature (Tm (A1)) of from 125 to 145° C., and from 70 to 30 wt % of (A2) a propylene-ethylene random copolymer component having an ethylene content (E [A2]) of from 7 to 17 wt % and obtained using a metallocene catalyst,
  (A-ii) having a melt flow rate (MFR (A), at 230° C. and 2.16 kg) in a range of from 0.5 to 20 g/10 min, and
  (A-iii) having, in a temperature-loss tangent (tan δ) curve obtained by dynamic mechanical analysis, a single peak at or below 0° C. on the tan δ curve representing a glass transition observed in a range of from −60 to 20° C., from 10 to 30 wt % of (B) an ethylene-α-olefin copolymer which satisfies the conditions of
  (B-i) having a density in a range of from 0.860 to 0.910 g/cm³, and
  (B-ii) having a melt flow rate (MFR (B), at 190° C. and 2.16 kg) in a range of from 0.1 to 20 g/10 min, and from 1 to 25 wt % of (C) a propylene resin which satisfies the conditions of
  (C-i) having a melting peak temperature (Tm (C)) which is at least 6° C. higher than the melting peak temperature (Tm (A1)) of the propylene-α-olefin random copolymer component (A1), and
  (C-ii) having a melt flow rate (MFR(C), at 230° C. and 2.16 kg) in a range of from 0.5 to 30 g/10 min.
(2) The outer layer is made of (Y) a propylene resin composition including (D) a propylene resin having a melting peak temperature (Tm (D)) in a range of from 135 to 170° C.

In a third aspect, the invention provides the multilayer propylene resin sheet according to the first or second aspect of the invention, wherein the propylene-α-olefin random copolymer component (A1) in the propylene resin composition (A) is obtained using a metallocene catalyst.

In a fourth aspect, the invention provides the multilayer propylene resin sheet according to the first to third aspects of the invention, wherein the propylene-α-olefin random copolymer component (A1) and the propylene-ethylene random copolymer component (A2) of the propylene resin composition (A) are obtained by successive polymerization using a metallocene catalyst, the successive polymerization including:

(1) a first step of polymerizing from 50 to 60 wt % of the propylene-α-olefin random copolymer component (A1), and
(2) a second step of polymerizing from 50 to 40 wt % of the propylene-ethylene random copolymer component (A2) having an ethylene content (E [A2]) of from 8 to 14 wt %.

In a fifth aspect, the invention provides the multilayer polypropylene resin sheet according to the first to fourth aspects of the invention which is a multilayer sheet of at least three layers further including an innermost layer, in order of an outer layer, an inner layer and the innermost layer, wherein the innermost layer is made of (Z) a propylene resin composition having a soluble content at or below 0° C. (S0), as measured by temperature rising elution fractionation (TREF), of 15 wt % or less.

In a sixth aspect, the invention provides the multilayer propylene resin sheet according to the fifth aspect of the invention, wherein the propylene resin composition (Z) is (Z1) a propylene resin composition composed of from 80 to 99 wt % of (E) a propylene-α-olefin copolymer having a melting peak temperature (Tm (E)) of from 130 to 145° C., and from 1 to 20 wt % of (F) an ethylene-α-olefin copolymer having a density of from 0.860 to 0.910 g/cm³.

In a seventh aspect, the invention provides the multilayer propylene resin sheet according to the fifth aspect of the invention, wherein the propylene resin composition (Z) is a propylene resin composition (Z2) which includes: from 60 to 90 wt % of (G) a propylene resin composition which satisfies the condition of
  (G-i) including from 30 to 70 wt % of (G1) a propylene-α-olefin random copolymer component having a melting peak temperature Tm (G1) in a range of from 125 to 145° C., and from 70 to 30 wt % of (G2) a propylene-ethylene random copolymer component having an ethylene content (E [G2]) of from 7 to 17 wt % and obtained using a metallocene catalyst; and from 40 to 10 wt % of (H) an ethylene-α-olefin copolymer which satisfies the condition of (H-i) having a density in a range of from 0.860 to 0.910 g/cm$^3$.

In an eight aspect, the invention provides the multiplayer propylene resin sheet according to the fifth aspect of the invention, wherein the propylene resin composition (Z) is (Z2) a propylene resin composition which includes:
from 45 to 89 wt % of (G) a propylene resin composition which satisfies the condition of (G-i) including from 30 to 70 wt % of (G1) a propylene-α-olefin random copolymer component having a melting peak temperature Tm (G1) in a range of from 125 to 145° C., and from 70 to 30 wt % of (G2) a propylene-ethylene random copolymer component having an ethylene content (E [G2]) of from 7 to 17 wt % and obtained using a metallocene catalyst;
from 10 to 30 wt % of (H) an ethylene-α-olefin copolymer which satisfies the condition of (H-i) having a density in a range of from 0.860 to 0.910 g/cm$^3$; and
from 1 to 25 wt % of (I) a propylene resin which satisfies the condition of (I-i) having a melting peak temperature (Tm (I)) which is at least 6° C. higher than the melting peak temperature (Tm (G1)) of the propylene-α-olefin random copolymer component (G1).

In a ninth aspect, the invention provides the multilayer propylene resin sheet according to the seventh or eighth aspect of the invention, wherein the propylene resin composition (G) further satisfies the condition of (G-ii) having, in a temperature-loss tangent (tan δ) curve obtained by dynamic mechanical analysis (DMA), a single peak at or below 0° C. on the tan δ curve representing a glass transition observed in a range of from −60 to 20° C.

In a tenth aspect, the invention provides the multilayer propylene resin sheet according to any one of the seventh to ninth aspects of the invention, wherein the propylene-α-olefin random copolymer component (G1) is obtained using a metallocene catalyst.

In an eleventh aspect, the invention provides the multilayer propylene resin sheet according to the seventh or eighth aspect of the invention, wherein the propylene-α-olefin random copolymer component (G1) and the propylene-ethylene random copolymer component (G2) of the propylene resin composition (G) are obtained by successive polymerization using a metallocene catalyst, the successive polymerization including:
(1) a first step of polymerizing from 50 to 60 wt % of the propylene-α-olefin random copolymer (G1), and
(2) a second step of polymerizing from 50 to 40 wt % of the propylene-ethylene random copolymer component (G2) having an ethylene content (E [G2]) of from 8 to 14 wt %.

In a twelfth aspect, the invention provides a heat-treatable packaging material, which material is characterized by the use of the multilayer propylene resin sheet according to any one of the first to eleventh aspects of the invention.

Finally, in a thirteenth aspect, the invention provides a heat-treatable packaging material according to the twelfth aspect of the invention, which is an IV bag.

The basic feature of the inventive multilayer sheet and the inventive heat-treatable packaging material using the same are the use in an inner layer (1) of (X) a propylene resin composition containing (A) a specific propylene resin composition and (B) a specific ethylene-α-olefin copolymer, and the use in an outer layer (2) of (Y) a propylene resin composition composed primarily of (D) a specific propylene resin.

Propylene resin composition (A) used in the inner layer (1), because it is a propylene-ethylene copolymer composition which contains (A1) a propylene-α-olefin random copolymer component having a melting peak temperature in a specific range and (A2) a propylene-ethylene random copolymer component obtained using a metallocene catalyst and having a specific ethylene content, because it has a high flexibility and because, in dynamic mechanical analysis, the glass transition temperature observed as a tan δ curve peak in a range of from −60 to 20° C. exhibits a single peak at or below 0° C., is able to impart to the resulting multilayer sheet a good balance of transparency and flexibility.

Ethylene-α-olefin copolymer (B) used in the inner layer (1) is specified in terms of its density and melt flow rate, and is capable of conferring to the resulting multilayer sheet the quality of being flexible without a loss of transparency.

Also, in a preferred embodiment, the inner layer (1) further includes (C) a propylene resin. The propylene resin (C) used in such a case is specified in terms of its melting peak temperature and melt flow rate. By having a melting peak temperature which is at least 6° C. higher than that of propylene resin composition (A), this component is able to confer to the resulting multilayer sheet the ability to prevent appearance defects such as bleedout from arising, to suppress appearance defects such as thickness variation and interfacial roughness, and to suppress a reduction in thickness during heat sealing.

A propylene resin (D) specified in terms of the melting peak temperature is used in propylene resin composition (Y) employed in the outer layer (2) to prevent the multilayer sheet from sticking to the sealing bar during heat sealing and thereby make the multilayer sheet suitable for bag-making.

In a preferred embodiment, the multilayer sheet of the invention may also have an innermost layer (3). That is, the multilayer sheet may be composed of at least three layers which include an innermost layer (3), in order of an outer layer (1), an inner layer (2), and the innermost layer (3). The propylene resin composition (Z) used in the innermost layer (3) preferably has a soluble content at or below 0° C. (S0) of 15 wt % or less, and contains either propylene resin composition (Z1) or propylene resin composition (Z2).

Propylene resin composition (Z1) is specified in terms of the melting peak temperature and density, and preferably is composed primarily of (E) a propylene-α-olefin copolymer obtained with a metallocene catalyst. However, with propylene-α-olefin copolymer (E) alone, the impact resistance is poor. When a blend of (E) is used together with (F) an ethylene-α-olefin copolymer having a specific density, the impact resistance can be conferred. Because the (E) has a sharp molecular weight distribution, both cleanliness owing to the low level of low-molecular-weight components and heat sealability owing to the abrupt rise in the heat sealing strength can be conferred. Because a large amount of crystalline components are also contained, a strong heat seal is possible.

Propylene resin composition (Z2) is composed primarily of (G) a propylene resin composition. Propylene resin composition (G) is a propylene-ethylene copolymer composition containing (G1) a propylene-α-olefin random copolymer composition having a melting peak temperature in a specific range, and (G2) a propylene-ethylene random copolymer component which, owing to its specific ethylene content, has a high flexibility and keeps the transparency from worsening. By using this propylene resin composition (Z2), the resulting multilayer sheet can be conferred with a good balance of transparency and flexibility.

Ethylene-α-olefin copolymer (H) used in propylene resin composition (Z2) is specified in terms of density, and can confer flexibility without a loss of transparency to the resulting multilayer sheet.

In addition, propylene resin (I) used in the propylene resin composition (Z2) is specified in terms of the melting peak temperature, and can confer to the resulting multilayer sheet a heat resistance that prevents the innermost layers (3) from thermally fusing to one another at the time of heat treatment.

Therefore, the multilayer propylene resin sheet of the invention, and the heat-treatable packaging material obtained using such a multilayer sheet have an excellent transparency, flexibility, impact resistance and cleanliness, a reduced thickness fluctuation during lamination, suppress appearance defects such as interfacial roughness, and moreover mitigate the reduction in thickness during fabrication. This combination of properties make them highly suitable for use as retortable packaging materials and as IV bags.

DESCRIPTION OF EMBODIMENTS

The multilayer propylene resin sheet of the invention is composed of at least two layers: (1) an inner layer in which a (X) a propylene resin composition is used, and (2) an outer layer in which (Y) a propylene resin composition is used. The invention also provides a heat-treatable packaging material obtained using such a multilayer sheet. In a preferred embodiment, the multilayer sheet of the invention also has (3) an innermost layer, and thus is a multilayer sheet of at least three layers which is composed of, in order, (1) an outer layer, (2) an inner layer, and (3) an innermost layer.

The components making up each layer of the multilayer propylene resin sheet of the invention, the production of the components in each layer, and the heat-treatable packing material are described below in detail.

[I] Components Making Up Each Layer of Multilayer Propylene Resin Sheet

1. Inner Layer (1)

The inner layer (1) is formed of (X) a propylene resin composition containing the propylene resin composition (A) and the ethylene-α-olefin copolymer (B) described below. It is preferable for propylene resin composition (X) to additionally include (C) a propylene resin.

(1) Propylene Resin Composition (A)

(1-1) Properties of Propylene Resin Composition (A)

The propylene resin composition (A) (also referred to below as "component (A)") which is used as a component of propylene resin composition (X) making up the inner layer (1) of the multilayer propylene resin sheet of the invention is required to have a high transparency, flexibility and impact resistance. To fulfill these requirements at a high level, component (A) must satisfy conditions (A-i) to (A-iii) below.

(A) Basic Conditions

Component (A) used in the invention is a propylene resin composition (A) which satisfies the following conditions (A-i) to (A-iii):

(A-i) includes from 30 to 70 wt % of (A1) a propylene-α-olefin random copolymer component having a melting peak temperature (Tm (A1)) of from 125 to 145° C., and from 70 to 30 wt % of (A2) a propylene-ethylene random copolymer component having an ethylene content (E [A2]) of from 7 to 17 wt % and obtained using a metallocene catalyst;

(A-ii) has a melt flow rate (MFR (A), at 230° C. and 2.16 kg) in a range of from 0.5 to 20 g/10 min; and (A-iii) has, in a temperature-loss tangent (tan δ) curve obtained by dynamic mechanical analysis (DMA), a single peak at or below 0° C. on the tan δ curve representing the glass transition observed in a range of from −60 to 20° C.

The above conditions are described in detail in (i) to (v) below.

(i) Melting Peak Temperature (Tm (A1)) of Propylene-α-Olefin
Random Copolymer Component (A1)

Component (A1) is a component which determines the crystallinity in the propylene resin composition (component (A)). To increase the heat resistance of component (A), it is necessary for the melting peak temperature Tm (A1) (also referred to below as "Tm (A1)") of component (A1) to be high. However, if Tm (A1) is too high, this interferes with the flexibility and transparency. On the other hand, if Tm (A1) is too low, the heat resistance worsens, as a result of which a reduction in the thickness of the sheet may proceed during heat sealing. Tm (A1) must be in a range of from 125 to 145° C., and is preferably from 125 to 138° C., and more preferably from 128 to 135° C. Component (A1) is preferably produced using a metallocene catalyst.

Here, the melting peak temperature Tm is a value determined with a differential scanning calorimeter (DSC, available from Seiko Instruments, Inc.). Specifically, it is the value determined as the melting peak temperature when a 5.0 mg sample that has been collected and held at 200° C. for 5 minutes is subsequently crystallized by lowering the temperature to 40° C. at a ramp-down rate of 10° C./min, then melted at a ramp-up rate of 10° C./min.

(ii) Ratio of Component (A1) in Component (A)

Although component (A1) confers heat resistance on component (A), if the ratio W(A1) of component (A1) in component (A) is too high, it will not be possible to exhibit a sufficient flexibility, impact resistance and transparency. Hence, it is essential for the ratio of component (A1) to be 70 wt % or less.

On the other hand, when the ratio of component (A1) is too low, even if Tm (A1) is sufficient, the heat resistance decreases, as a result of which deformation may occur in a sterilization step. Hence, the ratio of component (A1) must be at least 30 wt %. The preferred range in W(A1) is from 50 to 60 wt %.

(iii) Ethylene Content E[A2] in Propylene-Ethylene Random Copolymer Component (A2)

Component (A2) is a required component for increasing the flexibility, impact resistance and transparency of component (A), and is obtained using a metallocene catalyst. Generally, in propylene-ethylene random copolymers, when the ethylene content rises, the crystallinity decreases and the flexibility-increasing effect becomes larger. Hence, it is critical for the ethylene content E[A2] in component (A2) (sometimes referred to below as "E [A2]") to be at least 7 wt %. When E[A2] is less than 7 wt %, a sufficient flexibility cannot be exhibited. E[A2] is preferably at least 8 wt %, and more preferably at least 10 wt %.

On the other hand, if E[A2] is increased excessively in order to lower the crystallinity of component (A2), the compatibility of component (A1) and component (A2) decreases and component (A2) forms domains rather than compatibilizing with component (A1). In such a phase-separated structure, if the matrix and the domains have differing refractive indices, the transparency abruptly decreases. Hence, the ratio E[A2] of component (A2) in component (A) used in this invention must be not more than 17 wt %, and is preferably not more than 14 wt %, and more preferably not more than 12 wt %.

(iv) Ratio of Component (A2) in Component (A)

If the ratio W(A2) of component (A2) in component (A) is too high, the heat resistance will decrease. Hence, it is critical for W(A2) to be held to not more than 70 wt %.

On the other hand, if W(A2) is too low, flexibility and impact resistance-improving effects cannot be obtained. Hence, it is critical for W(A2) to be at least 30 wt %. The preferred range for W(A2) is from 50 to 40 wt %.

Here, W(A1) and W(A2) are values determined by temperature rising elution fractionation (TREF), and the α-olefin content E[A1] and the ethylene content E[A2] are values obtained by nuclear magnetic resonance (NMR).

The following specific methods are used.

(a) Specifying W(A1) and W(A2) by Temperature Rising Elution Fractionation (TREF)

Techniques for evaluating the distribution in the crystallinity of, for example, propylene-ethylene random copolymers by the temperature rising elution fractionation (TREF) are familiar to those skilled in the art. For example, detailed measurement methods are described in the following literature.

G. Glockner: *J. Appl. Polym. Sci.: Appl. Polym, Symp.*, 45, 1-(1990)

L. Wild: *Adv. Polym, Sci.*, 98, 1-47 (1990)

J. B. P. Soares, A. E. Hamielec: *Polymer*, 36, No. 8, 1639-1654 (1995)

In component (A) used in the invention, there is a large difference between the respective crystallinities of component (A1) and component (A2). Moreover, when both components are produced using a metallocene catalyst, the respective crystallinity distributions become narrow, so that intermediate components therebetween become very scarce, thus enabling both to be precisely fractionated using TREF.

In the invention, measurement is carried out specifically as follows.

A sample is dissolved in o-dichlorobenzene (containing 0.5 mg/mL of BHT) at 140° C. to form a solution. The solution is introduced into a 140° C. TREF column, following which it is cooled to 100° C. at a ramp-down rate of 8° C./min, then cooled to −15° C. at a ramp-down rate of 4° C./min, and held for 60 minutes. Next, −15° C. o-dichlorobenzene (containing 0.5 mg/mL of BHT) solvent is poured into the column at a rate of 1 mL/min, and the component dissolved in the −15° C. o-dichlorobenzene within the TREF column is eluted for 10 minutes, following which the temperature of the column is raised linearly to 140° C. at a ramp-up rate of 100° C./hour, thereby giving an elution curve.

In the resulting elution curve, component (A1) and component (A2), due to the difference in crystallinity therebetween, exhibit elution peaks at the respective temperatures T(A1) and T(A2). Because this difference is sufficiently large, substantial separation is possible at an intermediate temperature $T(A3) (=\{T(A1)+T(A2)\}/2)$.

Here, defining the cumulative amount of component eluted up to T(A3) as W(A2) wt % and the cumulative amount of component eluted at more than T(A3) as W(A1) wt %, W(A2) corresponds to the amount of component (A2) and the cumulative amount W(A1) of component eluted at more than T(A3) corresponds to the amount of component (A1) having a relatively high crystallinity.

The equipment and specifications used in measurement are shown below.

(Tref Apparatus)

TREF column: 4.3 mm diameter×150 mm stainless steel column

Column packing: 100 μm surface-deactivated glass beads

Heating method: aluminum heating block

Cooling method: Peltier element (water cooling was used to cool the Peltier element)

Temperature distribution: ±0.5° C.

Temperature regulator: KP 1000 (Chino Corporation) programmable digital temperature controller (valve open)

Heating system: air bath oven

Temperature at time of measurement: 140° C.

Temperature distribution: ±1° C.

Valves: 6-way valve, 4-way valve (Sample Injection Apparatus)

Injection method: loop injection method

Injection amount: loop size, 0.1 mL

Injection port heating method: aluminum heating block

Temperature at time of measurement: 140° C.

(Detector)

Detector: MIRAN 1A (Foxboro) fixed wavelength type infrared detector

Detection wavelength: 3.42 μm

High-temperature flow cell: LC-IR microcell; optical path length, 1.5 mm; window shape, 2×4 mm oval; synthetic sapphire window Temperature at time of measurement: 140° C.

(Pump)

Delivery pump: SSC-3461 pump (Senshu Kagaku)

(Measurement Conditions)

Solvent: o-dichlorobenzene (containing 0.5 mg/mL of BHT)

Sample concentration: 5 mg/mL

Sample injection amount: 0.1 mL

Solvent flow rate: 1 mL/min (b) Specifying E[A1] and E[A2]

To determine the α-olefin (preferably ethylene) content E[A1] and ethylene content E[A2] of the respective components, the components are separated by temperature rising column fractionation using a preparative fractionation unit, and the ethylene (or α-olefin) contents of the respective components are determined by NMR.

Temperature rising column fractionation refers to a measurement method like that described in, for example, *Macromolecules* 21, 314-319 (1988). Specifically, the following method was used in this invention.

(c) Temperature Rising Column Fractionation

A cylindrical column having a diameter of 50 mm and a height of 500 mm is filled with a glass bead carrier (80 to 100 mesh), and is held at 140° C. Next, 200 mL of an o-dichlorobenzene solution (10 mg/mL) of the sample dissolved at 140° C. is introduced into the column. The column temperature is then cooled to 0° C. at a ramp-down rate of 10° C./hour. After being held at 0° C. for 1 hour, the column temperature is elevated at a ramp-up rate of 10° C./hour to T(A3) (obtained in TREF measurement) and held at that temperature for one hour. The column temperature control precision throughout the series of operations is set to ±1° C.

Next, with the column temperature held at T(A3), the component present within the column and soluble at T(A3) is eluted and recovered by passing through 800 mL of o-dichlorobenzene at T(A3) and a flow rate of 20 mL/min.

Next, the column temperature was raised to 140° C. at a ramp-up rate of 10° C./min and the column was left at rest for 1 hour at 140° C., following which the component insoluble at T(A3) was eluted and recovered by passing through 800 mL of the 140° C. solvent o-dichlorobenzene at a flow rate of 20 mL/min.

The polymer-containing solution obtained by fractionation was concentrated to 20 mL using an evaporator, then precipitated out in a five-fold amount of methanol. The precipitated polymer was recovered by filtration and dried overnight in a vacuum desiccator.

(d) Measurement of Ethylene Content by $^{13}$C-NMR

The ethylene contents E[A2] for each of the components (A2) obtained in the above fractionation were determined by analyzing the $^{13}$C-NMR spectrum measured under the following conditions by complete proton decoupling.

Apparatus: GSX-400 (JEOL Ltd.) or comparable unit (carbon nuclear resonance frequency of 100 MHz or more)
Solvents: o-dichlorobenzene/heavy benzene=4/1 (v/v)
Concentration: 100 mg/mL
Temperature: 130° C.
Pulse angle: 90°
Pulse interval: 15 seconds
Number of integrations: at least 5,000 times Spectral assignments may be carried out by referring to, for example, *Macromolecules* 17, 1950 (1984). The spectral assignments measured according to the above conditions are shown in Table 1. Symbols such as $S_{\alpha\alpha}$ in the table are in accordance with the method of notation by Carman et al. (Macromolecules 10, 636 (1977). In addition, "P" stands for a methyl carbon, "S" stands for a methylene carbon, and "T" stands for a methyne carbon.

TABLE 1

| Chemical shift (ppm) | Assignment |
|---|---|
| 45 to 48 | $S_{\alpha\alpha}$ |
| 37.8 to 37.9 | $S_{\alpha\gamma}$ |
| 37.4 to 37.5 | $S_{\alpha\delta}$ |
| 33.1 | $T_{\delta\delta}$ |
| 30.9 | $T_{\beta\delta}$ |
| 30.6 | $S_{\gamma\gamma}$ |
| 30.2 | $S_{\gamma\delta}$ |
| 29.8 | $S_{\delta\delta}$ |
| 28.7 | $T_{\beta\beta}$ |
| 27.4 to 27.6 | $S_{\beta\delta}$ |
| 24.4 to 24.7 | $S_{\beta\beta}$ |
| 19.1 to 22.0 | P |

Below, letting "P" be a propylene unit in a copolymer chain and letting "E" be an ethylene unit, six types of triads (PPP, PPE, EPE, PEP, PEE and EEE) are capable of being present on the chain. As noted in *Macromolecules* 15, 1150 (1982), the concentrations of these triads and the spectral peak intensities can be connected by means of the following formulas (1) to (6).

$$[PPP]=k \times I(T_{\beta\beta}) \quad (1)$$

$$[PPE]=k \times I(T_{\beta\delta}) \quad (2)$$

$$[EPE]=k \times I(T_{\delta\delta}) \quad (3)$$

$$[PEP]=k \times I(S_{\beta\beta}) \quad (4)$$

$$[PEE]=k \times I(S_{\beta\delta}) \quad (5)$$

$$[EEE]=k \times \{I(S_{\delta\delta})/2 + I(S_{\gamma\delta})/4\} \quad (6)$$

Here, [ ] represents the fraction of the triad. For example, [PPP] represents the fraction of the PPP triad among all the triads.

Therefore, $$[PPP]+[PPE]+[EPE]+[PEP]+[PEE]+[EEE]=1 \quad (7)$$

Also, k is a constant, and I indicates the spectral intensity. For example, I($T_{\beta\beta}$) stands for the intensity of the peak at 28.7 ppm attributed to $T_{\beta\beta}$.

By using the above formulas (1) to (7), the fractions of each triad are determined, and the ethylene content is determined from the following formula Ethylene content (mol %)=([PEP]+[PEE]+[EEE])×100.

The propylene-ethylene random copolymer of the invention includes a small amount of propylene heterobonds (2,1-bonds and/or 1,3-bonds), as a result of which the small peaks shown in Table 2 arise.

TABLE 2

| Chemical shift (ppm) | Assignment |
|---|---|
| 42.0 | $S_{\alpha\alpha}$ |
| 38.2 | $T_{\alpha\gamma}$ |
| 37.1 | $S_{\alpha\delta}$ |
| 34.1 to 35.6 | $S_{\alpha\beta}$ |
| 33.7 | $T_{\gamma\gamma}$ |
| 33.3 | $T_{\gamma\delta}$ |
| 30.8 to 31.2 | $T_{\beta\gamma}$ |
| 30.5 | $T_{\beta\delta}$ |
| 30.3 | $S_{\alpha\beta}$ |
| 27.3 | $S_{\beta\gamma}$ |

In order to determine the correct ethylene content, there is a need to also take into account and include in the calculations the peaks attributable to such heterobonds, although the complete separation and identification of peaks attributable to heterobonds is difficult. Moreover, because the amount of heterobonds is small, the ethylene content in the invention shall be determined using formulas (1) to (7) in the same way as the analysis of copolymer produced with a Ziegler-Natta catalyst and containing substantially no heterobonds.

The conversion of ethylene content from mol % to wt % is carried out using the following formula.

Ethylene content (wt %)=(28×X/100)/{28×X/100+42×(1−X/100)}×100

(where X is the ethylene content expressed in mol %).

(v) Method of Preparing Component (A)

In a preferred method of preparing the component (A) used in the invention, successive polymerization is carried out using a metallocene catalyst. In a first step, from 30 to 70 wt %, and more preferably from 50 to 60 wt %, of the propylene-α-olefin random copolymer component (A1) having a melting peak temperature Tm(A1) in DSC measurement within a range of from 125 to 145° C., and more preferably from 125 to 138° C., is obtained. In a second step, from 70 to 30 wt %, and more preferably from 50 to 40 wt %, of the propylene-ethylene random copolymer component (A2) having an ethylene content E[A2] of from 7 to 17%, and more preferably from 8 to 14 wt %, is obtained. The specific method employed for the successive polymerization, using a metallocene catalyst, of component (A1) in a first step and component (A2) in a second step may be the method described in, for example, Japanese Patent Application Laid-open No. 2005-132979, the entire contents of which are incorporated herein by reference.

Alternatively, component (A) need not be a successive polymerization product, and may instead be a blend of a propylene-α-olefin copolymer (A1) which satisfies the above melting peak temperature Tm(A1) and a propylene-ethylene random copolymer (A2) which satisfies the ethylene content E[A2].

(A-ii) Melt Flow Rate of Component (A) (MFR (A))

The melt flow rate MFR (at 230° C. and 2.16 kg) of component (A) used in the invention (which melt flow rate is also referred to below as "MFR (A)") must fall within a range of from 0.5 to 20 g/10 min.

MFR (A) may be determined by the ratio of the respective MFRs for component (A1) and component (A2) (also referred to below as "MFR (A1)" and "MFR (A2)"), although in this invention, so long as MFR (A) is in a range of from 0.5 to 20 g/10 min, MFR (A1) and MFR (A2) may be any values within ranges that do not compromise the objects of the invention. However, because there is a risk of appearance defects arising in cases where the MFR difference between the two is very large, it is desirable for both MFR (A1) and MFR (A2) to be within a range of from 4 to 10 g/10 min.

If MFR (A) is too low, resistance to turning of the extruder screw becomes large, which not only increases the motor load and the forward end pressure, but also roughens the sheet surface, worsening the appearance. As a result, MFR (A) is preferably at least 4 g/10 min, and more preferably at least 5 g/10 min.

On the other hand, if the MFR (A) is too high, sheet formation tends to become unstable, making a uniform sheet difficult to obtain. Therefore, the MFR is preferably not more than 10 g/10 min, and more preferably not more than 8 g/10 min.

Here, MFR is the value measured in general accordance with JIS K7210.

(A-iii) Temperature-Loss Tangent (tan δ) Curve Peak

It is critical that the propylene resin composition (component (A)) used in the invention have, in a temperature-loss tangent (tan δ) curve obtained by dynamic mechanical analysis (DMA), a single peak at or below 0° C. on the tan δ curve representing the glass transition observed in a range of from −60 to 20° C.

In cases where component (A) assumes a phase-separated structure, because the glass transition temperature of the non-crystalline portion included in component (A1) and the glass transition temperature of the non-crystalline portion included in component (A2) each differ, there are a plurality of peaks. In such a case, the transparency worsens markedly.

Generally, the glass transition temperature in a propylene-ethylene random copolymer is observed in a range of from −60 to 20°; in the tan δ curve obtained by dynamic mechanical analysis within this range, it can be determined whether component (A) has assumed a phase-separated structure. Avoidance of a phase-separated structure which affects the sheet transparency is brought about by having a single peak at or below 0° C.

Here, dynamic mechanical analysis (DMA) is carried out by imparting sinusoidal strain of a specific frequency to a strip-shaped test specimen, and detecting the stress that arises. A frequency of 1 Hz is used. The measurement temperature is raised in a stepwise fashion from −60° C., and the test is carried out until the sample melts and measurement becomes impossible. It is recommended that the size of the strain be from about 0.1 to about 0.5%. The storage modulus G' and the loss modulus G" are determined by known methods from the resulting stress, and the loss tangent (=loss modulus/storage modulus) defined by this ratio is plotted versus temperature, yielding a sharp peak in the temperature region at or below 0° C. Generally, a peak in the tan δ curve at or below 0° C. is observed with the glass transition of amorphous regions. In the present invention, this peak temperature is defined as the glass transition temperature Tg (° C.).

(1-2) Proportion of Component (A) in Inner Layer (1)

It is critical that the proportion of the inner layer accounted for by the propylene resin composition (component (A)) be in a range of from 60 to 90 wt %, and preferably from 65 to 85 wt %, per 100 wt % of the combined weight of component (A) and component (B).

If the content of component (A) is too low, a good flexibility and transparency cannot be obtained. On the other hand, if the content of component (A) is too high, a marked reduction in thickness during fabrication such as heat sealing may arise.

(2) Ethylene-α-Olefin Copolymer (B)

(2-1) Properties of Component (B)

The ethylene-α-olefin copolymer (B) (also referred to below as "component (B)") which is used as a component of the propylene resin composition (X) making up the inner layer (1) of the multilayer propylene resin sheet of the invention is a copolymer obtained by the copolymerization of ethylene with an α-olefin having preferably from 3 to 20 carbons. Preferred examples of the α-olefin include those having from 3 to 20 carbons, such as propylene, 1-butene, 1-pentene, 1-hexene, 1-octene and 1-heptene. Component (B) is a component which acts to increase the transparency and flexibility of propylene resin composition (x), and must satisfy conditions (B-i) and (B-ii) below.

The multilayer propylene resin sheet of the invention is required to have flexibility and transparency. With regard to transparency, in cases where the refractive index of component (B) differs considerably from that of component (A), the transparency of the resulting sheet worsens. Hence, it is also important to have the refractive indices agree. Control of the refractive index by density is possible. In the invention, to obtain the required transparency, it is important for the density to be set within a specific range.

The addition of component (B) is also essential for further strengthening the low-temperature impact resistance of component (A).

(B-i) Density

Component (B) used in the invention must have a density in a range of from 0.860 to 0.910 g/cm$^3$.

If the density is too low, the refractive index difference will become large, worsening the transparency. Hence, at a density below 0.860 g/cm$^3$, the transparency required in this invention cannot be ensured.

On the other hand, if the density is too high, the crystallinity becomes high, resulting in an inadequate flexibility. Hence, the density must be no higher than 0.910 g/cm$^3$, and is preferably not more than 0.905 g/cm$^3$, and even more preferably not more than 0.900 g/cm$^3$.

Here, the density is a value measured in general accordance with JIS K7112.

(B-ii) Melt Flow Rate of Component (B) (MFR (B))

It is critical for the inner layer (1) in the invention to have suitable flow properties in order to ensure good sheet formability.

Therefore, if the melt flow rate MFR of component (B) (at 190° C. and 2.16 kg) (also referred to below as "MFR (B)") is too low, the flow properties will be inadequate, and problems such as poor dispersion will occur, giving rise to a decrease in transparency. Hence, it is critical for MFR (B) to be at least 0.5 g/10 min, preferably at least 1.5 g/10 min, and more preferably at least 2 g/10 min.

On the other hand, if MFR (B) is too high, sheet formation is unstable and film thickness variations arise. Hence, the MFR (B) is not more than 30 g/10 min, preferably not more than 10 g/10 min, and most preferably not more than 9 g/10 min.

The MFR is a value measured in general accordance with JIS K7210.

(2-2) Method of Producing Component (B)

Component (B) used in this invention must be set to a low density in order to make the refractive index difference with component (A) small. Moreover, to suppress tackiness and bleedout, it is desirable for the crystallinity and molecular weight distributions to be narrow. Hence, in the production of component (B), it is desirable to use a metallocene catalyst which is capable of providing narrow crystallinity and molecular weight distributions.

The catalyst and the polymerization process are described below.

(i) Metallocene Catalyst

Various types of known catalysts used to polymerize ethylene-α-olefin copolymers may be employed as the metallocene catalyst.

Illustrative examples include the metallocene catalysts mentioned in, e.g., Japanese Patent Application Laid-open Nos. S58-19309, S59-95292, S60-35006 and H3-163088.

(ii) Polymerization Process

Illustrative examples of polymerization processes include the following carried out in the presence of such catalysts: slurry processes, vapor phase fluidized bed processes, solution processes, and high-pressure bulk polymerization processes at a pressure of at least 200 kg/cm$^2$ and a polymerization temperature of at least 100° C. An example of a preferred production method is high-pressure bulk polymerization.

The component (B) used may be suitably selected from among commercially available metallocene-based polyethylenes. Examples of commercial products include AFFINITY and ENGAGE (available under these trade names from DuPont-Dow), KERNEL (available under this trade name from Japan Polyethylene Corporation), and EXACT (available under this trade name from Exxon Mobil).

In using these, a grade which satisfies the density and MFR that are essential features of the invention should be suitably selected.

(2-3) Ratio of Component (B) in Inner Layer Composition

It is essential that the ratio of component (B) in the inner layer composition be in a range of from 10 to 40 wt % per 100 wt % of component (A) and component (B) combined.

If the content of component (B) is too low, the low-temperature impact resistance conferred will be inadequate. On the other hand, if the content of component (B) is too high, thickness irregularities will arise in the sheet, making it impossible to obtain a sheet having a good appearance.

Hence, it is critical for component (B) to account for a proportion of the inner layer composition in a range of from 10 to 40 wt %. At less than 10 wt %, the flexibility conferred is inadequate; at more than 40 wt %, the sheet formability is inadequate, making use impossible. The preferred content of component (B), per 100 wt % of component (A) and component (B) combined, is from 15 to 35 wt %.

(3) Propylene Resin (C)

(3-1) Properties of Component (C)

Propylene resin (C), which may be advantageously used as one component of propylene resin composition (X) in the inner layer of the invention, is employed as a component which confers formability and suppresses appearance defects and a reduction in thickness.

Component (A), which is used as the primary component of the propylene resin composition (X) of the inner layer, is very effective for imparting a high flexibility and transparency to a laminated sheet. However, because component (A1) is a relatively low-melting component, drawbacks include the presence of little high-crystallinity component and a reduction in thickness during heat sealing. This is especially pronounced because product obtained using a metallocene catalyst has a sharp crystallinity distribution.

When attempts are thus made to broaden the crystallinity distribution of component (A) and thereby achieve a relative increase in high-crystallinity components, the low-crystallinity components also inevitably increase. As a result, these low-crystallinity components bleed out to the surface of the laminated sheet, giving rising to stickiness and appearance defects, which makes the sheet unfit for applications requiring transparency.

By adding a specific amount of component (C) to component (A) having little high-crystallinity component, the high-crystallinity components and the high-molecular-weight components can be increased without increasing the low-crystallinity components and the low-molecular-weight components. It is possible in this way to suppress appearance defects such as thickness variations and interfacial roughness, and to suppress a reduction in thickness during heat sealing, without giving rise to appearance defects such as bleedout.

Component (C) is preferably a propylene resin which satisfies conditions (C-i) and (C-ii) below, and more preferably a propylene resin composition composed of propylene (co)polymer component (C1) and a propylene-ethylene random copolymer (C2).

(C-i) Melting Peak Temperature Tm (C)

Component (C) is preferably a propylene resin having a melting peak temperature (Tm (C)) which is at least 6° C. higher than the melting peak temperature (Tm (A1)) of propylene-α-olefin random copolymer component (A1). By having the melting peak temperature be at least 6° C. higher, the resulting multilayer sheet can be conferred with the ability to suppress a reduction in thickness during heat sealing without causing appearance defects such as bleedout. Tm (C) is more preferably at least 10° C. higher, and even more preferably at least 20° C. higher, than Tm (A1).

The melting peak temperature Tm (C) of component (C) is preferably in a range of from 150 to 170° C., and more preferably from 155 to 167° C. If Tm (C) is less than 150° C., the high crystallinity component is inadequate, as a result of which a sufficient decrease in flow and a reduction in thickness-suppressing effect may not be achievable. At Tm (C) in excess of 170° C., industrial production is difficult. Tm (C) is more preferably from 155 to 165° C.

(C-ii) Melt Flow Rate MFR(C)

Also, in order to ensure sheet formability, it is important for component (C) to have suitable flow properties. The melt flow rate MFR (at 230° C. and 2.16 kg loading) (also referred to below as "MFR(C)"), which is a measure of the flow properties, is preferably in a range of from 0.5 to 30 g/10 min, with the upper limit being more preferably 15 g/10 min, and even more preferably 12 g/10 min. It is especially preferable for the MFR range to be from 2.5 to 12 g/10 min.

When MFR(C) is less than 0.5 g/10 min, dispersion worsens, which tends to give rise to the appearance defects known as gels and fisheyes. On the other hand, at more than 30 g/10 min, the physical property-related drawback of a decrease in flexibility tends to arise.

Here, MFR is a value measured in general accordance with JIS K7210.

(3-2) Composition of Propylene (Co)polymer Component (C1) and Propylene-Ethylene Random Copolymer (C2)

Component (C) is more preferably a composition of a propylene (co)polymer component (C1) which satisfies condition (C1-i) below and a propylene-ethylene random copolymer (C2) which satisfies condition (C2-i) below, and is, moreover, preferably a propylene resin (C) which satisfies condition (C-iii) below.

Here, component (C1) is a polypropylene component, and is a high-crystallinity component. Because Component (C1) has a higher melting peak temperature than component (A), it is in a crystalline state (solid state) at the temperature at which component (A) melts and begins to undergo melt flow, and thus acts to suppress the melt flow of component (A), making it an effective component for suppressing a reduction in thickness during heat sealing. Hence, component (C1) must be a polypropylene or propylene-ethylene copolymer composed of a copolymer having a higher crystallinity than component (A). However, by adding component (C1), the crystallinity of the inner layer as a whole increases, as a result of which a loss of flexibility occurs. By adding component (C2), which is a propylene-ethylene random copolymer and a low-crystallinity component, flexibility is conferred, which is effective for flexibilizing the laminated sheet as a whole. That is, component (C2) is effective for suppressing increased stiffness due to the addition of the high-crystallinity component (C1).

(C1-i) Ratios of Components (C1) and (C2) in Component (C)

Component (C) may be a mixture of propylene (co)polymer component (C1) in a component ratio (also referred to below as "W(C1)") of from 40 to 70 wt % and ethylene-propylene copolymer component (C2) in a component ratio (also referred to below as "W(C2)") of from 30 to 60 wt %. From the standpoint of uniformly and finely dispersing component (C2), component (C) is preferably obtained by multistage polymerization.

Because component (C2) is a low-crystallinity component, when W(C2) is too high, a reduction in thickness-suppressing effect is difficult to obtain, and when W(C2) is too low, a loss of flexibility occurs. Here, W(C1) and W(C2) can be determined from the material balance.

(C2-i) Ethylene Content (E [C2])

Component (C2) is a flexibility-imparting component essential for minimizing the increase in stiffness due to the addition of the high-crystallinity component (C1). Hence, because component (C2) is controlled by the ethylene content (also referred to below as "E [C2]"), it is preferable to set the ethylene content E [C2] to from 15 to 40 wt %.

At an ethylene content E [C2] below 15 wt %, because this is a region of compatibility with propylene, a sufficient flexibility-imparting effect at a low amount of addition is difficult to obtain. On the other hand, at an ethylene content in excess of 40 wt %, the ethylene content E [C2] is too high, which tends to worsen the transparency of the inner layer (1) as a whole.

Here, E [C2] is a value determined by the above-described $^{13}$C-NMR spectroscopy.

(C-iii) Intrinsic Viscosity Ratio of Components (C1) and (C2) in Component (C)

Component (C2) in component (C) has an intrinsic viscosity $[\eta]C2$ (also referred to below as "$[\eta]C2$"), as measured in 135° C. tetralin, of preferably from 1.7 to 6.5 dL/g, and more preferably from 1.7 to 4.0 dL/g, and has an intrinsic viscosity ratio $[\eta]C2/[\eta]C1$ with the intrinsic viscosity $[\eta]C1$ (also referred to below as "$[\eta]C1$") of component (C1) measured under the same conditions in a range of preferably from 0.6 to 1.2, and more preferably from 0.6 to 1.1.

$[\eta]C1$ influences in particular the processing properties such as, in particular, the sheet formability, and $[\eta]C2/[\eta]C1$ influences the dispersibility of component (C2) in component (C1). If $[\eta]C1$ is too large, the sheet formability tends to worsen, leading to production problems. If $[\eta]C2$ is too small, a sufficient flexibility is difficult to obtain, and if $[\eta]C2$ is too large, the transparency tends to worsen.

In cases where component (C) is obtained by consecutively producing components (C1) and (C2), because it is impossible to directly measure $[\eta]C2$ in component (C), this is determined as follows from the directly measurable $[\eta]C1$ and the intrinsic viscosity $[\eta]C$ of component (C) (also referred to below as "$[\eta]C$"), and also from W(C2).

$$[\eta]C2=\{[\eta]C-(1-W(C2)/100)[\eta]C1\}/(W(C2)/100)$$

Here, "consecutively producing" refers to producing component (C1) in the subsequently described first stage (first step), then successively producing component (C2) in a second stage (second step).

In the propylene resin (C) used in this invention, the product of the weight ratio (W(C2)/W(C1)) of W(C1) and W(C2) with the intrinsic viscosity ratio of the two components ($[\eta]C2/[\eta]C1$), which product is expressed as ($[\eta]C2/[\eta]C2)\times(W(C1)/W(C2))$, is preferably in a range of from 0.2 to 4.5, and more preferably from 0.6 to 4.0.

The product of the weight ratio and the intrinsic viscosity ratio indicates the dispersion state of component (C2) dispersed in component (C1). Having the product fall within the above range is an essential condition for indicating a specific dispersed structure wherein domains of component (C2) are present in an elongated state as isolated domains in the machine direction during fabrication or are connected to other domains in at least one place. Having this value be in the above-mentioned range is desirable because the transparency and flexibility of the resulting sheet are good.

(3-3) Method of Producing Component (C)

The propylene resin (C) may be produced by any method, so long as the above properties are satisfied. In cases where a composition of (C1) a propylene (co)polymer component and (C2) a propylene-ethylene random copolymer is produced, the propylene resin (C) may be produced using an apparatus that mixes a propylene (co)polymer (C1) and a propylene-ethylene random copolymer (C2) which have been separately produced, or the propylene resin (C) may be consecutively produced by, in a first step, producing a propylene (co)polymer (C1) and subsequently, in a second step, producing a propylene-ethylene random copolymer (C2) in the presence of the propylene (co)polymer (C1).

Preferred examples of specific methods of production are described in Japanese Patent Application Laid-open Nos. 2006-35516 and 2001-172454, the entire contents of which are incorporated herein by reference.

It is also possible to suitably select and use component (C) from among commercially available products. Illustrative examples of commercially available products include NOVATEC PP (available under this trade name from Japan Polypropylene Corporation), NEWCON (available under this trade name from Japan Polypropylene Corporation), and ZELAS (available under this trade name from Mitsubishi Chemical Corporation). In using these, a grade which satisfies the melting peak temperature, MFR and intrinsic viscosity ratio that are conditions of the invention should be suitably selected.

(3-4) Proportion of Component (C) in Inner Layer Components

The proportion of component (C) in the inner layer (1) is preferably in a range of from 1 to 25 wt % per 100 wt % of above components (A), (B) and (C) combined. Because component (C1) in component (C) has a higher melting peak temperature than component (A), it retains a crystalline state even at the temperature at which component (A) melts, thus suppressing flow by component (A). Component (C2) in component (C) has a flexibility-imparting effect for minimizing the increase in stiffness due to the addition of component (C1), which is a high-crystallinity component.

When the amount of component (C) is too low, the high-crystallinity component will be inadequate and it will not be possible to obtain a sufficient reduction in thickness-suppressing effect. Hence, this amount is preferably at least 1 wt %, and more preferably at least 5 wt %. Conversely, when the amount of component (C) is too high, decreases in physical properties such as flexibility and transparency tend to become conspicuous, making it difficult to satisfy the quality required of the inventive resin composition. Hence, this amount is preferably not more than 25 wt %, and more preferably not more than 20 wt %.

(3-5) Proportions of Components (A) and (B) When Component (C) is Included in Inner Layer Components The proportions of components (A) and (B) when component (C) is included in the inner layer components are as follows. The ratio of component (A) is preferably from 45 to 89 wt %, more preferably from 45 to 85 wt %, and most preferably from 50 to 80 wt %, per 100 wt % of component (A) to (C) combined. The ratio of component (B) is preferably from 15 to 25 wt % per 100 wt % of components (A) to (C) combined.

2. Outer Layer (2)

The outer layer (2) of the multilayer sheet of the invention is formed of a propylene resin composition (Y).

(1) Properties of Propylene Resin Composition (Y)

It is essential that the propylene resin composition (Y) (also referred to below as "component (Y)") used as the outer layer (2) of the multilayer propylene resin sheet of the invention have an excellent transparency, flexibility, heat resistance and impact resistance. To obtain a transparency and flexibility as a multilayer sheet, not only the inner layer (1), but also the outer layer (2) must be made flexible and transparent. Moreover, the outer layer (2) must also have heat resistance, in addition to which it is necessary that it not deform even when subjected to heat treatment such as sterilization, and that it not stick to the heat sealing bar in heat-sealing during fabrication. Also, it is essential that the outer layer (2) has a good impact resistance as well so as to suppress notch (failure starting point) formation in bag drop tests following fabrication into heat-treatable packaging bags.

To satisfy these requirements at a high level, it is essential that component (Y) be a propylene resin (D) (also referred to below as "component (D)") which satisfies condition (D-i) below.

It is preferable, moreover, for component Y to be a composition of a propylene (co)polymer component (D1) (also referred to below as "component (D1)") which satisfies conditions (D-ii) and (D1-i) below, and a propylene-ethylene random copolymer (D2) (also referred to below as "component (D2)") which satisfies conditions (D2-i) to (D2-iii) below.

Propylene resin (D) itself has a good impact resistance, although an ethylene-α-olefin copolymer (D3) (also referred to below as "component (D3)") may also be added to provide impact resistance at low temperatures of 0 to 5° C.

(D-i) Melting Peak Temperature Tm (D)

Component (D) has a melting peak temperature Tm (D) in a range of from 135 to 170° C., preferably from 136 to 165° C., and more preferably from 136 to 163° C.

When Tm (D) is less than 135° C., the heat resistance is inadequate, as a result of which deformation may arise when heat treatment such as sterilization is carried out. At Tm (D) above 170° C., industrial production is difficult.

(D-ii) Melt Flow Rate MFR (D)

Component (D) must have suitable flow properties in order to obtain a good formability that does not cause interface roughness and surface roughness during lamination and does not give rise to problems such as thickness variations. The melt flow rate MFR (at 230° C. and a load of 2.16 kg) (sometimes referred to below as "MFR (D)") which is a measure of flowability is in a range of preferably from 4 to 15 g/10 min, and more preferably from 4.5 to 10 g/10 min.

At a MFR (D) of below 4 g/10 min, interfacial roughness and surface roughness tend to arise, as a result of which a sheet having a good appearance may not be obtained. On the other hand, at MFR (D) in excess of 15 g/10 min, thickness variations readily arise, and formability is often difficult.

Here, the MFR is a value measured in general accordance with JIS K7210.

(2) Composition of Propylene (Co)polymer Component (D1) and Propylene-Ethylene Random Copolymer (D2)

Component (D) is preferably a composition of a propylene (co)polymer component (D1) which satisfies condition (D1-i) below and a propylene-ethylene random copolymer (D2) which satisfies conditions (D2-i) to (D2-iii) below.

Here, component (D1) is a propylene component which is a high-crystallinity component. Component (D1) is a heat-resistant component having a higher melting peak temperature than component (D2). When component (D) is composed only of component (D1), it has a high stiffness, resulting in a loss in the flexibility of the multilayer sheet of the invention. Hence, imparting flexibility by adding component (D2), which is a propylene-ethylene random copolymer and a low-crystallinity component, is effective for making the outer layer (2) more flexible. In other words, component (D2) is an effective component for suppressing an increase in stiffness by component (D1), which is a high-crystallinity component.

(D1-i) Ratio of Component (D1) in Component (D)

Component (D) may be a mixture composed of a propylene (co)polymer component (D1) (also referred to below as "component (D1)") in a component ratio (also referred to below as "W (D1)") of from 40 to 70 wt % and a propylene-ethylene random copolymer component (D2) (also referred to below as "component (D2)") in a component ratio (also referred to below as (W (D2)") of from 30 to 60 wt %. However, from the standpoint of uniformly and finely dispersing component (D2), component (D) is preferably obtained by multistage polymerization.

Because component (D2) is a low-crystallinity component, when W(D2) is too high, heat resistance is difficult to obtain, and when W(D2) is too low, sufficient flexibility is not imparted.

Here, W(D1) and W(D2) can be determined from the material balance.

(D2-i) Ethylene Content (E [D2])

Component (D2) is a flexibility-imparting component essential for minimizing the increase in stiffness due to the addition of component (D1), which is a high-crystallinity component. Hence, because component (D2) is controlled by the ethylene content (also referred to below as "E [D2]"), it is preferable to set the ethylene content E [D2] to from 15 to 40 wt %.

At an ethylene content below 15 wt %, because this is a region of compatibility with propylene, a sufficient flexibility-imparting effect is difficult to obtain. On the other hand, at an ethylene content in excess of 40 wt %, the ethylene content E is too high, which tends to worsen the transparency of the inner layer (1) as a whole.

Here, E [D2] is a value determined by the above-described $^{13}$C-NMR spectroscopy.

(D2-ii) Intrinsic Viscosity

Component (D2) in component (D) has an intrinsic viscosity [η] D2 (also referred to below as "[η]D2"), as measured in 135° C. tetralin, of preferably from 1.7 to 6.5 dL/g, and more preferably from 1.7 to 4.0 dL/g, and has an intrinsic viscosity ratio [η]D2/[η]D1 with the intrinsic viscosity [η] D1 (also referred to below as "[η] D1") of component (D1) measured under the same conditions in a range of preferably from 0.6 to 1.2, and more preferably from 0.6 to 1.1.

[η]D2 influences in particular the processing properties such as, in particular, the sheet formability, and [η]D2/[η]D1 influences the dispersibility of component (D2) in component (D1). If [η]D2 is too large, the sheet formability worsens, leading to production problems. If [η]D2 is too small, a sufficient flexibility cannot be obtained, and if [η]D2 is too large, the transparency worsens.

In cases where component (D) is obtained by consecutively producing components (D1) and (D, because it is impossible to directly measure [η]D2 in component (D), this is determined as follows from the directly measurable [η]D1 and the intrinsic viscosity [η]D of component (D) (also referred to below as "[η]D"), and also from W(D2).

$$[\eta]D2=\{[\eta]D-(1-W(D2)/100) [\eta]D1\}/(W(D2)/100)$$

Here, "consecutively producing" refers to producing component (D1) in the subsequently described first stage (first step), then successively producing component (D2) in a second stage (second step).

(D2-iii) Product of Weight Ratio and Intrinsic Viscosity Ratio of Components (D1) and (D2)

In the propylene resin composition (D) used in this invention, the product of the weight ratio (W(D2)/W(D1)) of W(D1) and W(D2) with the intrinsic viscosity ratio of the two components ([η]D2/[η]D1), which product is expressed as ([η]D2/[η]D2)×(W(D1)/W(D2)), is preferably in a range of from 0.2 to 4.5, and more preferably from 0.6 to 4.0.

The product of the weight ratio and the intrinsic viscosity ratio indicates the dispersion state of component (D2) dispersed in component (D1). Having the product fall within the above range is a condition for indicating a specific dispersed structure wherein domains of component (D2) are present in an elongated state as isolated domains in the machine direction during fabrication or are connected to other domains in at least one place. Having this value be in the above-mentioned range is desirable because the transparency and flexibility of the resulting sheet are good.

(3) Method of Producing Component (D)

The propylene resin (D) used in the invention may be produced by any method, so long as the above properties are satisfied. In cases where a composition of a propylene (co)polymer component (D1) and a propylene-ethylene random copolymer (D2) is produced as propylene resin (D), this may be done using an apparatus which mixes a propylene (co)polymer (D1) and a propylene-ethylene random copolymer (D2) which have been separately produced, or the propylene resin (D) may be consecutively produced by producing first a propylene (co)polymer (D1) and subsequently, producing a propylene-ethylene random copolymer (D2) in the presence of the propylene (co)polymer (D1). Preferred examples of specific methods of production are described in Japanese Patent Application Laid-open Nos. 2006-35516 and 2001-172454, the entire contents of which are incorporated herein by reference.

It is also possible to suitably select and use component (D) from among commercially available products. Illustrative examples of commercially available products include NOVATEC PP (available under this trade name from Japan Polypropylene Corporation), NEWCON (available under this trade name from Japan Polypropylene Corporation), and ZELAS (available under this trade name from Mitsubishi Chemical Corporation). In using these, a grade which satisfies the melting peak temperature, MFR and intrinsic viscosity ratio that are conditions of the invention should be suitably selected.

(4) Ethylene-α-Olefin Copolymer (D3)

The propylene resin (D) itself has a good impact resistance, although the ethylene-α-olefin copolymer (D3) described below may be added to impart further impact resistance at low temperature of 0 to 5° C.

The ethylene-α-olefin copolymer (D3) which may be used in the outer layer (2) of the multilayer polypropylene resin sheet of the invention is a copolymer obtained by the copolymerization of ethylene with an α-olefin having preferably from 3 to 20 carbons. Preferred examples of the α-olefin include those having from 3 to 20 carbons, such as propylene, 1-butene, 1-pentene, 1-hexene, 1-octene and 1-heptene. Component (D3) is a component which acts to increase the low-temperature impact resistance of propylene resin composition (Y), and preferably satisfies condition (D3-i) below.

(D3-i) Density

Component (D3) which may be advantageously used in the invention has a density in a range of from 0.860 to 0.910 g/cm³. If the density is too low, the refractive index difference will become large, worsening the transparency. Hence, at a density below 0.860 g/cm³, the transparency required in this invention cannot be ensured.

On the other hand, if the density is too high, the crystallinity rises, as a result of which a low-temperature impact resistance is not adequately imparted. Moreover, as in cases where the density is too low, a density which is too high will result in a large refractive index difference, as a result of which the transparency will tend to worsen. The density is more preferably not higher than 0.905 g/cm³, and even more preferably not more than 0.900 g/cm³.

Here, the density is a value measured in general accordance with JIS K7112.

(5) Method of Producing Component (D3)

Component (D3) which may be advantageously used in this invention must be set to a low density in order to make the refractive index difference with component (D) small. Moreover, to suppress tackiness and bleedout, it is desirable for the crystallinity and molecular weight distributions to be narrow. Hence, in the production of component (D3), it is desirable to use a metallocene catalyst which is capable of providing narrow crystallinity and molecular weight distributions.

Various types of known catalysts used to polymerize ethylene-α-olefin copolymers may be employed as the metallocene catalyst. The same catalysts as those mentioned above in connection with ethylene-α-olefin copolymer (B) may be used. Illustrative examples of polymerization processes include the following carried out in the presence of such catalysts: slurry processes, vapor phase fluidized bed processes, solution processes, and high-pressure bulk polymerization processes at a pressure of at least 200 kg/cm² and a polymerization temperature of at least 100° C. An example of a preferred production method is high-pressure bulk polymerization.

The component (D3) used may be suitably selected from among commercially available metallocene-based polyethylenes. Examples of commercial products include AFFINITY and ENGAGE (available under these trade names from DuPont-Dow), KERNEL (available under this trade name from Japan Polyethylene Corporation, and EXACT (available under this trade name from Exxon Mobil).

In using these, a grade which satisfies the density that is a condition of the invention should be suitably selected.

(6) Component Ratios within Component (Y) in Outer Layer (2) Composition

When component (D3) which may be advantageously used in the invention, is employed, it is preferable for the proportion of the outer layer (2) accounted for by component (D) to be in a range of from 80 to 99 wt %, and it is preferable for the proportion of the outer layer (2) accounted for by component (D3) to be in a range of from 1 to 20 wt %. The content of component (D) is more preferably from 85 to 95 wt %, and the content of component (D3) is more preferably from 5 to 15 wt %.

If the content of component (D) is less than 80 wt %, that is, if the content of component (D3) is 20 wt % or more, the heat resistance may be inadequate and deformation may arise in the heat treatment step. At a component (D) content of at 99 wt % or more, that is, at a component (D3) content of less than 1 wt %, the low temperature impact resistance-imparting effect is inadequate.

3. Innermost Layer (3)

In a preferred embodiment, the multilayer sheet of the invention also has an innermost layer (3). That is, the multilayer sheet is composed of at least three layers which include, in order, an outer layer (1), an inner layer (2) and an innermost layer (3). This innermost layer (3) is preferably formed of the propylene resin composition (Z) described below.

(1) Properties of Propylene Resin Composition (Z)

It is essential for the propylene resin composition (Z) (sometimes referred to below as "component (Z)") which may be used as the innermost layer (3) of the multilayer sheet to have transparency, flexibility, and a heat resistance which prevents internal fusion. In addition, the innermost layer (3), because it comes into contact with the contents, must also have a cleanliness such as not to contaminate the contents, and must also have a low-temperature heat-sealability that facilitates bag-making.

To satisfy these requirements at a high level, component (Z) is preferably a propylene resin composition having a soluble content at or below 0° C. (S0) of 15 wt % or less, as measured by temperature rising elution fractionation (TREF).

Also, to obtain a high heat-sealing strength, it is preferable to use as the propylene resin composition (Z) either a propylene resin composition (Z1) (sometimes referred to below as "component (Z1)") composed of (E) a propylene-ethylene random copolymer component and (F) an ethylene-α-olefin copolymer, or a propylene resin composition (Z2) (sometimes referred to below as "component (Z2)") composed of (G) a propylene resin composition (sometimes referred to below as "component (G)") to obtain greater flexibility, (H) an ethylene-α-olefin copolymer (sometimes referred to below as "component (H)") and (I) a propylene resin (sometimes referred to below as "component (I)").

Soluble Content of Component (Z) at or Below 0° C. (S0) in Temperature Rising Elution Fractionation (TREF)

The propylene resin composition (Z) (component (Z)) used in the innermost layer (3), because it comes into contact with the contents, must have a cleanliness that does not contaminate the contents. Component (Z) preferably has a soluble content (S0), as measured at or below 0° C. by temperature rising elution fractionation (TREF), of not more than 15 wt %.

The soluble content at or below 0° C. (S0) is preferably not more than 14 wt %, more preferably not more than 12 wt %, and most preferably not more than 12 wt %. At a soluble content at or below 0° C. (S0) of more than 15 wt %, the amount of low-crystallinity component is high, which may lead to contamination of the contents, making use of the multilayer sheet unsuitable in retort applications and IV bag applications, for which cleanliness is required.

The temperature rise elution fractionation (TREF) method is the same as described above, the ratio (wt %) components eluted at 0° C. or 40° C. with respect to the total weight being calculated from the resulting elution curve. The column, solvent, temperature and other conditions used are as follows.

Column size: 4.3 mm diameter×150 mm
Column packing: 100 μm surface-deactivated glass beads
Solvent: o-dichlorobenzene
Sample concentration: 5 mg/mL
Amount of sample injected: 0.1 mL
Solvent flow rate: 1 mL/min
Detector: MIRAN 1A (Foxboro) fixed wavelength type infrared detector
Measurement wavelength: 3.42 μm Melt Flow Rate of Component (Z) (MFR (Z))

Also, to obtain an easy sheet formability in which interfacial roughness and surface roughness do not arise during lamination and problems such as thickness variations do not occur, it is necessary for component (Z) to have suitable flow properties. The melt flow rate MFR (at 230° C. and 2.16 kg loading) (also referred to below as "MFR (Z)"), which is a measure of the flow properties, is preferably in a range of from 2 to 15 g/10 min, and more preferably from 2.5 to 10 g/10 min.

When MFR (Z) is less than 2 g/10 min, interfacial roughness and surface roughness tend to arise, and a sheet having a good appearance may not be obtained. On the other hand, when MFR (Z) is more than 15 g/10 min, thickness variations tend to arise and difficulties with sheet formation occur.

Here, MFR is a value measured in general accordance with JIS K7210.

The above propylene resin composition (component (Z)) which may be used in the innermost layer (3) is preferably selected from among the propylene resin composition (Z1) and the propylene resin composition (Z2) described below.

(2) Propylene Resin Composition (Z1)

Component (Z1) is a composition made of a propylene-α-olefin copolymer component (E) (also referred to below as "component (E)") which preferably satisfies condition (E-i) below, and an ethylene-α-olefin copolymer component (F) (also referred to below as "component (F)") which preferably satisfies conditions (F-i) and (F-ii) below.

(2-1) Properties of Component (E)

The propylene-α-olefin copolymer component (E) which may be used in propylene resin composition (Z1) of the innermost layer (3) is a propylene-rich component which has a higher melting peak temperature than the ethylene-α-olefin copolymer component (F) and has heat resistance. When component (E) is used alone, the low-temperature impact resistance is poor.

Hence, imparting low-temperature impact resistance by adding component (F), which is an ethylene-α-olefin copolymer and is a low-crystallinity component, is effective for increasing the flexibility of the innermost layer (3). That is, component (F) is an effective component for imparting low-temperature impact resistance. The propylene-α-olefin copolymer (E) used in this invention has itself a good low-temperature heat-sealability. However, the productivity can be improved by further lowering the heat-sealing temperature within a range where internal fusion does not arise in heat treatment such as sterilization. The ethylene-α-olefin copolymer component (F) is added for this purpose.

Therefore, the propylene-α-olefin copolymer component (E) is preferably one which satisfies the following conditions.

(E-i) Melting Peak Temperature Tm (E)

It is desirable for component (E) to be a propylene resin composition having a melting peak temperature Tm (E) in a range of preferably from 130 to 145° C., and more preferably from 135 to 140° C.

When Tm (E) is less than 130° C., the heat resistance tends to be inadequate. For example, internal fusion may arise when heat treatment such as sterilization is carried out. When Tm (E) exceeds 145° C., the flexibility worsens due to the higher stiffness, and the higher heat sealing temperature tends to worsen the bag-making efficiency.

(E-ii) Ratio of Component (E) in Component (Z1)

Component (E) accounts for a proportion of the propylene resin composition (Z1) which is preferably from 80 to 99 wt %, and more preferably from 85 to 99 wt %. The content of component E is most preferably from 90 to 95 wt %.

When the content of component E is less than 80 wt %, the heat resistance tends to be inadequate and internal fusion may arise in the heat treatment step. At a component (E) content above 99 wt %, the low temperature heat-sealability-imparting effect tends to be inadequate.

(2-2) Method of Producing Component (E)

The propylene-ethylene random copolymer component (E) is preferably polymerized using a metallocene catalyst. The metallocene catalyst used may be any known catalyst which is composed of (i) a ligand-containing group 4 transition metal compound having a cyclopentadienyl skeleton (a so-called metallocene compound), (ii) a co-catalyst which reacts with the metallocene compound and can be activated to a stable ion stage and, optionally, (iii) an organoaluminum compound. The metallocene compound is preferably a bridged metallocene compound capable of the stereoregular polymerization of propylene, and most preferably a bridged metallocene compound capable of the isotactic polymerization of propylene. Each of the ingredients is described below.

(i) Preferred examples of the metallocene compound include those mentioned in, for example, Japanese Patent Application Laid-open Nos. S60-35007, S61-130314, S63-295607, H1-275609, H2-41303, H2-131488, H2-76887, H3-163088, H4-300887, H4-211694, H5-43616, H5-209013, H6-239914, Japanese Translation of PCT Application No. H7-504934, and Japanese Patent Application Laid-open No. H8-85708, the entire contents of which are incorporated herein by reference.

Specific preferred examples include zirconium compounds such as methylenebis(2-methylindenyl)zirconium dichloride, ethylenebis(2-methylindenyl)zirconium dichloride, ethylene-1,2-(4-phenylindenyl)(2-methyl-4-phenyl-4H-azulenyl)zirconium dichloride, isopropylidene(cyclopentadienyl)(fluorenyl)zirconium dichloride, isopropylidene (4-methylcyclopentadienyl)(3-t-butylindenyl)zirconium dichloride, dimethylsilylene(2-methyl-4-t-butyl-cyclopentadienyl) (3'-t-butyl-5'-methyl-cyclopentadienyl) zirconium dichloride, dimethylsilylenebis(indenyl)zirconium dichloride, dimethylsilylenebis(4,5,6,7-tetrahydroindenyl)zirconium dichloride, dimethylsilylenebis[1-(2-methyl-4-phenyl-indenyl)]zirconium dichloride, dimethylsilylenebis[1-(2-ethyl-4-phenylindenyl)]zirconium dichloride, dimethylsilylenebis[4-(1-phenyl-3-methylindenyl)]zirconium dichloride, dimethylsilylene(fluorenyl)-t-butylamidozirconium dichloride, methylphenylsilylenebis[1-(2-methyl-4-(1-naphthyl)-indenyl)]zirconium dichloride, dimethylsilylenebis[1-(2-methyl-4,5-benzoindenyl)]zirconium dichloride, dimethylsilylenebis[1-(2-methyl-4-phenyl-4H-azulenyl)]zirconium dichloride, dimethylsilylenebis[1-(2-ethyl-4-(4-chlorophenyl)-4H-azulenyl)]zirconium dichloride, dimethylsilylenebis[1-(2-ethyl-4-naphthyl-4H-azulenyl)]zirconium dichloride, diphenylsilylenebis[1-(2-methyl-4-(4-chlorophenyl)-4H-azulenyl)]zirconium dichloride, dimethylsilylenebis[1-(2-ethyl-4-(3-fluorobiphenyryl)-4H-azurenyl)]zirconium dichloride, dimethylgermylenebis [1-(2-ethyl-4-(4-chlorophenyl)-4H-azulenyl)]zirconium dichloride and dimethylgermylenebis[1-(2-ethyl-4-phenyl-indenyl)]zirconium dichloride.

Advantageous use may likewise be made of those compounds in which zirconium has been substituted with titanium or hafnium in the above-mentioned compounds. The use of mixtures of zirconium compounds with hafnium compounds or the like is also possible. Also, chloride may be substituted with other halides, with hydrocarbon groups such as methyl, isobutyl or benzyl, with amide groups such as dimethylamide or diethylamide, with alkoxide groups such as methoxy or phenoxy, or with a hydride group.

Of these, metallocene compounds in which an indenyl group or azulenyl group is bridged with silyl or a germyl group are more preferred. Polymers obtained with a catalyst obtained by combining an azulenyl group-containing metallocene compound with a clay mineral are most preferred because they provide an excellent balance of film formability and low fisheyes.

The metallocene compound may be supported on an inorganic or organic compound carrier and used. A porous, inorganic or organic compound is preferred as the carrier. Illustrative examples include inorganic compounds such as ion-exchangeable layered silicates, zeolites, $SiO_2$, $Al_2O_3$, silica alumina, MgO, $ZrO_2$, $TiO_2$, $B_2O_3$, CaO, ZnO, BaO and $ThO_2$; organic compounds composed of porous polyolefin, styrene-divinyl benzene copolymers and olefin-acrylic acid copolymers, or mixtures thereof.

(ii) Examples of co-catalysts which react with a metallocene compound and can be activated to a stable ion stage include organoaluminoxy compounds (e.g., aluminoxane compounds), ion-exchangeable layered silicates, Lewis acids, boron-containing compounds, ionic compounds and fluorine-containing organic compounds.

(iii) Examples of organoaluminum compounds include trialkylaluminums such as triethylaluminum, triisopropylaluminum and triisobutylaluminum, dialkylaluminum halides, alkylaluminumsesquihalides, alkylaluminum dihalides, alkylaluminum hydrides and organoaluminum alkoxides.

Illustrative examples of the polymerization processes include the following carried out in the presence of such catalysts: slurry processes and solution processes which use an inert solvent, vapor phase processes which use substantially no solvent, and bulk polymerization processes in which the polymerization monomer serves as the solvent. As for the method of obtaining the propylene used in the invention, the desired polymer may be obtained by, for example, adjusting the polymerization temperature and amount of comonomer and suitably regulating the molecular weight and crystallinity distribution.

It is also possible to suitably select and use polypropylene from among products that are commercially available as metallocene-based polypropylene. Commercial products are exemplified by WINTEC (available under this trade name from Japan Polypropylene Corporation).

(2-3) Properties of Ethylene-α-Olefin Copolymer (F)

The ethylene-α-olefin copolymer (F) included in the propylene resin composition (Z1) used in the innermost layer (3) of the multilayer propylene resin sheet is a copolymer obtained by the copolymerization of ethylene with an α-olefin having preferably from 3 to 20 carbons. Preferred examples of the α-olefin include those having from 3 to 20 carbons, such as propylene, 1-butene, 1-pentene, 1-hexene, 1-octene and 1-heptene. Component (F) is a component which acts to increase the low-temperature heat sealability of the propylene-α-olefin copolymer component (E), and preferably satisfies conditions (F-i) and (F-ii) below.

(F-i) Density

Component (F) used in the invention has a density in a range of preferably from 0.860 to 0.910 g/cm$^3$.

If the density is too low, the refractive index difference will become large, worsening the transparency. Hence, at a density below 0.860 g/cm$^3$, the transparency required in this invention cannot be ensured.

On the other hand, if the density is too high, the crystallinity becomes high, resulting in an inadequate low-temperature impact resistance-imparting effect. As when the density is too low, at too high a density, the refractive index difference becomes large, worsening the transparency. Hence, the density must be no higher than 0.910 g/cm$^3$, and is preferably not more than 0.905 g/cm$^3$, and even more preferably not more than 0.900 g/cm$^3$.

Here, the density is a value measured in general accordance with JIS K7112.

(F-ii) Ratio of Component (F) in Component (Z1)

The ratio of component (F) in propylene resin composition (Z1) is in a range of preferably from 1 to 20 wt %, more preferably from 1 to 15 wt %, and even more preferably from 5 to 10 wt %.

At a component (F) content in excess of 20 wt %, the heat resistance is inadequate and internal fusion may arise in a heat treatment step. On the other hand, at a component F content of less than 1 wt %, the low temperature heat sealability-imparting effect is inadequate.

(2-4) Method of Producing Component (F)

The density of Component (F) used in this invention must be adjusted with that of component (E) in order to make the refractive index difference therewith small. Moreover, to suppress tackiness and bleedout, it is desirable for the crystallinity and molecular weight distributions to be narrow. Hence, in the production of component (F), it is desirable to use a metallocene catalyst which is capable of providing narrow crystallinity and molecular weight distributions.

Various types of known catalysts used to polymerize ethylene-α-olefin copolymers may be employed as the metallocene catalyst. Use may be made of metallocene catalysts similar to those mentioned above in connection with ethylene-α-olefin copolymer (B). Illustrative examples of polymerization processes include the following carried out in the presence of such catalysts: slurry processes, vapor phase fluidized bed processes, solution processes, and high-pressure bulk polymerization processes at a pressure of at least 200 kg/cm$^2$ and a polymerization temperature of at least 100° C. An example of a preferred production method is high-pressure bulk polymerization.

The component (F) used may also be suitably selected from among commercially available metallocene-based polyethylenes. Examples of commercial products include AFFINITY and ENGAGE (available under these trade names from DuPont-Dow), KERNEL (available under this trade name from Japan Polyethylene Corporation), and EXACT (available under this trade name from Exxon Mobil).

In using these, a grade which satisfies the density that is an essential feature of the invention should be suitably selected.

(3) Propylene Resin Composition (Z2)

The other propylene resin composition (referred to below as "component (Z2)") which may be preferably used as propylene resin composition (Z) in the innermost layer (3) is made of (G) a propylene resin composition and (H) an ethylene-α-olefin copolymer. Component (Z2) is suitable for obtaining a more flexible propylene resin multilayer sheet. It is preferable to also include in component (Z2) the subsequently described propylene resin (I).

(3-1) Properties of Propylene Resin Composition (G)

It is essential that the propylene resin composition (G) have a high transparency, flexibility and impact resistance. Also required are heat resistance so that internal fusion does not arise in the heating steps, and low temperature heat sealability to facilitate bag-making. To satisfy these requirements at a high level, it is preferable that component (G) satisfy condition (G-i) below.

(3-1) Basic Conditions of Component (G)

Component (G) used in the invention is a propylene resin composition (G) which satisfies the following condition (G-i):

(G-i) includes from 30 to 70 wt % of (G1) a propylene-α-olefin random copolymer component having a melting peak temperature (Tm (G1)) of from 125 to 145° C., and from 70 to 30 wt % of (G2) a propylene-ethylene random copolymer component having an ethylene content (E[G2]) of from 7 to 17 wt % and obtained using a metallocene catalyst;

The preferred conditions desired of component (G) are described in detail in (i) to (v) below.

(i) Melting Peak Temperature (Tm (G1)) of Component (G1)

Component (G1) is a component which determines the crystallinity in the propylene resin composition (component (G)). To increase the heat resistance of component (G), it is necessary for the melting peak temperature Tm (G1) (also referred to below as "Tm (G1)") of component (G1) to be high. However, if Tm (G1) is too high, the heat sealing temperature becomes higher, making bags more difficult to fabricate. On the other hand, if Tm (G1) is too low, the heat resistance worsens, as a result of which internal fusion arises during heat treatment such as in a sterilization step. Tm (G1) must be in a range of from 125 to 145° C., and is preferably from 125 to 138° C., and more preferably from 128 to 135° C. Component (A1) is preferably produced using a metallocene catalyst.

Here, the method of measuring the melting peak temperature Tm is as described above in the description of propylene resin composition (A).

(ii) Ratio of Component (G1) in Component (G)

Although component (G1) confers heat resistance on component (G), if the ratio W(G1) of component (G1) in component (G) is too high, it will be difficult to exhibit a sufficient flexibility, impact resistance and transparency. Hence, the ratio of component (G1) is preferably not more than 70 wt %, and more preferably not more than 60 wt %.

On the other hand, when the ratio of component (G1) is too small, even if Tm (G1) is sufficient, the heat resistance decreases, as a result of which deformation may occur in a sterilization step. Hence, the ratio of component (G1) is preferably at least 30 wt %, and more preferably at least 50 wt %.

(iii) Ethylene Content (E) in Component (G2) (E[G2])

Component (G2) produced in the second step is a required component for increasing the flexibility, impact resistance and transparency of component (G1). Generally, in propylene-ethylene random copolymers, when the ethylene content rises, the crystallinity decreases and the flexibility-increasing effect becomes larger. Hence, the ethylene content E[G2] in component (G2) (sometimes referred to below as "E[G2]") is preferably at least 7 wt %, and more preferably at least 8 wt %. When E[G2] is less than 7 wt %, a sufficient flexibility cannot be exhibited. E[G2] is preferably at least 10 wt %.

On the other hand, if E[G2] is increased excessively in order to lower the crystallinity of component (G2), the compatibility of component (G1) and component (G2) decreases and component (G2) forms domains rather than compatibilizing with component (G1). In such a phase-separated structure, if the matrix and the domains have differing refractive indices, the transparency abruptly decreases. Hence, the E[G2] of component (G2) in component (G) used in this invention is preferably not more than 17 wt %, more preferably not more than 14 wt %, and even more preferably not more than 12 wt %.

(iv) Ratio of Component (G2) in Component (G)

If the ratio W(G2) of component (G2) in component (G) is too high, the heat resistance will decrease. Hence, W(G2) is held to preferably not more than 70 wt %, and more preferably not more than 50 wt %.

On the other hand, if W(G2) is too low, flexibility and impact resistance-improving effects cannot be obtained. Hence, W(G2) is preferably at least 30 wt %, and more preferably at least 40 wt %.

Here, W(G1) and W(G2) are values determined by temperature rising elution fractionation (TREF). Also, as in the description provided for component (A) above, the ethylene content E[G2] is a value obtained by NMR.

(3-2) Temperature-Loss Tangent (tan δ) Curve Peak (G-ii)

It is preferable for component (G) used in the invention to have, in a temperature-loss tangent (tan δ) curve obtained by dynamic mechanical analysis (DMA), a single peak at or below 0° C. on the tan δ curve representing the glass transition observed in a range of from −60 to 20° C. The dynamic mechanical analysis method is defined in the same way as described above in connection with component (A).

In cases where component (G) assumes a phase-separated structure, because the glass transition temperature of the non-crystalline portion included in component (G1) and the glass transition temperature of the non-crystalline portion included in component (G2) each differ, there are a plurality of peaks. In such a case, the transparency worsens markedly.

Generally, the glass transition temperature in a propylene-ethylene random copolymer is observed in a range of from −60 to 20° C. and, in the tan δ curve obtained by dynamic mechanical analysis within this range, it can be determined whether component (G) has assumed a phase-separated structure. Avoidance of a phase-separated structure which affects the sheet transparency is brought about by having a single peak at or below 0° C.

(v) Method of Preparing Component (G)

The method of preparation described above for propylene resin composition (A) applies also to the method of preparing the component (G) used in the invention. Component (G) is obtained by using a metallocene catalyst to polymerize component (G1) in a first step and successively polymerize component (G2) in a second step. Production is preferably carried out by successively polymerizing from 50 to 60 wt % of the above-described propylene-α-olefin random copolymer component (C1) in the first step, and from 50 to 40 wt % of the above-described propylene-ethylene random copolymer component (G2) having an ethylene content E[G2] of from 8 to 14 wt % in the second step. The preferred method for producing component (G) is similar to the production method described in connection with propylene resin composition (A) above.

Alternatively, component (G) need not be a successive polymerization product, and may instead be produced by blending together component (G1) having the above properties with component (G2) having the above properties.

Ratio of Component (G) in Propylene Resin Composition (Z2)

Component (G) accounts for a proportion of component (Z2) which is preferably in a range of from 60 to 90 wt %, and more preferably from 65 to 85 wt %, per 100 wt % of components (G) and (H) combined.

If the content of component (G) is too low, a good flexibility and transparency may be difficult to achieve. On the other hand, if the content of component (G) is too high, it may be impossible to obtain a more preferable impact resistance and heat resistance.

(3-2) Ethylene-α-Olefin Copolymer (H)

(3-2-1) Properties of Component (H)

The ethylene-α-olefin copolymer (H) included in the propylene resin composition (Z2) is a copolymer obtained by the copolymerization of ethylene with an α-olefin having preferably from 3 to 20 carbons. Preferred examples of the α-olefin include those having from 3 to 20 carbons, such as propylene, 1-butene, 1-pentene, 1-hexene, 1-octene and 1-heptene. Component (H) is a component which acts to increase the transparency and flexibility of the propylene resin composition, and preferably satisfies condition (H-i) below.

Propylene resin composition (Z) used in the invention is required to have flexibility and transparency. With regard to the transparency, in cases where the refractive index of component (H) differs considerably from that of component (G), the transparency of the resulting sheet will worsen. Hence, it is important for the refractive indices to agree. The refractive index can be controlled by density. To obtain the transparency required in the invention, it is important to set the density within a specific range.

The addition of component (H) is necessary to further strengthen the low-temperature impact resistance of component (G).

(H-i) Density

Component (H) used in the invention has a density in a range of preferably from 0.860 to 0.910 g/cm$^3$.

If the density is too low, the refractive index difference will become large, worsening the transparency. Hence, at a density below 0.860 g/cm$^3$, the transparency required in this invention cannot be ensured.

On the other hand, if the density is too high, the crystallinity becomes high, resulting in an insufficient flexibility. Hence, the density is preferably not higher than 0.910 g/cm$^3$, more preferably not higher than 0.905 g/cm$^3$, and even more preferably not higher than 0.900 g/cm$^3$.

Here, the density is a value measured in general accordance with JIS K7112.

(3-2-2) Method of Producing Component (H)

To make the refractive index difference with component (G) small, component (H) used in this invention must be set to a low density. Moreover, to suppress tackiness and bleedout, it is desirable for the crystallinity and molecular weight distributions to be narrow. Hence, in the production of component (H), it is desirable to use a metallocene catalyst which is capable of providing narrow crystallinity and molecular weight distributions.

The metallocene catalyst and the polymerization process may be the same as those described above in connection with ethylene-α-olefin copolymer (F).

The component (H) used may be suitably selected from among commercially available metallocene-based polyethylenes. Examples of commercial products include AFFINITY and ENGAGE (available under these trade names from DuPont-Dow), KERNEL (available under this trade name from Japan Polyethylene Corporation), and EXACT (available under this trade name from Exxon Mobil).

In using these, a grade which satisfies the density that is an essential feature of the invention should be suitably selected.

(3-2-3) Ratio of Component (H) in Component (Z2)

Component (H) accounts for a proportion of component (Z2) which is in a range of preferably from 40 to 10 wt %, and more preferably from 35 to 15 wt %, per 100 wt % of components (G) and (H) combined.

If the content of component (H) is too low, the low-temperature impact resistance conferred is inadequate. On the other hand, if the content of component (H) is too high, thickness irregularities arise in the sheet, and obtaining a sheet having a good appearance is difficult.

Hence, the proportion of component (Z2) accounted for by component (H) is most preferably in a range of from 35 to 15 wt % per 100 wt % of components (G) and (H) combined. At less than 10 wt %, the flexibility imparted tends to be inadequate, whereas at more than 40 wt %, the sheet formability is inadequate, which is undesirable.

(3-3) Propylene Resin (I)
(3-3-1) Properties of Component (I)

The propylene resin (I) which is preferably included in the propylene resin composition (Z2) is used as component for suppressing the internal fusion which may arise in heating treatment steps such as a sterilization step.

In component (Z2), above-described component (G) which is used as the main component is very effective for imparting a high flexibility and transparency to a laminated sheet. However, because it is preferably produced with a metallocene catalyst and thus has a narrow crystallinity distribution, there remains some concern over the heat resistance owing to the low level of high-crystallinity components, and there is a high possibility that internal fusion will arise.

In light of this, when attempts are made to broaden the crystallinity distribution of component (G) and thereby achieve a relative increase in high-crystallinity components, the low-crystallinity components also inevitably increase. As a result, these low-crystallinity components bleed out to the surface of the laminated sheet, giving rising to stickiness and appearance defects, thus making the sheet unfit for applications requiring transparency.

By adding a specific amount of component (I) to component (G) having little high-crystallinity component, the high-crystallinity components and the high-molecular-weight components can be increased without increasing the low-crystallinity components and the low-molecular-weight components. As a result, appearance defects such as thickness variations and interfacial roughness can be suppressed without giving rise to appearance defects such as bleedout. Moreover, the addition of a specific amount of high crystallinity components, rather than broadening the crystallinity distribution, makes it easier to strike a good balance between a heat resistance which suppresses internal fusion and low-temperature heat sealability.

Therefore, component (I) is preferably a propylene resin which satisfies condition (I-i) below, and more preferably a propylene resin composed of the propylene (co)polymer component (I1) and propylene-ethylene random copolymer (I2) described below.

(I-i) Melting Peak Temperature Tm (I)

Component (I) preferably has a melting peak temperature (Tm (I)) which is at least 6° C. higher than the melting peak temperature (Tm (G1)) of the above-described propylene-α-olefin random copolymer component (G1). By having the melting peak temperature be at least 6° C. higher, the resulting multilayer sheet can be conferred with an ability to suppress appearance defects such as thickness variations and interfacial roughness, and also an ability to suppress a reduction in thickness during heat sealing, without giving rise to appearance defects such as bleedout. Tm (I) is more preferably at least 10° C. higher, and even more preferably at least 20° C. higher, than Tm (G1).

Component (I) is a propylene resin composition and has a melting peak temperature Tm (I) in a range of preferably from 150 to 170° C., and more preferably from 155 to 165° C.

If Tm (I) is less than 150° C., high-crystallinity components are inadequate, as a result of which a sufficient heat resistance may not be imparted. On the other hand, when Tm (I) is higher than 165° C., industrial production is difficult.

Propylene Resin Composed of Propylene (Co)polymer Component (I1) and Propylene-Ethylene Random Copolymer (I2)

Component (I) is preferably a propylene resin composed of (I1) a propylene (co)polymer component which satisfies component (I1-i) below and (I2) a propylene-ethylene random copolymer which satisfies condition (I2-i) below, and is, moreover, preferably a propylene resin (I) which satisfies condition (I-ii) below.

Here, component (I1) is a polypropylene component, and is a high-crystallinity component. Because component (I1) has a higher melting peak temperature than component (G), it is in a crystalline state (solid state) at the temperature at which component (G) melts and begins melt-flowing, and thus acts to suppress the melt flow of component (G), making it an effective component for suppressing internal fusion in a heating step such as sterilization treatment. Therefore, it is necessary for component (I1) to be a polypropylene or propylene-ethylene copolymer composed of a copolymer having a higher crystallinity than component (G). However, by adding component (I1), the crystallinity of the innermost layer (3) as a whole increases, as a result of which a loss of flexibility occurs. By adding component (I2), which is a propylene-ethylene random copolymer and a low-crystallinity component, flexibility is conferred, which is effective for flexibilizing the laminated sheet as a whole.

Component (H), too, is added to obtain similar effects, although too much component (H) worsens the sheet formability, making it difficult to obtain a sheet of uniform thickness. Hence, there is an upper limit to the amount added. In cases where the flexibility cannot be entirely provided by component (H) alone, adding component (I2) is effective. That is, component (I2) is effective for suppressing an increase in stiffness with the addition of the highly crystalline component (I1).

(I1-i) Ratios of Components (I1) and (I2) in Component (I)

Component (I) may be a mixture of a propylene (co)polymer component (I1) in a component ratio (also referred to below as "W(I1)") of from 40 to 70 wt % and an ethylene-propylene copolymer component (I2) in a component ratio (also referred to below as "W(I2)") of from 30 to 60 wt %. However, from the standpoint of uniformly and finely dispersing component (I2), component (I) is preferably obtained by multistage polymerization.

Because component (I2) is a low-crystallinity component, when W(I2) is too high, a heat resistance augmenting effect is difficult to obtain, and when W(I2) is too low, a flexibility augmenting effect is difficult to obtain. Here, W(I1) and W(I2) can be determined from the material balance.

(I2-i) Ethylene Content (E(I2))

Component (I2) is a flexibility-imparting component for minimizing the increase in stiffness due to the addition of component (I1), which is a high-crystallinity component. Hence, because component (I2) is controlled by the ethylene content (also referred to below as "E(I2)"), it is preferable to set the ethylene content to from 15 to 40 wt %.

At an ethylene content below 15 wt %, because this is a region of compatibility with propylene, a sufficient flexibility-imparting effect at a small amount of addition is difficult to obtain. On the other hand, at an ethylene content in excess of 40 wt %, the ethylene content is too high, which tends to worsen the transparency of the inner layer as a whole.

Here, E(I2) is a value determined by the above-described $^{13}$C-NMR spectroscopy.

(I-ii) Intrinsic Viscosity Ratio of Components (I1) and (I2) in Component (I)

Component (I2) in component (I) has an intrinsic viscosity [η]I2 (also referred to below as "[η]I2"), as measured in 135° C. tetralin, of preferably from 1.7 to 6.5 dL/g, and more preferably from 1.7 to 4.0 dL/g, and has an intrinsic viscosity ratio [η]I2/[η]I1 with the intrinsic viscosity [η]I1 (also referred to below as "[η]I1") of component (I1) measured under the same conditions in a range of preferably from 0.6 to 1.2, and more preferably from 0.6 to 1.1.

[η]I1 influences the processing properties such as, in particular, the sheet formability, and [η]I2/[η]I1 influences the dispersibility of component (I2) in component (I1). If [η]I1 is too large, the sheet formability tends to worsen, leading to production problems. If [η]I2 is too small, a sufficient flexibility is difficult to obtain, and if [η]I2 is too large, the transparency tends to worsen.

In cases where component (I) is obtained by consecutively producing components (I1) and (I2), because it is impossible to directly measure [η]I2 in component (I), this is determined as follows from the directly measurable [η]I1 and the intrinsic viscosity [η]I of component (I) (also referred to below as "[η]I"), and also from W(I2).

$$[\eta]I2=\{[\eta]I-(1-W(I2)/100)[\eta]I1\}/(W(I2)/100)$$

Here, "consecutively producing" refers to producing component (I1) in the subsequently described first stage (first step), then successively producing component (I2) in a second stage (second step).

In the propylene resin (I) used in this invention, it is important that the product of the weight ratio (W(I2)/W(I1)) of W(I1) and W(I2) with the intrinsic viscosity ratio of the two components ([η]I2/[η]I1), which product is expressed as ([η]I2/[η]I1)×(W(I1)/W(I2)), be in a range of from 0.2 to 4.5, and preferably from 0.6 to 4.0.

The product of the weight ratio and the intrinsic viscosity ratio indicates the dispersion state of component (I2) dispersed in component (I1). Having the product fall within the above range is an essential condition for indicating a specific dispersed structure wherein domains of component (I2) are present in an elongated state as isolated domains in the machine direction during fabrication or are connected to other domains in at least one place. Having this value be in the above-mentioned range is desirable because the transparency and flexibility of the resulting sheet are good.

(3-3-3) Method of Producing Component (I)

The propylene resin (I) used in the invention may be produced by any method, so long as the above properties are satisfied. In cases where a composition of (I1) a propylene (co)polymer component and (I2) a propylene-ethylene random copolymer is produced, the propylene resin (I) may be produced using an apparatus that mixes a propylene (co)polymer (I1) and a propylene-ethylene random copolymer (I2) which have been separately produced, or the propylene resin (I) may be consecutively produced by, in a first step, producing a propylene (co)polymer (I1) and subsequently, in a second step, producing a propylene-ethylene random copolymer (I2) in the presence of the propylene (co)polymer (I1). Preferred examples of specific methods of production are described in Japanese Patent Application Laid-open Nos. 2006-35516 and 2001-172454, the entire contents of which are incorporated herein by reference.

It is also possible to suitably select and use component (I) from among commercially available products. Illustrative examples of commercially available products include NOVATEC PP (available under this trade name from Japan Polypropylene Corporation), NEWCON (available under this trade name from Japan Polypropylene Corporation), and ZELAS (available under this trade name from Mitsubishi Chemical Corporation). In using these, a grade which satisfies the melting peak temperature, MFR and intrinsic viscosity ratio that are conditions of the invention should be suitably selected.

(3-3-4) Proportion of Component (I) in Component (Z2)

Component (I) accounts for a proportion of component (Z2) which is preferably in a range of from 1 to 25 wt % per 100 wt % of components (G), (H) and (I) combined.

When component (I) is included in component (Z2), the ratio of component (G) is preferably from 45 to 89 wt %, more preferably from 45 to 85 wt %, and even more preferably from 50 to 80 wt %, per 100 wt % of components (G), (H) and (I) combined; and the ratio of component (H) is preferably from 15 to 25 wt %, per 100 wt % of components (G) to (I) combined.

Component (I1) in component (I), because it has a higher melting peak temperature than component (G), maintains a crystalline state even at the temperature at which component (G) melts, and thus has a heat resistance-imparting effect which suppresses the melting and flow of component (G). Component (I2) in component (I) has a flexibility-imparting effect for minimizing the increase in stiffness due to the addition of component (I1), which is a high crystallinity component.

If an amount of component (I) which is too low, the high crystallinity component will not suffice, making it impossible to obtain a sufficient heat resistance-imparting effect. Hence, the amount of (I) included is preferably at least 1 wt %, and more preferably at least 5 wt %, per 100 wt % of components (G), (H) and (I) combined. On the other hand, if the amount of component (I) is too high, pronounced decreases in physical properties such as flexibility and transparency occur, making it impossible to satisfy the quality required in the resin composition of the invention. Hence, the amount of (I) included is preferably not more than 25 wt %, and more preferably not more than 20 wt %.

4. Additional Ingredients (Additives)

To enable the multilayer propylene resin sheet of the invention to be suitably employed as a multilayer sheet, propylene resin compositions (X), (Y) and (Z) used in, respectively, the inner layer (1), outer layer (2) and innermost layer (3) of the inventive multilayer sheet may include optional additives within ranges that do not significantly diminish the advantageous effects of the invention with regard to bleedout and the like. Such optional ingredients are exemplified by antioxidants, crystal nucleating agents, clarifiers, lubricants, anti-blocking agents, antistatic agents, haze inhibitors, neutralizing agents, metal inactivators, colorants, dispersants, peroxides, fillers and fluorescent whiteners used in ordinary polyolefin resin materials. Specific examples of the various additives are listed below. In addition, elastomers may be included as elasticity-imparting ingredients within a range which does not significantly diminish the advantageous effects of the invention.

(1) Antioxidants

Illustrative examples of antioxidants include phenolic antioxidants, such as tris(3,5-di-t-butyl-4-hydroxybenzyl) isocyanurate, 1,1,3-tris(2-methyl-4-hydroxy-5-t-butylphenyl) butane, octadecyl-3-(3,5-di-t-butyl-4-hydroxyphenyl) propionate, pentaerythrityltetrakis{3-(3,5-di-t-butyl-4- hydroxyphenyl)propionate}, 1,3,5-trimethyl-2,4,6-tris(3,5-di-t-butyl-4-hydroxybenzyl)benzene, 3,9-bis[2-{3-(3-t-butyl-4-hydroxy-5-methylphenyl)propionyloxy}-1,1-dimethylethyl]-2,4,8,10-tetraoxaspiro[5,5]undecane and 1,3,5-tris(4-t-butyl-3-hydroxy-2,6-dimethylbenzyl)isocyanuric acid.

Examples of phosphorus-based antioxidants include tris(mixed mono- and di-nonylphenylphosphite), tris(2,4-di-t-butylphenyl)phosphite, 4,4'-butylidenebis(3-methyl-6-t-butylphenyl-di-tridecyl)phosphite, 1,1,3-tris(2-methyl-4-di-tridecylphosphite-5-t-butylphenyl)butane, bis(2,4-di-t-butylphenyl)pentaerythritol diphosphite, tetrakis(2,4-di-t-butylphenyl)-4,4'-biphenylene diphosphonite, tetrakis(2,4-di-t-butyl-5-methylphenyl)-4,4'-biphenylene diphosphonite and bis(2,6-di-t-butyl-4-methylphenyl)pentaerythritol diphosphite.

Examples of sulfur-based antioxidants include distearyl thiodipropionate, dimyristyl thiodipropionate and pentaerythritol tetrakis(3-lauryl thiopropionate).

These antioxidants may be used singly or as combinations of two or more thereof, insofar as the advantageous effects of the invention are not compromised.

The amount of antioxidant included per 100 parts by weight of the respective resins is from 0.01 to 1.0 part by weight, preferably from 0.02 to 0.5 parts by weight, and more preferably from 0.05 to 0.1 parts by weight. If the amount included is below the above range, a thermal stability effect is not obtained and deterioration takes place when the resin is produced, causing scorching and fisheyes. On the other hand, at an amount in excess of the above range, the additive itself becomes a foreign substance, causing fisheyes, which is undesirable.

(2) Anti-Blocking Agents

The antiblocking agent has an average particle size of from 1 to 7 μm, preferably from 1 to 5 μm, and more preferably from 1 to 4 μm. At an average particle size below 1 μm, the slip characteristics and bag openability diminish, which is undesirable. On the other hand, at more than 7 μm, the transparency and tendency to scratch become markedly worse, which is undesirable. Here, the average particle size is a value measured by the coal tar counter method.

Examples of antiblocking agents that may be used include inorganic agents such as synthetic or natural silicas (silicon dioxide), magnesium silicate, aluminosilicates, talc, zeolites, aluminum borate, calcium carbonate, calcium sulfate, barium sulfate and calcium phosphate.

Examples of organic antiblocking agents include polymethyl methacrylate, polymethylsilsesquioxane (silicone), polyamides, polytetrafluoroethylene, epoxy resins, polyester resins, benzoguanamine formaldehyde (urea resin) and phenolic resins.

Synthetic silicas and polymethyl methacrylate are especially preferred from the standpoint of balance in dispersibility, transparency, antiblocking properties and scratch resistance.

The antiblocking agent may be one that has been surface-treated. Examples of surface treatment agents which may be used include surfactants, metal soaps, organic salts of acrylic acid, oxalic acid, citric acid and tartaric acid, higher alcohols, esters, silicones, fluoroplastics, silane coupling agents and condensed phosphates such as sodium hexametaphosphate, sodium pyrophosphate, sodium tripolyphosphate and sodium trimetaphosphate. Organic acid treatment, particularly citric acid treatment, is especially preferred. The method of treatment is not subject to any particular limitation. Use may be made of a known method, such as surface spraying or dipping.

The particles of antiblocking agent may have any shape. For example, they may have a shape that is spheroidal, angular, columnar, needle-like, plate-like or amorphous.

These antiblocking agents may be used singly or as combinations of two or more thereof, insofar as the advantageous effects of the invention are not compromised.

The amount of antiblocking agent compounded per 100 parts by weight of resin is typically from 0.01 to 1.0 part by weight, preferably from 0.05 to 0.7 parts by weight, and more preferably from 0.1 to 0.5 parts by weight. When the amount included is less than the above range, the antiblocking properties, slip characteristics and bag openability tend to decrease. When the amount is greater than the above range, a loss tends to occur in the transparency of the sheet or the antiblocking agent itself becomes foreign matter and causes fisheyes, which is undesirable.

(3) Slip Agents

Exemplary slip agents include monoamides, substituted amides and bisamides. Any one or combinations of two or more may be used.

Examples of monoamides include saturated fatty acid monoamides, such as laurylamide, palmitamide, stearamide, behenamide and hydroxystearamide.

Examples of unsaturated fatty acid monoamides include oleamide, erucamide and ricinolamide.

Examples of substituted amides include N-stearyl stearamide, N-oleyl oleamide, N-stearyl oleamide, N-oleyl stearamide, N-stearyl erucamide and N-oleyl palmitamide.

Examples of bisamides include saturated fatty acid bisamides such as methylenebis(stearamide), ethylenebis(capramide), ethylenebis(lauramide), ethylenebis(stearamide), ethylenebis(isostearamide), ethylenebis(hydroxystearamide), ethylenebis(behenamide), hexamethylenebis(stearamide), hexamethylenebis(behenamide), hexamethylenebis(hydroxystearamide), N,N'-distearyladipamide and N,N'-distearylsebacinamide.

Examples of unsaturated fatty acid bisamides include ethylenebis(oleamide), hexamethylenebis(oleamide), N,N'-dioleyl adipamide, N,N'-dioleyl sebacamide.

Examples of aromatic bisamides include m-xylylenebis(stearamide) and N,N'-distearyl isophthalamide.

Of these, among the fatty acid amides, the use of oleamide, erucamide and behenamide is especially preferred.

The amount of slip agent compounded per 100 parts by weight of the resin is typically from 0.01 to 1.0 part by weight, preferably from 0.05 to 0.7 parts by weight, and more preferably from 0.1 to 0.4 parts by weight. Below the foregoing range, the bag openability and slip characteristics tend to be poor. Above the foregoing range, floating up of the strip agent becomes excessive, as a result of which the slip agent bleeds to the sheet surface, worsening the transparency.

(4) Nucleating Agent

Illustrative examples of nucleating agents include sodium 2,2-methylenebis(4,6-di-t-butylphenyl)phosphate, talc, sorbitol compounds such as 1,3,2,4-di(p-methylbenzylidene)sorbitol, hydroxy-di(t-butylbenzoic acid) aluminum, 2,2-methylenebis(4,6-di-t-butylphenyl)phosphoric acid, and lithium $C_{8-20}$ aliphatic monocarboxylate mixtures (available from ADEKA under the trade name NA21).

The above nucleating agent is included in an amount per 100 parts by weight of the respective resins of typically from 0.0005 to 0.5 parts by weight, preferably from 0.001 to 0.1 parts by weight, and more preferably from 0.005 to 0.05 parts by weight. Below the foregoing range, effects as a nucleating agent are not obtained. Above the foregoing range, the nucleating agent itself becomes a foreign matter, causing fisheyes, which is undesirable.

Examples of nucleating agents other than the above include high-density polyethylene resins. The high-density polyethylene resin has a density of typically form 0.94 to 0.98 g/cm$^3$, and preferably from 0.95 to 0.97 g/cm$^3$. At densities outside this range, a transparency-improving effect cannot be obtained. The melt flow rate (MFR) of the high-density polyethylene resin at 190° C. is typically at least 5 g/10 min, preferably from 7 to 500 g/10 min, and more preferably from 10 to 100 g/10 min. At a MFR below 5 g/10 min, the dispersed diameter of high-density polyethylene resin does not become sufficiently small, as a result of which the high-density polyethylene resin itself becomes a foreign matter, causing fisheyes, which is undesirable. Also, in order for the high-density polyethylene resin to microdisperse, it is preferable that the high-density polyethylene resin have a higher MFR than the MFR of the propylene resin in the invention.

Production of the high-density polyethylene resin used as a nucleating agent is not subject to any particular limitation concerning the method of production and the catalyst, so long as a polymer having the desired physical properties can be obtained. Exemplary catalysts include Ziegler-Natta catalysts (i.e., catalysts based on a combination of a supported or unsupported halogen-containing titanium compound and an organoaluminum compound) and Kaminsky catalysts (catalysts based on a combination of a supported or unsupported metallocene compound and an organoaluminum compound, particularly an alumoxane). The shape of the high-density polyethylene resin is not subject to any particular limitation, and may be in the form of pellets or in powder form.

When used as a nucleating agent, the amount of high-density polyethylene compounded per 100 parts by weight of the resin is typically form 0.01 to 5 parts by weight, preferably from 0.05 to 3 parts by weight, and more preferably from 0.1 to 1 part by weight. Below the foregoing range, effects as a nucleating agent are not obtained. Above the foregoing range, the high-density polyethylene itself becomes a foreign matter, causing fisheyes, which is undesirable.

(5) Neutralizing Agent

Illustrative examples of neutralizing agents include calcium stearate, zinc stearate, hydrotalcite and Mizukalac (available from Mizusawa Industrial Chemicals, Ltd.).

When a neutralizing agent is included, the amount compounded per 100 parts by weight of the resin is typically from 0.01 to 1.0 part by weight, preferably form 0.02 to 0.5 parts by weight, and more preferably from 0.05 to 0.1 parts by weight. At an amount below the foregoing range, because effects as a neutralizing agent are not obtained, deteriorated resin at the interior of the extruder is scraped out, causing fisheyes. Above the foregoing range, the neutralizing agent itself becomes a foreign material, causing fisheyes, which is undesirable.

(6) Optical Stabilizers

Hindered amine stabilizers are suitably used as the optical stabilizer. Compounds known to the art which have a structure wherein all the hydrogens bonded to the carbons at the 2 and 6 positions of piperidine have been substituted with methyl groups may be used without particular limitation. Examples of compounds that may be used include those listed below.

Illustrative examples include polycondensates of dimethyl succinate with 1-(2-hydroxyethyl)-4-hydroxy-2,2,6,6-tetramethylpiperidine, tetrakis(1,2,2,6,6-pentamethyl-4-piperidyl)1,2,3,4-butanetetracarboxylate, bis(1,2,2,6,6-pentamethyl-4-piperidyl)sebacate, the condensate of N,N-bis(3-aminopropyl)ethylenediamine with 2,4-bis[N-butyl-N-(1,2,2,6,6-pentamethyl-4-piperidyl)amino]-6-chloro-1,3,5-triazine, bis(2,2,6,6-tetramethyl-4-piperidyl)sebacate, poly[{6-(1,1,3,3-tetramethylbutyl)imino-1,3,5-triazine-2,4-diyl}{(2,2,6,6-tetramethyl-4-piperidyl)imino}hexamethylene{2,2,6,6-tetramethyl-4-piperidyl}imino] and poly[(6-morpholino-s-triazine-2,4-diyl)[(2,2,6,6-tetramethyl-4-piperidyl)imino]hexamethylene{(2,2,6,6-tetramethyl-4-piperidyl)imino}].

These hindered amine stabilizers may be used singly or as a combination of two or more thereof, insofar as the advantageous effects of the invention are not compromised.

In cases where a hindered amine stabilizer is included, it is desirable for the amount compounded per 100 parts by weight of the resin to be from 0.005 to 2 parts by weight, preferably from 0.01 to 1 part by weight, and more preferably from 0.05 to 0.5 parts by weight.

At a hindered amine stabilizer content below 0.005 parts by weight, there is no stability (e.g., heat resistance, antidegrading property) improving effect, whereas at above 2 parts by weight, the stabilizer itself becomes a foreign matter, causing fisheyes, which is undesirable.

(7) Antistatic Agent

Known additives that have hitherto been used as antistatic agents may be employed here as antistatic agents without any particular limitation. Exemplary antistatic agents include anionic surfactants, cationic surfactants, nonionic surfactants and amphoteric surfactants.

Illustrative examples of anionic surfactants include carboxylates such as fatty acid or rosin acid soaps, N-acylcarboxylates, ether carboxylates and fatty acid amine salts; sulfonates such as sulfosuccinates, ester sulfonates and N-acylsulfonates; sulfates such as sulfonated oils, sulfuric acid esters, alkyl sulfates, alkylpolyoxyethylene salts of sulfuric acids, ether sulfates and amide sulfates; and phosphates such as alkyl phosphates, alkylpolyoxyethylene salts of phosphoric acid, ether phosphates and amide phosphates.

Illustrative examples of cationic surfactants include amine salts such as alkylamine salts, quaternary ammonium salts such as alkyltrimethylammonium chloride, alkylbenzyldimethylammonium chloride, alkyldihydroxyethylmethylammonium chloride, dialkyldimethylammonium chloride, tetraalkylammonium salts, N,N-di(polyoxyethylene)dialkylammonium salts and ammonium salts of N-alkylalkanamides; alkylimidazoline derivatives such as 1-hydroxyethyl-2-alkyl-2-imidazoline and 1-hydroxyethyl-1-alkyl-2-alkyl-2-imidazoline; and imidazolinium salts, pyridinium salts and isoquinolinium salts.

Illustrative examples of nonionic surfactants include those in the form of ethers, such as alkylpolyoxyethylene ether and p-alkylphenylpolyoxyethylene ether; those in the form of ether esters, such as fatty acid sorbitan polyoxyethylene ethers, fatty acid sorbitol polyoxyethylene ethers and fatty acid glycerol polyoxyethylene ethers; those in the form of esters, such as fatty acid polyoxyethylene esters, monoglycerides, diglycerides, sorbitan esters, sucrose esters, dihydric alcohol esters, and boric acid esters; and those in the form of nitrogen-containing compounds, such as dialcohol alkylamines, dialcohol alkylamine esters, fatty acid alkanolamides, N,N-di(polyoxyethylene)alkanamides, alkanolamine esters, N,N-di(polyoxyethylene)alkanamines, aminoxides and alkylpolyethyleneimines.

Illustrative examples of amphoteric surfactants include those in the form of amino acids, such as monoaminocarboxylic acids and polyaminocarboxylic acids; those in the form of N-alkyl-β-alanines, such as N-alkylaminopropionic acid salts and N,N-di(carboxymethyl)alkylamine salts; those in the form of betaines, such as N-alkylbetaines, N-alkylamide betaines, N-alkylsulfobetaines, N,N-di(polyoxyethylene)alkylbetaines and imidazolium betaine; and alkylimidazoline derivatives, such as 1-carboxymethyl-1-hydroxy-1-hydroxyethyl-2-alkyl-2-imidazoline and 1-sulfoethyl-2-alkyl-2-imidazoline.

Of these, nonionic surfactants and amphoteric surfactants are preferred. Nonionic surfactants, either in the form of esters, such as monoglycerides, diglycerides, boric acid esters, dialcohol alkylamines, dialcohol alkylamine esters and amides, or in the form of nitrogen-containing compounds, and amphoteric surfactants in the form of betaines are especially preferred.

Commercial products may be used as the antistatic agent. Illustrative examples include Electrostripper TS5 (glycerol monostearate, available under this trade name from Kao Corporation), Electrostripper TS6 (stearyl diethanolamine, available under this trade name from Kao Corporation), Electrostripper EA (lauryldiethanolamine, available under this trade name from Kao Corporation), Electrostripper EA-7 (polyoxyethylene laurylamine capryl ester, available under this trade name from Kao Corporation), Denon 331P (stearyl diethanolamine monostearate, available under this trade name from Marubishi Oil Chemical Co., Ltd.), Denon 310 (alkyl diethanolamine fatty acid monoester, available under this trade name from Marubishi Oil Chemical Co., Ltd.), Resistat PE-139 (stearic acid mono and diglyceride boric acid esters, available under this trade name from Dai-ichi Kogyo Seiyaku Co., Ltd.), Chemistat 4700 (alkyl dimethylbetaine, available under this trade name from Sanyo Chemical Industries, Ltd.) and Leostat S (alkyl diethanolamide, available under this trade name from Lion Corporation).

When an antistatic agent is included, the amount compounded per 100 parts by weight of resin is typically from 0.01 to 2 parts by weight, preferably from 0.05 to 1 part by weight, more preferably from 0.1 to 0.8 parts by weight, and even more preferably from 0.2 to 0.5 parts by weight. These antistatic agents may be used singly or as combinations of two or more thereof, insofar as the advantageous effects of the invention are not compromised. At an amount below 0.01 parts by weight, the antistatic agent is unable to reduce the surface resistivity and prevent damage due to static electricity. At more than 2 parts by weight, the surface of the sheet has a tendency to shed powder due to bleeding.

The elastomer in the invention is exemplified by styrene-based elastomers. Commercial products include Hybrar (available under this trade name from Kuraray Co., Ltd.) and Dynaron (available under this trade name from JSR Corporation).

[II] Production of Resin Compositions for Respective Layers of Multilayer Propylene Resin Sheet The propylene resin composition (X) making up the inner layer (1) in the multilayer propylene resin sheet of the invention is obtained by a method which involves mixing the above-described propylene resin composition (A), ethylene-α-olefin copolymer (B), propylene resin (C) where desired, and other additives as needed in for example, a Henschel mixer, V blender, ribbon blender or tumbler blender, followed by kneading in a kneader such as a single-screw extruder, a multi-screw extruder, a kneader or a Banbury mixer.

The propylene resin composition (Y) making up the outer layer (2) in the multilayer propylene resin sheet of the invention is obtained by a method which involves mixing the above-described propylene resin (D) and other additives as needed in, for example, a Henschel mixer, V blender, ribbon blender or tumbler blender, followed by kneading in a kneader such as a single-screw extruder, a multi-screw extruder, a kneader or a Banbury mixer.

The propylene resin composition (Z) making up the innermost layer (3) in the multilayer propylene resin sheet of the invention is obtained by a method which involves mixing the above-described propylene resin composition (Z1) of propylene-α-olefin copolymer component (E) and ethylene-α-olefin copolymer (F), or the above-described propylene resin composition (Z2) of propylene resin composition (G), ethylene-α-olefin copolymer (H), propylene resin (I) where desired, and other additives as needed in, for example, a Henschel mixer, V blender, ribbon blender or tumbler blender, followed by kneading in a kneader such as a single-screw extruder, a multi-screw extruder, a kneader or a Banbury mixer.

The respective components may be mixed at the same time, or a portion may be prepared as a masterbatch, then mixed and kneaded.

[III] Multilayer Propylene Resin Sheet

The multilayer propylene resin sheet of the invention can be produced by a known method using the above-described propylene resin compositions. Production is carried out by a known technique, such as extrusion using a T-die or a circular die.

The multilayer propylene resin sheet of the invention has an excellent flexibility, transparency, impact resistance, heat resistance and cleanliness, and is able to suppress the loss of transparency due to appearance defects such as thickness irregularities and interfacial roughness. Moreover, the productivity is enhanced because reductions in thickness during fabrication operations such as heat sealing can be suppressed, enabling a good mechanical strength to be maintained and excellent heat sealability to be achieved. As a result, the sheet is ideally suited for use in heat-treatable packaging bags which must undergo a heat treatment operation such as sterilization, and particularly IV bags.

The multilayer propylene resin sheet of the invention is characterized by having an excellent flexibility even after heat treatment. It is desirable that the sheet have a tensile modulus, which is a measure of flexibility, of 330 Mpa or less. At a tensile modulus of 300 Mpa or less, and preferably 280 Mpa or less, because the sheet ceases to feel stiff, it has a good hand and is able to convey a sense of quality, which is a remarkable feature.

The multilayer propylene resin sheet of the invention, by having a haze (a measure of transparency) following heat treatment of 20% or less, preferably 18% or less, and more preferably 15% or less, allows the contents to be clearly seen, a quality which is highly desirable in that it enables one to check whether foreign matter is present in the bag contents.

The multilayer propylene resin sheet of the invention has an impact resistance, particularly at low temperatures of 0 to 5° C., which is excellent. In low-temperature bag drop tests, which are a measure of the low-temperature impact resistance, the sheet has an outstanding impact resistance, with bag failure not occurring even when dropped from a height of 100 cm. This is an excellent result in that it allows the sheet to be used as a product (bag) which will not fail even should it be dropped during, for example, transport or storage. The sheet preferably does not fail even when dropped from a height of 150 cm, and more preferably does not fail even when dropped from a height of 200 cm.

In addition, the multilayer propylene resin sheet of the invention has an excellent heat resistance. Namely, it exhibits an outstanding heat resistance without deformation or internal fusion even when heat treatment at about 121° C. is carried out. A deformed sheet has a bad appearance and a reduced product value. An internally fused sheet may interfere with discharge of the contents, making the sheet unfit for use as a product.

Furthermore, the multilayer propylene resin sheet of the invention has an excellent cleanliness. In the innermost layer (3) which comes into contact with the contents, it is desirable to employ a propylene resin composition which is obtained using a metallocene catalyst and has exceedingly low contents of low-molecular weight components and low-regularity components that may contaminate the contents.

Finally, the multilayer propylene resin sheet of the invention has an excellent low-temperature heat sealability, which is highly advantageous for enhancing productivity. The heat sealability of the sheet is such that, at a heat-sealing pressure of 3.4 kgf/cm$^2$ and a heat-sealing time of 5 seconds, a heat-sealing strength of at least 3,000 gf/10 mm is obtained at a heat-sealing temperature of preferably 145° C. or less, and more preferably 140° C. or less.

EXAMPLES

To more concretely and clearly explain the invention, the invention is illustrated below by contrasting working examples of the invention with comparative examples, thereby demonstrating the rationality and significance of the constitution of the invention. However, the invention is not limited by these examples. The physical property measurement methods, characterization methods and resin materials used in the working examples and comparative examples are described below.

1. Resin Property Measurement Methods (1) MFR

Propylene resin composition (A), propylene resin (C), propylene resin (D), propylene-ethylene random copolymer (E), propylene resin composition (G) and propylene resin (I) were measured in accordance with JIS K7210, Method A, Condition M; namely, at a test temperature of 230° C., a nominal load of 2.16 kg, and a die shape having a diameter of 2.095 mm and a length of 8.00 mm.

Ethylene-α-olefin copolymer (B), ethylene-α-olefin copolymer (D3), ethylene-α-olefin copolymer (F) and ethylene-α-olefin copolymer (H) were measured in accordance with JIS K7210, Method A, Condition D; namely, at a test temperature of 190° C., a nominal load of 2.16 kg, and a die shape having a diameter of 2.095 mm and a length of 8.00 mm.

(2) Density:

Using the extruded strand obtained at the time of MFR measurement, measurement was carried out by the density gradient tube method in general accordance with JIS K7112, Method D.

(3) Melting Peak Temperature:

A digital scanning calorimeter (DSC) manufactured by Seiko Instruments, Inc. was used. After placing a 5.0 mg sample in the calorimeter and holding it at 200° C. for 5 minutes, the sample was crystallized by lowering the temperature to 40° C. at a ramp-down rate of 10° C./min, then melted at a ramp-up rate of 10° C./min, at which time the melting peak temperature was measured.

(4) Dynamic Mechanical Analysis

The samples used were cut out in the form of strips (10 mm wide×18 mm long×2 mm thick) from a 2 mm thick sheet injection-molded under the conditions indicated below. The apparatus used was an ARES manufactured by Rheometric Scientific. The frequency was 1 Hz. The measurement temperature was ramped up in a stepwise manner from −60° C., and measurement was carried out until the sample melted and measurement became impossible. Measurement was carried out at a strain in a range of from 0.1 to 0.5%.

[Test Piece Fabrication]

Standard No.: JIS-7152 (ISO 294-1)

Molding machine: EC-20 injection molding machine (Toshiba Machine)

Molding machine temperature settings: from below hopper——80, 80, 160, 200, 200, 200° C.

Mold temperature: 40° C.

Injection rate: 200 mm/s (rate in mold cavity)

Holding pressure: 20 MPa

Pressure-holding time: 40 seconds

Mold shape: flat plate (thickness, 2 mm; width, 40 mm; length, 80 mm)

(5) W(A1), W(A2), E[A1], E[A2], W(G1), W(G2), E(G1), E(G2)

Measured by the above-described methods.

(6) 0° C. Solubles (S0) of Component (E)

Measured by the temperature rising elution fractionation (TREF) method described below.

A sample is dissolved in o-dichlorobenzene at 140° C., forming a solution. The solution is introduced into a 140° C. TREF column, following which it is cooled to 100° C. at a ramp-down rate of 8° C./rain, then cooled to 40° C. at a ramp-down rate of 4° C./min, and held at that temperature for 10 minutes. Next, the o-dichlorobenzene serving as the solvent is passed through the column at a rate of 1 mL/min and the component dissolved in the 40° C. o-dichlorobenzene within the TREF column is eluted for 10 minutes, following which the temperature of the column is raised linearly to 140° C. at a ramp-up rate of 100° C./hour, thereby giving an elution curve.

The ratio (wt %) of the component eluted at 40° C. to the total weight is computed from the elution curve obtained according to the above conditions. Conditions such as the column used, the solvent and the temperature were as follows.

Column size: 4.3 mm diameter×150 mm

Column packing: 100 μm surface-deactivated glass beads

Solvent: o-dichlorobenzene

Sample concentration: 5 mg/mL

Sample insertion amount: 0.1 mL

Solvent flow rate: 1 mL/min

Detector: MIRAN 1A (Foxboro) fixed wavelength type infrared detector

Measurement wavelength: 3.42 μm

2. Method of Forming Multilayer Propylene Resin Sheet

Using a 3-kind, 3-layer water-cooled blown film forming machine (Placo Co., Ltd.; die diameter, 100 mm; die lip, 3 mm; die temperature, 200° C.), a tubular multilayer sheet was formed in which the outer layer (2) and innermost layer (3) each had thicknesses of 20 μm and the inner layer had a thickness of 160 μm, and which had a lay-flat width of 200 mm.

3. Evaluation Methods for Multilayer Propylene Resin Sheet (1) Heat Resistance (Appearance)

The multilayer propylene resin sheet having a tubular shape was cut to a size of 210 mm in the machine direction, and the cut side was heat-sealed (heat-sealing conditions: pressure, 3.4 kgf/cm$^2$; time, 5 seconds; temperature, 160° C.; using a heat sealer manufactured by Tester Sangyo Co., Ltd.) and formed into a bag shape. Next, the interior was filled with 500 mL of pure water, and the other end was sealed by heat-sealing with an impulse sealer. Sealing was carried out such that the distance between the two heat seals was 200 mm. The sample bag thus obtained was placed in a high-temperature and high-pressure cooking sterilization equipment (RCS-40 RTGN, manufactured by Hisaka Works, Ltd.), after which pressure was applied and the ambient temperature was raised to and held at 121° C. for 30 minutes. This was followed by cooling to about 40° C., whereupon the sample bag was removed from the equipment (the multilayer sheet (sample bag) which has been subjected to this sterilization treatment is sometimes referred to below as "the heat-treated multilayer sheet").

The heat resistance of the heat-treated multilayer sheet was evaluated according to the following criteria.

Δ: Bag is not fit for use owing to deformation, wrinkling or internal fusion.

◯–: Some deformation, but of a degree that allows bag to be used.

◯: Condition of bag is good, with no deformation, wrinkling or internal fusion.

(2) Transparency (HAZE)

The transparency of the heat-treated multilayer sheet was measured with a hazemeter in general accordance with JIS K7136-2000. A smaller value signifies better transparency. A value of 20% or less is good because the contents are easy to check, giving a display effect. The value is preferably 18% or less, and more preferably 15% or less.

(3) Flexibility (Tensile Modulus)

The tensile modulus of the heat-treated multilayer sheet was measured under the following conditions in the machine direction (MD) in accordance with JIS K-7127-1989. A smaller value signifies better flexibility. A value of 330 MPa or less is desirable because the bag has a good hand, giving it a sense of quality. The value is preferably 300 MP or less, and more preferably 280 MPa or less.

Sample length: 150 mm
Sample width: 15 mm
Chuck interval: 100 mm
Crosshead speed: 1 mm/min (4) Low-Temperature Impact Resistance (Cumulative Bag Drop Test)

Two water-filled heat-treated multilayer sheets were conditioned at 4° C. for 48 hours, following which they were dropped twice at that temperature onto an iron plate from a height of 50 cm. If the bags did not break, they were dropped twice from a height of 100 cm. If the bags still did not break, they were then dropped twice from a height of 150 cm. If the bags still remained unbroken, they were finally dropped twice from a height of 200 cm. It is desirable that failure not occur even when the bag is dropped from 100 cm, preferable that failure not occur even when the bag is dropped from 150 cm, and more preferable that failure not occur even when the bag is dropped from 200 cm. Sheets that did not fail were rated as "◯" for good. Sheets that failed were rated as "X".

(5) Bag-Making Ease (Low-Temperature Heat Sealability: Heat-Sealing Strength)

A tubular multilayer propylene resin sheet was cut to a size of 100 mm in the machine direction and the cut side was heat-sealed to form a bag. The sheet was then conditioned for 24 hours in a 23° C., 50% RH atmosphere (heat-sealing conditions: pressure, 3.4 kgf/cm$^2$; time, 5 seconds; temperature, from 125 to 160° C. in 5° C. intervals). Next, the interior was filled with 500 mL of pure water, and the other side was sealed by heat-sealing using an impulse sealer. The sample bag thus obtained was placed in a high-temperature and high-pressure cooking sterilization equipment (RCS-40 RTGN, manufactured by Hisaka Works, Ltd.), after which pressure was applied and the ambient temperature was raised to and held at 121° C. for 30 minutes. This was followed by cooling to about 40° C., whereupon the sample bag was removed from the equipment. Next, the water was drained, and the heat-sealed portion was cut into 10 mm wide strips. Using a universal testing machine (Tensilon universal testing machine, manufactured by Orientec Co., Ltd.), peel tests were carried out at a peel rate of 500 mm/min on these specimens, and the heat-sealing strength of the multilayer sheet was determined.

The higher the resulting numerical value, the stronger the heat seal between the laminated sheets. At a value of 3,000 gf/10 mm or more, the sheet is fully capable of being used in heat-treatable packaging bags.

Also, the lower the heat-sealing temperature at which a heat-sealing strength of 3,000 gf/10 mm or more can be achieved, the better the resulting productivity. That is, a lower heat-sealing temperature signifies a good bag-making ease. The heat-sealing temperature is preferably 145° C. or below, and more preferably 140° C.

4. Resins Used (1) Propylene Resin Composition (A) for Inner Layer (1-1) Resins PPCA-1) to PP(A-17) obtained by successive polymerization in Production Examples (A-1) to (A-17) below were used.

Production Example A-1

(i) Preparation of Prepolymerization Catalyst (Chemical Treatment of Silicate)

A 10-liter glass separable flask equipped with a stirrer was charged with 3.75 liters of distilled water, followed by 2.5 kg of concentrated sulfuric acid (96%) slowly. In addition, 1 kg of montmorillonite (Benclay SL, available from Mizusawa Industrial Chemicals, Ltd.; average particle size, 25 μm; particle size distribution, 10 to 60 μm) was dispersed at 50° C., following which the temperature was raised to 90° C. and the flask was maintained at that temperature for 6.5 hours. After cooling to 50° C., the slurry was vacuum filtered and the cake was collected. Next, 7 liters of distilled water was added to the cake to as to reconstitute the slurry, which was then filtered. This washing operation was carried out until the pH of the wash fluid (filtrate) exceeded 3.5. The recovered cake was dried overnight in a nitrogen atmosphere at 110° C. The weight after drying was 707 g.

(Drying of Silicate)

The silicate which was chemically treated earlier was dried in a kiln dryer. The specifications and drying conditions were as follows.

Rotary cylinder: cylindrical shape, with inside diameter of 50 mm, heating zone of 550 mm (electric furnace), and with lifting flights Rotating speed: 2 rpm
Inclination: 20/520
Silicate feed rate: 2.5 g/min
Gas flow rate: nitrogen, 96 L/hour
Countercurrent drying temperature: 200° C. (powder temperature)

(Preparation of Catalyst)

A 16-liter autoclave equipped with a stirrer and a temperature control device was thoroughly flushed with nitrogen. Dry silicate (200 g) was introduced, then 1,160 mL of mixed heptane was added, followed by 840 mL of a heptane solution of triethylaluminum (0.60 M), and the contents were stirred at room temperature. One hour later, washing with mixed heptane was carried out, thereby preparing 2,000 mL of a silicate slurry. Next, 9.6 mL of a heptane solution of triisobutylaluminum (0.71 M/L) was added to the prepared silicate slurry, and reacted at 25° C. for one hour. In a separate procedure, 33.1 mL of a heptane solution of triisobutylaluminum (0.71 M) was added to 2,180 mg (0.3 mM) of (r)-dichloro[1,1'-dimethylsilylenebis{2-methyl-4-(4-chlorophenyl)-4H-azulenyl}]zirconium and 870 mL of mixed heptane, and reacted at room temperature for one hour. The mixture thus obtained was added to the silicate slurry and stirred for 1 hour, following which additional mixed heptane was added, bringing the volume up to 5,000 mL.

(Prepolymerization/Washing)

Next, the reactor temperature was raised to 40° C. Once the temperature had stabilized, propylene was fed in at a rate of 100 g/hour, and the temperature was maintained. The supply of propylene was stopped after 4 hours, and the temperature was maintained for another 2 hours.

After the completion of prepolymerization, the remaining monomer was purged, stirring was stopped, and the system was left at rest for about 10 minutes, following which 2,400 mL of supernatant was decanted. Next, 9.5 mL of a heptane solution of triisobutylaluminum (0.71 M/L) then 5,600 mL of mixed heptane were added, stirring was carried out at 40° C. for 30 minutes, and the system was left at rest for 10 minutes, after which 5,600 mL of supernatant was removed. This operation was repeated another three times. An ingredient analysis of the final supernatant was carried out, whereupon the concentration of the organoaluminum ingredient was 1.23 mM/L and the zirconium concentration was $8.6 \times 10^{-6}$ g/L. Hence, the amount present in the supernatant relative to the amount charged was 0.016%. Next, 170 mL of a heptane solution of triisobutylaluinum (0.71 M/L) was added, following which vacuum drying was carried out at 45° C. This operation yielded a prepolymerization catalyst containing 2.0 g of polypropylene per gram of catalyst.

Using this prepolymerization catalyst, a propylene-ethylene block copolymer was produced according to the following procedure.

(ii) First Polymerization Step

A horizontal reactor (L/D=6; capacity, 100 liters) equipped with stirring blades was thoroughly dried, and the interior was thoroughly flushed with nitrogen gas. In the presence of a polypropylene powder bed and while stirring at a speed of 30 rpm, 0.568 g/hr of the prepolymerization catalyst prepared by the above-described method and 15.0 mmol/hr of triisobutylaluminum were continuously fed to the upstream portion of the reactor. Vapor phase polymerization was carried out by continuously passing a monomer mixed gas into the reactor in such a way as to give an ethylene-propylene molar ratio of 0.07 in the vapor phase portion within the reactor and to set the hydrogen concentration at 100 ppm, while holding the reactor temperature at 65° C. and the pressure at 2.1 MPaG. The polymer powder formed by the reaction was continuously removed from the downstream portion of the reactor in a manner such as to keep the size of the powder bed within the reactor constant. The polymer removal rate that reached a steady state at this time was 10.0 kg/hr.

Upon analysis, the propylene-ethylene random copolymer obtained in the first polymerization step was found to have a MFR of 6.0 g/10 min and an ethylene content of 2.2 wt %.

(iii) Second Polymerization Step

The propylene-ethylene copolymer removed from the first step was continuously fed to a horizontal reactor equipped with stirring blades (L/D=6; capacity, 100 liters). Vapor-phase polymerization was carried out by continuously passing a monomer mixed gas into the reactor in such a way as to give an ethylene-propylene molar ratio of 0.453 in the vapor phase portion within the reactor and to set the hydrogen concentration at 330 ppm, while stirring at a rate of 25 rpm and while holding the reactor temperature at 70° C. and the pressure at 2.0 MPaG. The polymer powder formed by the reaction was continuously removed from the downstream portion of the reactor in such a way as to keep the size of the powder bed within the reactor constant. Oxygen was supplied as an activity suppressor so as to set the polymer removal rate at this time to 17.9 kg/hr, thereby controlling the polymerization reaction rate in the second polymerization step. The activity was 31.429 kg/g of catalyst.

The various analytical results for the propylene resin composition PP(A-1) obtained in this way are shown in Table 3.

Production Examples A-2 to A-9

Aside from changing the polymerization conditions as shown in Table 3, catalyst preparation and polymerization were carried out by the same methods as in Production Example A-1.

Following reaction completion, various analyses of the resulting polymers were carried out. Table 3 shows the analytical results for the propylene resin compositions PP(A-2) to PP(A-9) thus obtained. These satisfy all the features of the invention for component (A).

Production Examples A-10 to A-17

Aside from changing the polymerization conditions as shown in Table 4, catalyst preparation and polymerization were carried out by the same methods as in Production Example A-1.

Following reaction completion, various analyses of the resulting polymers were carried out. Table 4 shows analytical results for the propylene resin compositions PPCA-10) to PP(A-17) thus obtained. These do not satisfy the features of the invention for component (A).

TABLE 3

| | Production Examples | | | A-1 | A-2 | A-3 | A-4 | A-5 |
|---|---|---|---|---|---|---|---|---|
| | Propylene Resin Composition (A) | | | PP(A-1) | PP(A-2) | PP(A-3) | PP(A-4) | PP(A-5) |
| Production conditions | Step 1 | Catalyst amount | g/h | 0.568 | 0.391 | 0.625 | 0.568 | 0.568 |
| | | Temperature | ° C. | 65 | 65 | 65 | 65 | 65 |
| | | Pressure | MPa | 2.1 | 2.1 | 2.1 | 2.1 | 2.1 |
| | | C2/C3 ratio | mol/mol | 0.07 | 0.09 | 0.055 | 0.07 | 0.07 |
| | | Hydrogen concentration | ppm | 100 | 150 | 90 | 100 | 100 |
| | | Production amount | kg/h | 10 | 10 | 10 | 10 | 10 |
| | | (Polymerization activity) | g/g-cat | 17,600 | 25,600 | 16,000 | 17,600 | 17,600 |
| | Step 2 | Temperature | ° C. | 70 | 70 | 70 | 70 | 70 |
| | | Pressure | MPa | 2.0 | 2.0 | 2.0 | 2.0 | 2.0 |
| | | C2/C3 ratio | mol/mol | 0.453 | 0.453 | 0.453 | 0.534 | 0.435 |
| | | Hydrogen concentration | ppm | 330 | 330 | 330 | 350 | 320 |
| | | Production amount | kg/h | 17.9 | 17.9 | 17.9 | 19.2 | 16.7 |
| | | (Polymerization activity) | g/g-cat | 31,429 | 45,714 | 28,571 | 33,846 | 29,333 |

TABLE 3-continued

| Analytic results | Tm(A1) | Melting peak temperature | ° C. | 130 | 126 | 133 | 130 | 130 |
|---|---|---|---|---|---|---|---|---|
| | E(A1) | Ethylene content in component (A1) | wt % | 2.2 | 2.8 | 1.7 | 2.2 | 2.2 |
| | W(A1) | Ratio of component (A1) | wt % | 56 | 56 | 56 | 52 | 60 |
| | MFR(A1) | MFR of component (A1) | g/10 min | 6 | 6 | 6 | 6 | 6 |
| | E(A2) | Ethylene content in component (A2) | wt % | 11 | 11 | 11 | 12.8 | 10.6 |
| | W(A2) | Ratio of component (A2) | wt % | 44 | 44 | 44 | 48 | 40 |
| | MFR(A) | MFR of component (A) | g/10 min | 6 | 6 | 6 | 6 | 6 |
| | Tg | Glass transition point | ° C. | −14 | −15 | −13 | −16 | −13 |

| Production Examples | | | | A-6 | A-7 | A-8 | A-9 |
|---|---|---|---|---|---|---|---|
| Propylene Resin Composition (A) | | | | PP(A-6) | PP(A-7) | PP(A-8) | PP(A-9) |
| Production conditions | Step 1 | Catalyst amount | g/h | 0.568 | 0.568 | 0.649 | 0.535 |
| | | Temperature | ° C. | 65 | 65 | 65 | 65 |
| | | Pressure | MPa | 2.1 | 2.1 | 2.1 | 2.1 |
| | | C2/C3 ratio | mol/mol | 0.07 | 0.07 | 0.07 | 0.07 |
| | | Hydrogen concentration | ppm | 100 | 100 | 90 | 110 |
| | | Production amount | kg/h | 10 | 10 | 10 | 10 |
| | | (Polymerization activity) | g/g-cat | 17,600 | 17,600 | 15,400 | 18,700 |
| | Step 2 | Temperature | ° C. | 70 | 70 | 70 | 70 |
| | | Pressure | MPa | 2.0 | 2.0 | 2.0 | 2.0 |
| | | C2/C3 ratio | mol/mol | 0.435 | 0.534 | 0.453 | 0.453 |
| | | Hydrogen concentration | ppm | 320 | 350 | 300 | 450 |
| | | Production amount | kg/h | 17.9 | 17.9 | 17.9 | 17.9 |
| | | (Polymerization activity) | g/g-cat | 31,429 | 31,429 | 27,500 | 33,393 |
| Analytic results | Tm(A1) | Melting peak temperature | ° C. | 130 | 130 | 130 | 130 |
| | E(A1) | Ethylene content in component (A1) | wt % | 2.2 | 2.2 | 2.2 | 2.2 |
| | W(A1) | Ratio of component (A1) | wt % | 56 | 56 | 56 | 56 |
| | MFR(A1) | MFR of component (A1) | g/10 min | 6 | 6 | 4.7 | 8 |
| | E(A2) | Ethylene content in component (A2) | wt % | 10.6 | 12.8 | 11 | 11 |
| | W(A2) | Ratio of component (A2) | wt % | 44 | 44 | 44 | 44 |
| | MFR(A) | MFR of component (A) | g/10 min | 6 | 6 | 4.7 | 8 |
| | Tg | Glass transition point | ° C. | −14 | −15 | −14 | −14 |

TABLE 4

| Production Examples | | | | A-10 | A-11 | A-12 | A-13 | A-14 |
|---|---|---|---|---|---|---|---|---|
| Propylene Resin Composition (A) | | | | PP(A-10) | PP(A-11) | PP(A-12) | PP(A-13) | PP(A-14) |
| Production conditions | Step 1 | Catalyst amount | g/h | 0.284 | 1.250 | 0.568 | 0.568 | 0.568 |
| | | Temperature | ° C. | 65 | 65 | 65 | 65 | 65 |
| | | Pressure | MPa | 2.1 | 2.1 | 2.1 | 2.1 | 2.1 |
| | | C2/C3 ratio | mol/mol | 0.12 | 0.02 | 0.07 | 0.07 | 0.07 |
| | | Hydrogen concentration | ppm | 200 | 30 | 100 | 100 | 100 |
| | | Production amount | kg/h | 10 | 10 | 10 | 10 | 10 |
| | | (Polymerization activity) | g/g-cat | 35,200 | 8,000 | 17,600 | 17,600 | 17,600 |
| | Step 2 | Temperature | ° C. | 70 | 70 | 70 | 70 | 70 |
| | | Pressure | MPa | 2.0 | 2.0 | 2.0 | 2.0 | 2.0 |
| | | C2/C3 ratio | mol/mol | 0.453 | 0.453 | 0.453 | 0.453 | 0.228 |
| | | Hydrogen concentration | ppm | 330 | 330 | 330 | 330 | 300 |
| | | Production amount | kg/h | 17.9 | 17.9 | 25.0 | 15.4 | 17.9 |
| | | (Polymerization activity) | g/g-cat | 62,857 | 14,286 | 44,000 | 27,077 | 31,429 |

TABLE 4-continued

| | | | | | | | | |
|---|---|---|---|---|---|---|---|---|
| Analytic results | Tm(A1) | Melting peak temperature | °C. | 120 | 140 | 130 | 130 | 130 |
| | E(A1) | Ethylene content in component (A1) | wt % | 3.8 | 0.5 | 2.2 | 2.2 | 2.2 |
| | W(A1) | Ratio of component (A1) | wt % | 56 | 56 | 40 | 65 | 56 |
| | MFR(A1) | MFR of component (A1) | g/10 min | 6 | 6 | 6 | 6 | 6 |
| | E(A2) | Ethylene content in component (A2) | wt % | 11 | 11 | 11 | 11 | 6 |
| | W(A2) | Ratio of component (A2) | wt % | 44 | 44 | 60 | 35 | 44 |
| | MFR(A) | MFR of component (A) | g/10 min | 6 | 6 | 6 | 6 | 6 |
| | Tg | Glass transition point | °C. | −16 | −12 | −15 | −11 | −9 |

| | | Production Examples | | A-15 | A-16 | A-17 |
|---|---|---|---|---|---|---|
| | | Propylene Resin Composition (A) | | PP(A-15) | PP(A-16) | PP(A-17) |
| Production conditions | Step 1 | Catalyst amount | g/h | 0.568 | 0.909 | 0.455 |
| | | Temperature | °C. | 65 | 65 | 65 |
| | | Pressure | MPa | 2.1 | 2.1 | 2.1 |
| | | C2/C3 ratio | mol/mol | 0.07 | 0.07 | 0.07 |
| | | Hydrogen concentration | ppm | 100 | 20 | 200 |
| | | Production amount | kg/h | 10 | 10 | 10 |
| | | (Polymerization activity) | g/g-cat | 17,600 | 11,000 | 22,000 |
| | Step 2 | Temperature | °C. | 70 | 70 | 70 |
| | | Pressure | MPa | 2.0 | 2.0 | 2.0 |
| | | C2/C3 ratio | mol/mol | 0.678 | 0.453 | 0.453 |
| | | Hydrogen concentration | ppm | 380 | 330 | 330 |
| | | Production amount | kg/h | 17.9 | 17.9 | 17.9 |
| | | (Polymerization activity) | g/g-cat | 31,429 | 19,643 | 39,286 |
| Analytic results | Tm(A1) | Melting peak temperature | °C. | 130 | 130 | 130 |
| | E(A1) | Ethylene content in component (A1) | wt % | 2.2 | 2.2 | 2.2 |
| | W(A1) | Ratio of component (A1) | wt % | 56 | 56 | 56 |
| | MFR(A1) | MFR of component (A1) | g/10 min | 6 | 2 | 15 |
| | E(A2) | Ethylene content in component (A2) | wt % | 16 | 11 | 11 |
| | W(A2) | Ratio of component (A2) | wt % | 44 | 44 | 44 |
| | MFR(A) | MFR of component (A) | g/10 min | 6 | 2 | 15 |
| | Tg | Glass transition point | °C. | −12, −32 | −14 | −14 |

(1-2) Propylene Resin Composition (A) for Inner Layer, Obtained by Blending

The following <J1> propylene-α-olefin random copolymers ((J1-1) to (J1-7)) were used as component (A1), and the following <J2> propylene-ethylene random copolymers ((J2-1) to (J2-4)) were used as component (A2).

<J1>

J1-1: The commercial product available from Japan Polypropylene Corporation under the trade name WINTEC WFW4 (a propylene-ethylene random copolymer obtained with a metallocene catalyst)

J1-2: Produced in Production Example J1-2 below.

J1-3: The commercial product available from Japan Polypropylene Corporation under the trade name NOVATEC PP FW4B (a propylene-α-olefin copolymer obtained with a Ziegler-Natta catalyst)

J1-4: The commercial product available from Japan Polypropylene Corporation under the trade name NOVATEC PP EG7F (a propylene-ethylene random copolymer obtained with a Ziegler-Natta catalyst)

J1-5: The commercial product available from Dow Chemical under the trade name VERSIFY 3000 (a propylene-ethylene random copolymer obtained with a metallocene catalyst)

J1-6: Produced in Production Example J1-6 below.

J1-7: The commercial product available from Japan Polypropylene Corporation under the trade name NOVATEC PP SA06A (a propylene homopolymer obtained with a Ziegler-Natta catalyst)

<J2>

J2-1: The commercial product available from Exxon-Mobil Chemical under the trade name VISTAMAXX 3000 (a propylene-ethylene random copolymer obtained with a metallocene catalyst)

J2-2: The commercial product available from Dow Chemical under the trade name VERSIFY 3000 (a propylene-ethylene random copolymer obtained with a metallocene catalyst)

J2-3: The commercial product available from LiondellBasell Industries under the trade name ADFLEX X100G (a propylene-ethylene random copolymer obtained with a Ziegler-Natta catalyst)

J2-4: The commercial product available from Exxon-Mobil Chemical Under the trade name VISTAMAXX 2120 (a propylene-ethylene random copolymer obtained with a metallocene catalyst)

Production Example J1-2

(i) Synthesis of Transition Metal Compound

The synthesis of [(r)-dichloro[1,1'-dimethylsilylenebis{2-methyl-4-(4-chlorophenyl)-4H-azurenyl}]zirconium] was carried out in accordance with the working examples in Japanese Patent Application Laid-open No. H10-226712.

(ii) Chemical Treatment of Silicate

A 10-liter glass separable flask equipped with a stirrer was charged with 3.75 liters of distilled water, followed by 2.5 kg of concentrated sulfuric acid (96%) slowly. In addition, 1 kg of montmorillonite (Benclay SL, available from Mizusawa Industrial Chemicals, Ltd.; average particle size=25 µm; particle size distribution=10 µm to 60 µm) was dispersed at 50° C., following which the temperature was raised to 90° C. and the flask was maintained at that temperature for 6.5 hours. After cooling to 50° C., the slurry was vacuum filtered, and the cake was collected. Next, 7 liters of distilled water was added to the cake to as to reconstitute the slurry, which was then filtered. This washing operation was carried out until the pH of the wash fluid (filtrate) exceeded 3.5.

The recovered cake was dried overnight in a nitrogen atmosphere at 110° C. The weight after drying was 707 g.

(iii) Drying of Silicate

The silicate which was chemically treated earlier was dried in a kiln dryer. The specifications and drying conditions were as follows.

Rotary cylinder: cylindrical shape, with inside diameter of 50 mm, heating zone of 550 mm (electric furnace), and with lifting flights Rotating speed: 2 rpm Inclination: 20/520

Silicate feed rate: 2.5 g/min

Gas flow rate: nitrogen, 96 L/hour

Countercurrent drying temperature: 200° C. (powder temperature)

(iv) Preparation of Catalyst

The dry silicate (20 g) obtained as described above was placed in a 1 L glass reactor equipped with a stirrer, after which 116 mL of mixed heptane was added, followed by 84 mL of a heptane solution of triethylaluminum (0.60 M), and the contents were stirred at room temperature. One hour later, washing with mixed heptane was carried out, thereby preparing 200 mL of a silicate slurry.

Next, 0.96 mL of a heptane solution of triisobutylaluminum (0.71 M/L) was added to the silicate slurry prepared as described above, and reacted at 25° C. for one hour. In a separate procedure, 3.31 mL of a heptane solution of triisobutylaluminum (0.71 M) was added to 218 mg (0.3 mmol) of (r)-dichloro[1,1'-dimethylsilylenebis{2-methyl-4-(4-chlorophenyl)]zirconium and 87 mL of mixed heptane, and reacted at room temperature for one hour. The mixture thus obtained was added to the silicate slurry and stirred for 1 hour, following which additional mixed heptane was added, bringing the volume up to 500 mL.

(v) Prepolymerization/Washing

Next, the silicate/metallocene complex slurry prepared above was placed in a 1.0 liter autoclave with stirrer which had been thoroughly flushed with nitrogen. Once the temperature had stabilized to 40° C., propylene was fed in at a rate of 10 g/hour, and the temperature was maintained. The supply of propylene was stopped after 4 hours, and the temperature was maintained for another 2 hours.

After the completion of prepolymerization, the remaining monomer was purged, stirring was stopped, and the system was left at rest for about 10 minutes, following which 240 mL of supernatant was decanted. Next, 0.95 mL of a heptane solution of triisobutylaluminum (0.71 M/L), then 560 mL of mixed heptane were added, stirring was carried out at 40° C. for 30 minutes, and the system was left at rest for 10 minutes, then 560 mL of supernatant was removed. This operation was repeated another three times. An ingredient analysis of the final supernatant was carried out, whereupon the concentration of the organoaluminum ingredient was 1.23 mM/L and the zirconium concentration was $8.6 \times 10^{-6}$ g/L. Hence, the amount present in the supernatant relative to the amount charged was 0.016%.

Next, 17.0 mL of a heptane solution of triisobutylaluminum (0.71 M/L) was added, following which vacuum drying was carried out at 45° C. This operation yielded a prepolymerization catalyst containing 2.0 g of polypropylene per gram of solid catalyst component.

(vi) Polymerization

The interior of a 200 liter stirring-type autoclave was thoroughly flushed with propylene, following which 45 kg of thoroughly dehydrated, liquefied propylene was introduced. To this were added 500 mL (0.12 mol) of an n-heptane solution of triisobutylaluminum, 0.32 kg of ethylene and 2.5 liters (the volume under standard conditions) of hydrogen, and the internal temperature was maintained at 30° C. Next, 1.90 g (weight of solid catalyst component) of a metallocene type polymerization catalyst was injected with argon, thereby commencing polymerization. The temperature rose to 70° C. over a period of 40 minutes, and was held at that temperature for 60 minutes. At this point, 100 mL of ethanol was added, stopping the reaction. The remaining gas was purged, yielding 20.3 kg of polypropylene polymer. This operation was repeated five time, giving polypropylene-ethylene random copolymer PP(J1-2).

The MFR of this resin was 7 g/10 min, the ethylene content was 0.75 mol %, and the melting point was 142° C.

Production Example (J1-6)

(i) Production of Solid Component (A)

A 10 L autoclave equipped with a stirrer was thoroughly flushed with nitrogen, and 2 L of purified n-heptane was introduced. In addition, 250 g of $MgCl_2$ and 1.8 L of Ti(O-n-Bu)$_4$ were added, and the reaction was carried out at 95° C. for 2 hours. The reaction product was cooled to 40° C., and 500 mL of methyl hydrogen polysiloxane (20 centistoke) was added. After the reaction was carried out at 40° C. for 5 hours, the precipitated solid product was thoroughly washed with purified n-heptane.

Next, purified n-heptane was introduced, and the concentration of the above solid product was adjusted to 200 g/L. At this point, 300 mL of SiCl$_4$ was added, and the reaction was carried out at 90° C. for 3 hours. The reaction product was thoroughly washed with purified n-heptane, and purified n-heptane was introduced so as to set the concentration of the reaction product to 100 g/L. To this was added a mixture of 30 mL of phthaloyl dichloride with 270 mL of purified n-heptane, and the reaction was carried out at 90° C. for 1 hour. The reaction product was thoroughly washed with purified n-heptane, and purified n-heptane was added so as to bring the concentration of the reaction product to 200 g/L. Next, 1 L of TiCl$_4$ was added, and the reaction was carried out at 95° C. for 3 hours. The reaction product was thoroughly washed with purified n-heptane, giving a slurry of solid component (A). A portion of this slurry was sampled and dried. The analysis showed the titanium content of the solid component (A) to be 2.5 wt %.

(ii) Preparation of Solid Catalyst Component (B)

Next, a 20 L autoclave equipped with a stirrer was thoroughly flushed with nitrogen, and the above slurry of solid component (A) was introduced in an amount corresponding to 100 g of solid component (A). Purified n-heptane was added so as to adjust the concentration of solid component (A) to 20 g/L. To this were added 25 mL of trimethylvinylsilane, 25 mL of (t-Bu)(Me)Si(OEt)$_2$, and an amount of an n-heptane dilution of Et$_3$Al corresponding to 50 g as Et$_3$Al, and the reaction was carried out at 30° C. for 2 hours. The reaction product was thoroughly washed with purified n-heptane. A portion of the resulting slurry was sampled and dried. The analysis showed that the solid component contained 2.1 wt % of titanium and 6.1 wt % of (t-Bu) (Me)Si(OEt)$_2$.

Using the solid component obtained above, preliminary polymerization was carried out according to the following procedure. Purified n-heptane was added to the above slurry, adjusting the concentration of the solid component to 10 g/L. The slurry was cooled to 10° C., following which an n-heptane dilution of Et$_3$Al was added in an amount corresponding to 10 g of Et$_3$Al, and 150 g of propylene was fed over a period of 2 hours. After the feeding of propylene was completed, the reaction was continued for another 30 minutes. Next, the vapor phase portion was thoroughly flushed with nitrogen, and the reaction product was thoroughly washed with purified n-heptane. The resulting slurry was removed from the autoclave and vacuum dried, giving solid catalyst component (B). This solid catalyst component (B) contained 1.2 g of polypropylene per gram of solid components. Upon analysis, the portion of this solid catalyst component (B) from which polypropylene had been removed contained 1.6 wt % of titanium and 5.5 wt % of (t-Bu)(Me)Si(OEt)$_2$.

(iii) Polymerization

The interior of a 200 L stirring-type autoclave was thoroughly flushed with propylene, following which 80 L of purified n-heptane was introduced. The temperature was raised to 70° C., then an n-heptane dilution of Et$_3$Al in an amount corresponding to 1.5 g of Et$_3$Al, 5.0 NL of hydrogen, and 0.25 g of the above solid catalyst component (B) (but excluding the prepolymerization polymer) were added. The temperature was raised to 75° C., following which propylene was fed in to a pressure of 0.7 MPaG, and polymerization was begun. Propylene supply was continued so as to maintain the pressure during polymerization. Three hours later, polymerization was stopped by adding 1 L of butanol. The remaining propylene was purged, and thoroughly flushed with nitrogen. The slurry thus obtained was filtered with a centrifugal separator, then dried in a desiccator, thereby giving PP(J1-6).

Analytical results for above PP(J1-1) to PP(J1-7) and PP(J2-1) to PP(J2-4) are shown in Tables 5 and 6 below.

TABLE 5

| Production Example | | | | (J1-1) | J1-2 | (J1-3) | (J1-4) | (J1-5) | J1-6 | (J1-7) |
|---|---|---|---|---|---|---|---|---|---|---|
| Propylene-α-olefin copolymer (J1) | | | | PP (J1-1) | PP (J1-2) | PP (J1-3) | PP (J1-4) | PP (J1-5) | PP (J1-6) | PP (J1-7) |
| Name of grade | | | | WFW4 | | FW4B | EG7F | VERSIFY 3000 | | SA06A |
| Analytic Result | Melt peak temp. | Tm(J1) | ° C. | 135 | 142 | 139 | 142 | 108 | 161 | 161 |
| | Melt flow rate | MFR(J1) | g/10 min | 7 | 7 | 7 | 1.4 | 8 | 5 | 60 |

TABLE 6

| Production Example | | | | (J2-1) | (J2-2) | (J2-3) | (J2-4) |
|---|---|---|---|---|---|---|---|
| Propylene-α-olefin copolymer (J2) | | | | PP (J2-1) | PP (J2-2) | PP (J2-3) | PP (J2-4) |
| Name of grade | | | | VISTAMAXX 3000 | VERSIFY 3000 | ADFLEX X100G | VISTAMAXX 2120 |
| Analytic results | Ethylene content | E(J2) | ° C. | 11 | 3 | 18 | 13 |
| | Melt flow rate | MFR(J2) | g/10 min | 8 | 8 | 8 | 80 |
| | Catalyst | | | — | — | metallocene | metallocene | Ziegler-Natta | metallocene |

The above <J1> propylene-α-olefin random copolymers ((J1-1) to (J1-7)) as component (A1), and the above <J2> propylene-ethylene random copolymers ((J2-1) to (J2-4)) as component (A2) were weighed out in the compositional ratios shown below in Table 7 and mixed together by stirring in a Henschel mixer, thereby giving propylene resin compositions PP(A-18) to PPCA-33).

Analytical results for the above compositions are shown in Tables 7 and 8 below.

TABLE 7

| Production Example | | | | A-18 | A-19 | A-20 | A-21 | A-22 | A-23 | A-24 | A-25 |
|---|---|---|---|---|---|---|---|---|---|---|---|
| Propylene resin composition (A) | | | | PP (A-18) | PP (A-19) | PP (A-20) | PP (A-21) | PP (A-22) | PP (A-23) | PP (A-24) | PP (A-25) |
| Propylene-α-olefin copolymer (J1) | | | | PP (J1-1) | PP (J1-1) | PP (J1-1) | PP (J1-2) | PP (J1-3) | PP (J1-4) | PP (J1-1) | — |
| Compounded amount (wt %) | | | | 50 | 40 | 60 | 50 | 50 | 50 | 100 | 0 |
| Propylene-ethylene copolymer (J2) | | | | PP (J2-1) | PP (J2-1) | PP (J2-1) | PP (J2-1) | PP (J2-1) | PP (J2-1) | — | PP (J2-1) |
| Compounded amount (wt %) | | | | 50 | 60 | 40 | 50 | 50 | 50 | 0 | 100 |
| Analytic Results | Melt flow rate | MFR (A) | g/10 min | 7.5 | 7.6 | 7.4 | 7.5 | 7.5 | 3.3 | 7 | 8 |
| | Glass transition point | Tg | °C. | −15 | −16 | −14 | −13 | −13 | −13 | 2 | −23 |

TABLE 8

| Production Example | | | | A-26 | A-27 | A-28 | A-29 | A-30 | A-31 | A-32 | A-33 |
|---|---|---|---|---|---|---|---|---|---|---|---|
| Propylene resin composition (A) | | | | PP (A-26) | PP (A-27) | PP (A-28) | PP (A-29) | PP (A-30) | PP (A-31) | PP (A-32) | PP (A-33) |
| Propylene-α-olefin copolymer (J1) | | | | PP (J1-1) | PP (J1-1) | PP (J1-5) | PP (J1-6) | PP (J1-7) | PP (J1-1) | PP (J1-1) | PP (J1-1) |
| Compounded amount (wt %) | | | | 80 | 20 | 50 | 50 | 50 | 50 | 50 | 50 |
| Propylene-ethylene copolymer (J2) | | | | PP (J2-1) | PP (J2-1) | PP (J2-1) | PP (J2-1) | PP (J2-1) | PP (J2-2) | PP (J2-3) | PP (J2-4) |
| Compounded amount (wt %) | | | | 20 | 80 | 50 | 50 | 50 | 50 | 50 | 50 |
| Analytic Results | Melt flow rate | MFR (A) | g/10 min | 7.2 | 7.8 | 8 | 6.3 | 21.9 | 7.5 | 7.5 | 23.7 |
| | Glass transition point | Tg | °C. | −8 | −20 | −20 | −5 | −5 | −9 | −20, −41 | −16 |

(2) Ethylene-α-Olefin Copolymer (B) in Inner Layer

The resins PE(B-1) to PE(B-6) obtained in Production Examples (B-1) to (B-6) below and the subsequently described commercial products PE(B-7) and PE(B-8) were used (Production Example B-1)

A copolymer of ethylene and 1-hexene was produced. Catalyst preparation was carried out by the method described in Japanese Translation of PCT Application No H7-508545 (preparation of catalyst system). That is, a catalyst solution was prepared by adding, to 2.0 mmol of the complex dimethylsilylenebis(4,5,6,7-tetrahydroindenyl)hafnium dimethyl, an equimolar amount of tripentafluorophenylboron, then diluting to 10 liters with toluene.

A mixture of ethylene and 1-hexene was fed to a stirring autoclave-type continuous reactor having a capacity of 1.5 liters in a manner such as to set the 1-hexene content to 73 wt %, and the reaction was carried out at 127° C. while maintaining the pressure inside the reactor at 130 MPa. The amount of polymer produced per hour was about 2.5 kg.

Following reaction completion, various analyses were carried out on the polymer. Table 9 shows the analytical results obtained for the resulting ethylene-α-olefin copolymer PE(B-1).

Production Examples B-2 to B-6

Aside from varying the 1-hexene content at the time of polymerization and the polymerization temperature as shown in Table 9, catalyst preparation and polymerization were carried out by a method similar to that for Production Example (B-1).

Following reaction completion, various analyses were conducted on the resulting polymers.

The commercial products employed were as follows.

B-7: The commercial product available from Japan Polyethylene Corporation under the trade name KERNEL KF283 (an ethylene-α-olefin copolymer obtained with a metallocene catalyst)

B-8: The commercial product available from Japan Polyethylene Corporation under the trade name KERNEL KJ640T (an ethylene-α-olefin copolymer obtained with a metallocene catalyst)

Table 9 shows the analytical results obtained for PE(B-1) to PE(B-8). PE(B-1) to PE(B-6) satisfy all the conditions of the invention for component (B).

However, PE(B-7) and PE(B-8) do not satisfy the conditions of the invention for component B.

TABLE 9

| Production Example | | | B-1 | B-2 | B-3 | B-4 | B-5 | B-6 | (B-7) | (B-8) |
|---|---|---|---|---|---|---|---|---|---|---|
| Ethylene-α-olefin copolymer (B) | | | PE (B-1) | PE (B-2) | PE (B-3) | PE (B-4) | PE (B-5) | PE (B-6) | PE (B-7) | PE (B-8) |
| Name of grade | | | — | — | — | — | — | — | KF283 | KJ640T |
| Production conditions | 1-Hexene content | wt % | 73 | 78 | 62 | 55 | 74 | 72 | — | — |
| | Pressure | MPa | 130 | 130 | 130 | 130 | 130 | 130 | — | — |
| | Temperature | ° C. | 127 | 118 | 140 | 148 | 140 | 114 | — | — |
| Analytic results | Density | g/cc | 0.880 | 0.865 | 0.898 | 0.905 | 0.880 | 0.880 | 0.921 | 0.880 |
| | MFR(B) | g/10 min | 3.5 | 3.5 | 3.5 | 2.2 | 12 | 1 | 2.5 | 30 |

(3) Propylene Resin (C) for Inner Layer

Resins PP(C-1) to PP(C-5) obtained in Production Examples (C-1) to (C-5) below were used. PP(C-1) to PP(C-4) are homopolypropylenes obtained by single-stage polymerization, and PP(C-5) is a block copolymer polypropylene obtained by multistage polymerization.

The following commercial polypropylene resins were used.

(C-6): The product available from Japan Polyethylene Corporation under the trade name WINTEC WFW4 (a random polypropylene obtained by single-stage polymerization)
(C-7): The product available from Japan Polyethylene Corporation under the trade name WINTEC WFX4 (a random polypropylene obtained by single-stage polymerization)
(C-8): The product available from Japan Polyethylene Corporation under the trade name NOVATEC PP SA06A (a homopolypropylene obtained by single-stage polymerization)

The MFR and Tm are shown in Table 10.

Production Example C-1

(i) Production of Solid Component (A)

A 10 L autoclave equipped with a stirrer was thoroughly flushed with nitrogen, and 2 L of purified n-heptane was introduced. In addition, 250 g of $MgCl_2$ and 1.8 L of Ti(O-n-Bu)$_4$ were added, and the reaction was carried out at 95° C. for 2 hours. The reaction product was cooled to 40° C., and 500 mL of methyl hydrogen polysiloxane (20 centistoke) was added. After the reaction was carried out at 40° C. for 5 hours, the precipitated solid product was thoroughly washed with purified n-heptane.

Next, purified n-heptane was introduced, and the concentration of the above solid product was adjusted to 200 g/L. At this point, 300 mL of $SiCl_4$ was added, and the reaction was carried out at 90° C. for 3 hours. The reaction product was thoroughly washed with purified n-heptane, and purified n-heptane was introduced in a manner such as to set the concentration of the reaction product to 100 g/L. To this was added a mixture of 30 mL of phthaloyl dichloride with 270 mL of purified n-heptane, and the reaction was carried out at 90° C. for 1 hour. The reaction product was thoroughly washed with purified n-heptane, and purified n-heptane was added so as to bring the concentration of the reaction product to 200 g/L. Next, 1 L of $TiCl_4$ was added, and the reaction was carried out at 95° C. for 3 hours. The reaction product was thoroughly washed with purified n-heptane, giving a slurry of solid component (A). A portion of this slurry was sampled and dried. The analysis showed the titanium content of the solid component (A) to be 2.5 wt %.

(ii) Preparation of Solid Catalyst Component (B)

Next, a 20 L autoclave equipped with a stirrer was thoroughly flushed with nitrogen, and the above slurry of solid component (A) was introduced in an amount corresponding to 100 g of solid component (A). Purified n-heptane was added so as to adjust the concentration of solid component (A) to 20 g/L. To this were added 25 mL of trimethylvinylsilane, 25 mL of (t-Bu)(Me)Si(OEt)$_2$, and an amount of an n-heptane dilution of Et$_3$Al corresponding to 50 g as Et$_3$Al, and the reaction was carried out at 30° C. for 2 hours. The reaction product was thoroughly washed with purified n-heptane. A portion of the resulting slurry was sampled and dried. The analysis showed that the solid component contained 2.1 wt % of titanium and 6.1 wt % of (t-Bu)(Me)Si(OEt)$_2$.

Using the solid component obtained above, preliminary polymerization was carried out according to the following procedure. Purified n-heptane was added to the above slurry, adjusting the concentration of the solid component to 10 g/L. The slurry was cooled to 10° C., following which an n-heptane dilution of Et$_3$Al was added in an amount corresponding to 10 g of Et$_3$Al, and 150 g of propylene was fed over a period of 2 hours. After the feeding of propylene was completed, the reaction was continued for another 30 minutes. Next, the vapor phase portion was thoroughly flushed with nitrogen, and the reaction product was thoroughly washed with purified n-heptane. The resulting slurry was removed from the autoclave and vacuum dried, giving solid catalyst component (B). This solid catalyst component (B) contained 1.2 g of polypropylene per gram of solid components. Upon analysis, the portion of this solid catalyst component (B) from which polypropylene had been removed contained 1.6 wt % of titanium and 5.5 wt % of (t-Bu)(Me)Si(OEt)$_2$.

(iii) Polymerization

The interior of a 200 L stirring-type autoclave was thoroughly flushed with propylene, following which 80 L of purified n-heptane was introduced. The temperature was raised to 70° C., then an n-heptane dilution of Et$_3$Al in an amount corresponding to 1.5 g of Et$_3$Al, 5.0 NL of hydrogen, and 0.25 g of the above solid catalyst component (B) (but excluding the prepolymerization polymer) were added. The temperature was raised to 75° C., following which propylene was fed in to a pressure of 0.7 MPaG, and polymerization was begun. Propylene supply was continued so as to maintain the pressure during polymerization. Three hours later, polymerization was stopped by adding 1 L of butanol. The remaining propylene was purged, and thoroughly flushed with nitrogen. The slurry thus obtained was filtered with a centrifugal separator, then dried in a desiccator, thereby giving PP(C-1).

Production Examples C-2 to C-4

Aside from changing the amount of hydrogen used during polymerization, PP(C-2) to PP(C-4) were obtained in the same way as in Production Example C-1. The results are shown in Table 10.

Production Example C-5

(i) Production of Solid Component Catalyst

A nitrogen-flushed 50 L reactor equipped with a stirrer was charged with 20 liters of dehydrated and deoxygenated n-heptane, then 4 moles of magnesium chloride and 8 moles of tetrabutoxytitanium were added and the reactor contents were reacted at 95° C. for 2 hours. The temperature was subsequently lowered to 40° C., 480 mL of methyl hydrogen polysiloxane (20 centipoises) was added, and the contents were again reacted for 3 hours, following which the reaction mixture was removed and the solid component that had formed was washed with n-heptane.

Next, 15 liters of dehydrated and deoxygenated n-heptane was charged into the same type of reactor with stirrer as described above, following which the solid components were added in an amount equivalent to 3 moles of magnesium atoms. A mixture of 8 moles of silicon tetrachloride added to 25 mL of n-heptane was then introduced at 30° C. over a period of 30 minutes, the temperature was raised to 90° C., and the reactor contents were reacted for one hour, following which the reaction mixture was removed and the solid component that had formed was washed with n-heptane.

In addition, 5 liters of dehydrated and deoxygenated n-heptane was charged into the same type of reactor with stirrer as described above, following which 250 g of the silicon tetrachloride-treated titanium-containing solid component obtained above, 750 g of 1,5-hexadiene, 130 mL of t-butylmethyldimethoxysilane, 10 mL of divinyldimethylsilane and 225 g of triethylaluminum were each added, and reaction was effected at 30° C. for 2 hours. The reaction mixture was subsequently removed and washed with n-heptane, giving a solid component catalyst.

The amount of 1,5-hexadiene prepolymerization for the resulting solid component catalyst was 2.97 g per gram of the titanium-containing solid component.

(ii) Two-Stage Polymerization of Propylene/Propylene-Ethylene

Propylene, triethylaluminum, and an amount of the above solid component catalyst which sets the polymer-forming rate at 20 kg/hour were continuously fed into a first-stage reactor having a capacity of 550 liters at a temperature of 70° C. and under an applied pressure (about 3.2 MPa at 70° C.). In addition, hydrogen was continuously fed as a molecular weight adjusting agent, and first-stage polymerization was carried out in a liquid phase.

Next, the polymer that had formed was charged, through a propylene purging tank, into a second-stage reactor having a capacity of 1,900 liters, and propylene and ethylene in amounts corresponding to the compositional ratio of the target copolymer were continuously fed in at a temperature of 60° C. to a pressure of 3.0 MPa. In addition, hydrogen was continuously fed in as a molecular weight adjusting agent, and an active hydrogen compound (ethanol) was fed in an amount of 200 moles per mole of titanium atoms in the solid component catalyst supplied in the first stage and in an amount of 2.5 moles per mole of triethylaluminum, whereupon polymerization was carried out in a vapor phase. The polymer that formed was continuously transferred to a vessel, following which moisture-containing nitrogen gas was introduced, thereby stopping the reaction (second-stage polymerization).

The analytic results for the resulting PP(C-5) are shown in Table 10.

PP(C-1) to PP(C-5) satisfy all the preferred features for component (C) in the invention. However, PP(C-6) to PP(C-8) do not satisfy the preferred features for component (C) in the invention.

TABLE 10

| Production Example | | | C-1 | C-2 | C-3 | C-4 | C-5 | (C-6) | (C-7) | (C-8) |
|---|---|---|---|---|---|---|---|---|---|---|
| Propylene resin (C) | | | PP (C-1) | PP (C-2) | PP (C-3) | PP (C-4) | PP (C-5) | PP (C-6) | PP (C-7) | PP (C-8) |
| Name of grade | | | — | — | — | — | — | WFW4 | WFX4 | SA06A |
| Analytic results | Tm(C) | ° C. | 161 | 161 | 161 | 161 | 162 | 135 | 125 | 161 |
| | MFR(C) | g/10 min | 5 | 10 | 1 | 21 | 7 | 7 | 7 | 60 |
| | Elastomer content | wt % | — | — | — | — | 57 | — | — | — |
| | Ethylene content in elastomer | wt % | — | — | — | — | 17 | — | — | — |

(4) Propylene Resin (D) for Outer Layer (2)

The commercial propylene-ethylene random copolymers shown below and the resins obtained in Production Examples (D-2) to (D-4) described below were used. The MFR and Tm are shown in Table 11.

(D-1): The product available from Japan Polyethylene Corporation under the trade name WINTEC WFW4

(D-5): The product available from Japan Polyethylene Corporation under the trade name WINTEC WFX4

(D-2) and (D-3): Ziegler-Natta catalyst-based homopolypropylenes produced by the single-stage polymerization described below (D-4): Block copolymer polypropylene produced by the multistage polymerization described below Production Example D-2

(i) Production of Solid Component (A)

A 10 L autoclave equipped with a stirrer was thoroughly flushed with nitrogen, and 2 L of purified n-heptane was introduced. In addition, 250 g of $MgCl_2$ and 1.8 L of $Ti(O-n-Bu)_4$ were added, and the reaction was carried out at 95° C. for 2 hours. The reaction product was cooled to 40° C., and 500 mL of methyl hydrogen polysiloxane (20 centistoke) was added. The reaction was carried out at 40° C. for 5 hours, after which the precipitated solid product was thoroughly washed with purified n-heptane.

Next, purified n-heptane was introduced, and the concentration of the above solid product was adjusted to 200 g/L. At this point, 300 mL of $SiCl_4$ was added, and the reaction was carried out at 90° C. for 3 hours. The reaction product was thoroughly washed with purified n-heptane, and purified n-heptane was introduced so as to set the concentration of the reaction product to 100 g/L. To this was added a mixture of 30 mL of phthaloyl dichloride with 270 mL of purified n-heptane, and the reaction was carried out at 90° C. for 1 hour. The reaction product was thoroughly washed with purified n-heptane, and purified n-heptane was added so as to bring the concentration of the reaction product to 200 g/L. Next, 1 L of $TiCl_4$ was added, and the reaction was carried out at 95° C. for 3 hours. The reaction product was thoroughly washed with purified n-heptane, giving a slurry of solid component (A). A portion of this slurry was sampled and dried. The analysis showed the titanium content of the solid component (A) to be 2.5 wt %.

(ii) Preparation of Solid Catalyst Component (B)

Next, a 20 L autoclave equipped with a stirrer was thoroughly flushed with nitrogen, and the above slurry of solid component (A) was introduced in an amount corresponding to 100 g of solid component (A). Purified n-heptane was added so as to adjust the concentration of solid component (A) to 20 g/L. To this were added 25 mL of trimethylvinylsilane, 25 mL of (t-Bu)(Me)Si(OEt)$_2$, and an amount of an n-heptane dilution of Et$_3$Al corresponding to 50 g as Et$_3$Al, and the reaction was carried out at 30° C. for 2 hours. The reaction product was thoroughly washed with purified n-heptane. A portion of the resulting slurry was sampled and dried. The analysis showed that the solid component contained 2.1 wt % of titanium and 6.1 wt % of (t-Bu)(Me)Si(OEt)$_2$.

Using the solid component obtained above, preliminary polymerization was carried out according to the following procedure. Purified n-heptane was added to the above slurry, adjusting the concentration of the solid component to 10 g/L. The slurry was cooled to 10° C., following which an n-heptane dilution of Et$_3$Al was added in an amount corresponding to 10 g of Et$_3$Al, and 150 g of propylene was fed over a period of 2 hours. After the feeding of propylene was completed, the reaction was continued for another 30 minutes. Next, the vapor phase portion was thoroughly flushed with nitrogen, and the reaction product was thoroughly washed with purified n-heptane. The resulting slurry was removed from the autoclave and vacuum dried, giving solid catalyst component (B). This solid catalyst component (B) contained 1.2 g of polypropylene per gram of solid components. Upon analysis, the portion of this solid catalyst component (B) from which polypropylene had been removed contained 1.6 wt % of titanium and 5.5 wt % of (t-Bu)(Me)Si(OEt)$_2$.

(iii) Polymerization

The interior of a 200 L stirring-type autoclave was thoroughly flushed with propylene, following which 80 L of purified n-heptane was introduced. The temperature was raised to 70° C., then an n-heptane dilution of Et$_3$Al in an amount corresponding to 1.5 g of Et$_3$Al, 5.0 NL of hydrogen, and 0.25 g of the above solid catalyst component (B) (but excluding the prepolymerization polymer) were added. The temperature was raised to 75° C., following which propylene was fed in to a pressure of 0.7 MPaG, and polymerization was begun. Propylene supply was continued so as to maintain the pressure during polymerization. Three hours later, polymerization was stopped by adding 1 L of butanol. The remaining propylene was purged, and thoroughly flushed with nitrogen. The slurry thus obtained was filtered with a centrifugal separator, then dried in a desiccator, thereby giving PP(D-2).

Production Example D-3

Aside from changing the amount of hydrogen used during polymerization, PP(D-3) was obtained in the same way as in Production Example D-2. The results are shown in Table 11.

Production Example D-4

(i) Production of Solid Component Catalyst

A nitrogen-flushed 50 L reactor equipped with a stirrer was charged with 20 liters of dehydrated and deoxygenated n-heptane, then 4 moles of magnesium chloride and 8 moles of tetrabutoxytitanium were added and the reactor contents were reacted at 95° C. for 2 hours. The temperature was subsequently lowered to 40° C., 480 mL of methyl hydrogen polysiloxane (20 centistoke) was added, and the contents were again reacted for 3 hours, following which the reaction mixture was removed and the solid component that had formed was washed with n-heptane.

Next, 15 liters of dehydrated and deoxygenated n-heptane was charged into the same type of reactor with stirrer as described above, following which the solid component was added in an amount equivalent to 3 moles of magnesium atoms. A mixture of 8 moles of silicon tetrachloride added to 25 mL of n-heptane was then introduced at 30° C. over a period of 30 minutes, the temperature was raised to 90° C., and the reactor contents were reacted for one hour, following which the reaction mixture was removed and the solid component that had formed was washed with n-heptane.

In addition, 5 liters of dehydrated and deoxygenated n-heptane was charged into the same type of reactor with stirrer as described above, following which 250 g of the silicon tetrachloride-treated titanium-containing solid component obtained above, 750 g of 1,5-hexadiene, 130 mL of t-butyl-methyldimethoxysilane, 10 mL of divinyldimethylsilane and 225 g of triethylaluminum were each added, and the reaction was carried out at 30° C. for 2 hours. The reaction mixture was subsequently removed and washed with n-heptane, giving a solid component catalyst.

The amount of 1,5-hexadiene prepolymerization for the resulting solid component catalyst was 2.97 g per gram of the titanium-containing solid component.

(ii) Two-Stage Polymerization of Propylene/Propylene-Ethylene

Propylene, triethylaluminum, and an amount of the above solid component catalyst for setting the polymer-forming rate at 20 kg/hour were continuously fed into a first-stage reactor having a capacity of 550 liters at a temperature of 70° C. and under an applied pressure (about 3.2 MPa at 70° C.). In addition, hydrogen was continuously fed as a molecular weight adjusting agent, and first-stage polymerization was carried out in a liquid phase.

Next, the polymer that had formed was charged, through a propylene purging tank, into a second-stage reactor having a capacity of 1,900 liters, and propylene and ethylene in amounts corresponding to the compositional ratio of the target copolymer were continuously fed in at a temperature of 60° C. to a pressure of 3.0 MPa. In addition, hydrogen was continuously fed in as a molecular weight adjusting agent, and an active hydrogen compound (ethanol) was fed in an amount of 200 moles per mole of titanium atoms in the solid component catalyst supplied in the first stage and in an amount of 2.5 moles per mole of triethylaluminum, whereupon polymerization was carried out in a vapor phase. The polymer that formed was continuously transferred to a vessel, following which moisture-containing nitrogen gas was introduced, thereby stopping the reaction (second-stage polymerization).

The analytic results for the resulting PP(D-4) are shown in Table 11.

PP(D-1) to PP(D-5) satisfy all the preferred features for component (D) in the invention. However, PP(D-5) does not satisfy the preferred features for component (D) in the invention.

TABLE 11

| Production Example | | | (D-1) | D-2 | D-3 | D-4 | (D-5) |
|---|---|---|---|---|---|---|---|
| Propylene resin (D) | | | PP (D-1) | PP (D-2) | PP (D-3) | PP (D-4) | PP (D-5) |
| Name of grade | | | WFW4 | — | — | — | WFX4 |
| Analytic results | Tm(D) | °C. | 135 | 161 | 161 | 162 | 125 |
| | MFR(D) | g/10 min | 7 | 5 | 10 | 7 | 7 |
| | Elastomer content | wt % | — | — | — | 57 | — |
| | Ethylene content in elastomer | wt % | — | — | — | 17 | — |

(5) Ethylene-α-Olefin Copolymer (D3) Compounded in Component D for Outer Layer (2)

The resin obtained in Production Example (D3-1) below was used. Also, the commercial product available from Japan Polypropylene Corporation under the trade name KERNEL KF283 was used as ethylene-α-olefin copolymer (D3-2). The analytical results are shown in Table 12.

Production Example D3-1

A copolymer of ethylene and 1-hexene was produced. Catalyst preparation was carried out by the method described in Japanese Translation of PCT Application No. H7-508545 (preparation of catalyst system). That is, a catalyst solution was prepared by adding, to 2.0 mmol of the complex dimethylsilylenebis(4,5,6,7-tetrahydroindenyl)hafnium dimethyl, an equimolar amount of tripentafluorophenylboron, then diluting to 10 liters with toluene.

A mixture of ethylene and 1-hexene was fed to a stirring autoclave-type continuous reactor having a capacity of 1.5 liters in such a way as to set the 1-hexene content to 73 wt %, and the reaction was carried out at 127° C. while maintaining the pressure inside the reactor at 130 MPa. The amount of polymer produced per hour was about 2.5 kg.

Following reaction completion, various analyses were carried out on the polymer. Table 12 shows the analytical results obtained for the resulting ethylene-α-olefin copolymer PE(D3-1).

TABLE 12

| Production Example | | D3-1 | (D3-2) |
|---|---|---|---|
| Ethylene-α-olefin copolymer (D3) Name of grade | | PE(D3-1) | PE(D3-2) KF283 |

TABLE 12-continued

| Production Example | | | D3-1 | (D3-2) |
|---|---|---|---|---|
| Production conditions | 1-Hexene content | wt % | 73 | — |
| | Pressure | MPa | 130 | — |
| | Temperature | °C. | 127 | — |
| Analytic results | Density | g/cc | 0.880 | 0.921 |
| | MFR (D3) | g/10 min | 3.5 | 2.2 |

(6) Propylene Resin Composition (Z1) for Innermost Layer (3)

(6-1) Propylene-Ethylene Random Copolymer (E)

The following propylene-ethylene random copolymer available from Japan Polypropylene Corporation under the trade names WINTEC, the following polypropylene available from Japan Polypropylene Corporation under the trade name NOVATEC PP, and the resins obtained in Production Examples (E-2) and (E-5) below were used. The MFR, Tm and soluble content at or below 0° C. (S0) are shown in Table 13.

(E-1): A propylene-ethylene random copolymer obtained using a metallocene catalyst and available from Japan Polyethylene Corporation under the trade name WINTEC WFW4

(E-2): The propylene-ethylene random copolymer produced in Production Example (E-2)

(E-3): A propylene-α-olefin copolymer obtained using a Ziegler-Natta catalyst and available from Japan Polyethylene Corporation under the trade name NOVATEC PP FX3A (E-4): A propylene-ethylene random copolymer obtained using a metallocene catalyst and available from Dow Chemical under the trade name VERSIFY 3000

(E-5): The propylene-ethylene random copolymer produced in Production Example (E-5)

Production Example (E-2)

(i) Synthesis of Transition Metal Compound

The synthesis of [(r)-dichloro[1,1'-dimethylsilylenebis{2-methyl-4-(4-chlorophenyl)-4H-azurenyl}]zirconium] was carried out in accordance with the working examples in Japanese Patent Application Laid-open No. H10-226712.

(ii) Chemical Treatment of Silicate

A 10-liter glass separable flask equipped with a stirrer was charged with 3.75 liters of distilled water, followed by 2.5 kg of concentrated sulfuric acid (96%) slowly. In addition, 1 kg of montmorillonite (Benclay SL, available from Mizusawa Industrial Chemicals, Ltd.; average particle size, 25 μm; particle size distribution, 10 μm to 60 μm) was dispersed at 50° C., following which the temperature was raised to 90° C. and the flask was maintained at that temperature for 6.5 hours. After cooling to 50° C., the slurry was vacuum filtered, and the cake was collected. Next, 7 liters of distilled water was added to the cake to as to reconstitute the slurry, which was then filtered. This washing operation was carried out until the pH of the wash fluid (filtrate) exceeded 3.5.

The recovered cake was dried overnight in a nitrogen atmosphere at 110° C. The weight after drying was 707 g.

(iii) Drying of Silicate

The silicate which was chemically treated earlier was dried in a kiln dryer. The specifications and drying conditions were as follows.

Rotary cylinder: cylindrical shape, with inside diameter of 50 mm, heating zone of 550 mm (electric furnace), and with lifting flights
Rotating speed: 2 rpm
Inclination: 20/520
Silicate feed rate: 2.5 g/min
Gas flow rate: nitrogen, 96 L/hour
Countercurrent drying temperature: 200° C. (powder temperature)

(iv) Preparation of Catalyst

The dry silicate (20 g) obtained as described above was placed in a 1 L glass reactor equipped with a stirrer, after which 116 mL of mixed heptane was added, followed by 84 mL of a heptane solution of triethylaluminum (0.60 M), and the contents were stirred at room temperature. One hour later, washing with mixed heptane was carried out, thereby preparing 200 mL of a silicate slurry.

Next, 0.96 mL of a heptane solution of triisobutylaluminum (0.71 M/L) was added to the silicate slurry prepared as described above, and reacted at 25° C. for one hour. In a separate procedure, 3.31 mL of a heptane solution of triisobutylaluminum (0.71 M) was added to 218 mg (0.3 mmol) of (r)-dichloro[1,1'-dimethylsilylenebis{2-methyl-4-(4-chlorophenyl)-4H-azulenyl}]zirconium and 87 mL of mixed heptane, and reacted at room temperature for one hour. The mixture thus obtained was added to the silicate slurry and stirred for 1 hour, following which additional mixed heptane was added, bringing the volume up to 500 mL.

(v) Prepolymerization/Washing

Next, the silicate/metallocene complex slurry prepared above was placed in a 1.0 liter autoclave with stirrer which had been thoroughly flushed with nitrogen. Once the temperature had stabilized to 40° C., propylene was fed in at a rate of 10 g/hour, and the temperature was maintained. The supply of propylene was stopped after 4 hours, and the temperature was maintained for another 2 hours.

After the completion of prepolymerization, the remaining monomer was purged, stirring was stopped, and the system was left at rest for about 10 minutes, following which 240 mL of supernatant was decanted. Next, 0.95 mL of a heptane solution of triisobutylaluminum (0.71 M/L), then 560 mL of mixed heptane were added, stirring was carried out at 40° C. for 30 minutes, and the system was left at rest for 10 minutes, following which 560 mL of supernatant was removed. This operation was repeated another three times. An ingredient analysis of the final supernatant was carried out, whereupon the concentration of the organoaluminum ingredient was 1.23 mM/L and the zirconium concentration was $8.6 \times 10^{-6}$ g/L. Hence, the amount present in the supernatant relative to the amount charged was 0.016%.

Next, 17.0 mL of a heptane solution of triisobutylaluminum (0.71 M/L) was added, following which vacuum drying was carried out at 45° C. This operation yielded a prepolymerization catalyst containing 2.0 g of polypropylene per gram of solid catalyst component.

(vi) Polymerization

The interior of a 200 liter stirring-type autoclave was thoroughly flushed with propylene, following which 45 kg of thoroughly dehydrated, liquefied propylene was introduced. To this were added 500 mL (0.12 mol) of an n-heptane solution of triisobutylaluminum, 0.32 kg of ethylene and 2.5 liters (the volume under standard conditions) of hydrogen, and the internal temperature was maintained at 30° C. Next, 1.90 g (weight of solid catalyst component) of a metallocene-type polymerization catalyst was injected with argon, thereby commencing polymerization; the temperature rose to 70° C. over a period of 40 minutes, and was held at that temperature for 60 minutes. At this point, 100 mL of ethanol was added, stopping the reaction. The remaining gas was purged, yielding 20.3 kg of polypropylene polymer. This operation was repeated five time, giving polypropylene-ethylene random copolymer PP(E-2).

The MFR of this resin was 7 g/10 min, the ethylene content was 0.75 mol %, and the melting point was 142° C.

Production Example (E-5)

(i) Production of Solid Component (A)

A 10 L autoclave equipped with a stirrer was thoroughly flushed with nitrogen, and 2 L of purified n-heptane was introduced. In addition, 250 g of $MgCl_2$ and 1.8 L of $Ti(O-n-Bu)_4$ were added, and the reaction was carried out at 95° C. for 2 hours. The reaction product was cooled to 40° C., and 500 mL of methyl hydrogen polysiloxane (20 centistoke) was added. After the reaction was carried out at 40° C. for 5 hours, the precipitated solid product was thoroughly washed with purified n-heptane.

Next, purified n-heptane was introduced, and the concentration of the above solid product was adjusted to 200 g/L. At this point, 300 mL of $SiCl_4$ was added, and the reaction was carried out at 90° C. for 3 hours. The reaction product was thoroughly washed with purified n-heptane, and purified n-heptane was introduced so as to set the concentration of the reaction product to 100 g/L. To this was added a mixture of 30 mL of phthaloyl dichloride with 270 mL of purified n-heptane, and the reaction was carried out at 90° C. for 1 hour. The reaction product was thoroughly washed with purified n-heptane, and purified n-heptane was added so as to bring the concentration of the reaction product to 200 g/L. Next, 1 L of $TiCl_4$ was added, and the reaction was carried out at 95° C. for 3 hours. The reaction product was thoroughly washed with purified n-heptane, giving a slurry of solid component (A). A portion of this slurry was sampled and dried. The analysis showed the titanium content of the solid component (A) to be 2.5 wt %.

(ii) Preparation of Solid Catalyst Component (B)

Next, a 20 L autoclave equipped with a stirrer was thoroughly flushed with nitrogen, and the above slurry of solid component (A) was introduced in an amount corresponding to 100 g of solid component (A). Purified n-heptane was added so as to adjust the concentration of solid component (A) to 20 g/L. To this were added 25 mL of trimethylvinylsilane, 25 mL of (t-Bu)(Me)Si(OEt)$_2$, and an amount of an n-heptane dilution of Et$_3$Al corresponding to 50 g as Et$_3$Al, and the reaction was carried out at 30° C. for 2 hours. The reaction product was thoroughly washed with purified n-heptane. A portion of the resulting slurry was sampled and dried. The analysis showed that the solid component contained 2.1 wt % of titanium and 6.1 wt % of (t-Bu) (Me)Si(OEt)$_2$.

Using the solid component obtained above, preliminary polymerization was carried out according to the following procedure. Purified n-heptane was added to the above slurry, adjusting the concentration of the solid component to 10 g/L. The slurry was cooled to 10° C., following which an n-heptane dilution of Et$_3$Al was added in an amount corresponding to 10 g of Et$_3$Al, and 150 g of propylene was fed over a period of 2 hours. After propylene feeding was completed, the reaction was continued for another 30 minutes. Next, the vapor phase portion was thoroughly flushed with nitrogen, and the reaction product was thoroughly washed with purified n-heptane. The resulting slurry was removed from the autoclave and vacuum dried, giving solid catalyst component (B). This solid catalyst component (B) contained 1.2 g of polypropylene per gram of solid components. Upon analysis, the portion of this solid catalyst component (B) from which polypropylene had been removed contained 1.6 wt % of titanium and 5.5 wt % of (t-Bu) (Me)Si(OEt)$_2$.

(iii) Polymerization

The interior of a 200 L stirring-type autoclave was thoroughly flushed with propylene, following which 80 L of purified n-heptane was introduced. The temperature was raised to 70° C., then an n-heptane dilution of Et$_3$Al in an amount corresponding to 1.5 g of Et$_3$Al, 5.0 NL of hydrogen, and 0.25 g of the above solid catalyst component (B) (but excluding the prepolymerization polymer) were added. The temperature was raised to 75° C., following which propylene was fed in to a pressure of 0.7 MPaG, and polymerization was begun. Propylene feeding was continued so as to maintain the pressure during polymerization. Three hours later, polymerization was stopped by adding 1 L of butanol. The remaining propylene was purged, and thoroughly flushed with nitrogen. The slurry thus obtained was filtered with a centrifugal separator, then dried in a desiccator, thereby giving PP(E-5).

Analytical results for above PP(E-1) to PP(E-5) are shown in Table 13.

PP(E-1) to PP(E-3) satisfy all the preferred features of the invention for component (E). However, PP(E-4) and PP(E-5) do not satisfy the features of the invention for component (E).

TABLE 13

| Production Example | | | | (E-1) | E-2 | (E-3) | (E-4) | E-5 |
|---|---|---|---|---|---|---|---|---|
| Propylene-α-olefin copolymer (E1) | | | | PP (E-1) | PP (E-2) | PP (E-3) | PP (E-4) | PP (E-5) |
| Name of grade | | | | WFW4 | | FW4B | VERSIFY 3000 | |
| Analytic results | Melt peak temp. | Tm (E) | ° C. | 135 | 142 | 139 | 108 | 161 |
| | Melt flow rate | MFR (E) | g/10 min | 7 | 7 | 7 | 8 | 5 |

(6-2) Ethylene-α-Olefin Copolymer (F) Included in Propylene Resin Composition (Z1) for Innermost Layer (3)

The resins obtained in Production Examples (F-1) to (F-4) below, and the commercial ethylene-α-olefin copolymer (F-5) shown below were used.

(F-5): An ethylene-α-olefin copolymer obtained with a metallocene catalyst, available from Japan Polyethylene Corporation under the trade name KERNEL KF283

Production Example (F-1)

A copolymer of ethylene and 1-hexene was produced. Catalyst preparation was carried out by the method described in Japanese Translation of PCT Application No. H7-508545 (preparation of catalyst system). That is, a catalyst solution was prepared by adding, to 2.0 mmol of the complex dimethylsilylenebis(4,5,6,7-tetrahydroindenyl)hafnium dimethyl, an equimolar amount of tripentafluorophenylboron, then diluting to 10 liters with toluene.

A mixture of ethylene and 1-hexene was fed to a stirring autoclave-type continuous reactor having a capacity of 1.5 liters in such a way as to set the 1-hexene content to 73 wt %, and the reaction was carried out at 127° C. while maintaining the pressure inside the reactor at 130 MPa. The amount of polymer produced per hour was about 2.5 kg.

Following reaction completion, various analyses were carried out on the resulting polymer. Table 14 shows the analytical results obtained for the resulting ethylene-α-olefin copolymer PE(F-1).

Production Examples F-2 to F-4

Aside from varying the 1-hexene content at the time of polymerization and the polymerization temperature as shown in Table 14, catalyst preparation and polymerization were carried out by a method similar to that for Production Example (F-1).

Following reaction completion, various analyses were conducted on the resulting polymers. Analytical results for the resulting ethylene-α-olefin copolymers PE(F-2) to PE(F-5) are shown in Table 14. PE(F-1) to PE(F-4) satisfy all the preferred features of the invention for component (F). However, PE(F-5) does not satisfy the preferred features of the invention for component (F).

TABLE 14

| Production Example | | | F-1 | F-2 | F-3 | F-4 | (F-5) |
|---|---|---|---|---|---|---|---|
| Ethylene-α-olefin copolymer (F) | | | PE (F-1) | PE (F-2) | PE (F-3) | PE (F-4) | PE (F-5) |
| Name of grade | | | — | — | — | — | KF283 |
| Production conditions | 1-Hexene content | wt % | 73 | 78 | 62 | 55 | — |
| | Pressure | MPa | 130 | 130 | 130 | 130 | — |
| | Temperature | ° C. | 127 | 118 | 140 | 148 | — |
| Analytic results | Density | g/cc | 0.880 | 0.865 | 0.898 | 0.905 | 0.921 |
| | MFR (F) | g/10 min | 3.5 | 3.5 | 3.5 | 2.2 | 2.5 |

(7) Propylene Resin Composition (Z2) for Innermost Layer (3)

(7-1) Propylene Resin Composition (G)

(7-1-1)

The resins (PP(K-1) to PP(K-15)) obtained by successive polymerization in Production Examples (K-1) to (K-15) below were used.

(Production Example K-1

(i) Preparation of Prepolymerization Catalyst

Chemical Treatment of Silicate

A 10-liter glass separable flask equipped with a stirrer was charged with 3.75 liters of distilled water, followed by 2.5 kg of concentrated sulfuric acid (96%) slowly. In addition, 1 kg of montmorillonite (Benclay SL, available from Mizusawa Industrial Chemicals, Ltd.; average particle size, 25 µm; particle size distribution, 10 to 60 µm) was dispersed at 50° C., following which the temperature was raised to 90° C. and the flask was maintained at that temperature for 6.5 hours. After cooling to 50° C., the slurry was vacuum filtered, and the cake was collected. Next, 7 liters of distilled water was added to the cake to as to reconstitute the slurry, which was then filtered. This washing operation was carried out until the pH of the wash fluid (filtrate) exceeded 3.5. The recovered cake was dried overnight in a nitrogen atmosphere at 110° C. The weight after drying was 707 g.

(Drying of Silicate)

The silicate that had been chemically treated earlier was dried in a kiln dryer. The specifications and drying conditions were as follows.

Rotary cylinder: cylindrical shape, with inside diameter of 50 mm, heating zone of 550 mm (electric furnace), and with lifting flights Rotating speed: 2 rpm Inclination: 20/520

Silicate feed rate: 2.5 g/min

Gas flow rate: nitrogen, 96 L/hour

Countercurrent drying temperature: 200° C. (powder temperature)

(Preparation of Catalyst)

A 16-liter autoclave equipped with a stirrer and a temperature control device was thoroughly flushed with nitrogen. Dry silicate (200 g) was introduced, then 1,160 mL of mixed heptane was added, followed by 840 mL of a heptane solution of triethylaluminum (0.60 M), and the contents were stirred at room temperature. One hour later, washing with mixed heptane was carried out, thereby preparing 2,000 mL of a silicate slurry. Next, 9.6 mL of a heptane solution of triisobutylaluminum (0.71 M/L) was added to the prepared silicate slurry, and 1 hour of reaction was effected at 25° C. In a separate procedure, 33.1 mL of a heptane solution of triisobutylaluminum (0.71 M) was added to 2,180 mg (0.3 mM) of (r)-dichloro[1,1'-dimethylsilylenebis{2-methyl-4-(4-chlorophenyl)-4H-azulenyl}]zirconium and 870 mL of mixed heptane, and 1 hour of reaction was effected at room temperature. The mixture thus obtained was added to the silicate slurry and stirred for 1 hour, following which additional mixed heptane was added, bringing the volume up to 5,000 mL.

(Prepolymerization/Washing)

Next, the reactor temperature was raised to 40° C. Once the temperature had stabilized, propylene was fed in at a rate of 100 g/hour, and the temperature was maintained. The supply of propylene was stopped after 4 hours, and the temperature was maintained for another 2 hours.

After the completion of prepolymerization, the remaining monomer was purged, stirring was stopped, and the system was left at rest for about 10 minutes, following which 2,400 mL of supernatant was decanted. Next, 9.5 mL of a heptane solution of triisobutylaluminum (0.71 M/L), then 5,600 mL of mixed heptane were added, and stirring was carried out at 40° C. for 30 minutes. The system was then left at rest for 10 minutes, following which 5,600 mL of supernatant was removed. This operation was repeated another three times. An ingredient analysis of the final supernatant was carried out, whereupon the concentration of the organoaluminum ingredient was 1.23 mM/L and the zirconium concentration was $8.6 \times 10^{-6}$ g/L. Hence, the amount present in the supernatant relative to the amount charged was 0.016%. Next, 170 mL of a heptane solution of triisobutylaluinum (0.71 M/L) was added, following which vacuum drying was carried out at 45° C. A prepolymerization catalyst containing 2.0 g of polypropylene per gram of catalyst was obtained.

Using this prepolymerization catalyst, the production of a propylene-ethylene block copolymer was carried out according to the procedure described below.

(ii) First Polymerization Step

A horizontal reactor (L/D=6; capacity, 100 liters) equipped with stirring blades was thoroughly dried, and the interior was thoroughly flushed with nitrogen gas. In the presence of a polypropylene powder bed and while stirring at a speed of 30 rpm, 0.568 g/hr of the prepolymerization catalyst prepared by the above-described method and 15.0 mmol/hr of triisobutylaluminum were continuously fed to the upstream portion of the reactor. Vapor phase polymerization was carried out by continuously passing a monomer mixed gas into the reactor in such a way as to give an ethylene-propylene molar ratio of 0.07 in the vapor phase portion within the reactor and to set the hydrogen concentration at 100 ppm, while holding the reactor temperature at 65° C. and the pressure at 2.1 MPaG. The polymer powder formed by the reaction was continuously removed from the downstream portion of the reactor in such manner as to keep the size of the powder bed within the reactor constant. The polymer removal rate that reached a steady state at this time was 10.0 kg/hr.

Upon analysis, the propylene-ethylene random copolymer obtained in the first polymerization step was found to have a MFR of 6.0 g/10 min and an ethylene content of 2.2 wt %.

(iii) Second Polymerization Step

The propylene-ethylene copolymer removed from the first step was continuously fed to a horizontal reactor equipped with stirring blades (L/D=6; capacity, 100 liters). Vapor-phase polymerization was carried out by continuously passing a monomer mixed gas into the reactor in such a way as to give an ethylene-propylene molar ratio of 0.453 in the vapor phase portion within the reactor and to set the hydrogen concentration at 330 ppm, while stirring at a rate of 25 rpm and while holding the reactor temperature at 70° C. and the pressure at 2.0 MPaG. The polymer powder formed by the reaction was continuously removed from the downstream portion of the reactor in such manner as to keep the size of the powder bed within the reactor constant. Oxygen was supplied as an activity suppressor so as to set the polymer removal rate at this time to 17.9 kg/hr, thereby controlling the polymerization reaction rate in the second polymerization step. The activity was 31.429 kg/g of catalyst.

The analytical results for the resulting propylene resin composition PP(K-1) are shown in Table 15.

Production Examples K-2 to K-9

Aside from changing the polymerization conditions as shown in Table 15, catalyst preparation and polymerization were carried out by the same methods as in Production Example K-1.

Following reaction completion, various analyses of the resulting polymers were carried out. Table 15 shows the analytical results for propylene resin compositions PP(K-2) to PP(K-9) thus obtained. These satisfy all the preferred features of the invention for component (G).

TABLE 15

| | Production Examples | | | K-1 | K-2 | K-3 | K-4 | K-5 |
|---|---|---|---|---|---|---|---|---|
| | Propylene Resin Composition (K) | | | PP (K-1) | PP (K-2) | PP (K-3) | PP (K-4) | PP (K-5) |
| Production conditions | Step 1 | Catalyst amount | g/h | 0.568 | 0.391 | 0.625 | 0.568 | 0.568 |
| | | Temperature | °C. | 65 | 65 | 65 | 65 | 65 |
| | | Pressure | MPa | 2.1 | 2.1 | 2.1 | 2.1 | 2.1 |
| | | C2/C3 ratio | mol/mol | 0.07 | 0.09 | 0.055 | 0.07 | 0.07 |
| | | Hydrogen concentration | ppm | 100 | 150 | 90 | 100 | 100 |
| | | Production amount | kg/h | 10 | 10 | 10 | 10 | 10 |
| | | (Polymerization activity) | g/g-cat | 17,600 | 25,600 | 16,000 | 17,600 | 17,600 |
| | Step 2 | Temperature | °C. | 70 | 70 | 70 | 70 | 70 |
| | | Pressure | MPa | 2.0 | 2.0 | 2.0 | 2.0 | 2.0 |
| | | C2/C3 ratio | mol/mol | 0.453 | 0.453 | 0.453 | 0.534 | 0.435 |
| | | Hydrogen concentration | ppm | 330 | 330 | 330 | 350 | 320 |
| | | Production amount | kg/h | 17.9 | 17.9 | 17.9 | 19.2 | 16.7 |
| | | (Polymerization activity) | g/g-cat | 31,429 | 45,714 | 28,571 | 33,846 | 29,333 |
| Analytic results | Tm(K1) | Melting peak temperature | °C. | 130 | 126 | 133 | 130 | 130 |
| | E(K1) | Ethylene content in component (K1) | wt % | 2.2 | 2.8 | 1.7 | 2.2 | 2.2 |
| | W(K1) | Ratio of component (K1) | wt % | 56 | 56 | 56 | 52 | 60 |
| | MFR(K1) | MFR of component (K1) | g/10 min | 6 | 6 | 6 | 6 | 6 |
| | E(K2) | Ethylene content in component (K2) | wt % | 11 | 11 | 11 | 12.8 | 10.6 |
| | W(K2) | Ratio of component (K2) | wt % | 44 | 44 | 44 | 48 | 40 |
| | MFR(K) | MFR of component K | g/10 min | 6 | 6 | 6 | 6 | 6 |
| | Tg | Glass transition point | °C. | −14 | −15 | −13 | −16 | −13 |

| | Production Examples | | | K-6 | K-7 | K-8 | K-9 |
|---|---|---|---|---|---|---|---|
| | Propylene Resin Composition (K) | | | PP (K-6) | PP (K-7) | PP (K-8) | PP (K-9) |
| Production conditions | Step 1 | Catalyst amount | g/h | 0.568 | 0.568 | 0.649 | 0.535 |
| | | Temperature | °C. | 65 | 65 | 65 | 65 |
| | | Pressure | MPa | 2.1 | 2.1 | 2.1 | 2.1 |

TABLE 15-continued

| | | | | | | | |
|---|---|---|---|---|---|---|---|
| | | C2/C3 ratio | mol/mol | 0.07 | 0.07 | 0.07 | 0.07 |
| | | Hydrogen concentration | ppm | 100 | 100 | 90 | 110 |
| | | Production amount | kg/h | 10 | 10 | 10 | 10 |
| | | (Polymerization activity) | g/g-cat | 17,600 | 17,600 | 15,400 | 18,700 |
| | Step 2 | Temperature | °C. | 70 | 70 | 70 | 70 |
| | | Pressure | MPa | 2.0 | 2.0 | 2.0 | 2.0 |
| | | C2/C3 ratio | mol/mol | 0.435 | 0.534 | 0.453 | 0.453 |
| | | Hydrogen concentration | ppm | 320 | 350 | 300 | 450 |
| | | Production amount | kg/h | 17.9 | 17.9 | 17.9 | 17.9 |
| | | (Polymerization activity) | g/g-cat | 31,429 | 31,429 | 27,500 | 33,393 |
| Analytic results | Tm(K1) | Melting peak temperature | °C. | 130 | 130 | 130 | 130 |
| | E(K1) | Ethylene content in component (K1) | wt % | 2.2 | 2.2 | 2.2 | 2.2 |
| | W(K1) | Ratio of component (K1) | wt % | 56 | 56 | 56 | 56 |
| | MFR(K1) | MFR of component (K1) | g/10 min | 6 | 6 | 4.7 | 8 |
| | E(K2) | Ethylene content in component (K2) | wt % | 10.6 | 12.8 | 11 | 11 |
| | W(K2) | Ratio of component (K2) | wt % | 44 | 44 | 44 | 44 |
| | MFR(K) | MFR of component K | g/10 min | 6 | 6 | 4.7 | 8 |
| | Tg | Glass transition point | °C. | −14 | −15 | −14 | −14 |

Production Examples K-10 to K-15

Aside from changing the polymerization conditions as shown in Table 16, catalyst preparation and polymerization were carried out by the same methods as in Production Example K-1.

Following reaction completion, various analyses of the resulting polymers were carried out. Table 16 shows the analytical results for propylene resin compositions PP(K-10) to PP(K-15) thus obtained. These satisfy all the preferred features of the invention for component (G).

TABLE 16

| | | Production Examples | | K-10 | K-11 | K-12 | K-13 | K-14 | K-15 |
|---|---|---|---|---|---|---|---|---|---|
| Propylene Resin Composition (K) | | | | PP (K-10) | PP (K-11) | PP (K-12) | PP (K-13) | PP (K-14) | PP (K-15) |
| Production conditions | Step 1 | Catalyst amount | g/h | 0.284 | 1.250 | 0.568 | 0.568 | 0.568 | 0.568 |
| | | Temperature | °C. | 65 | 65 | 65 | 65 | 65 | 65 |
| | | Pressure | MPa | 2.1 | 2.1 | 2.1 | 2.1 | 2.1 | 2.1 |
| | | C2/C3 ratio | mol/mol | 0.12 | 0.02 | 0.07 | 0.07 | 0.07 | 0.07 |
| | | Hydrogen concentration | ppm | 200 | 30 | 100 | 100 | 100 | 100 |
| | | Production amount | kg/h | 10 | 10 | 10 | 10 | 10 | 10 |
| | | (Polymerization activity) | g/g-cat | 35,200 | 8,000 | 17,600 | 17,600 | 17,600 | 17,600 |
| | Step 2 | Temperature | °C. | 70 | 70 | 70 | 70 | 70 | 70 |
| | | Pressure | MPa | 2.0 | 2.0 | 2.0 | 2.0 | 2.0 | 2.0 |
| | | C2/C3 ratio | mol/mol | 0.453 | 0.453 | 0.453 | 0.453 | 0.228 | 0.678 |
| | | Hydrogen concentration | ppm | 330 | 330 | 330 | 330 | 300 | 380 |
| | | Production amount | kg/h | 17.9 | 17.9 | 25.0 | 15.4 | 17.9 | 17.9 |
| | | (Polymerization activity) | g/g-cat | 62,857 | 14,286 | 44,000 | 27,077 | 31,429 | 31,429 |
| Analytic results | Tm(K1) | Melting peak temperature | °C. | 120 | 140 | 130 | 130 | 130 | 130 |
| | E(K1) | Ethylene content in component (K1) | wt % | 3.8 | 0.5 | 2.2 | 2.2 | 2.2 | 2.2 |
| | W(K1) | Ratio of component (K1) | wt % | 56 | 56 | 40 | 65 | 56 | 56 |

TABLE 16-continued

| Production Examples | | | K-10 | K-11 | K-12 | K-13 | K-14 | K-15 |
|---|---|---|---|---|---|---|---|---|
| MFR(K1) | MFR of component (K1) | g/10 min | 6 | 6 | 6 | 6 | 6 | 6 |
| E(K2) | Ethylene content in component (K2) | wt % | 11 | 11 | 11 | 11 | 6 | 16 |
| W(K2) | Ratio of component (K2) | wt % | 44 | 44 | 60 | 35 | 44 | 44 |
| MFR(K) | MFR of component K | g/10 min | 6 | 6 | 6 | 6 | 6 | 6 |
| Tg | Glass transition point | °C. | −16 | −12 | −15 | −11 | −9 | −12, −32 |

(7-1-2) Propylene Resin Composition (G) for Inner Layer, Obtained by Blending

The following <K1> propylene-α-olefin random copolymers ((K1-1) to (K1-5)) were used as component (G1), and the following <K2> propylene-ethylene random copolymers ((K2-1) to (K2-3)) were used as component (G2).

<K1>

K1-1: The commercial product available from Japan Polypropylene Corporation under the trade name WINTEC WFW4 (a propylene-ethylene random copolymer obtained with a metallocene catalyst)

K1-2: Produced in Production Example K1-2 below.

K1-3: The commercial product available from Japan Polypropylene Corporation under the trade name NOVATEC PP FW4B (a propylene-α-olefin copolymer obtained with a Ziegler-Natta catalyst)

K1-4: The commercial product available from Dow Chemical under the trade name VERSIFY 3000 (a propylene-ethylene random copolymer obtained with a metallocene catalyst)

K1-5: Produced in Production Example K1-5 below.

<K2>

K2-1: The commercial product available from Exxon-Mobil Chemical under the trade name VISTAMAXX 3000 (a propylene-ethylene random copolymer obtained with a metallocene catalyst)

K2-2: The commercial product available from Dow Chemical under the trade name VERSIFY 3000 (a propylene-ethylene random copolymer obtained with a metallocene catalyst)

K2-3: The commercial product available from LiondellBasell Industries under the trade name ADFLEX X100G (a propylene-ethylene random copolymer obtained with a Ziegler-Natta catalyst)

Production Example (K1-2)

(i) Synthesis of Transition Metal Compound

The synthesis of [(r)-dichloro[1,1'-dimethylsilylenebis{2-methyl-4-(4-chlorophenyl)-4H-azurenyl}]zirconium] was carried out in accordance with the working examples in JP-A-H10-226712.

(ii) Chemical Treatment of Silicate

A 10-liter glass separable flask equipped with a stirrer was charged with 3.75 liters of distilled water, followed by 2.5 kg of concentrated sulfuric acid (96%) slowly. In addition, 1 kg of montmorillonite (Benclay SL, available from Mizusawa Industrial Chemicals, Ltd.; average particle size, 25 μm; particle size distribution, 10 μm to 60 μm) was dispersed at 50° C., following which the temperature was raised to 90° C. and the flask was maintained at that temperature for 6.5 hours. After cooling to 50° C., the slurry was vacuum filtered, and the cake was collected. Next, 7 liters of distilled water was added to the cake to as to reconstitute the slurry, which was then filtered. This washing operation was carried out until the pH of the wash fluid (filtrate) exceeded 3.5.

The recovered cake was dried overnight in a nitrogen atmosphere at 110° C. The weight after drying was 707 g.

(iii) Drying of Silicate

The silicate that had been chemically treated earlier was dried in a kiln dryer. The specifications and drying conditions were as follows.

Rotary cylinder: cylindrical shape, with inside diameter of 50 mm, heating zone of 550 mm (electric furnace), and with lifting flights
Rotating speed: 2 rpm
Inclination: 20/520
Silicate feed rate: 2.5 g/min
Gas flow rate: nitrogen, 96 L/hour
Countercurrent drying temperature: 200° C. (powder temperature)

(iv) Preparation of Catalyst

The dry silicate (20 g) obtained as described above was placed in a 1 L glass reactor equipped with a stirrer, after which 116 mL of mixed heptane was added, followed by 84 mL of a heptane solution of triethylaluminum (0.60 M), and the contents were stirred at room temperature. One hour later, washing with mixed heptane was carried out, thereby preparing 200 mL of a silicate slurry.

Next, 0.96 mL of a heptane solution of triisobutylaluminum (0.71 M/L) was added to the silicate slurry prepared as described above, and reaction carried out at 25° C. for one hour. In a separate procedure, 3.31 mL of a heptane solution of triisobutylaluminum (0.71 M) was added to 218 mg (0.3 mmol) of (r)-dichloro[1,1'-dimethylsilylenebis{2-methyl-4-(4-chlorophenyl)-4H-azulenyl}]zirconium and 87 mL of mixed heptane, and reaction carried out at room temperature for one hour. The mixture thus obtained was added to the silicate slurry and stirred for 1 hour, following which additional mixed heptane was added, bringing the volume up to 500 mL.

(v) Prepolymerization/Washing

Next, the silicate/metallocene complex slurry prepared above was placed in a 1.0 liter autoclave with stirrer which had been thoroughly flushed with nitrogen. Once the temperature had stabilized to 40° C., propylene was fed in at a rate of 10 g/hour, and the temperature was maintained. The supply of propylene was stopped after 4 hours, and the temperature was maintained for another 2 hours.

After the completion of prepolymerization, the remaining monomer was purged, stirring was stopped, and the system was left at rest for about 10 minutes, following which 240 mL of supernatant was decanted. Next, 0.95 mL of a heptane solution of triisobutylaluminum (0.71 M/L), then 560 mL of mixed heptane were added, and stirring was carried out at 40° C. for 30 minutes. The system was then left at rest for 10 minutes, following which 560 mL of supernatant was removed. This operation was repeated another three times. An ingredient analysis of the final supernatant was carried out, whereupon the concentration of the organoaluminum ingredient was 1.23 mM/L and the zirconium concentration was $8.6 \times 10^{-6}$ g/L. Hence, the amount present in the supernatant relative to the amount charged was 0.016%.

Next, 17.0 mL of a heptane solution of triisobutylaluminum (0.71 M/L) was added, following which vacuum drying was carried out at 45° C. This operation yielded a prepolymerization catalyst containing 2.0 g of polypropylene per gram of solid catalyst component.

(vi) Polymerization

The interior of a 200 liter stirring-type autoclave was thoroughly flushed with propylene, following which 45 kg of thoroughly dehydrated, liquefied propylene was introduced. To this were added 500 mL (0.12 mol) of an n-heptane solution of triisobutylaluminum, 0.32 kg of ethylene and 2.5 liters (the volume under standard conditions) of hydrogen, and the internal temperature was maintained at 30° C. Next, 1.90 g (weight of solid catalyst component) of a metallocene type polymerization catalyst was injected with argon, thereby commencing polymerization, the temperature rose to 70° C. over a period of 40 minutes, and was held at that temperature for 60 minutes. At this point, 100 mL of ethanol was added, stopping the reaction. The remaining gas was purged, yielding 20.3 kg of polypropylene polymer. This operation was repeated five time, giving polypropylene-ethylene random copolymer PP(E-2).

The MFR of this resin was 7 g/10 min, the ethylene content was 0.75 mol %, and the melting point was 142° C.

Production Example (K1-5)

(i) Production of Solid Component (A)

A 10 L autoclave equipped with a stirrer was thoroughly flushed with nitrogen, and 2 L of purified n-heptane was introduced. In addition, 250 g of $MgCl_2$ and 1.8 L of Ti(O-n-Bu)$_4$ were added, and the reaction was carried out at 95° C. for 2 hours. The reaction product was cooled to 40° C., and 500 mL of methyl hydrogen polysiloxane (20 centistoke) was added. The reaction was carried out at 40° C. for 5 hours, following which the precipitated solid product was thoroughly washed with purified n-heptane.

Next, purified n-heptane was introduced, and the concentration of the above solid product was adjusted to 200 g/L. At this point, 300 mL of $SiCl_4$ was added, and the reaction was carried out at 90° C. for 3 hours. The reaction product was thoroughly washed with purified n-heptane, and purified n-heptane was introduced so as to set the concentration of the reaction product to 100 g/L. To this was added a mixture of 30 mL of phthaloyl dichloride with 270 mL of purified n-heptane, and the reaction was carried out at 90° C. for 1 hour. The reaction product was thoroughly washed with purified n-heptane, and purified n-heptane was added so as to bring the concentration of the reaction product to 200 g/L. Next, 1 L of $TiCl_4$ was added, and the reaction was carried out at 95° C. for 3 hours. The reaction product was thoroughly washed with purified n-heptane, giving a slurry of solid component (A). A portion of this slurry was sampled and dried. The analysis showed the titanium content of the solid component (A) to be 2.5 wt %.

(ii) Preparation of Solid Catalyst Component (B)

Next, a 20 L autoclave equipped with a stirrer was thoroughly flushed with nitrogen, and the above slurry of solid component (A) was introduced in an amount corresponding to 100 g of solid component (A). Purified n-heptane was added so as to adjust the concentration of solid component (A) to 20 g/L. To this were added 25 mL of trimethylvinylsilane, 25 mL of (t-Bu)(Me)Si(OEt)$_2$ and an amount of an n-heptane dilution of $Et_3Al$ corresponding to 50 g as $Et_3Al$, following which the reaction was carried out at 30° C. for 2 hours. The reaction product was thoroughly washed with purified n-heptane. A portion of the resulting slurry was sampled and dried. The analysis showed that the solid component contained 2.1 wt % of titanium and 6.1 wt % of (t-Bu)(Me)Si(OEt)$_2$.

Using the solid component obtained above, preliminary polymerization was carried out according to the following procedure. Purified n-heptane was added to the above slurry, adjusting the concentration of the solid component to 10 g/L. The slurry was cooled to 10° C., following which an n-heptane dilution of $Et_3Al$ was added in an amount corresponding to 10 g of $Et_3Al$, and 150 g of propylene was fed over a period of 2 hours. After the feeding of propylene was completed, the reaction was continued for another 30 minutes. Next, the vapor phase portion was thoroughly flushed with nitrogen, and the reaction product was thoroughly washed with purified n-heptane. The resulting slurry was removed from the autoclave and vacuum dried, giving solid catalyst component (B). This solid catalyst component (B) contained 1.2 g of polypropylene per gram of solid components. Upon analysis, the portion of this solid catalyst component (B) from which polypropylene had been removed contained 1.6 wt % of titanium and 5.5 wt % of (t-Bu) (Me)Si(OEt)$_2$.

(iii) Polymerization

The interior of a 200 L stirring-type autoclave was thoroughly flushed with propylene, following which 80 L of purified n-heptane was introduced. The temperature was raised to 70° C., then an n-heptane dilution of $Et_3Al$ in an amount corresponding to 1.5 g of $Et_3Al$, 5.0 NL of hydrogen, and 0.25 g of the above solid catalyst component (B) (but excluding the prepolymerization polymer) were added. The temperature was raised to 75° C., following which propylene was fed in to a pressure of 0.7 MPaG, and polymerization was begun. Propylene supply was continued so as to maintain the pressure during polymerization. Three hours later, polymerization was stopped by adding 1 L of butanol. The remaining propylene was purged, and thoroughly flushed with nitrogen. The slurry thus obtained was filtered with a centrifugal separator, then dried in a desiccator, thereby giving PP(K1-5).

Various analytical results for above PP(K1-1) to PP(K1-5) and PP(K2-1) to PP(K2-3) are shown in Tables 17 and 18 below. PP(K1-4), PP(K1-5), PP(K2-2) and PP(K2-3) satisfy the preferred features for component (G) in the invention.

TABLE 17

| Production Example | | | | (K1-1) | K1-2 | (K1-3) | (K1-4) | K1-5 |
|---|---|---|---|---|---|---|---|---|
| Propylene-α-olefin copolymer (K1) | | | | PP (K1-1) | PP (K1-2) | PP (K1-3) | PP (K1-4) | PP (K1-5) |
| Name of grade | | | | WFW4 | | FW4B | VERSIFY 3000 | |
| Analytic results | Melt peak temp. | Tm(K1) | °C. | 135 | 142 | 139 | 108 | 161 |
| | Melt flow rate | MFR(K1) | g/10 min | 7 | 7 | 7 | 8 | 5 |

TABLE 18

| Production Example | | | | (K2-1) | (K2-2) | (K2-3) |
|---|---|---|---|---|---|---|
| Propylene-α-olefin copolymer (K2) | | | | PP (K2-1) | PP (K2-2) | PP (K2-3) |
| Name of grade | | | | VISTAMAXX 3000 | VERSIFY 3000 | ADFLEX X100G |
| Analytic results | Ethylene content | E(K2) | °C. | 11 | 3 | 18 |
| | Melt flow rate | MFR(K2) | g/10 min | 8 | 8 | 8 |
| | Catalyst | — | — | metallocene | metallocene | Ziegler-Natta |

(7-2) Production of Component (G) by Blending

The above <K1> propylene-α-olefin random copolymers ((K1-1) to (K1-5)) as component (G1), and the above <K2> propylene-ethylene random copolymers ((K2-1) to (K2-3)) as component (G2) were weighed out in the compositional ratios shown below in Tables 19 and 20 and mixed together by stirring in a Henschel mixer, thereby giving PP(K-16) to PP(K-28) as propylene resin composition (G).

Various analytical results for the above composition (G) are shown in Table 19 and 20 below.

Of PP(K-16) to PP(K-28), PP(K-16) to PP(K-21) satisfy all the preferred features in the invention. However, PP(K-22) to PP(K-28) do not satisfy all the preferred features in the invention.

TABLE 19

| Production Example | | | | K-16 | K-17 | K-18 | K-19 | K-20 | K-21 |
|---|---|---|---|---|---|---|---|---|---|
| Propylene resin composition (K) | | | | PP (K-16) | PP (K-17) | PP (K-18) | PP (K-19) | PP (K-20) | PP (K-21) |
| Propylene-α-olefin copolymer (K1) | | | | PP (K1-1) | PP (K1-1) | PP (K1-1) | PP (K1-2) | PP (K1-3) | PP (K1-1) |
| Compounded amount (wt %) | | | | 50 | 40 | 60 | 50 | 50 | 100 |
| Propylene-ethylene copolymer (K2) | | | | PP (K2-1) | PP (K2-1) | PP (K2-1) | PP (K2-1) | PP (K2-1) | — |
| Compounded amount (wt %) | | | | 50 | 60 | 40 | 50 | 50 | 0 |
| Analytic results | Glass transition point | Tg | °C. | −15 | −16 | −14 | −13 | −13 | 2 |

TABLE 20

| Production Example | | | | K-22 | K-23 | K-24 | K-25 | K-26 | K-27 | K-28 |
|---|---|---|---|---|---|---|---|---|---|---|
| Propylene resin composition (K) | | | | PP (K-22) | PP (K-23) | PP (K-24) | PP (K-25) | PP (K-26) | PP (K-27) | PP (K-28) |
| Propylene-α-olefin copolymer (K1) | | | | — | PP (K1-1) | PP (K1-1) | PP (K1-4) | PP (K1-5) | PP (K1-1) | PP (K1-1) |
| Compounded amount (wt %) | | | | 0 | 80 | 20 | 50 | 50 | 50 | 50 |
| Propylene-ethylene copolymer (K2) | | | | PP (K2-1) | PP (K2-1) | PP (K2-1) | PP (K2-1) | PP (K2-1) | PP (K2-2) | PP (K2-3) |
| Compounded amount (wt %) | | | | 100 | 20 | 80 | 50 | 50 | 50 | 50 |
| Analytic results | Glass transition point | Tg | °C. | −23 | −8 | −20 | −20 | −5 | −9 | −20, −41 |

(7-2) Ethylene-α-Olefin Copolymer (H) Included in Propylene Resin Composition (Z2) for Innermost Layer (3)

Ethylene-α-olefin copolymer PE(H-1) to PE(H-4) obtained in Production Examples (H-1) to (H-4) below and the following commercial ethylene-α-olefin copolymer PE(H-5) were used. PE(H-5): The commercial product available from Japan Polyethylene Corporation under the trade name KERNEL KF283 (an ethylene-α-olefin copolymer obtained with a metallocene catalyst)

Production Example H-1

A copolymer of ethylene and 1-hexene was produced. Catalyst preparation was carried out by the method described in Japanese Translation of PCT Application No. H7-508545 (preparation of catalyst system). That is, a catalyst solution was prepared by adding, to 2.0 mmol of the complex dimethylsilylenebis(4,5,6,7-tetrahydroindenyl)hafnium dimethyl, an equimolar amount of tripentafluorophenylboron, then diluting to 10 liters with toluene.

A mixture of ethylene and 1-hexene was fed to a stirring autoclave-type continuous reactor having a capacity of 1.5 liters in such a way as to set the 1-hexene content to 73 wt %, and the reaction was carried out at 127° C. while maintaining the pressure inside the reactor at 130 MPa. The amount of polymer produced per hour was about 2.5 kg.

Following reaction completion, various analyses were carried out on the resulting polymer. Table 21 shows the analytical results obtained for the resulting ethylene-α-olefin copolymer PE(H-1).

Production Examples H-2 to H-4

Aside from varying the 1-hexene content at the time of polymerization and the polymerization temperature as shown in Table 21, catalyst preparation and polymerization were carried out by the same methods as in Production Example (H-1).

Following reaction completion, various analyses were conducted on the resulting polymers. Various analytical results for the resulting ethylene-α-olefin copolymers PE(H-2) to PE(H-4) and PE(H-5) are shown in Table 21.

PE(H-1) to PE(H-4) satisfy all the features in the invention regarded as desirable for component (H). However, PE(H-5) does not satisfy the features in the invention regarded as desirable for component (H).

TABLE 21

| Production Example | | | H-1 | H-2 | H-3 | H-4 | (H-5) |
|---|---|---|---|---|---|---|---|
| Ethylene-α-olefin copolymer (H) | | | PE (H-1) | PE (H-2) | PE (H-3) | PE (H-4) | PE (H-5) |
| Name of grade | | | — | — | — | — | KF283 |
| Production conditions | 1-Hexene content | wt % | 73 | 78 | 62 | 55 | — |
| | Pressure | MPa | 130 | 130 | 130 | 130 | — |
| | Temperature | ° C. | 127 | 118 | 140 | 148 | — |
| Analytic results | Density | g/cc | 0.880 | 0.865 | 0.898 | 0.905 | 0.921 |
| | MFR(H) | g/10 min | 3.5 | 3.5 | 3.5 | 2.2 | 2.5 |

(7-3) Propylene Resin (I) Included in Propylene Resin Composition (Z2) for Innermost Layer (3)

Resins PP(I-1) to PP(I-3) obtained in Production Examples (I-1) to (I-3) below and the commercial products shown below were used. PP(I-1) and PP(I-2) are homopropylenes obtained by single-stage polymerization, and PP(I-3) is a block copolymer polypropylene obtained by multistage polymerization.

PP(I-4): The product available from Japan Polyethylene Corporation under the trade name WINTEC WFW4 (a propylene-ethylene random copolymer obtained by single-stage polymerization)

PP(I-5): The product available from Japan Polyethylene Corporation under the trade name WINTEC WFX4 (a propylene-ethylene random copolymer obtained by single-stage polymerization)

The MFR and Tm of the above resins are shown in Table 22.

Production Example I-1

(i) Production of Solid Component (A)

A 10 L autoclave equipped with a stirrer was thoroughly flushed with nitrogen, and 2 L of purified n-heptane was introduced. In addition, 250 g of $MgCl_2$ and 1.8 L of $Ti(O-n-Bu)_4$ were added, and the reaction was carried out at 95° C. for 2 hours. The reaction product was cooled to 40° C., and 500 mL of methyl hydrogen polysiloxane (20 centistoke) was added. After the reaction was carried out at 40° C. for 5 hours, the precipitated solid product was thoroughly washed with purified n-heptane.

Next, purified n-heptane was introduced, and the concentration of the above solid product was adjusted to 200 g/L. At this point, 300 mL of $SiCl_4$ was added, and the reaction was carried out at 90° C. for 3 hours. The reaction product was thoroughly washed with purified n-heptane, and purified n-heptane was introduced so as to set the concentration of the reaction product to 100 g/L. To this was added a mixture of 30 mL of phthaloyl dichloride with 270 mL of purified n-heptane, and the reaction was carried out at 90° C. for 1 hour. The reaction product was thoroughly washed with purified n-heptane, and purified n-heptane was added so as to bring the concentration of the reaction product to 200 g/L. Next, 1 L of $TiCl_4$ was added, and the reaction was carried out at 95° C. for 3 hours. The reaction product was thoroughly washed with purified n-heptane, giving a slurry of solid component (A). A portion of this slurry was sampled and dried. The analysis showed the titanium content of the solid component (A) to be 2.5 wt %.

(ii) Preparation of Solid Catalyst Component (B)

Next, a 20 L autoclave equipped with a stirrer was thoroughly flushed with nitrogen, and the above slurry of solid component (A) was introduced in an amount corresponding to 100 g of solid component (A). Purified n-heptane was added so as to adjust the concentration of solid component (A) to 20 g/L. To this were added 25 mL of trimethylvinylsilane, 25 mL of (t-Bu) (Me)Si(OEt)$_2$, and an amount of an n-heptane dilution of Et$_3$Al corresponding to 50 g as Et$_3$Al, and the reaction was carried out at 30° C. for 2 hours. The reaction product was thoroughly washed with purified n-heptane. A portion of the resulting slurry was sampled and dried. The analysis showed that the solid component contained 2.1 wt % of titanium and 6.1 wt % of (t-Bu)(Me)Si(OEt)$_2$.

Using the solid component obtained above, preliminary polymerization was carried out according to the following procedure. Purified n-heptane was added to the above slurry, adjusting the concentration of the solid component to 10 g/L. The slurry was cooled to 10° C., following which an n-heptane dilution of Et$_3$Al was added in an amount corresponding to 10 g of Et$_3$Al, and 150 g of propylene was fed over a period of 2 hours. After the supply of propylene was completed, the reaction was continued for another 30 minutes. Next, the vapor phase portion was thoroughly flushed with nitrogen, and the reaction product was thoroughly washed with purified n-heptane. The resulting slurry was removed from the autoclave and vacuum dried, giving solid catalyst component (B). This solid catalyst component (B) contained 1.2 g of polypropylene per gram of solid components. Upon analysis, the portion of this solid catalyst component (B) from which polypropylene had been removed contained 1.6 wt % of titanium and 5.5 wt % of (t-Bu)(Me)Si(OEt)$_2$.

(iii) Polymerization

The interior of a 200 L stirring-type autoclave was thoroughly flushed with propylene, following which 80 L of purified n-heptane was introduced. The temperature was raised to 70° C., then an n-heptane dilution of EtAl in an amount corresponding to 1.5 g of Et$_3$Al, 5.0 NL of hydrogen and 0.25 g of the above solid catalyst component (B) (but excluding the prepolymerization polymer) were added. The temperature was raised to 75° C., following which propylene was fed in to a pressure of 0.7 MPaG, and polymerization was begun. Propylene supply was continued so as to maintain the pressure during polymerization. Three hours later, polymerization was stopped by adding 1 L of butanol. The remaining propylene was purged, and thoroughly flushed with nitrogen. The slurry thus obtained was filtered with a centrifugal separator, then dried in a desiccator, thereby giving PP(I-1).

Production Example I-2

Aside from changing the amount of hydrogen used during polymerization, PP(I-2) was obtained in the same way as in Production Example I-1. The results are shown in Table 22.

Production Example I-3

(i) Production of Solid Component Catalyst

A nitrogen-flushed 50 L reactor equipped with a stirrer was charged with 20 liters of dehydrated and deoxygenated n-heptane, then 4 moles of magnesium chloride and 8 moles of tetrabutoxytitanium were added and the reactor contents were reacted at 95° C. for 2 hours. The temperature was subsequently lowered to 40° C., 480 mL of methyl hydrogen polysiloxane (20 centistoke) was added, and the contents were again reacted for 3 hours, following which the reaction mixture was removed and the solid component that had formed was washed with n-heptane.

Next, 15 liters of dehydrated and deoxygenated n-heptane was charged into the same type of reactor with stirrer as described above, following which the solid component was added in an amount equivalent to 3 moles of magnesium atoms. A mixture of 8 moles of silicon tetrachloride added to 25 mL of n-heptane was then introduced at 30° C. over a period of 30 minutes, the temperature was raised to 90° C., and the reactor contents were reacted for one hour, following which the reaction mixture was removed and the solid component that had formed was washed with n-heptane.

In addition, 5 liters of dehydrated and deoxygenated n-heptane was charged into the same type of reactor with stirrer as described above, following which 250 g of the silicon tetrachloride-treated titanium-containing solid component obtained above, 750 g of 1,5-hexadiene, 130 mL of t-butyl-methyldimethoxysilane, 10 mL of divinyldimethylsilane and 225 g of triethylaluminum were each added, and the reaction was carried out at 30° C. for 2 hours. The reaction mixture was subsequently removed and washed with n-heptane, giving a solid component catalyst.

The amount of 1,5-hexadiene prepolymerization for the resulting solid component catalyst was 2.97 g per gram of the titanium-containing solid component.

(ii) Two-Stage Polymerization of Propylene/Propylene-Ethylene

Propylene, triethylaluminum, and an amount of the above solid component catalyst for setting the polymer-forming rate at 20 kg/hour were continuously fed into a first-stage reactor having a capacity of 550 liters at a temperature of 70° C. and under an applied pressure (about 3.2 MPa at 70° C.). In addition, hydrogen was continuously fed as a molecular weight adjusting agent, and first-stage polymerization was carried out in a liquid phase.

Next, the polymer that had formed was charged, through a propylene purging tank, into a second-stage reactor having a capacity of 1,900 liters, and propylene and ethylene in amounts corresponding to the compositional ratio of the target copolymer were continuously fed in at a temperature of 60° C. to a pressure of 3.0 MPa. In addition, hydrogen was continuously fed in as a molecular weight adjusting agent, and an active hydrogen compound (ethanol) was fed in an amount of 200 moles per mole of titanium atoms in the solid component catalyst supplied in the first stage and in an amount of 2.5 moles per mole of triethylaluminum, whereupon polymerization was carried out in a vapor phase. The polymer that formed was continuously transferred to a vessel, following which moisture-containing nitrogen gas was introduced, thereby stopping the reaction (second-stage polymerization).

The analytic results for the resulting PP(I-3) are shown in Table 22.

PP(I-1) to PP(I-3) satisfy all the preferred features for component (I) in the invention. However, PP(I-4) and PP(I-5) do not satisfy the preferred features for component (I) in the invention.

TABLE 22

| Production Example | | | I-1 | I-2 | I-3 | (I-4) | (I-5) |
|---|---|---|---|---|---|---|---|
| Propylene resin (I) | | | PP (I-1) | PP (I-2) | PP (I-3) | PP (I-4) | PP (I-5) |
| Name of grade | | | — | — | — | WFW4 | WFX4 |
| Analytic results | Tm(I) | ° C. | 161 | 161 | 162 | 135 | 125 |
| | MFR(I) | g/10 min | 5 | 10 | 7 | 7 | 7 |
| | Elastomer content | wt % | — | — | 57 | — | — |

TABLE 22-continued

| Production Example | | I-1 | I-2 | I-3 | (I-4) | (I-5) |
|---|---|---|---|---|---|---|
| Ethylene content in elastomer | wt % | — | — | 17 | — | — |

Working Examples, Comparative Examples and Reference Examples (1-i) Inner Layer Formulation The propylene resin composition (X) for forming the inner layer was obtained by weighing out the propylene resin composition (component (A)), ethylene-α-olefin copolymer (component (B)) and propylene resin PP (as component (C)) shown in the respective tables below in the proportions indicated in the tables. In each example, the composition (X) was charged into a Henschel mixer, following which 0.07 parts by weight of antioxidant 1 below, 0.07 parts by weight of antioxidant 2 below, and 0.01 parts by weight of the neutralizing agent shown below were added per 100 parts by weight of the propylene resin composition (X), and the ingredients were thoroughly mixed to give a compound.

Antioxidant 1: Tetrakis[methylene-3-(3',5'-di-t-butyl-4'-hydroxyphenyl)propionate]methane (available from Ciba Specialty Chemicals under the trade name Irganox 1010)

Antioxidant 2: Tris(2,4-di-t-butylphenyl)phosphate (available from Ciba Specialty Chemicals under the trade name Irganox 168)

Neutralizing agent: Calcium stearate (available from Nitto Kasei Kogyo KK under the trade name Ca-St)

(1-ii) Outer Layer (2)

The propylene resin composition (Y) for forming the outer layer was obtained either by using the propylene resin (component (D)) shown in the respective tables below alone, or dry blending component (D) with an ethylene-α-olefin copolymer (component (D3)) and other ingredients in the proportions shown in each table to form a compound.

(1-iii) Innermost Layer (3)

The propylene-α-olefin copolymer (component (E)) and the ethylene-α-olefin copolymer (component (F)) shown in the respective tables below which make up propylene resin composition (Z1) for forming the innermost layer, or the propylene resin composition (G) and the ethylene-α-olefin copolymer (component (H)) shown in the respective tables below which make up propylene resin composition (Z2) for forming the innermost layer, were dry blended together with component (H), (I) and other components shown in the respective tables below in the proportions shown in each table to form a compound.

(2) Granulation

Each of the resulting compounds was melt-blended in a PCM twin-screw extruder (screw bore, 30 mm; Ikegai Seisakusho) at a screw speed of 200 rpm, a discharge rate of 10 kg/hr and an extruder temperature of 190° C. The molten resin extruded from the strand die was taken up while being cooled and solidified in a cooling water tank. Using a strand cutter, the strand was cut to a diameter of about 2 mm and a length of about 3 mm, giving pellets for use as the feedstock.

(3) Evaluating the Physical Properties of the Multilayer Sheet

Using a single-screw extruder having a 50 mm bore as the inner layer extruder and using a single-screw extruder having a 40 mm bore as the surface layer extruder, the feedstock pellets obtained above were extruded at a temperature setting of 200° C. from a circular die having a mandrel diameter of 100 mm and a lip width of 3.0 mm, water-cooled, and shaped at a speed of 10 m/min, thereby giving a 200 μm thick tubular shaped body having a layer ratio of 1/8/1. Next, the tubular shaped body was cut along one side with a cutter to form a laminated sheet, after which the laminated sheet was conditioned for at least 24 hours in a 23° C., 50% RH atmosphere.

The physical properties of the laminated sheet were evaluated. The results of the evaluations are shown in the Tables below.

Laminated sheets which satisfied the constitution of the invention had an excellent transparency, flexibility, heat resistance, impact resistance, heat-sealability, cleanliness and suitability for fabrication.

TABLE 23

| | | | | EX 1 | EX 2 | EX 3 | EX 4 | EX 5 | EX 6 | EX 7 |
|---|---|---|---|---|---|---|---|---|---|---|
| Layer compositions and resin formulations | Outer layer | Component (D) amount | wt % | — 100 | PP(D-1) 100 | PP(D-1) 100 | PP(D-1) 100 | PP(D-1) 100 | PP(D-1) 100 | PP(D-1) 100 |
| | | Component (D3) amount | wt % | — — | — — | — — | — — | — — | — — | — — |
| | | Other components amount | wt % | — — | — — | — — | — — | — — | — — | — — |
| | Inner layer | Component (A) amount | wt % | PP(A-1) 80 | PP(A-1) 70 | PP(A-1) 70 | PP(A-2) 70 | PP(A-3) 70 | PP(A-4) 70 | PP(A-5) 70 |
| | | Component (B) amount | wt % | PE(H-3) 20 | PE(B-3) 20 | PE(B-1) 20 | PE(B-1) 20 | PE(B-1) 20 | PE(B-1) 20 | PE(B-1) 20 |
| | | Component (C) amount | wt % | — — | PP(C-2) 10 | PP(C-1) 10 | PP(C-1) 10 | PP(C-1) 10 | PP(C-1) 10 | PP(C-1) 10 |
| | | Other components amount | wt % | — — | — — | — — | — — | — — | — — | — — |
| | | Tm(C) - Tm(Al) | ° C. | — | 31 | 31 | 35 | 28 | 31 | 31 |
| | Innermost layer | Component (K) amount | wt % | — — | — — | PP(K-1) 70 | PP(K-1) 70 | PP(K-1) 70 | PP(K-1) 70 | PP(K-1) 70 |
| | | Component H amount | wt % | — — | — — | PE(H-1) 20 | PE(H-1) 20 | PE(H-1) 20 | PE(H-1) 20 | PE(H-1) 20 |
| | | Component I amount | wt % | — — | — — | PP(I-1) 10 | PP(I-1) 10 | PP(I-1) 10 | PP(I-1) 10 | PP(I-1) 10 |
| | | Other components amount | wt % | — — | — — | — — | — — | — — | — — | — — |
| | | Tm(C) - Tm(Al) | ° C. | — | 31 | 31 | 31 | 31 | 31 | 31 |
| | | S(0) | wt % | 1.6 | 2.2 | 2.2 | 2.2 | 2.2 | 2.2 | 2.2 |
| Film properties | Appearance | | — | ◯— | ◯ | ◯ | ◯ | ◯ | ◯ | ◯ |
| | Total haze | | % | 19 | 14 | 13 | 13 | 13 | 13 | 13 |

TABLE 23-continued

| | | | | EX 1 | EX 2 | EX 3 | EX 4 | EX 5 | EX 6 | EX 7 |
|---|---|---|---|---|---|---|---|---|---|---|
| after 30 minutes of heat treatment at 121° C. | Tensile modulus | MD | MPa | 195 | 251 | 240 | 236 | 244 | 242 | 244 |
| | Heat-sealing strength | 125° C. | gf/10 mm | 1350 | 1756 | 1800 | 1846 | 1817 | 1879 | 1797 |
| | | 130° C. | | 2546 | 2756 | 2856 | 2546 | 2849 | 2864 | 2879 |
| | | 135° C. | | 3041 | 3102 | 3135 | 3187 | 3144 | 3179 | 3179 |
| | | 140° C. | | 3154 | 3325 | 3326 | 3465 | 3467 | 3468 | 3471 |
| | | 145° C. | | 3477 | 3711 | 3562 | 3654 | 3554 | 3567 | 3598 |
| | | 150° C. | | 3844 | 4798 | 4598 | 4687 | 4567 | 4577 | 4512 |
| | | 155° C. | | 3910 | 5102 | 5165 | 5026 | 5100 | 5167 | 5147 |
| | | 160° C. | | 4098 | 5201 | 5249 | 5163 | 5164 | 5203 | 5207 |
| | Cumulative bag drop test | 50 cm | — | ○○/○○ | ○○/○○ | ○○/○○ | ○○/○○ | ○○/○○ | ○○/○○ | ○○/○○ |
| | | 100 cm | | ○○/○○ | ○○/○○ | ○○/○○ | ○○/○○ | ○○/○○ | ○○/○○ | ○○/○○ |
| | | 150 cm | | X/X | ○X/○X | ○○/X | X/○X | ○○/X | X/○X | X/○X |
| | | 200 cm | | —/— | —/— | X/— | —/— | X/— | —/— | —/— |

TABLE 24

| | | | | EX 8 | EX 9 | EX 10 | EX 11 | EX 12 | EX 13 | EX 14 |
|---|---|---|---|---|---|---|---|---|---|---|
| Layer compositions and resin formulations | Outer layer | Component (D) | — | PP(D-1) | PP(D-1) | PP(D-1) | PP(D-1) | PP(D-1) | PP(D-1) | PP(D-1) |
| | | amount | wt % | 100 | 100 | 100 | 100 | 100 | 100 | 100 |
| | | Component (D3) | — | — | — | — | — | — | — | — |
| | | amount | wt % | — | — | — | — | — | — | — |
| | | Other components | — | — | — | — | — | — | — | — |
| | | amount | wt % | — | — | — | — | — | — | — |
| | Inner layer | Component (A) | — | PP(A-6) | PP(A-7) | PP(A-8) | PP(A-9) | PP(A-11) | PP(A-12) | PP(A-13) |
| | | amount | wt % | 70 | 70 | 70 | 70 | 70 | 70 | 70 |
| | | Component (B) | — | PE(B-1) | PE(B-1) | PE(B-1) | PE(B-1) | PE(B-1) | PE(B-1) | PE(B-1) |
| | | amount | wt % | 20 | 20 | 20 | 20 | 20 | 20 | 20 |
| | | Component (C) | — | PP(C-1) | PP(C-1) | PP(C-1) | PP(C-1) | PP(C-1) | PP(C-1) | PP(C-1) |
| | | amount | wt % | 10 | 10 | 10 | 10 | 10 | 10 | 10 |
| | | Other components | — | — | — | — | — | — | — | — |
| | | amount | wt % | — | — | — | — | — | — | — |
| | | Tm(C) - Tm(Al) | ° C. | 31 | 31 | 31 | 31 | 21 | 31 | 31 |
| | Innermost layer | Component (K) | — | PP(K-1) | PP(K-1) | PP(K-1) | PP(K-1) | PP(K-1) | PP(K-1) | PP(K-1) |
| | | amount | wt % | 70 | 70 | 70 | 70 | 70 | 70 | 70 |
| | | Component (H) | — | PE(H-1) | PE(H-1) | PE(H-1) | PE(H-1) | PE(H-1) | PE(H-1) | PE(H-1) |
| | | amount | wt % | 20 | 20 | 20 | 20 | 20 | 20 | 20 |
| | | Component (I) | — | PP(I-1) | PP(I-1) | PP(I-1) | PP(I-1) | PP(I-1) | PP(I-1) | PP(I-1) |
| | | amount | wt % | 10 | 10 | 10 | 10 | 10 | 10 | 10 |
| | | Other components | — | — | — | — | — | — | — | — |
| | | amount | wt % | — | — | — | — | — | — | — |
| | | Tm(C) - Tm(Al) | ° C. | 31 | 31 | 31 | 31 | 31 | 31 | 31 |
| | | S(0) | wt % | 2.2 | 2.2 | 2.2 | 2.2 | 2.2 | 2.2 | 2.2 |
| Film properties after 30 minutes of heat treatment at 121° C. | Appearance | | — | ○ | ○ | ○ | ○ | ○ | ○ | ○ |
| | Total haze | | % | 13 | 13 | 13 | 13 | 14 | 13 | 14 |
| | Tensile modulus | MD | MPa | 242 | 236 | 240 | 240 | 289 | 233 | 301 |
| | Heat-sealing strength | 125° C. | gf/10 mm | 1813 | 1846 | 1899 | 1784 | 1857 | 1890 | 1877 |
| | | 130° C. | | 2846 | 2846 | 2811 | 2877 | 2557 | 2587 | 2579 |
| | | 135° C. | | 3177 | 3111 | 3146 | 3176 | 3226 | 3220 | 3236 |
| | | 140° C. | | 3412 | 3416 | 3498 | 3478 | 3499 | 3514 | 3516 |
| | | 145° C. | | 3577 | 3519 | 3579 | 3564 | 3699 | 3671 | 3705 |
| | | 150° C. | | 4517 | 4587 | 4569 | 4578 | 4730 | 4732 | 4692 |
| | | 155° C. | | 5189 | 5198 | 5177 | 5144 | 5064 | 5038 | 5067 |
| | | 160° C. | | 5211 | 5279 | 5317 | 5243 | 5185 | 5209 | 5182 |
| | Cumulative bag drop test | 50 cm | — | ○○/○○ | ○○/○○ | ○○/○○ | ○○/○○ | ○○/○○ | ○○/○○ | ○○/○○ |
| | | 100 cm | | ○○/○○ | ○○/○○ | ○○/○○ | ○○/○○ | ○○/○○ | ○○/○○ | ○○/○○ |
| | | 150 cm | | ○○/X | ○○/X | ○X/X | ○X/○X | X/X | X/X | X/X |
| | | 200 cm | | X/— | X/— | X/— | —/— | —/— | —/— | —/— |

TABLE 25

| | | | | EX 15 | EX 16 | EX 17 | EX 18 | EX 19 | EX 20 | EX 21 |
|---|---|---|---|---|---|---|---|---|---|---|
| Layer compositions and resin formulations | Outer layer | Component (D) | — | PP(D-1) | PP(D-1) | PP(D-1) | PP(D-1) | PP(D-1) | PP(D-1) | PP(D-1) |
| | | amount | wt % | 100 | 100 | 100 | 100 | 100 | 100 | 100 |
| | | Component (D3) | — | — | — | — | — | — | — | — |
| | | amount | wt % | — | — | — | — | — | — | — |
| | | Other components | — | — | — | — | — | — | — | — |
| | | amount | wt % | — | — | — | — | — | — | — |

TABLE 25-continued

|  |  |  |  | EX 15 | EX 16 | EX 17 | EX 18 | EX 19 | EX 20 | EX 21 |
|---|---|---|---|---|---|---|---|---|---|---|
|  | Inner layer | Component (A) | — | PP(A-15) | PP(A-16) | PP(A-17) | PP(A-1) | PP(A-1) | PP(A-1) | PP(A-1) |
|  |  | amount | wt % | 70 | 70 | 70 | 70 | 70 | 70 | 70 |
|  |  | Component (B) | — | PE(B-1) | PE(B-1) | PE(B-1) | PE(B-2) | PE(B-3) | PE(B-4) | PE(B-5) |
|  |  | amount | wt % | 20 | 20 | 20 | 20 | 20 | 20 | 20 |
|  |  | Component (C) | — | PP(C-1) | PP(C-1) | PP(C-1) | PP(C-1) | PP(C-1) | PP(C-1) | PP(C-1) |
|  |  | amount | wt % | 10 | 10 | 10 | 10 | 10 | 10 | 10 |
|  |  | Other components | — | — | — | — | — | — | — | — |
|  |  | amount | wt % | — | — | — | — | — | — | — |
|  |  | Tm(C) - Tm(Al) | ° C. | 31 | 31 | 31 | 31 | 31 | 31 | 31 |
|  | Innermost layer | Component (K) | — | PP(K-1) | PP(K-1) | PP(K-1) | PP(K-1) | PP(K-1) | PP(K-1) | PP(K-1) |
|  |  | amount | wt % | 70 | 70 | 70 | 70 | 70 | 70 | 70 |
|  |  | Component (H) | — | PE(H-1) | PE(H-1) | PE(H-1) | PE(H-1) | PE(H-1) | PE(H-1) | PE(H-1) |
|  |  | amount | wt % | 20 | 20 | 20 | 20 | 20 | 20 | 20 |
|  |  | Component (I) | — | PP(I-1) | PP(I-1) | PP(I-1) | PP(I-1) | PP(I-1) | PP(I-1) | PP(I-1) |
|  |  | amount | wt % | 10 | 10 | 10 | 10 | 10 | 10 | 10 |
|  |  | Other components | — | — | — | — | — | — | — | — |
|  |  | amount | wt % | — | — | — | — | — | — | — |
|  |  | Tm(C) - Tm(Al) | ° C. | 31 | 31 | 31 | 31 | 31 | 31 | 31 |
|  |  | S(0) | wt % | 2.2 | 2.2 | 2.2 | 2.2 | 2.2 | 2.2 | 2.2 |
| Film properties after 30 minutes of heat treatment at 121° C. | Appearance | | — | ○ | ○ | ○ | ○ | ○ | ○ | ○ |
|  | Total haze | | % | 20 | 19 | 19 | 15 | 13 | 15 | 13 |
|  | Tensile modulus | MD | MPa | 242 | 244 | 310 | 235 | 244 | 247 | 241 |
|  | Heat-sealing strength | 125° C. | gf/10 mm | 1856 | 1872 | 1895 | 1812 | 1854 | 1817 | 1810 |
|  |  | 130° C. |  | 2582 | 2596 | 2587 | 2872 | 2889 | 2821 | 2828 |
|  |  | 135° C. |  | 3223 | 3211 | 3213 | 3142 | 3180 | 3114 | 3133 |
|  |  | 140° C. |  | 3498 | 3518 | 3503 | 3340 | 3339 | 3315 | 3312 |
|  |  | 145° C. |  | 3694 | 3678 | 3676 | 3508 | 3561 | 3553 | 3543 |
|  |  | 150° C. |  | 4702 | 4725 | 4712 | 4591 | 4595 | 4610 | 4525 |
|  |  | 155° C. |  | 5056 | 5033 | 5046 | 5137 | 5110 | 5115 | 5116 |
|  |  | 160° C. |  | 5177 | 5193 | 5173 | 5256 | 5234 | 5310 | 5235 |
|  | Cumulative bag drop test | 50 cm | — | ○○/○○ | ○○/○○ | ○○/○○ | ○○/○○ | ○○/○○ | ○○/○○ | ○○/○○ |
|  |  | 100 cm |  | ○○/○○ | ○○/○○ | ○○/○○ | ○○/○○ | ○○/○○ | ○○/○○ | ○○/○○ |
|  |  | 150 cm |  | ○X/○X | X/X | X/X | X/○X | ○○/○X | X/○X | ○X/X |
|  |  | 200 cm |  | —/— | —/— | —/— | —/— | —/— | —/— | —/— |

TABLE 26

|  |  |  |  | EX 22 | EX 23 | EX 24 | EX 25 | EX 26 | EX 27 | EX 28 |
|---|---|---|---|---|---|---|---|---|---|---|
| Layer compositions and resin formulations | Outer layer | Component (D) | — | PP(D-1) | PP(D-1) | PP(D-1) | PP(D-1) | PP(D-1) | PP(D-2) | PP(D-3) |
|  |  | amount | wt % | 100 | 100 | 100 | 100 | 100 | 100 | 100 |
|  |  | Component (D3) | — | — | — | — | — | — | — | — |
|  |  | amount | wt % | — | — | — | — | — | — | — |
|  |  | Other components | — | — | — | — | — | — | — | — |
|  |  | amount | wt % | — | — | — | — | — | — | — |
|  | Inner layer | Component A | — | PP(A-1) | PP(A-1) | PP(A-1) | PP(A-1) | PP(A-1) | PP(A-1) | PP(A-1) |
|  |  | amount | wt % | 70 | 70 | 70 | 70 | 65 | 70 | 70 |
|  |  | Component (B) | — | PE(B-6) | PE(B-1) | PE(B-1) | PE(B-1) | PE(B-1) | PE(B-1) | PE(B-1) |
|  |  | amount | wt % | 20 | 20 | 20 | 20 | 20 | 20 | 20 |
|  |  | Component (C) | — | PP(C-1) | PP(C-2) | PP(C-3) | PP(C-4) | PP(C-5) | PP(C-1) | PP(C-1) |
|  |  | amount | wt % | 10 | 10 | 10 | 10 | 15 | 10 | 10 |
|  |  | Other components | — | — | — | — | — | — | — | — |
|  |  | amount | wt % | — | — | — | — | — | — | — |
|  |  | Tm(C) - Tm(Al) | ° C. | 31 | 31 | 31 | 31 | 32 | 31 | 31 |
|  | Innermost layer | Component (K) | — | PP(K-1) | PP(K-1) | PP(K-1) | PP(K-1) | PP(K-1) | PP(K-1) | PP(K-1) |
|  |  | amount | wt % | 70 | 70 | 70 | 70 | 70 | 70 | 70 |
|  |  | Component (H) | — | PE(H-1) | PE(H-1) | PE(H-1) | PE(H-1) | PE(H-1) | PE(H-1) | PE(H-1) |
|  |  | amount | wt % | 20 | 20 | 20 | 20 | 20 | 20 | 20 |
|  |  | Component (I) | — | PP(I-1) | PP(I-1) | PP(I-1) | PP(I-1) | PP(I-1) | PP(I-1) | PP(I-1) |
|  |  | amount | wt % | 10 | 10 | 10 | 10 | 10 | 10 | 10 |
|  |  | Other components | — | — | — | — | — | — | — | — |
|  |  | amount | wt % | — | — | — | — | — | — | — |
|  |  | Tm(C) - Tm(Al) | ° C. | 31 | 31 | 31 | 31 | 31 | 31 | 31 |
|  |  | S(0) | wt % | 2.2 | 2.2 | 2.2 | 2.2 | 2.2 | 2.2 | 2.2 |
| Film properties after 30 minutes of heat treatment at 121° C. | Appearance | | — | ○ | ○ | ○ | ○ | ○ | ○ | ○ |
|  | Total haze | | % | 13 | 13 | 13 | 13 | 12 | 13 | 14 |
|  | Tensile modulus | MD | MPa | 242 | 242 | 239 | 245 | 232 | 262 | 270 |
|  | Heat-sealing strength | 125° C. | gf/10 mm | 1886 | 1839 | 1900 | 1818 | 1867 | 1770 | 1733 |
|  |  | 130° C. |  | 2901 | 2882 | 2839 | 2847 | 2891 | 2851 | 2854 |
|  |  | 135° C. |  | 3158 | 3125 | 3144 | 3183 | 3174 | 3137 | 3130 |
|  |  | 140° C. |  | 3366 | 3310 | 3315 | 3389 | 3356 | 3400 | 3326 |
|  |  | 145° C. |  | 3504 | 3581 | 3581 | 3530 | 3582 | 3506 | 3567 |
|  |  | 150° C. |  | 4520 | 4521 | 4523 | 4511 | 4510 | 4578 | 4573 |
|  |  | 155° C. |  | 5174 | 5186 | 5153 | 5199 | 5190 | 5127 | 5129 |
|  |  | 160° C. |  | 5275 | 5270 | 5254 | 5257 | 5206 | 5227 | 5255 |

TABLE 26-continued

|  |  |  | EX 22 | EX 23 | EX 24 | EX 25 | EX 26 | EX 27 | EX 28 |
|---|---|---|---|---|---|---|---|---|---|
| Cumulative bag drop test | 50 cm | — | ○○/○○ | ○○/○○ | ○○/○○ | ○○/○○ | ○○/○○ | ○○/○○ | ○○/○○ |
|  | 100 cm |  | ○○/○○ | ○○/○○ | ○○/○○ | ○○/○○ | ○○/○○ | ○○/○○ | ○○/○○ |
|  | 150 cm |  | X/○X | ○X/X | X/○X | ○X/X | X/○○ | ○○/○○ | ○○/○○ |
|  | 200 cm |  | —/— | —/— | —/— | —/— | —/X | ○○/○○ | ○○/○○ |

TABLE 27

|  |  |  |  | EX 29 | EX 30 | EX 31 | EX 32 | EX 33 | EX 34 | EX 35 |
|---|---|---|---|---|---|---|---|---|---|---|
| Layer compositions and resin formulations | Outer layer | Component (D) | — | PP(D-4) | PP(D-4) | PP(D-4) | PP(D-1) | PP(D-1) | PP(D-1) | PP(D-1) |
|  |  | amount | wt % | 100 | 90 | 100 | 100 | 100 | 100 | 100 |
|  |  | Component (D3) | — | — | PE(D3-1) | — | — | — | — | — |
|  |  | amount | wt % | — | 10 | — | — | — | — | — |
|  |  | Other components | — | — | — | — | — | — | — | — |
|  |  | amount | wt % | — | — | — | — | — | — | — |
|  | Inner layer | Component (A) | — | PP(A-1) | PP(A-1) | PP(A-1) | PP(A-1) | PP(A-1) | PP(A-1) | PP(A-1) |
|  |  | amount | wt % | 70 | 70 | 65 | 70 | 70 | 70 | 70 |
|  |  | Component (B) | — | PE(B-1) | PE(B-1) | PE(B-1) | PE(B-1) | PE(B-1) | PE(B-1) | PE(B-1) |
|  |  | amount | wt % | 20 | 20 | 20 | 20 | 20 | 20 | 20 |
|  |  | Component (C) | — | PP(C-1) | PP(C-1) | PP(C-5) | PP(C-1) | PP(C-1) | PP(C-1) | PP(C-1) |
|  |  | amount | wt % | 10 | 10 | 15 | 10 | 10 | 10 | 10 |
|  |  | Other components | — | — | — | — | — | — | — | — |
|  |  | amount | wt % | — | — | — | — | — | — | — |
|  |  | Tm(C) - Tm(Al) | ° C. | 31 | 31 | 32 | 31 | 31 | 31 | 31 |
|  | Innermost layer | Component (K) | — | PP(K-1) | PP(K-1) | PP(K-1) | PP(K-1) | PP(K-2) | PP(K-3) | PP(K-4) |
|  |  | amount | wt % | 70 | 70 | 70 | 80 | 70 | 70 | 70 |
|  |  | Component (H) | — | PE(H-1) | PE(H-1) | PE(H-1) | PE(H-3) | PE(H-1) | PE(H-1) | PE(H-1) |
|  |  | amount | wt % | 20 | 20 | 20 | 20 | 20 | 20 | 20 |
|  |  | Component (I) | — | PP(I-1) | PP(I-1) | PP(I-1) | — | PP(I-1) | PP(I-1) | PP(I-1) |
|  |  | amount | wt % | 10 | 10 | 10 | — | 10 | 10 | 10 |
|  |  | Other components | — | — | — | — | — | — | — | — |
|  |  | amount | wt % | — | — | — | — | — | — | — |
|  |  | Tm(C) - Tm(Al) | ° C. | 31 | 31 | 31 | — | 35 | 28 | 31 |
|  |  | S(0) | wt % | 2.2 | 2.2 | 2.2 | 2.2 | 2.2 | 2.2 | 2.2 |
| Film properties after 30 minutes of heat treatment at 121° C. | Appearance | — | — | ○ | ○ | ○ | ○— | ○ | ○ | ○ |
|  | Total haze | — | % | 16 | 12 | 15 | 15 | 13 | 13 | 14 |
|  | Tensile modulus | MD | MPa | 221 | 215 | 209 | 230 | 238 | 241 | 239 |
|  | Heat-sealing strength | 125° C. | gf/10 mm | 1512 | 1399 | 1707 | 2043 | 1883 | 1823 | 1890 |
|  |  | 130° C. |  | 2638 | 2520 | 2881 | 2982 | 2869 | 2835 | 2894 |
|  |  | 135° C. |  | 3022 | 3199 | 3152 | 3072 | 3162 | 3191 | 3123 |
|  |  | 140° C. |  | 3111 | 3213 | 3404 | 3365 | 3342 | 3313 | 3332 |
|  |  | 145° C. |  | 3349 | 3237 | 3567 | 3431 | 3548 | 3555 | 3556 |
|  |  | 150° C. |  | 4353 | 4236 | 4513 | 4635 | 4548 | 4531 | 4520 |
|  |  | 155° C. |  | 4913 | 4798 | 5162 | 5045 | 5149 | 5154 | 5170 |
|  |  | 160° C. |  | 5028 | 4922 | 5306 | 5205 | 5280 | 5303 | 5213 |
|  | Cumulative bag drop test | 50 cm | — | ○○/○○ | ○○/○○ | ○○/○○ | ○○/○○ | ○○/○○ | ○○/○○ | ○○/○○ |
|  |  | 100 cm |  | ○○/○○ | ○○/○○ | ○○/○○ | ○○/○○ | ○○/○○ | ○○/○○ | ○○/○○ |
|  |  | 150 cm |  | ○○/○○ | ○○/○○ | ○○/○○ | X/X | X/X | X/○X | X/○X |
|  |  | 200 cm |  | ○○/○○ | ○○/○○ | ○○/○○ | —/— | —/— | —/— | —/— |

TABLE 28

|  |  |  |  | EX 36 | EX 37 | EX 38 | EX 39 | EX 40 | EX 41 | EX 42 |
|---|---|---|---|---|---|---|---|---|---|---|
| Layer compositions and resin formulations | Outer layer | Component (D) | — | PP(D-1) | PP(D-1) | PP(D-1) | PP(D-1) | PP(D-1) | PP(D-1) | PP(D-1) |
|  |  | amount | wt % | 100 | 100 | 100 | 100 | 100 | 100 | 100 |
|  |  | Component (D3) | — | — | — | — | — | — | — | — |
|  |  | amount | wt % | — | — | — | — | — | — | — |
|  |  | Other components | — | — | — | — | — | — | — | — |
|  |  | amount | wt % | — | — | — | — | — | — | — |
|  | Inner layer | Component (A) | — | PP(A-1) | PP(A-1) | PP(A-1) | PP(A-1) | PP(A-1) | PP(A-1) | PP(A-1) |
|  |  | amount | wt % | 70 | 70 | 70 | 70 | 70 | 70 | 70 |
|  |  | Component (B) | — | PE(B-1) | PE(B-1) | PE(B-1) | PE(B-1) | PE(B-1) | PE(B-1) | PE(B-1) |
|  |  | amount | wt % | 20 | 20 | 20 | 20 | 20 | 20 | 20 |
|  |  | Component (C) | — | PP(C-1) | PP(C-1) | PP(C-1) | PP(C-1) | PP(C-1) | PP(C-1) | PP(C-1) |
|  |  | amount | wt % | 10 | 10 | 10 | 10 | 10 | 10 | 10 |
|  |  | Other components | — | — | — | — | — | — | — | — |
|  |  | amount | wt % | — | — | — | — | — | — | — |
|  |  | Tm(C) - Tm(Al) | ° C. | 31 | 31 | 31 | 31 | 31 | 31 | 31 |

TABLE 28-continued

|  |  |  |  | EX 36 | EX 37 | EX 38 | EX 39 | EX 40 | EX 41 | EX 42 |
|---|---|---|---|---|---|---|---|---|---|---|
|  | Innermost layer | Component (K) | — | PP(K-5) | PP(K-6) | PP(K-7) | PP(K-8) | PP(K-9) | PP(K-1) | PP(K-1) |
|  |  | amount | wt % | 70 | 70 | 70 | 70 | 70 | 70 | 70 |
|  |  | Component (H) | — | PE(H-1) | PE(H-1) | PE(H-1) | PE(H-1) | PE(H-1) | PE(H-2) | PE(H-3) |
|  |  | amount | wt % | 20 | 20 | 20 | 20 | 20 | 20 | 20 |
|  |  | Component (I) | — | PP(I-1) | PP(I-1) | PP(I-1) | PP(I-1) | PP(I-1) | PP(I-1) | PP(I-1) |
|  |  | amount | wt % | 10 | 10 | 10 | 10 | 10 | 10 | 10 |
|  |  | Other components | — | — | — | — | — | — | — | — |
|  |  | amount | wt % | — | — | — | — | — | — | — |
|  |  | Tm(C) - Tm(Al) | ° C. | 31 | 31 | 31 | 31 | 31 | 31 | 31 |
|  |  | S(0) | wt % | 2.2 | 2.2 | 2.2 | 2.2 | 2.2 | 2.3 | 2.1 |
| Film properties after 30 minutes of heat treatment at 121° C. | Appearance |  | — | ○ | ○ | ○ | ○ | ○ | ○ | ○ |
|  | Total haze |  | % | 12 | 12 | 14 | 13 | 13 | 15 | 12 |
|  | Tensile modulus | MD | MPa | 240 | 242 | 235 | 240 | 240 | 233 | 243 |
|  | Heat-sealing strength | 125° C. | gf/10 mm | 1883 | 1806 | 1866 | 1845 | 1865 | 1841 | 1903 |
|  |  | 130° C. |  | 2863 | 2834 | 2884 | 2878 | 2810 | 2892 | 2864 |
|  |  | 135° C. |  | 3176 | 3169 | 3171 | 3161 | 3107 | 3186 | 3183 |
|  |  | 140° C. |  | 3313 | 3351 | 3341 | 3360 | 3405 | 3339 | 3364 |
|  |  | 145° C. |  | 3533 | 3519 | 3587 | 3577 | 3558 | 3521 | 3596 |
|  |  | 150° C. |  | 4529 | 4556 | 4546 | 4578 | 4548 | 4541 | 4514 |
|  |  | 155° C. |  | 5199 | 5138 | 5123 | 5134 | 5170 | 5142 | 5141 |
|  |  | 160° C. |  | 5281 | 5291 | 5212 | 5307 | 5255 | 5267 | 5250 |
|  | Cumulative bag drop test | 50 cm | — | ○○/○○ | ○○/○○ | ○○/○○ | ○○/○○ | ○○/○○ | ○○/○○ | ○○/○○ |
|  |  | 100 cm |  | ○○/○○ | ○○/○○ | ○○/○○ | ○○/○○ | ○○/○○ | ○○/○○ | ○○/○○ |
|  |  | 150 cm |  | ○X/X | X/○X | ○X/X | ○X/X | X/X | X/○X | X/○X |
|  |  | 200 cm |  | —/— | —/— | —/— | —/— | —/— | —/— | —/— |

TABLE 29

|  |  |  |  | EX 43 | EX 44 | EX 45 | EX 46 | EX 47 | EX 48 | EX 49 |
|---|---|---|---|---|---|---|---|---|---|---|
| Layer compositions and resin formulations | Outer layer | Component D | — | PP(D-1) | PP(D-1) | PP(D-1) | PP(D-2) | PP(D-1) | PP(D-1) | PP(D-1) |
|  |  | amount | wt % | 100 | 100 | 100 | 80 | 100 | 100 | 100 |
|  |  | Component D3 | — | — | — | — | — | — | — | — |
|  |  | amount | wt % | — | — | — | — | — | — | — |
|  |  | Other components | — | — | — | — | 7125 | — | — | — |
|  |  | amount | wt % | — | — | — | 20 | — | — | — |
|  | Inner layer | Component A | — | PP(A-1) | PP(A-1) | PP(A-1) | PP(A-1) | PP(A-1) | PP(A-1) | PP(A-1) |
|  |  | amount | wt % | 70 | 70 | 70 | 70 | 60 | 50 | 70 |
|  |  | Component B | — | PE(B-1) | PE(B-1) | PE(B-1) | PE(B-1) | PE(B-1) | PE(B-1) | PE(B-1) |
|  |  | amount | wt % | 20 | 20 | 20 | 20 | 20 | 20 | 20 |
|  |  | Component C | — | PP(C-1) | PP(C-1) | PP(C-1) | PP(C-1) | PP(C-1) | PP(C-1) | PP(C-1) |
|  |  | amount | wt % | 10 | 10 | 10 | 10 | 10 | 10 | 10 |
|  |  | Other components | — | — | — | — | — | 7125 | 7125 | — |
|  |  | amount | wt % | — | — | — | — | 10 | 20 | — |
|  |  | Tm(C) - Tm(Al) | ° C. | 31 | 31 | 31 | 31 | 31 | 31 | 31 |
|  | Innermost layer | Component K | — | PP(K-1) | PP(K-1) | PP(K-1) | PP(K-1) | PP(K-1) | PP(K-1) | PP(K-1) |
|  |  | amount | wt % | 70 | 70 | 65 | 70 | 70 | 70 | 60 |
|  |  | Component H | — | PE(H-4) | PE(H-1) | PE(H-1) | PE(H-1) | PE(H-1) | PE(H-1) | PE(H-1) |
|  |  | amount | wt % | 20 | 20 | 20 | 20 | 20 | 20 | 20 |
|  |  | Component I | — | PP(I-1) | PP(I-2) | PP(I-3) | PP(I-1) | PP(I-1) | PP(I-1) | PP(I-1) |
|  |  | amount | wt % | 10 | 10 | 15 | 10 | 10 | 10 | 10 |
|  |  | Other components | — | — | — | — | — | — | — | 7125 |
|  |  | amount | wt % | — | — | — | — | — | — | 10 |
|  |  | Tm(C) - Tm(Al) | ° C. | 31 | 31 | 32 | 26 | 26 | 26 | 26 |
|  |  | S(0) | wt % | 2.1 | 2.2 | 7 | 2.2 | 2.2 | 2.2 | 11 |
| Film properties after 30 minutes of heat treatment at 121° C. | Appearance |  | — | ○ | ○ | ○ | ○ | ○ | ○ | ○ |
|  | Total haze |  | % | 15 | 13 | 12 | 12 | 12 | 11 | 12 |
|  | Tensile modulus | MD | MPa | 248 | 244 | 231 | 254 | 231 | 196 | 228 |
|  | Heat-sealing strength | 125° C. | gf/10 mm | 1822 | 1883 | 1841 | 1848 | 1593 | 1403 | 1912 |
|  |  | 130° C. |  | 2822 | 2827 | 2887 | 2811 | 2578 | 2499 | 2992 |
|  |  | 135° C. |  | 3183 | 3112 | 3201 | 3169 | 3307 | 3113 | 3194 |
|  |  | 140° C. |  | 3321 | 3366 | 3369 | 3380 | 3346 | 3383 | 3328 |
|  |  | 145° C. |  | 3565 | 3575 | 3596 | 3586 | 3608 | 3601 | 3534 |
|  |  | 150° C. |  | 4598 | 4589 | 4569 | 4547 | 4567 | 4577 | 4577 |
|  |  | 155° C. |  | 5185 | 5150 | 5141 | 5153 | 5168 | 5207 | 5168 |
|  |  | 160° C. |  | 5257 | 5228 | 5248 | 5282 | 5254 | 5216 | 5251 |
|  | Cumulative bag drop test | 50 cm | — | ○○/○○ | ○○/○○ | ○○/○○ | ○○/○○ | ○○/○○ | ○○/○○ | ○○/○○ |
|  |  | 100 cm |  | ○○/○○ | ○○/○○ | ○○/○○ | ○○/○○ | ○○/○○ | ○○/○○ | ○○/○○ |
|  |  | 150 cm |  | ○X/X | X/○X | ○X/X | ○○/○○ | ○X/○○ | ○○/○○ | ○X/○○ |
|  |  | 200 cm |  | —/— | —/— | —/— | ○○/○○ | —/X | ○X/○X | —/X |

TABLE 30

|  |  |  |  | EX 50 | EX 51 | EX 52 | EX 53 | EX 54 | EX 55 | EX 56 | EX 57 |
|---|---|---|---|---|---|---|---|---|---|---|---|
| Layer compositions and resin formulations | Outer layer | Component (D) | — | PP(D-3) | PP(D-3) | PP(D-1) | PP(D-1) | PP(D-1) | PP(D-1) | PP(D-1) | PP(D-1) |
|  |  | amount | wt % | 40 | 100 | 100 | 100 | 100 | 100 | 100 | 100 |
|  |  | Component (D3) | — | PP(D3-1) | — | — | — | — | — | — | — |
|  |  | amount | wt % | 20 | — | — | — | — | — | — | — |
|  |  | Other components | — | PP(A-1) | — | — | — | — | — | — | — |
|  |  | amount | wt % | 40 | — | — | — | — | — | — | — |
|  | Inner layer | Component (A) | — | PP(A-1) | PP(A-1) | PP(A-1) | PP(A-1) | PP(A-1) | PP(A-1) | PP(A-1) | PP(A-1) |
|  |  | amount | wt % | 70 | 75 | 70 | 70 | 70 | 70 | 70 | 70 |
|  |  | Component (B) | — | PE(B-1) | PE(B-3) | PE(B-1) | PE(B-1) | PE(B-1) | PE(B-1) | PE(B-1) | PE(B-1) |
|  |  | amount | wt % | 20 | 20 | 20 | 20 | 20 | 20 | 20 | 20 |
|  |  | Component (C) | — | PP(C-1) | PP(C-2) | PP(C-1) | PP(C-1) | PP(C-1) | PP(C-1) | PP(C-1) | PP(C-1) |
|  |  | amount | wt % | 10 | 5 | 10 | 10 | 10 | 10 | 10 | 10 |
|  |  | Other components | — | — | — | — | — | — | — | — | — |
|  |  | amount | wt % | — | — | — | — | — | — | — | — |
|  |  | Tm(C) - Tm(Al) | ° C. | 31 | 31 | 31 | 31 | 31 | 31 | 31 | 31 |
|  | Innermost layer | Component (K) | — | PP(K-1) | — | PP(K-10) | PP(K-11) | PP(K-12) | PP(K-13) | PP(K-14) | PP(K-15) |
|  |  | amount | wt % | 70 | — | 70 | 70 | 70 | 70 | 70 | 70 |
|  |  | Component (H) | — | PE(H-1) | — | PE(H-1) | PE(H-1) | PE(H-1) | PE(H-1) | PE(H-1) | PE(H-1) |
|  |  | amount | wt % | 20 | — | 20 | 20 | 20 | 20 | 20 | 20 |
|  |  | Component (I) | — | PP(I-1) | — | PP(I-1) | PP(I-1) | PP(I-1) | PP(I-1) | PP(I-1) | PP(I-1) |
|  |  | amount | wt % | 10 | — | 10 | 10 | 10 | 10 | 10 | 10 |
|  |  | Other components | — | — | | | | | | | |
|  |  | amount | wt % | — | | | | | | | |
|  |  | Tm(C) - Tm(Al) | ° C. | 31 | 31 | 41 | 21 | 31 | 31 | 31 | 31 |
|  |  | S(0) | wt % | 2.2 | 2.2 | 2.4 | 2.1 | 2.2 | 2.2 | 2.2 | 2.3 |
| Film properties after 30 minutes of heat treatment at 121° C. | Appearance | | — | ○ | ○ | ○ | ○ | ○ | ○ | ○ | ○ |
|  | Total haze | | % | 12 | 13 | 13 | 14 | 13 | 13 | 12 | 19 |
|  | Tensile modulus | MD | MPa | 221 | 268 | 237 | 241 | 234 | 248 | 244 | 230 |
|  | Heat-sealing strength | 125° C. | gf/10 mm | 1356 | 1754 | 2028 | 1686 | 1873 | 1843 | 1867 | 1875 |
|  |  | 130° C. |  | 2546 | 2846 | 2988 | 2566 | 2817 | 2822 | 2840 | 2844 |
|  |  | 135° C. |  | 3182 | 3166 | 3185 | 3114 | 3142 | 3125 | 3137 | 3122 |
|  |  | 140° C. |  | 3216 | 3347 | 3501 | 3462 | 3393 | 3345 | 3339 | 3362 |
|  |  | 145° C. |  | 3278 | 3567 | 3682 | 3633 | 3511 | 3539 | 3515 | 3565 |
|  |  | 150° C. |  | 4289 | 4599 | 4436 | 4366 | 4560 | 4587 | 4554 | 4533 |
|  |  | 155° C. |  | 4756 | 5201 | 4834 | 4722 | 5108 | 5199 | 5128 | 5138 |
|  |  | 160° C. |  | 4980 | 5209 | 5020 | 4917 | 5266 | 5300 | 5215 | 5256 |
|  | Cumulative bag drop test | 50 cm | — | ○○/○○ | ○○/○○ | ○○/○○ | ○○/○○ | ○○/○○ | ○○/○○ | ○○/○○ | ○○/○○ |
|  |  | 100 cm |  | ○○/○○ | ○○/○○ | ○○/○○ | ○○/○○ | ○○/○○ | ○○/○○ | ○○/○○ | ○○/○○ |
|  |  | 150 cm |  | ○○/○○ | ○○/○○ | X/X | X/X | X/X | X/X | X/X | X/X |
|  |  | 200 cm |  | ○○/○○ | ○○/○○ | —/— | —/— | —/— | —/— | —/— | —/— |

TABLE 31

|  |  |  |  | Comp. Ex. 1 | Comp. Ex. 2 | Comp. Ex. 3 | Comp. Ex. 4 | Comp. Ex. 5 |
|---|---|---|---|---|---|---|---|---|
| Layer compositions and resin formulations | Outer layer | Component (D) | — | PP(D-1) | PP(D-1) | PP(D-1) | PP(D-1) | PP(D-1) |
|  |  | amount | wt % | 100 | 100 | 100 | 100 | 100 |
|  |  | Component (D3) | — | — | — | — | — | — |
|  |  | amount | wt % | — | — | — | — | — |
|  |  | Other components | — | — | — | — | — | — |
|  |  | amount | wt % | — | — | — | — | — |
|  | Inner layer | Component (A) | — | PP(A-1) | PP(A-1) | PP(A-1) | PP(A-1) | PP(A-10) |
|  |  | amount | wt % | 100 | 50 | 70 | 50 | 70 |
|  |  | Component (B) | — | — | PE(B-1) | — | PE(B-1) | PE(B-1) |
|  |  | amount | wt % | — | 50 | — | 40 | 20 |
|  |  | Component (C) | — | — | — | PP(C-1) | PP(C-1) | PP(C-1) |
|  |  | amount | wt % | — | — | 30 | 10 | 10 |
|  |  | Other components | — | — | — | — | — | — |
|  |  | amount | wt % | — | — | — | — | — |
|  |  | Tm(C) - Tm(Al) | ° C. | — | — | 31 | 31 | 41 |
|  | Innermost layer | Component (K) | — | PP(K-1) | PP(K-1) | PP(K-1) | PP(K-1) | PP(K-1) |
|  |  | amount | wt % | 70 | 70 | 70 | 70 | 70 |
|  |  | Component (H) | — | PE(H-1) | PE(H-1) | PE(H-1) | PE(H-1) | PE(H-1) |
|  |  | amount | wt % | 20 | 20 | 20 | 20 | 20 |
|  |  | Component (I) | — | PP(I-1) | PP(I-1) | PP(I-1) | PP(I-1) | PP(I-1) |
|  |  | amount | wt % | 10 | 10 | 10 | 10 | 10 |
|  |  | Other components | — | — | — | — | — | — |
|  |  | amount | wt % | — | — | — | — | — |
|  |  | Tm(C) - Tm(Al) | ° C. | 31 | 31 | 31 | 31 | 31 |
|  |  | S(0) | wt % | 2.2 | 2.2 | 2.2 | 2.2 | 2.2 |
| Film properties | Appearance | | — | ○ | Pockmarked pattern | ○ | Δ | ○ |
|  | Total haze | | % | 10 | | 28 | 27 | 15 |

TABLE 31-continued

|  |  |  |  |  |  |  |  |
|---|---|---|---|---|---|---|---|
| after 30 minutes of heat treatment at 121° C. | Tensile modulus | MD | MPa | 235 | arose due to inadequate heat resistance; good samples could not be obtained | 332 | 219 | 240 |
|  | Heat-sealing strength | 125° C. | gf/10 mm | 1586 |  | 1979 | 1258 | 1903 |
|  |  | 130° C. |  | 2195 |  | 2413 | 2009 | 2557 |
|  |  | 135° C. |  | 2849 |  | 2797 | 2619 | 3214 |
|  |  | 140° C. |  | 3288 |  | 3231 | 3294 | 3523 |
|  |  | 145° C. |  | 3490 |  | 3391 | 4071 | 3680 |
|  |  | 150° C. |  | 4500 |  | 3893 | 4269 | 4706 |
|  |  | 155° C. |  | 4489 |  | 4479 | 4435 | 5068 |
|  |  | 160° C. |  | 4695 |  | 4627 | 4630 | 5188 |
|  | Cumulative bag drop test | 50 cm | — | X/X |  | X/X | ○○/○○ | ○○/○○ |
|  |  | 100 cm |  | —/— |  | —/— | ○X/○○ | ○○/○X |
|  |  | 150 cm |  | —/— |  | —/— | —/○X | ○X/— |
|  |  | 200 cm |  | —/— |  | —/— | —/— | —/— |

|  |  |  |  | Comp. Ex. 6 | Comp. Ex. 7 | Comp. Ex. 8 | Comp. Ex. 9 |
|---|---|---|---|---|---|---|---|
| Layer compositions and resin formulations | Outer layer | Component (D) | — | PP(D-1) | PP(D-1) | PP(D-1) | PP(D-5) |
|  |  | amount | wt % | 100 | 100 | 100 | 100 |
|  |  | Component (D3) | — | — | — | — | — |
|  |  | amount | wt % | — | — | — | — |
|  |  | Other components | — | — | — | — | — |
|  |  | amount | wt % | — | — | — | — |
|  | Inner layer | Component (A) | — | PP(A-14) | PP(A-1) | PP(A-1) | PP(A-1) |
|  |  | amount | wt % | 70 | 70 | 70 | 70 |
|  |  | Component (B) | — | PE(B-1) | PE(B-7) | PE(B-8) | PE(B-1) |
|  |  | amount | wt % | 20 | 20 | 20 | 20 |
|  |  | Component (C) | — | PP(C-1) | PP(C-1) | PP(C-1) | PP(C-1) |
|  |  | amount | wt % | 10 | 10 | 10 | 10 |
|  |  | Other components | — | — | — | — | — |
|  |  | amount | wt % | — | — | — | — |
|  |  | Tm(C) - Tm(A1) | ° C. | 31 | 31 | 31 | 31 |
|  | Innermost layer | Component (K) | — | PP(K-1) | PP(K-1) | PP(K-1) | PP(K-1) |
|  |  | amount | wt % | 70 | 70 | 70 | 70 |
|  |  | Component (H) | — | PE(H-1) | PE(H-1) | PE(H-1) | PE(H-1) |
|  |  | amount | wt % | 20 | 20 | 20 | 20 |
|  |  | Component (I) | — | PP(I-1) | PP(I-1) | PP(I-1) | PP(I-1) |
|  |  | amount | wt % | 10 | 10 | 10 | 10 |
|  |  | Other components | — | — | — | — | — |
|  |  | amount | wt % | — | — | — | — |
|  |  | Tm(C) - Tm(A1) | ° C. | 31 | 31 | 31 | 31 |
|  |  | S(0) | wt % | 2.2 | 2.2 | 2.2 | 2.2 |
| Film properties after 30 minutes of heat treatment at 121° C. | Appearance |  | — | ○ | ○ | ○ | Pockmarked pattern arose due to inadequate heat resistance; good samples could not be obtained |
|  | Total haze |  | % | 13 | 35 | 26 |  |
|  | Tensile modulus | MD | MPa | 293 | 262 | 287 |  |
|  | Heat-sealing strength | 125° C. | gf/10 mm | 1867 | 1822 | 1570 |  |
|  |  | 130° C. |  | 2593 | 2811 | 2097 |  |
|  |  | 135° C. |  | 3231 | 3149 | 2870 |  |
|  |  | 140° C. |  | 3517 | 3347 | 3361 |  |
|  |  | 145° C. |  | 3677 | 3527 | 3512 |  |
|  |  | 150° C. |  | 4737 | 4511 | 4578 |  |
|  |  | 155° C. |  | 5056 | 5187 | 5167 |  |
|  |  | 160° C. |  | 5197 | 5265 | 5230 |  |
|  | Cumulative bag drop test | 50 cm | — | ○○/○○ | X/○X | ○○/○○ |  |
|  |  | 100 cm |  | ○X/○X | —/— | ○○/○○ |  |
|  |  | 150 cm |  | ○X/— | —/— | ○X/X |  |
|  |  | 200 cm |  | —/— | —/— | —/— |  |

TABLE 32

|  |  |  |  | Ref. Ex. 1 | Ref. Ex. 2 | Ref. Ex. 3 | Ref. Ex. 4 | Ref. Ex. 5 | Ref. Ex. 6 | Ref. Ex. 7 |
|---|---|---|---|---|---|---|---|---|---|---|
| Layer compositions and resin formulations | Outer layer | Component (D) | — | PP(D-1) | PP(D-1) | PP(D-1) | PP(D-1) | PP(D-4) | PP(D-1) | PP(D-1) |
|  |  | amount | wt % | 100 | 100 | 100 | 100 | 90 | 100 | 100 |
|  |  | Component (D3) | — | — | — | — | — | PE(D3-2) | — | — |
|  |  | amount | wt % | — | — | — | — | 10 | — | — |
|  |  | Other components | — | — | — | — | — | — | — | — |
|  |  | amount | wt % | — | — | — | — | — | — | — |
|  | Inner layer | Component (A) | — | PP(A-1) | PP(A-1) | PP(A-1) | PP(A-1) | PP(A-1) | PP(A-1) | PP(A-1) |
|  |  | amount | wt % | 60 | 70 | 70 | 70 | 70 | 70 | 70 |
|  |  | Component (B) | — | PE(B-1) | PE(B-1) | PE(B-1) | PE(B-1) | PE(B-1) | PE(B-1) | PE(B-1) |
|  |  | amount | wt % | 10 | 20 | 20 | 20 | 20 | 20 | 20 |
|  |  | Component (C) | — | PP(C-1) | PP(C-6) | PP(C-7) | PP(C-8) | PP(C-1) | PP(C-1) | PP(C-1) |

TABLE 32-continued

|  |  |  |  | Ref. Ex. 1 | Ref. Ex. 2 | Ref. Ex. 3 | Ref. Ex. 4 | Ref. Ex. 5 | Ref. Ex. 6 | Ref. Ex. 7 |
|---|---|---|---|---|---|---|---|---|---|---|
|  |  | amount | wt % | 30 | 10 | 10 | 10 | 10 | 10 | 10 |
|  |  | Other components | — | — | — | — | — | — | — | — |
|  |  | amount | wt % | — | — | — | — | — | — | — |
|  |  | Tm(C) - Tm(Al) | ° C. | 31 | 5 | −5 | 31 | 31 | 31 | 31 |
|  | Innermost layer | Component (K) | — | PP(K-1) | PP(K-1) | PP(K-1) | PP(K-1) | PP(K-1) | PP(K-1) | PP(K-1) |
|  |  | amount | wt % | 70 | 70 | 70 | 70 | 70 | 100 | 50 |
|  |  | Component (H) | — | PE(H-1) | PE(H-1) | PE(H-1) | PE(H-1) | PE(H-1) | — | PE(H-1) |
|  |  | amount | wt % | 20 | 20 | 20 | 20 | 20 | — | 50 |
|  |  | Component (I) | — | PP(I-1) | PP(I-1) | PP(I-1) | PP(I-1) | PP(I-1) | — | — |
|  |  | amount | wt % | 10 | 10 | 10 | 10 | 10 | — | — |
|  |  | Other components | — | — | — | — | — | — | — | — |
|  |  | amount | wt % | — | — | — | — | — | — | — |
|  |  | Tm(C) - Tm(Al) | ° C. | 31 | 31 | 31 | 31 | 31 | — | — |
|  |  | S(0) | wt % | 2.2 | 2.2 | 2.2 | 2.2 | 2.2 | 2.6 | 2.4 |
| Film properties after 30 minutes of heat treatment at 121° C. | Appearance |  | — | ○ | ○ | ○ | ○ | ○ | Δ | Internal fusion due to inadequate heat resistance occurred during sterilization; could not be evaluated |
|  | Total haze |  | % | 28 | 14 | 14 | 21 | 28 | 29 |  |
|  | Tensile modulus | MD | MPa | 326 | 225 | 220 | 306 | 234 | 230 |  |
|  | Heat-sealing strength | 125° C. | gf/10 mm | 1259 | 1683 | 1664 | 1346 | 1594 | 2001 |  |
|  |  | 130° C. |  | 1991 | 2625 | 2643 | 1877 | 2727 | 3072 |  |
|  |  | 135° C. |  | 2594 | 2923 | 2978 | 2592 | 3397 | 3375 |  |
|  |  | 140° C. |  | 3301 | 3140 | 3139 | 3501 | 3416 | 3337 |  |
|  |  | 145° C. |  | 4031 | 3363 | 3330 | 3572 | 3434 | 3563 |  |
|  |  | 150° C. |  | 4283 | 4323 | 4313 | 4084 | 4438 | 4508 |  |
|  |  | 155° C. |  | 4412 | 4956 | 4983 | 4688 | 4999 | 5009 |  |
|  |  | 160° C. |  | 4627 | 5100 | 5105 | 4993 | 5113 | 5287 |  |
|  | Cumulative bag drop test | 50 cm | — | X/X | ○○/X | ○X/○X | ○○/○○ | ○○/○○ | X/X |  |
|  |  | 100 cm |  | —/— | ○X/— | —/— | ○X/○○ | ○○/○○ | —/— |  |
|  |  | 150 cm |  | —/— | —/— | —/— | —/X | ○○/○○ | —/— |  |
|  |  | 200 cm |  | —/— | —/— | —/— | —/— | ○○/○○ | —/— |  |

TABLE 33

|  |  |  |  | Ref. Ex. 8 | Ref. Ex. 9 | Ref. Ex. 10 | Ref. Ex. 11 | Ref. Ex. 12 | Ref. Ex. 13 |
|---|---|---|---|---|---|---|---|---|---|
| Layer compositions and resin formulations | Outer layer | Component (D) | — | PP(D-1) | PP(D-1) | PP(D-1) | PP(D-1) | PP(D-1) | PP(D-1) |
|  |  | amount | wt % | 100 | 100 | 100 | 100 | 100 | 100 |
|  |  | Component (D3) | — | — | — | — | — | — | — |
|  |  | amount | wt % | — | — | — | — | — | — |
|  |  | Other components | — | — | — | — | — | — | — |
|  |  | amount | wt % | — | — | — | — | — | — |
|  | Inner layer | Component (A) | — | PP(A-1) | PP(A-1) | PP(A-1) | PP(A-1) | PP(A-1) | PP(A-1) |
|  |  | amount | wt % | 70 | 70 | 70 | 70 | 70 | 70 |
|  |  | Component (B) | — | PE(B-1) | PE(B-1) | PE(B-1) | PE(B-1) | PE(B-1) | PE(B-1) |
|  |  | amount | wt % | 20 | 20 | 20 | 20 | 20 | 20 |
|  |  | Component (C) | — | PP(C-1) | PP(C-1) | PP(C-1) | PP(C-1) | PP(C-1) | PP(C-1) |
|  |  | amount | wt % | 10 | 10 | 10 | 10 | 10 | 10 |
|  |  | Other components | — | — | — | — | — | — | — |
|  |  | amount | wt % | — | — | — | — | — | — |
|  |  | Tm(C) - Tm(Al) | ° C. | 31 | 31 | 31 | 31 | 31 | 31 |
|  | Innermost layer | Component (K) | — | PP(K-1) | PP(K-1) | PP(K-1) | PP(K-1) | PP(K-1) | PP(K-1) |
|  |  | amount | wt % | 70 | 40 | 60 | 70 | 70 | 70 |
|  |  | Component (H) | — | — | PE(H-1) | PE(H-1) | PE(H-5) | PE(H-1) | PE(H-1) |
|  |  | amount | wt % | — | 50 | 10 | 20 | 20 | 20 |
|  |  | Component (I) | — | PP(I-1) | PP(I-1) | PP(I-1) | PP(I-1) | PP(I-4) | PP(I-5) |
|  |  | amount | wt % | 30 | 10 | 30 | 10 | 10 | 10 |
|  |  | Other components | — | — | — | — | — | — | — |
|  |  | amount | wt % | — | — | — | — | — | — |
|  |  | Tm(C) - Tm(Al) | ° C. | 31 | 31 | 31 | 31 | 5 | −5 |
|  |  | S(0) | wt % | 1.9 | 2.1 | 1.8 | 2.1 | 2.2 | 2.2 |
| Film properties after 30 minutes of heat treatment at 121° C. | Appearance |  | — | ○ | Internal fusion due to inadequate heat resistance occurred during sterilization; could not be | ○ | ○ | Internal fusion due to inadequate heat resistance occurred during sterilization; could not be | Internal fusion due to inadequate heat resistance occurred during sterilization; could not be |
|  | Total haze |  | % | 22 |  | 21 | 28 |  |  |
|  | Tensile modulus | MD | MPa | 318 |  | 312 | 251 |  |  |
|  | Heat-sealing strength | 125° C. | gf/10 mm | 197 |  | 388 | 1588 |  |  |
|  |  | 130° C. |  | 592 |  | 734 | 2749 |  |  |
|  |  | 135° C. |  | 1046 |  | 1303 | 3026 |  |  |
|  |  | 140° C. |  | 1677 |  | 1763 | 3282 |  |  |
|  |  | 145° C. |  | 1759 |  | 1842 | 3435 |  |  |
|  |  | 150° C. |  | 2021 |  | 1940 | 4476 |  |  |
|  |  | 155° C. |  | 2111 |  | 2020 | 4922 |  |  |
|  |  | 160° C. |  | 2548 |  | 2569 | 4827 |  |  |

TABLE 33-continued

|  |  |  | Ref. Ex. 8 | Ref. Ex. 9 | Ref. Ex. 10 | Ref. Ex. 11 | Ref. Ex. 12 | Ref. Ex. 13 |
|---|---|---|---|---|---|---|---|---|
| Cumulative bag drop test | 50 cm | — | X/X | evaluated | X/X | ○○/X | evaluated | evaluated |
|  | 100 cm |  | —/— |  | —/— | ○X/— |  |  |
|  | 150 cm |  | —/— |  | —/— | —/— |  |  |
|  | 200 cm |  | —/— |  | —/— | —/— |  |  |

TABLE 34

|  |  |  |  |  | EX 58 | EX 59 | EX 60 | EX 61 | EX 62 | EX 63 | EX 64 |
|---|---|---|---|---|---|---|---|---|---|---|---|
| Layer compositions and resin formulations | Outer layer | Component (D) | — |  | PP(D-1) | PP(D-1) | PP(D-1) | PP(D-1) | PP(D-1) | PP(D-1) | PP(D-1) |
|  |  | amount | wt % |  | 100 | 100 | 100 | 100 | 100 | 100 | 100 |
|  |  | Component (D3) | — |  | — | — | — | — | — | — | — |
|  |  | amount | wt % |  | — | — | — | — | — | — | — |
|  |  | Other components | — |  | — | — | — | — | — | — | — |
|  |  | amount | wt % |  | — | — | — | — | — | — | — |
|  | Inner layer | Component (A) | — |  | PP(A-1) | PP(A-1) | PP(A-2) | PP(A-3) | PP(A-4) | PP(A-5) | PP(A-6) |
|  |  | amount | wt % |  | 80 | 70 | 70 | 70 | 70 | 70 | 70 |
|  |  | Component (B) | — |  | PE(B-3) | PE(B-1) | PE(B-1) | PE(B-1) | PE(B-1) | PE(B-1) | PE(B-1) |
|  |  | amount | wt % |  | 20 | 20 | 20 | 20 | 20 | 20 | 20 |
|  |  | Component (C) | — |  | — | PP(C-1) | PP(C-1) | PP(C-1) | PP(C-1) | PP(C-1) | PP(C-1) |
|  |  | amount | wt % |  | — | 10 | 10 | 10 | 10 | 10 | 10 |
|  |  | Other components | — |  | — | — | — | — | — | — | — |
|  |  | amount | wt % |  | — | — | — | — | — | — | — |
|  |  | Tm(C) - Tm(Al) | ° C. |  | — | 31 | 35 | 28 | 31 | 31 | 31 |
|  | Innermost layer | Component (E) | — |  | PP(E-1) | PP(E-1) | PP(E-1) | PP(E-1) | PP(E-1) | PP(E-1) | PP(E-1) |
|  |  | amount | wt % |  | 90 | 90 | 90 | 90 | 90 | 90 | 90 |
|  |  | Component (F) | — |  | PE(F-1) | PE(F-1) | PE(F-1) | PE(F-1) | PE(F-1) | PE(F-1) | PE(F-1) |
|  |  | amount | wt % |  | 10 | 10 | 10 | 10 | 10 | 10 | 10 |
|  |  | Component (I) | — |  | — | — | — | — | — | — | — |
|  |  | amount | wt % |  | — | — | — | — | — | — | — |
|  |  | Other components | — |  | — | — | — | — | — | — | — |
|  |  | amount | wt % |  | — | — | — | — | — | — | — |
|  |  | Tm(C) - Tm(Al) | ° C. |  | — | — | — | — | — | — | — |
|  |  | S(0) | wt % |  | 0.2 | 0.2 | 0.2 | 0.2 | 0.2 | 0.2 | 0.2 |
| Film properties after 30 minutes of heat treatment at 121° C. | Appearance | — | — |  | ○ | ○ | ○ | ○ | ○ | ○ | ○ |
|  | Total haze |  | % |  | 18 | 12 | 12 | 13 | 12 | 12 | 13 |
|  | Tensile modulus | MD | MPa |  | 251 | 280 | 277 | 286 | 275 | 284 | 291 |
|  | Heat-sealing strength | 125° C. | gf/10 mm |  | 765 | 1569 | 1549 | 1544 | 1578 | 1536 | 1547 |
|  |  | 130° C. |  |  | 2219 | 2672 | 2594 | 2548 | 2489 | 2612 | 2487 |
|  |  | 135° C. |  |  | 3101 | 3753 | 3687 | 3644 | 3612 | 3679 | 3674 |
|  |  | 140° C. |  |  | 3390 | 3637 | 3555 | 3647 | 3574 | 3677 | 3680 |
|  |  | 145° C. |  |  | 4121 | 4122 | 4236 | 4342 | 4287 | 4247 | 4105 |
|  |  | 150° C. |  |  | 4587 | 4656 | 4657 | 4689 | 4713 | 4699 | 4671 |
|  |  | 155° C. |  |  | 5290 | 5274 | 5347 | 5247 | 5246 | 5298 | 5278 |
|  |  | 160° C. |  |  | 5311 | 5320 | 5359 | 5347 | 5346 | 5311 | 5329 |
|  | Cumulative bag drop test | 50 cm | — |  | ○○/○○ | ○○/○○ | ○○/○○ | ○○/○○ | ○○/○○ | ○○/○○ | ○○/○○ |
|  |  | 100 cm |  |  | ○○/○○ | ○○/○○ | ○○/○○ | ○○/○○ | ○○/○○ | ○○/○○ | ○○/○○ |
|  |  | 150 cm |  |  | XX/XX | ○X/○X | ○X/X | X/X | X/○X | X/X | X/X |
|  |  | 200 cm |  |  | —/— | —/— | —/— | —/— | —/— | —/— | —/— |

TABLE 35

|  |  |  |  | EX 65 | EX 66 | EX 67 | EX 68 | EX 69 | EX 70 | EX 71 |
|---|---|---|---|---|---|---|---|---|---|---|
| Layer compositions and resin formulations | Outer layer | Component (D) | — | PP(D-1) | PP(D-1) | PP(D-1) | PP(D-1) | PP(D-1) | PP(D-1) | PP(D-1) |
|  |  | amount | wt % | 100 | 100 | 100 | 100 | 100 | 100 | 100 |
|  |  | Component (D3) | — | — | — | — | — | — | — | — |
|  |  | amount | wt % | — | — | — | — | — | — | — |
|  |  | Other components | — | — | — | — | — | — | — | — |
|  |  | amount | wt % | — | — | — | — | — | — | — |
|  | Inner layer | Component (A) | — | PP(A-7) | PP(A-8) | PP(A-9) | PP(A-11) | PP(A-12) | PP(A-13) | PP(A-15) |
|  |  | amount | wt % | 70 | 70 | 70 | 70 | 70 | 70 | 70 |
|  |  | Component (B) | — | PE(B-1) | PE(B-1) | PE(B-1) | PE(B-1) | PE(B-1) | PE(B-1) | PE(B-1) |
|  |  | amount | wt % | 20 | 20 | 20 | 20 | 20 | 20 | 20 |
|  |  | Component (C) | — | PP(C-1) | PP(C-1) | PP(C-1) | PP(C-1) | PP(C-1) | PP(C-1) | PP(C-1) |
|  |  | amount | wt % | 10 | 10 | 10 | 10 | 10 | 10 | 10 |
|  |  | Other components | — | — | — | — | — | — | — | — |
|  |  | amount | wt % | — | — | — | — | — | — | — |
|  |  | Tm(C) - Tm(Al) | ° C. | 31 | 31 | 31 | 21 | 31 | 31 | 31 |

TABLE 35-continued

|  |  |  |  | EX 65 | EX 66 | EX 67 | EX 68 | EX 69 | EX 70 | EX 71 |
|---|---|---|---|---|---|---|---|---|---|---|
|  | Innermost layer | Component (E) | — | PP(E-1) | PP(E-1) | PP(E-1) | PP(E-1) | PP(E-1) | PP(E-1) | PP(E-1) |
|  |  | amount | wt % | 90 | 90 | 90 | 90 | 90 | 90 | 90 |
|  |  | Component (F) | — | PE(F-1) | PE(F-1) | PE(F-1) | PE(F-1) | PE(F-1) | PE(F-1) | PE(F-1) |
|  |  | amount | wt % | 10 | 10 | 10 | 10 | 10 | 10 | 10 |
|  |  | Component (I) | — | — | — | — | — | — | — | — |
|  |  | amount | wt % | — | — | — | — | — | — | — |
|  |  | Other components | — | — | — | — | — | — | — | — |
|  |  | amount | wt % | — | — | — | — | — | — | — |
|  |  | Tm(C) - Tm(Al) | ° C. |  |  |  |  |  |  |  |
|  |  | S(0) | wt % | 0.2 | 0.2 | 0.2 | 0.2 | 0.2 | 0.2 | 0.2 |
| Film properties after 30 minutes of heat treatment at 121° C. | Appearance |  | — | ○ | ○ | ○ | ○ | ○ | ○ | ○ |
|  | Total haze |  | % | 12 | 12 | 12 | 14 | 13 | 14 | 19 |
|  | Tensile modulus | MD | MPa | 273 | 280 | 280 | 321 | 273 | 325 | 282 |
|  | Heat-sealing strength | 125° C. | gf/10 mm | 1579 | 1574 | 1577 | 1552 | 1554 | 1581 | 1552 |
|  |  | 130° C. |  | 2546 | 2469 | 2555 | 2595 | 2551 | 2499 | 2496 |
|  |  | 135° C. |  | 3643 | 3641 | 3655 | 3695 | 3651 | 3621 | 3683 |
|  |  | 140° C. |  | 3678 | 3679 | 3667 | 3557 | 3649 | 3580 | 3689 |
|  |  | 145° C. |  | 4279 | 4394 | 4317 | 4238 | 4349 | 4294 | 4115 |
|  |  | 150° C. |  | 4703 | 4781 | 4689 | 4662 | 4691 | 4714 | 4681 |
|  |  | 155° C. |  | 5200 | 5234 | 5349 | 5357 | 5257 | 5249 | 5283 |
|  |  | 160° C. |  | 5341 | 5304 | 5397 | 5362 | 5357 | 5353 | 5338 |
|  | Cumulative bag drop test | 50 cm | — | ○○/○○ | ○○/○○ | ○○/○○ | ○○/○○ | ○○/○○ | ○○/○○ | ○○/○○ |
|  |  | 100 cm |  | ○○/○○ | ○○/○○ | ○○/○○ | ○○/○○ | ○○/○○ | ○○/○○ | ○○/○○ |
|  |  | 150 cm |  | ○X/○X | ○X/X | ○X/X | X/X | X/X | X/X | X/X |
|  |  | 200 cm |  | —/— | —/— | —/— | —/— | —/— | —/— | —/— |

TABLE 36

|  |  |  |  | EX 72 | EX 73 | EX 74 | EX 75 | EX 76 | EX 77 | EX 78 |
|---|---|---|---|---|---|---|---|---|---|---|
| Layer compositions and resin formulations | Outer layer | Component (D) | — | PP(D-1) | PP(D-1) | PP(D-1) | PP(D-1) | PP(D-1) | PP(D-1) | PP(D-1) |
|  |  | amount | wt % | 100 | 100 | 100 | 100 | 100 | 100 | 100 |
|  |  | Component (D3) | — | — | — | — | — | — | — | — |
|  |  | amount | wt % | — | — | — | — | — | — | — |
|  |  | Other components | — | — | — | — | — | — | — | — |
|  |  | amount | wt % | — | — | — | — | — | — | — |
|  | Inner layer | Component (A) | — | PP(A-16) | PP(A-17) | PP(A-1) | PP(A-1) | PP(A-1) | PP(A-1) | PP(A-1) |
|  |  | amount | wt % | 70 | 70 | 70 | 70 | 70 | 70 | 70 |
|  |  | Component (B) | — | PE(B-1) | PE(B-1) | PE(B-2) | PE(B-3) | PE(B-4) | PE(B-5) | PE(B-6) |
|  |  | amount | wt % | 20 | 20 | 20 | 20 | 20 | 20 | 20 |
|  |  | Component (C) | — | PP(C-1) | PP(C-1) | PP(C-1) | PP(C-1) | PP(C-1) | PP(C-1) | PP(C-1) |
|  |  | amount | wt % | 10 | 10 | 10 | 10 | 10 | 10 | 10 |
|  |  | Other components | — | — | — | — | — | — | — | — |
|  |  | amount | wt % | — | — | — | — | — | — | — |
|  |  | Tm(C) - Tm(Al) | ° C. | 31 | 31 | 31 | 31 | 31 | 31 | 31 |
|  | Innermost layer | Component (E) | — | PP(E-1) | PP(E-1) | PP(E-1) | PP(E-1) | PP(E-1) | PP(E-1) | PP(E-1) |
|  |  | amount | wt % | 90 | 90 | 90 | 90 | 90 | 90 | 90 |
|  |  | Component (F) | — | PE(F-1) | PE(F-1) | PE(F-1) | PE(F-1) | PE(F-1) | PE(F-1) | PE(F-1) |
|  |  | amount | wt % | 10 | 10 | 10 | 10 | 10 | 10 | 10 |
|  |  | Component (I) | — |  |  |  |  |  |  |  |
|  |  | amount | wt % |  |  |  |  |  |  |  |
|  |  | Other components | — | — | — | — | — | — | — | — |
|  |  | amount | wt % | — | — | — | — | — | — | — |
|  |  | Tm(C) - Tm(Al) | ° C. |  |  |  |  |  |  |  |
|  |  | S(0) | wt % | 0.2 | 0.2 | 0.2 | 0.2 | 0.2 | 0.2 | 0.2 |
| Film properties after 30 minutes of heat treatment at 121° C. | Appearance |  | — | ○ | ○ | ○ | ○ | ○ | ○ | ○ |
|  | Total haze |  | % | 19 | 20 | 15 | 12 | 15 | 12 | 12 |
|  | Tensile modulus | MD | MPa | 284 | 306 | 276 | 285 | 286 | 280 | 281 |
|  | Heat-sealing strength | 125° C. | gf/10 mm | 1585 | 1576 | 1541 | 1567 | 1543 | 1556 | 1536 |
|  |  | 130° C. |  | 2554 | 2471 | 2585 | 2613 | 2583 | 2604 | 2573 |
|  |  | 135° C. |  | 3647 | 3646 | 3567 | 3603 | 3573 | 3602 | 3583 |
|  |  | 140° C. |  | 3679 | 3683 | 3478 | 3505 | 3469 | 3492 | 3466 |
|  |  | 145° C. |  | 4285 | 4397 | 4173 | 4195 | 4158 | 4186 | 4154 |
|  |  | 150° C. |  | 4704 | 4789 | 4526 | 4544 | 4526 | 4544 | 4505 |
|  |  | 155° C. |  | 5203 | 5237 | 5128 | 5163 | 5121 | 5144 | 5103 |
|  |  | 160° C. |  | 5345 | 5313 | 5252 | 5244 | 5247 | 5254 | 5247 |
|  | Cumulative bag drop test | 50 cm | — | ○○/○○ | ○○/○○ | ○○/○○ | ○○/○○ | ○○/○○ | ○○/○○ | ○○/○○ |
|  |  | 100 cm |  | ○○/○○ | ○○/○○ | ○○/○○ | ○○/○○ | ○○/○○ | ○○/○○ | ○○/○○ |
|  |  | 150 cm |  | X/X | X/X | X/○X | X/○X | X/○X | ○X/X | X/○X |
|  |  | 200 cm |  | —/— | —/— | —/— | —/— | —/— | —/— | —/— |

TABLE 37

|  |  |  |  | EX 79 | EX 80 | EX 81 | EX 82 | EX 83 | EX 84 | EX 85 |
|---|---|---|---|---|---|---|---|---|---|---|
| Layer compositions and resin formulations | Outer layer | Component (D) | — | PP(D-1) | PP(D-1) | PP(D-1) | PP(D-1) | PP(D-2) | PP(D-3) | PP(D-4) |
|  |  | amount | wt % | 100 | 100 | 100 | 100 | 100 | 100 | 100 |
|  |  | Component (D3) | — | — | — | — | — | — | — | — |
|  |  | amount | wt % | — | — | — | — | — | — | — |
|  |  | Other components | — | — | — | — | — | — | — | — |
|  |  | amount | wt % | — | — | — | — | — | — | — |
|  | Inner layer | Component (A) | — | PP(A-1) | PP(A-1) | PP(A-1) | PP(A-1) | PP(A-1) | PP(A-1) | PP(A-1) |
|  |  | amount | wt % | 70 | 70 | 70 | 65 | 70 | 70 | 70 |
|  |  | Component (B) | — | PE(B-1) | PE(B-1) | PE(B-1) | PE(B-1) | PE(B-1) | PE(B-1) | PE(B-1) |
|  |  | amount | wt % | 20 | 20 | 20 | 20 | 20 | 20 | 20 |
|  |  | Component (C) | — | PP(C-2) | PP(C-3) | PP(C-4) | PP(C-5) | PP(C-1) | PP(C-1) | PP(C-1) |
|  |  | amount | wt % | 10 | 10 | 10 | 10 | 10 | 10 | 10 |
|  |  | Other components | — | — | — | — | — | — | — | — |
|  |  | amount | wt % | — | — | — | — | — | — | — |
|  |  | Tm(C) - Tm(Al) | ° C. | 31 | 31 | 31 | 32 | 31 | 31 | 31 |
|  | Innermost layer | Component (E) | — | PP(E-1) | PP(E-1) | PP(E-1) | PP(E-1) | PP(E-1) | PP(E-1) | PP(E-1) |
|  |  | amount | wt % | 90 | 90 | 90 | 90 | 90 | 90 | 90 |
|  |  | Component (F) | — | PE(F-1) | PE(F-1) | PE(F-1) | PE(F-1) | PE(F-1) | PE(F-1) | PE(F-1) |
|  |  | amount | wt % | 10 | 10 | 10 | 10 | 10 | 10 | 10 |
|  |  | Component (I) | — |  |  |  |  |  |  |  |
|  |  | amount | wt % |  |  |  |  |  |  |  |
|  |  | Other components | — | — | — | — | — | — | — | — |
|  |  | amount | wt % | — | — | — | — | — | — | — |
|  |  | Tm(C) - Tm(Al) | ° C. |  |  |  |  |  |  |  |
|  |  | S(0) | wt % | 0.2 | 0.2 | 0.2 | 0.2 | 0.2 | 0.2 | 0.2 |
| Film properties after 30 minutes of heat treatment at 121° C. | Appearance |  | — | ○ | ○ | ○ | ○ | ○ | ○ | ○ |
|  | Total haze |  | % | 12 | 12 | 12 | 11 | 13 | 14 | 16 |
|  | Tensile modulus | MD | MPa | 281 | 278 | 284 | 271 | 298 | 298 | 251 |
|  | Heat-sealing strength | 125° C. | gf/10 mm | 1573 | 1556 | 1573 | 1553 | 1786 | 1763 | 1562 |
|  |  | 130° C. |  | 2614 | 2585 | 2614 | 2585 | 2861 | 2884 | 2672 |
|  |  | 135° C. |  | 3595 | 3562 | 3605 | 3575 | 3182 | 3168 | 3069 |
|  |  | 140° C. |  | 3498 | 3491 | 3514 | 3478 | 3443 | 3339 | 3147 |
|  |  | 145° C. |  | 4187 | 4183 | 4187 | 4156 | 3520 | 3592 | 3369 |
|  |  | 150° C. |  | 4532 | 4526 | 4553 | 4533 | 4594 | 4622 | 4394 |
|  |  | 155° C. |  | 5124 | 5136 | 5168 | 5139 | 5179 | 5164 | 4923 |
|  |  | 160° C. |  | 5242 | 5253 | 5250 | 5250 | 5241 | 5269 | 5075 |
|  | Cumulative bag drop test | 50 cm | — | ○○/○○ | ○○/○○ | ○○/○○ | ○○/○○ | ○○/○○ | ○○/○○ | ○○/○○ |
|  |  | 100 cm |  | ○○/○○ | ○○/○○ | ○○/○○ | ○○/○○ | ○○/○○ | ○○/○○ | ○○/○○ |
|  |  | 150 cm |  | ○X/X | X/○X | ○X/X | X/○○ | ○○/○○ | ○○/○○ | ○○/○○ |
|  |  | 200 cm |  | —/— | —/— | —/— | —/X | ○○/○○ | ○○/○○ | ○○/○○ |

TABLE 38

|  |  |  |  | EX 86 | EX 87 | EX 88 | EX 89 | EX 90 | EX 91 | EX 92 |
|---|---|---|---|---|---|---|---|---|---|---|
| Layer compositions and resin formulations | Outer layer | Component (D) | — | PP(D-4) | PP(D-4) | PP(D-1) | PP(D-1) | PP(D-1) | PP(D-1) | PP(D-1) |
|  |  | amount | wt % | 90 | 100 | 100 | 100 | 100 | 100 | 100 |
|  |  | Component (D3) | — | PE(D3-1) | — | — | — | — | — | — |
|  |  | amount | wt % | 10 | — | — | — | — | — | — |
|  |  | Other components | — | — | — | — | — | — | — | — |
|  |  | amount | wt % | — | — | — | — | — | — | — |
|  | Inner layer | Component (A) | — | PP(A-1) | PP(A-1) | PP(A-1) | PP(A-1) | PP(A-1) | PP(A-1) | PP(A-1) |
|  |  | amount | wt % | 70 | 65 | 70 | 70 | 70 | 70 | 70 |
|  |  | Component (B) | — | PE(B-1) | PE(B-1) | PE(B-1) | PE(B-1) | PE(B-1) | PE(B-1) | PE(B-1) |
|  |  | amount | wt % | 20 | 20 | 20 | 20 | 20 | 20 | 20 |
|  |  | Component (C) | — | PP(C-1) | PP(C-5) | PP(C-1) | PP(C-1) | PP(C-1) | PP(C-1) | PP(C-1) |
|  |  | amount | wt % | 10 | 15 | 10 | 10 | 10 | 10 | 10 |
|  |  | Other components | — | — | — | — | — | — | — | — |
|  |  | amount | wt % | — | — | — | — | — | — | — |
|  |  | Tm(C) - Tm(Al) | ° C. | 31 | 32 | 31 | 31 | 31 | 31 | 31 |
|  | Innermost layer | Component (E) | — | PP(E-1) | PP(E-1) | PP(E-2) | PP(E-3) | PP(E-1) | PP(K-1) | PP(K-1) |
|  |  | amount | wt % | 90 | 90 | 90 | 90 | 90 | 85 | 90 |
|  |  | Component (F) | — | PE(F-1) | PE(F-1) | PE(F-1) | PE(F-1) | PE(F-2) | PE(F-3) | PE(F-4) |
|  |  | amount | wt % | 10 | 10 | 10 | 10 | 10 | 15 | 10 |
|  |  | Component (I) | — |  |  |  |  |  |  |  |
|  |  | amount | wt % |  |  |  |  |  |  |  |
|  |  | Other components | — | — | — | — | — | — | — | — |
|  |  | amount | wt % | — | — | — | — | — | — | — |
|  |  | Tm(C) - Tm(Al) | ° C. |  |  |  |  |  |  |  |
|  |  | S(0) | wt % | 0.2 | 0.2 | 0.2 | 0.6 | 0.2 | 0.2 | 0.1 |
| Film properties after 30 minutes | Appearance |  | — | ○ | ○ | ○ | ○— | ○ | ○ | ○ |
|  | Total haze |  | % | 12 | 14 | 13 | 17 | 15 | 13 | 15 |
|  | Tensile modulus | MD | MPa | 243 | 235 | 281 | 285 | 281 | 282 | 280 |

TABLE 38-continued

|  |  |  |  | EX 86 | EX 87 | EX 88 | EX 89 | EX 90 | EX 91 | EX 92 |
|---|---|---|---|---|---|---|---|---|---|---|
| of heat treatment at 121° C. | Heat-sealing strength | 125° C. | gf/10 mm | 1436 | 1764 | 1367 | 1214 | 1755 | 1561 | 1579 |
|  |  | 130° C. |  | 2579 | 2902 | 2472 | 2551 | 2582 | 2647 | 2587 |
|  |  | 135° C. |  | 3248 | 3208 | 3322 | 3253 | 3425 | 3621 | 3488 |
|  |  | 140° C. |  | 3228 | 3433 | 3488 | 3422 | 3571 | 3616 | 3511 |
|  |  | 145° C. |  | 3285 | 3593 | 4183 | 4103 | 4017 | 4073 | 4315 |
|  |  | 150° C. |  | 4290 | 4564 | 4472 | 4464 | 4459 | 4463 | 4141 |
|  |  | 155° C. |  | 4833 | 5206 | 5081 | 5020 | 5023 | 5020 | 5133 |
|  |  | 160° C. |  | 4949 | 5356 | 5129 | 5164 | 5195 | 5121 | 5219 |
|  | Cumulative bag drop test | 50 cm | — | ○○/○○ | ○○/○○ | ○○/○○ | ○○/○○ | ○○/○○ | ○○/○○ | ○○/○○ |
|  |  | 100 cm |  | ○○/○○ | ○○/○○ | ○○/○○ | ○○/○○ | ○○/○○ | ○○/○○ | ○○/○○ |
|  |  | 150 cm |  | ○○/○○ | ○○/○○ | X/○X | X/○X | ○X/X | X/○X | ○X/X |
|  |  | 200 cm |  | ○○/○○ | ○○/○○ | —/— | —/— | —/— | —/— | —/— |

TABLE 39

|  |  |  |  | EX 93 | EX 94 | EX 95 | EX 96 |
|---|---|---|---|---|---|---|---|
| Layer compositions and resin formulations | Outer layer | Component (D) | — | PP(D-2) | PP(D-1) | PP(D-1) | PP(D-1) |
|  |  | amount | wt % | 80 | 100 | 100 | 100 |
|  |  | Component (D3) | — | — | — | — | — |
|  |  | amount | wt % | — | — | — | — |
|  |  | Other components | — | 7125 | — | — | — |
|  |  | amount | wt % | 20 | — | — | — |
|  | Inner layer | Component (A) | — | PP(A-1) | PP(A-1) | PP(A-1) | PP(A-1) |
|  |  | amount | wt % | 70 | 60 | 70 | 70 |
|  |  | Component (B) | — | PE(B-1) | PE(B-1) | PE(B-1) | PE(B-1) |
|  |  | amount | wt % | 20 | 20 | 20 | 20 |
|  |  | Component (C) | — | PP(C-1) | PP(C-1) | PP(C-1) | PP(C-1) |
|  |  | amount | wt % | 10 | 10 | 10 | 10 |
|  |  | Other components | — | — | 7125 | 7125 | — |
|  |  | amount | wt % | — | 10 | 20 | — |
|  |  | Tm(C) - Tm(Al) | ° C. | 26 | 26 | 26 | 26 |
|  | Innermost layer | Component (E) | — | PP(E-1) | PP(E-1) | PP(E-1) | PP(E-1) |
|  |  | amount | wt % | 90 | 90 | 90 | 85 |
|  |  | Component (F) | — | PE(F-1) | PE(F-1) | PE(F-1) | PE(F-1) |
|  |  | amount | wt % | 10 | 10 | 10 | 5 |
|  |  | Component (I) | — |  |  |  |  |
|  |  | amount | wt % |  |  |  |  |
|  |  | Other components | — | — | — | — | 7125 |
|  |  | amount | wt % | — | — | — | 10 |
|  |  | Tm(C) - Tm(Al) | ° C. |  |  |  |  |
|  |  | S(0) | wt % | 0.2 | 0.2 | 0.2 | 8.9 |
| Film properties after 30 minutes of heat treatment at 121° C. | Appearance |  | — | ○ | ○ | ○ | ○ |
|  | Total haze |  | % | 11 | 11 | 10 | 11 |
|  | Tensile modulus | MD | MPa | 284 | 271 | 234 | 268 |
|  | Heat-sealing strength | 125° C. | gf/10 mm | 2052 | 1819 | 1569 | 2177 |
|  |  | 130° C. |  | 3169 | 2874 | 2826 | 3367 |
|  |  | 135° C. |  | 3490 | 3673 | 3493 | 3542 |
|  |  | 140° C. |  | 3805 | 3724 | 3756 | 3681 |
|  |  | 145° C. |  | 3989 | 3980 | 4037 | 3939 |
|  |  | 150° C. |  | 5084 | 5065 | 5122 | 5038 |
|  |  | 155° C. |  | 5723 | 5745 | 5785 | 5745 |
|  |  | 160° C. |  | 5826 | 5795 | 5769 | 5793 |
|  | Cumulative bag drop test | 50 cm | — | ○○/○○ | ○○/○○ | ○○/○○ | ○○/○○ |
|  |  | 100 cm |  | ○○/○○ | ○○/○○ | ○○/○○ | ○○/○○ |
|  |  | 150 cm |  | ○○/○○ | ○X/○○ | ○○/○○ | ○X/○○ |
|  |  | 200 cm |  | ○○/○○ | —/X | ○X/○X | —/X |

TABLE 40

|  |  |  |  | Comp. Ex. 10 | Comp. Ex. 11 | Comp. Ex. 12 | Comp. Ex. 13 | Comp. Ex. 14 | Comp. Ex. 15 | Comp. Ex. 16 |
|---|---|---|---|---|---|---|---|---|---|---|
| Layer compositions and resin formulations | Outer layer | Component (D) | — | PP(D-1) | PP(D-1) | PP(D-1) | PP(D-1) | PP(D-1) | PP(D-1) | PP(D-1) |
|  |  | amount | wt % | 100 | 100 | 100 | 100 | 100 | 100 | 100 |
|  |  | Component (D3) | — | — | — | — | — | — | — | — |
|  |  | amount | wt % | — | — | — | — | — | — | — |
|  |  | Other components | — | — | — | — | — | — | — | — |
|  |  | amount | wt % | — | — | — | — | — | — | — |
|  | Inner layer | Component (A) | — | PP(A-1) | PP(A-1) | PP(A-1) | PP(A-1) | PP(A-10) | PP(A-14) | PP(A-1) |
|  |  | amount | wt % | 100 | 50 | 70 | 40 | 70 | 70 | 70 |
|  |  | Component (B) | — | — | PE(B-1) | — | PE(B-1) | PE(B-1) | PE(B-1) | PE(B-7) |

TABLE 40-continued

|  |  |  |  | Comp. Ex. 10 | Comp. Ex. 11 | Comp. Ex. 12 | Comp. Ex. 13 | Comp. Ex. 14 | Comp. Ex. 15 | Comp. Ex. 16 |
|---|---|---|---|---|---|---|---|---|---|---|
|  |  | amount | wt % | — | 50 | — | 50 | 20 | 20 | 20 |
|  |  | Component (C) | — | — | — | PP(C-1) | PP(C-1) | PP(C-1) | PP(C-1) | PP(C-1) |
|  |  | amount | wt % | — | — | 30 | 10 | 10 | 10 | 10 |
|  |  | Other components | — | — | — | — | — | — | — | — |
|  |  | amount | wt % | — | — | — | — | — | — | — |
|  |  | Tm(C) - Tm(A1) | ° C. | — | — | 31 | 31 | 41 | 31 | 31 |
|  | Innermost | Component (E) | — | PP(E-1) | PP(E-1) | PP(E-1) | PP(E-1) | PP(E-1) | PP(E-1) | PP(E-1) |
|  | layer | amount | wt % | 90 | 90 | 90 | 90 | 90 | 90 | 90 |
|  |  | Component (F) | — | PE(F-1) | PE(F-1) | PE(F-1) | PE(F-1) | PE(F-1) | PE(F-1) | PE(F-1) |
|  |  | amount | wt % | 10 | 10 | 10 | 10 | 10 | 10 | 10 |
|  |  | Component (I) | — |  |  |  |  |  |  |  |
|  |  | amount | wt % |  |  |  |  |  |  |  |
|  |  | Other components | — | — | — | — | — | — | — | — |
|  |  | amount | wt % | — | — | — | — | — | — | — |
|  |  | Tm(C) - Tm(A1) | ° C. |  |  |  |  |  |  |  |
|  |  | S(0) | wt % | 0.2 | 0.2 | 0.2 | 0.2 | 0.2 | 0.2 | 0.2 |
| Film properties after 30 minutes of heat treatment at 121° C. | Appearance |  | — | ○ | Pockmarked pattern arose due to inadequate heat resistance; good samples could not be obtained | ○ | Δ | ○ | ○ | ○ |
|  | Total haze |  | % | 9.5 |  | 27 | 22 | 15 | 13 | 34 |
|  | Tensile modulus | MD | MPa | 260 |  | 376 | 263 | 280 | 293 | 297 |
|  | Heat-sealing strength | 125° C. | gf/10 mm | 1522 |  | 1532 | 1389 | 1559 | 1539 | 1566 |
|  |  | 130° C. |  | 2611 |  | 2584 | 1984 | 2604 | 2621 | 2617 |
|  |  | 135° C. |  | 3374 |  | 3574 | 2984 | 3690 | 3683 | 3612 |
|  |  | 140° C. |  | 3544 |  | 3678 | 3290 | 3557 | 3687 | 3498 |
|  |  | 145° C. |  | 4267 |  | 4287 | 4019 | 4244 | 4254 | 4197 |
|  |  | 150° C. |  | 4623 |  | 4586 | 4239 | 4666 | 4704 | 4548 |
|  |  | 155° C. |  | 4769 |  | 5188 | 4728 | 5352 | 5302 | 5147 |
|  |  | 160° C. |  | 4772 |  | 5208 | 5297 | 5367 | 5318 | 5245 |
|  | Cumulative bag drop test | 50 cm | — | X/X |  | ○X/○X | ○○/○○ | ○○/○○ | ○○/○○ | X/○X |
|  |  | 100 cm |  | —/— |  | —/— | ○○/○X | ○○/○X | ○X/○X | —/— |
|  |  | 150 cm |  | —/— |  | —/— | ○X/— | ○X/— | ○X/— | —/— |
|  |  | 200 cm |  | —/— |  | —/— | —/— | —/— | —/— | —/— |

TABLE 41

|  |  |  |  | Comp. Ex. 17 | Comp. Ex. 18 |
|---|---|---|---|---|---|
| Layer compositions and resin formulations | Outer layer | Component (D) | — | PP(D-1) | PP(D-5) |
|  |  | amount | wt % | 100 | 100 |
|  |  | Component (D3) | — | — | — |
|  |  | amount | wt % | — | — |
|  |  | Other components | — | — | — |
|  |  | amount | wt % | — | — |
|  | Inner layer | Component (A) | — | PP(A-1) | PP(A-1) |
|  |  | amount | wt % | 70 | 70 |
|  |  | Component (B) | — | PE(B-8) | PE(B-1) |
|  |  | amount | wt % | 20 | 20 |
|  |  | Component (C) | — | PP(C-1) | PP(C-1) |
|  |  | amount | wt % | 10 | 10 |
|  |  | Other components | — | — | — |
|  |  | amount | wt % | — | — |
|  |  | Tm(C) - Tm(A1) | ° C. | 31 | 31 |
|  | Innermost layer | Component (E) | — | PP(E-1) | PP(E-1) |
|  |  | amount | wt % | 90 | 90 |
|  |  | Component (F) | — | PE(F-1) | PE(F-1) |
|  |  | amount | wt % | 10 | 10 |
|  |  | Component (I) | — |  |  |
|  |  | amount | wt % |  |  |
|  |  | Other components | — | — | — |
|  |  | amount | wt % | — | — |
|  |  | Tm(C) - Tm(A1) | ° C. |  |  |
|  |  | S(0) | wt % | 0.2 | 0.2 |
| Film properties after 30 minutes of heat treatment at 121° C. | Appearance |  | — | ○ | Pockmarked pattern arose due to inadequate heat resistance; good samples could not be obtained |
|  | Total haze |  | % | 35 |  |
|  | Tensile modulus | MD | MPa | 329 |  |
|  | Heat-sealing strength | 125° C. | gf/10 mm | 1549 |  |
|  |  | 130° C. |  | 2594 |  |
|  |  | 135° C. |  | 3577 |  |
|  |  | 140° C. |  | 3482 |  |
|  |  | 145° C. |  | 4165 |  |
|  |  | 150° C. |  | 4518 |  |
|  |  | 155° C. |  | 5116 |  |
|  |  | 160° C. |  | 5253 |  |

TABLE 41-continued

|  |  |  | Comp. Ex. 17 | Comp. Ex. 18 |
|---|---|---|---|---|
| Cumulative bag drop test | 50 cm | — | ○○/○○ | |
| | 100 cm | | ○○/○○ | |
| | 150 cm | | ○X/X | |
| | 200 cm | | —/— | |

TABLE 42

| | | | | Ref. Ex. 14 | Ref. Ex. 15 | Ref. Ex. 16 | Ref. Ex. 17 | Ref. Ex. 18 | Ref. Ex. 19 | Ref. Ex. 20 |
|---|---|---|---|---|---|---|---|---|---|---|
| Layer compositions and resin formulations | Outer layer | Component (D) | — | PP(D-1) | PP(D-1) | PP(D-1) | PP(D-1) | PP(D-4) | PP(D-1) | PP(D-1) |
| | | amount | wt % | 100 | 100 | 100 | 100 | 90 | 100 | 100 |
| | | Component (D3) | — | — | — | — | — | PE(D3-2) | — | — |
| | | amount | wt % | — | — | — | — | 10 | — | — |
| | | Other components | — | — | — | — | — | — | — | — |
| | | amount | wt % | — | — | — | — | — | — | — |
| | Inner layer | Component (A) | — | PP(A-1) | PP(A-1) | PP(A-1) | PP(A-1) | PP(A-1) | PP(A-1) | PP(A-1) |
| | | amount | wt % | 60 | 70 | 70 | 70 | 70 | 70 | 70 |
| | | Component (B) | — | PE(B-1) | PE(B-1) | PE(B-1) | PE(B-1) | PE(B-1) | PE(B-1) | PE(B-1) |
| | | amount | wt % | 10 | 20 | 20 | 20 | 20 | 20 | 20 |
| | | Component (C) | — | PP(C-1) | PP(C-6) | PP(C-7) | PP(C-8) | PP(C-1) | PP(C-1) | PP(C-1) |
| | | amount | wt % | 30 | 10 | 10 | 10 | 10 | 10 | 10 |
| | | Other components | — | — | — | — | — | — | — | — |
| | | amount | wt % | — | — | — | — | — | — | — |
| | | Tm(C) - Tm(Al) | ° C. | 31 | 5 | −5 | 31 | 31 | 31 | 31 |
| | Innermost layer | Component (E) | — | PP(E-1) | PP(E-1) | PP(E-1) | PP(E-1) | PP(E-1) | PP(E-1) | PP(E-1) |
| | | amount | wt % | 90 | 90 | 90 | 90 | 90 | 100 | 70 |
| | | Component (F) | — | PE(F-1) | PE(F-1) | PE(F-1) | PE(F-1) | PE(F-1) | — | PE(F-1) |
| | | amount | wt % | 10 | 10 | 10 | 10 | 10 | — | 30 |
| | | Component (I) | — | | | | | | | |
| | | amount | wt % | | | | | | | |
| | | Other components | — | — | — | — | — | — | — | — |
| | | amount | wt % | — | — | — | — | — | — | — |
| | | Tm(C) - Tm(Al) | ° C. | | | | | | | |
| | | S(0) | wt % | 0.2 | 0.2 | 0.2 | 0.2 | 0.2 | 0 | 0.6 |
| Film properties after 30 minutes of heat treatment at 121° C. | Appearance | | — | ○ | ○ | ○ | ○ | ○ | ○ | Internal fusion due to inadequate heat resistance occurred during sterilization; could not be evaluated |
| | Total haze | | % | 31 | 13 | 13 | 21 | 28 | 9 | |
| | Tensile modulus | MD | MPa | 368 | 265 | 359 | 348 | 248 | 284 | |
| | Heat-sealing strength | 125° C. | gf/10 mm | 1564 | 1571 | 1552 | 1571 | 1603 | 85 | |
| | | 130° C. | | 2566 | 2608 | 2592 | 2626 | 2728 | 459 | |
| | | 135° C. | | 3599 | 3609 | 3585 | 3606 | 3407 | 3194 | |
| | | 140° C. | | 3621 | 3516 | 3490 | 3507 | 3418 | 3260 | |
| | | 145° C. | | 4357 | 4201 | 4182 | 4193 | 3437 | 3647 | |
| | | 150° C. | | 4597 | 4547 | 4532 | 4551 | 4441 | 4317 | |
| | | 155° C. | | 5288 | 5134 | 5144 | 5178 | 5003 | 4825 | |
| | | 160° C. | | 5361 | 5249 | 5264 | 5258 | 5122 | 4422 | |
| | Cumulative bag drop test | 50 cm | — | X/○X | ○○/X | ○X/○X | ○○/○○ | ○○/○○ | X/X | |
| | | 100 cm | | —/— | ○X/— | —/— | ○X/○○ | ○○/○○ | —/— | |
| | | 150 cm | | —/— | —/— | —/— | —/X | ○○/○○ | —/— | |
| | | 200 cm | | —/— | —/— | —/— | —/— | ○○/○○ | —/— | |

TABLE 43

| | | | | Ref. Ex. 21 | Ref. Ex. 22 | Ref. Ex. 23 |
|---|---|---|---|---|---|---|
| Layer compositions and resin formulations | Outer layer | Component (D) | — | PP(D-1) | PP(D-1) | PP(D-1) |
| | | amount | wt % | 100 | 100 | 100 |
| | | Component (D3) | — | — | — | — |
| | | amount | wt % | — | — | — |
| | | Other components | — | — | — | — |
| | | amount | wt % | — | — | — |
| | Inner layer | Component (A) | — | PP(A-1) | PP(A-1) | PP(A-1) |
| | | amount | wt % | 70 | 70 | 70 |
| | | Component (B) | — | PE(B-1) | PE(B-1) | PE(B-1) |
| | | amount | wt % | 20 | 20 | 20 |
| | | Component (C) | — | PP(C-1) | PP(C-1) | PP(C-1) |

TABLE 43-continued

|  |  |  |  | Ref. Ex. 21 | Ref. Ex. 22 | Ref. Ex. 23 |
|---|---|---|---|---|---|---|
|  |  | amount | wt % | 10 | 10 | 10 |
|  |  | Other components | — | — | — | — |
|  |  | amount | wt % | — | — | — |
|  |  | Tm(C) - Tm(Al) | ° C. | 31 | 31 | 31 |
|  | Innermost layer | Component (E) | — | PP(E-4) | PP(E-5) | PP(E-1) |
|  |  | amount | wt % | 90 | 90 | 90 |
|  |  | Component (F) | — | PE(F-1) | PE(F-1) | PE(F-5) |
|  |  | amount | wt % | 10 | 10 | 10 |
|  |  | Component (I) | — | — | — | — |
|  |  | amount | wt % | — | — | — |
|  |  | Other components | — | — | — | — |
|  |  | amount | wt % | — | — | — |
|  |  | Tm(C) - Tm(Al) | ° C. |  |  |  |
|  |  | S(0) | wt % | 0.3 | 0.4 | 0.1 |
| Film properties after 30 minutes of heat treatment at 121° C. | Appearance |  | — | Internal fusion due to inadequate heat resistance occurred during sterilization; could not be evaluated | ○ | ○ |
|  | Total haze |  | % |  | 19 | 27 |
|  | Tensile modulus | MD | MPa |  | 501 | 285 |
|  | Heat-sealing strength | 125° C. | gf/10 mm |  | 22 | 1162 |
|  |  | 130° C. |  |  | 261 | 1365 |
|  |  | 135° C. |  |  | 448 | 3131 |
|  |  | 140° C. |  |  | 785 | 3249 |
|  |  | 145° C. |  |  | 1359 | 3558 |
|  |  | 150° C. |  |  | 1577 | 4322 |
|  |  | 155° C. |  |  | 2156 | 4992 |
|  |  | 160° C. |  |  | 3001 | 5104 |
|  | Cumulative bag drop test | 50 cm | — |  | X/X | ○○/○○ |
|  |  | 100 cm |  |  | —/— | X/X |
|  |  | 150 cm |  |  | —/— | —/— |
|  |  | 200 cm |  |  | —/— | —/— |

TABLE 44

|  |  |  |  | EX 97 | EX 98 | EX 99 | EX 100 | EX 101 | EX 102 | EX 103 |
|---|---|---|---|---|---|---|---|---|---|---|
| Layer compositions and resin formulations | Outer layer | Component (D) | — | PP(D-1) | PP(D-1) | PP(D-1) | PP(D-1) | PP(D-1) | PP(D-1) | PP(D-1) |
|  |  | amount | wt % | 100 | 100 | 100 | 100 | 100 | 100 | 100 |
|  |  | Component (D3) | — | — | — | — | — | — | — | — |
|  |  | amount | wt % | — | — | — | — | — | — | — |
|  |  | Other components | — | — | — | — | — | — | — | — |
|  |  | amount | wt % | — | — | — | — | — | — | — |
|  | Inner layer | Component (A) | — | PP(A-1) | PP(A-2) | PP(A-3) | PP(A-4) | PP(A-5) | PP(A-6) | PP(A-7) |
|  |  | amount | wt % | 70 | 70 | 70 | 70 | 70 | 70 | 70 |
|  |  | Component (B) | — | PE(B-1) | PE(B-1) | PE(B-1) | PE(B-1) | PE(B-1) | PE(B-1) | PE(B-1) |
|  |  | amount | wt % | 20 | 20 | 20 | 20 | 20 | 20 | 20 |
|  |  | Component (C) | — | PP(C-1) | PP(C-1) | PP(C-1) | PP(C-1) | PP(C-1) | PP(C-1) | PP(C-1) |
|  |  | amount | wt % | 10 | 10 | 10 | 10 | 10 | 10 | 10 |
|  |  | Other components | — | — | — | — | — | — | — | — |
|  |  | amount | wt % | — | — | — | — | — | — | — |
|  |  | Tm(C) - Tm(Al) | ° C. | 31 | 35 | 28 | 31 | 31 | 31 | 31 |
|  | Innermost layer | Component (K) | — | PP(K-16) | PP(K-16) | PP(K-16) | PP(K-16) | PP(K-16) | PP(K-16) | PP(K-16) |
|  |  | amount | wt % | 70 | 70 | 70 | 70 | 70 | 70 | 70 |
|  |  | Component (H) | — | PE(H-1) | PE(H-1) | PE(H-1) | PE(H-1) | PE(H-1) | PE(H-1) | PE(H-1) |
|  |  | amount | wt % | 20 | 20 | 20 | 20 | 20 | 20 | 20 |
|  |  | Component (I) | — | PP(I-1) | PP(I-1) | PP(I-1) | PP(I-1) | PP(I-1) | PP(I-1) | PP(I-1) |
|  |  | amount | wt % | 10 | 10 | 10 | 10 | 10 | 10 | 10 |
|  |  | Other components | — | — | — | — | — | — | — | — |
|  |  | amount | wt % | — | — | — | — | — | — | — |
|  |  | Tm(C) - Tm(Al) | ° C. | 26 | 26 | 26 | 26 | 26 | 26 | 26 |
|  |  | S(0) | wt % | 1.3 | 1.3 | 1.3 | 1.3 | 1.3 | 1.3 | 1.3 |
| Film properties after 30 minutes of heat treatment at 121° C. | Appearance |  | — | ○ | ○ | ○ | ○ | ○ | ○ | ○ |
|  | Total haze |  | % | 13 | 13 | 13 | 13 | 13 | 13 | 13 |
|  | Tensile modulus | MD | MPa | 240 | 236 | 244 | 242 | 244 | 242 | 236 |
|  | Heat-sealing strength | 125° C. | gf/10 mm | 1807 | 1852 | 1822 | 1887 | 1803 | 1816 | 1850 |
|  |  | 130° C. |  | 2865 | 2548 | 2853 | 2870 | 2881 | 2850 | 2853 |
|  |  | 135° C. |  | 3141 | 3197 | 3147 | 3181 | 3185 | 3182 | 3120 |
|  |  | 140° C. |  | 3331 | 3468 | 3472 | 3470 | 3477 | 3419 | 3421 |
|  |  | 145° C. |  | 3567 | 3664 | 3563 | 3569 | 3599 | 3580 | 3525 |
|  |  | 150° C. |  | 4606 | 4695 | 4576 | 4585 | 4513 | 4518 | 4595 |
|  |  | 155° C. |  | 5170 | 5032 | 5105 | 5177 | 5156 | 5193 | 5201 |
|  |  | 160° C. |  | 5251 | 5167 | 5171 | 5204 | 5211 | 5213 | 5283 |

TABLE 44-continued

|  |  |  | EX 97 | EX 98 | EX 99 | EX 100 | EX 101 | EX 102 | EX 103 |
|---|---|---|---|---|---|---|---|---|---|
| Cumulative bag drop test | 50 cm | — | ○○/○○ | ○○/○○ | ○○/○○ | ○○/○○ | ○○/○○ | ○○/○○ | ○○/○○ |
|  | 100 cm |  | ○○/○○ | ○○/○○ | ○○/○○ | ○○/○○ | ○○/○○ | ○○/○○ | ○○/○○ |
|  | 150 cm |  | ○○/X | X/○X | ○○/X | X/○X | X/○X | ○○/X | ○○/X |
|  | 200 cm |  | X/— | —/— | X/— | —/— | —/— | X/— | X/— |

TABLE 45

|  |  |  |  | EX 104 | EX 105 | EX 106 | EX 107 | EX 108 | EX 109 | EX 110 |
|---|---|---|---|---|---|---|---|---|---|---|
| Layer compositions and resin formulations | Outer layer | Component (D) | — | PP(D-1) | PP(D-1) | PP(D-1) | PP(D-1) | PP(D-1) | PP(D-1) | PP(D-1) |
|  |  | amount | wt % | 100 | 100 | 100 | 100 | 100 | 100 | 100 |
|  |  | Component (D3) | — | — | — | — | — | — | — | — |
|  |  | amount | wt % | — | — | — | — | — | — | — |
|  |  | Other components | — | — | — | — | — | — | — | — |
|  |  | amount | wt % | — | — | — | — | — | — | — |
|  | Inner layer | Component (A) | — | PP(A-8) | PP(A-9) | PP(A-11) | PP(A-12) | PP(A-13) | PP(A-15) | PP(A-16) |
|  |  | amount | wt % | 70 | 70 | 70 | 70 | 70 | 70 | 70 |
|  |  | Component (B) | — | PE(B-1) | PE(B-1) | PE(B-1) | PE(B-1) | PE(B-1) | PE(B-1) | PE(B-1) |
|  |  | amount | wt % | 20 | 20 | 20 | 20 | 20 | 20 | 20 |
|  |  | Component (C) | — | PP(C-1) | PP(C-1) | PP(C-1) | PP(C-1) | PP(C-1) | PP(C-1) | PP(C-1) |
|  |  | amount | wt % | 10 | 10 | 10 | 10 | 10 | 10 | 10 |
|  |  | Other components | — | — | — | — | — | — | — | — |
|  |  | amount | wt % | — | — | — | — | — | — | — |
|  |  | Tm(C) - Tm(Al) | ° C. | 31 | 31 | 21 | 31 | 31 | 31 | 31 |
|  | Innermost layer | Component (K) | — | PP(K-16) | PP(K-16) | PP(K-16) | PP(K-16) | PP(K-16) | PP(K-16) | PP(K-16) |
|  |  | amount | wt % | 70 | 70 | 70 | 70 | 70 | 70 | 70 |
|  |  | Component (H) | — | PE(H-1) | PE(H-1) | PE(H-1) | PE(H-1) | PE(H-1) | PE(H-1) | PE(H-1) |
|  |  | amount | wt % | 20 | 20 | 20 | 20 | 20 | 20 | 20 |
|  |  | Component (I) | — | PP(I-1) | PP(I-1) | PP(I-1) | PP(I-1) | PP(I-1) | PP(I-1) | PP(I-1) |
|  |  | amount | wt % | 10 | 10 | 10 | 10 | 10 | 10 | 10 |
|  |  | Other components | — | — | — | — | — | — | — | — |
|  |  | amount | wt % | — | — | — | — | — | — | — |
|  |  | Tm(C) - Tm(Al) | ° C. | 26 | 26 | 26 | 26 | 26 | 26 | 26 |
|  |  | S(0) | wt % | 1.3 | 1.3 | 1.3 | 1.3 | 1.3 | 1.3 | 1.3 |
| Film properties after 30 minutes of heat treatment at 121° C. | Appearance | — |  | ○ | ○ | ○ | ○ | ○ | ○ | ○ |
|  | Total haze |  | % | 13 | 13 | 14 | 13 | 14 | 20 | 19 |
|  | Tensile modulus | MD | MPa | 240 | 240 | 289 | 233 | 301 | 242 | 244 |
|  | Heat-sealing strength | 125° C. | gf/10 mm | 1901 | 1789 | 1855 | 1885 | 1868 | 1850 | 1863 |
|  |  | 130° C. |  | 2817 | 2885 | 2548 | 2578 | 2574 | 2580 | 2591 |
|  |  | 135° C. |  | 3153 | 3185 | 3222 | 3216 | 3232 | 3215 | 3201 |
|  |  | 140° C. |  | 3499 | 3486 | 3490 | 3509 | 3515 | 3491 | 3508 |
|  |  | 145° C. |  | 3581 | 3573 | 3691 | 3661 | 3704 | 3693 | 3670 |
|  |  | 150° C. |  | 4578 | 4586 | 4726 | 4731 | 4690 | 4695 | 4722 |
|  |  | 155° C. |  | 5187 | 5145 | 5063 | 5033 | 5058 | 5052 | 5030 |
|  |  | 160° C. |  | 5324 | 5253 | 5179 | 5203 | 5178 | 5172 | 5185 |
|  | Cumulative bag drop test | 50 cm | — | ○○/○○ | ○○/○○ | ○○/○○ | ○○/○○ | ○○/○○ | ○○/○○ | ○○/○○ |
|  |  | 100 cm |  | ○○/○○ | ○○/○○ | ○○/○○ | ○○/○○ | ○○/○○ | ○○/○○ | ○○/○○ |
|  |  | 150 cm |  | ○X/X | ○X/○X | X/X | X/X | X/X | X/X | X/X |
|  |  | 200 cm |  | X/— | —/— | —/— | —/— | —/— | —/— | —/— |

TABLE 46

|  |  |  |  | EX 111 | EX 112 | EX 113 | EX 114 | EX 115 | EX 116 | EX 117 |
|---|---|---|---|---|---|---|---|---|---|---|
| Layer compositions and resin formulations | Outer layer | Component (D) | — | PP(D-1) | PP(D-1) | PP(D-1) | PP(D-1) | PP(D-1) | PP(D-1) | PP(D-1) |
|  |  | amount | wt % | 100 | 100 | 100 | 100 | 100 | 100 | 100 |
|  |  | Component (D3) | — | — | — | — | — | — | — | — |
|  |  | amount | wt % | — | — | — | — | — | — | — |
|  |  | Other components | — | — | — | — | — | — | — | — |
|  |  | amount | wt % | — | — | — | — | — | — | — |
|  | Inner layer | Component (A) | — | PP(A-17) | PP(A-1) | PP(A-1) | PP(A-1) | PP(A-1) | PP(A-1) | PP(A-1) |
|  |  | amount | wt % | 70 | 70 | 70 | 70 | 70 | 70 | 70 |
|  |  | Component (B) | — | PE(B-1) | PE(B-2) | PE(B-3) | PE(B-4) | PE(B-5) | PE(B-6) | PE(B-1) |
|  |  | amount | wt % | 20 | 20 | 20 | 20 | 20 | 20 | 20 |
|  |  | Component (C) | — | PP(C-1) | PP(C-1) | PP(C-1) | PP(C-1) | PP(C-1) | PP(C-1) | PP(C-2) |
|  |  | amount | wt % | 10 | 10 | 10 | 10 | 10 | 10 | 10 |
|  |  | Other components | — | — | — | — | — | — | — | — |
|  |  | amount | wt % | — | — | — | — | — | — | — |
|  |  | Tm(C) - Tm(Al) | ° C. | 31 | 31 | 31 | 31 | 31 | 31 | 31 |

TABLE 46-continued

|  |  |  |  | EX 111 | EX 112 | EX 113 | EX 114 | EX 115 | EX 116 | EX 117 |
|---|---|---|---|---|---|---|---|---|---|---|
|  | Innermost layer | Component (K) | — | PP(K-16) | PP(K-16) | PP(K-16) | PP(K-16) | PP(K-16) | PP(K-16) | PP(K-16) |
|  |  | amount | wt % | 70 | 70 | 70 | 70 | 70 | 70 | 70 |
|  |  | Component (H) | — | PE(H-1) | PE(H-1) | PE(H-1) | PE(H-1) | PE(H-1) | PE(H-1) | PE(H-1) |
|  |  | amount | wt % | 20 | 20 | 20 | 20 | 20 | 20 | 20 |
|  |  | Component (I) | — | PP(I-1) | PP(I-1) | PP(I-1) | PP(I-1) | PP(I-1) | PP(I-1) | PP(I-1) |
|  |  | amount | wt % | 10 | 10 | 10 | 10 | 10 | 10 | 10 |
|  |  | Other components | — | — | — | — | — | — | — | — |
|  |  | amount | wt % | — | — | — | — | — | — | — |
|  |  | Tm(C) - Tm(Al) | ° C. | 26 | 26 | 26 | 26 | 26 | 26 | 26 |
|  |  | S(0) | wt % | 1.3 | 1.3 | 1.3 | 1.3 | 1.3 | 1.3 | 1.3 |
| Film properties after 30 minutes of heat treatment at 121° C. | Appearance |  | — | ○ | ○ | ○ | ○ | ○ | ○ | ○ |
|  | Total haze |  | % | 20 | 15 | 13 | 15 | 13 | 13 | 13 |
|  | Tensile modulus | MD | MPa | 310 | 235 | 244 | 247 | 241 | 242 | 242 |
|  | Heat-sealing strength | 125° C. | gf/10 mm | 1893 | 1832 | 1881 | 1871 | 1832 | 1922 | 1850 |
|  |  | 130° C. |  | 2585 | 2923 | 2912 | 2844 | 2863 | 2917 | 2904 |
|  |  | 135° C. |  | 3211 | 3178 | 3232 | 3128 | 3138 | 3211 | 3170 |
|  |  | 140° C. |  | 3496 | 3350 | 3374 | 3343 | 3344 | 3418 | 3339 |
|  |  | 145° C. |  | 3673 | 3543 | 3598 | 3575 | 3601 | 3518 | 3616 |
|  |  | 150° C. |  | 4704 | 4644 | 4641 | 4616 | 4528 | 4532 | 4553 |
|  |  | 155° C. |  | 5037 | 5177 | 5171 | 5144 | 5145 | 5207 | 5191 |
|  |  | 160° C. |  | 5171 | 5305 | 5239 | 5317 | 5251 | 5283 | 5311 |
|  | Cumulative bag drop test | 50 cm | — | ○○/○○ | ○○/○○ | ○○/○○ | ○○/○○ | ○○/○○ | ○○/○○ | ○○/○○ |
|  |  | 100 cm |  | ○X/○X | ○○/○○ | ○○/○○ | ○○/○○ | ○○/○○ | ○○/○○ | ○○/○○ |
|  |  | 150 cm |  | —/— | X/○X | X/○X | X/○X | ○X/X | X/○X | ○X/X |
|  |  | 200 cm |  | —/— | —/— | —/— | —/— | —/— | —/— | —/— |

TABLE 47

|  |  |  |  | EX 118 | EX 119 | EX 120 | EX 121 | EX 122 | EX 123 | EX 124 |
|---|---|---|---|---|---|---|---|---|---|---|
| Layer compositions and resin formulations | Outer layer | Component (D) | — | PP(D-1) | PP(D-1) | PP(D-1) | PP(D-2) | PP(D-3) | PP(D-4) | PP(D-4) |
|  |  | amount | wt % | 100 | 100 | 100 | 100 | 100 | 100 | 90 |
|  |  | Component (D3) | — | — | — | — | — | — | — | PE(D3-1) |
|  |  | amount | wt % | — | — | — | — | — | — | 10 |
|  |  | Other components | — | — | — | — | — | — | — | — |
|  |  | amount | wt % | — | — | — | — | — | — | — |
|  | Inner layer | Component (A) | — | PP(A-1) | PP(A-1) | PP(A-1) | PP(A-1) | PP(A-1) | PP(A-1) | PP(A-1) |
|  |  | amount | wt % | 70 | 70 | 65 | 70 | 70 | 70 | 70 |
|  |  | Component (B) | — | PE(B-1) | PE(B-1) | PE(B-1) | PE(B-1) | PE(B-1) | PE(B-1) | PE(B-1) |
|  |  | amount | wt % | 20 | 20 | 20 | 20 | 20 | 20 | 20 |
|  |  | Component (C) | — | PP(C-3) | PP(C-4) | PP(C-5) | PP(C-1) | PP(C-1) | PP(C-1) | PP(C-1) |
|  |  | amount | wt % | 10 | 10 | 15 | 10 | 10 | 10 | 10 |
|  |  | Other components | — | — | — | — | — | — | — | — |
|  |  | amount | wt % | — | — | — | — | — | — | — |
|  |  | Tm(C) - Tm(Al) | ° C. | 31 | 31 | 32 | 31 | 31 | 31 | 31 |
|  | Innermost layer | Component (K) | — | PP(K-16) | PP(K-16) | PP(K-16) | PP(K-16) | PP(K-16) | PP(K-16) | PP(K-16) |
|  |  | amount | wt % | 70 | 70 | 70 | 70 | 70 | 70 | 70 |
|  |  | Component (H) | — | PE(H-1) | PE(H-1) | PE(H-1) | PE(H-1) | PE(H-1) | PE(H-1) | PE(H-1) |
|  |  | amount | wt % | 20 | 20 | 20 | 20 | 20 | 20 | 20 |
|  |  | Component (I) | — | PP(I-1) | PP(I-1) | PP(I-1) | PP(I-1) | PP(I-1) | PP(I-1) | PP(I-1) |
|  |  | amount | wt % | 10 | 10 | 10 | 10 | 10 | 10 | 10 |
|  |  | Other components | — | — | — | — | — | — | — | — |
|  |  | amount | wt % | — | — | — | — | — | — | — |
|  |  | Tm(C) - Tm(Al) | ° C. | 26 | 26 | 26 | 26 | 26 | 26 | 26 |
|  |  | S(0) | wt % | 1.3 | 1.3 | 1.3 | 1.3 | 1.3 | 1.3 | 1.3 |
| Film properties after 30 minutes of heat treatment at 121° C. | Appearance |  | — | ○ | ○ | ○ | ○ | ○ | ○ | ○ |
|  | Total haze |  | % | 13 | 13 | 12 | 13 | 15 | 16 | 12 |
|  | Tensile modulus | MD | MPa | 239 | 245 | 232 | 262 | 270 | 221 | 215 |
|  | Heat-sealing strength | 125° C. | gf/10 mm | 1943 | 1878 | 1915 | 1786 | 1763 | 1562 | 1436 |
|  |  | 130° C. |  | 2846 | 2857 | 2935 | 2861 | 2884 | 2672 | 2579 |
|  |  | 135° C. |  | 3186 | 3194 | 3189 | 3182 | 3168 | 3069 | 3248 |
|  |  | 140° C. |  | 3346 | 3426 | 3376 | 3443 | 3339 | 3147 | 3228 |
|  |  | 145° C. |  | 3633 | 3579 | 3606 | 3520 | 3592 | 3369 | 3285 |
|  |  | 150° C. |  | 4535 | 4528 | 4540 | 4594 | 4622 | 4394 | 4290 |
|  |  | 155° C. |  | 5166 | 5230 | 5225 | 5179 | 5164 | 4923 | 4833 |
|  |  | 160° C. |  | 5281 | 5302 | 5244 | 5241 | 5269 | 5075 | 4949 |
|  | Cumulative bag drop test | 50 cm | — | ○○/○○ | ○○/○○ | ○○/○○ | ○○/○○ | ○○/○○ | ○○/○○ | ○○/○○ |
|  |  | 100 cm |  | ○○/○○ | ○○/○○ | ○○/○○ | ○○/○○ | ○○/○○ | ○○/○○ | ○○/○○ |
|  |  | 150 cm |  | X/○X | ○X/X | X/○○ | ○○/○○ | ○○/○○ | ○○/○○ | ○○/○○ |
|  |  | 200 cm |  | —/— | —/— | —/X | ○○/○○ | ○○/○○ | ○○/○○ | ○○/○○ |

TABLE 48

|  |  |  |  | EX 125 | EX 126 | EX 127 | EX 128 | EX 129 | EX 130 | EX 131 |
|---|---|---|---|---|---|---|---|---|---|---|
| Layer compositions and resin formulations | Outer layer | Component (D) | — | PP(D-4) | PP(D-1) | PP(D-1) | PP(D-1) | PP(D-1) | PP(D-1) | PP(D-1) |
|  |  | amount | wt % | 100 | 100 | 100 | 100 | 100 | 100 | 100 |
|  |  | Component (D3) | — | — | — | — | — | — | — | — |
|  |  | amount | wt % | — | — | — | — | — | — | — |
|  |  | Other components | — | — | — | — | — | — | — | — |
|  |  | amount | wt % | — | — | — | — | — | — | — |
|  | Inner layer | Component (A) | — | PP(A-1) | PP(A-1) | PP(A-1) | PP(A-1) | PP(A-1) | PP(A-1) | PP(A-1) |
|  |  | amount | wt % | 65 | 70 | 70 | 70 | 70 | 70 | 70 |
|  |  | Component (B) | — | PE(B-1) | PE(B-1) | PE(B-1) | PE(B-1) | PE(B-1) | PE(B-1) | PE(B-1) |
|  |  | amount | wt % | 20 | 20 | 20 | 20 | 20 | 20 | 20 |
|  |  | Component (C) | — | PP(C-5) | PP(C-1) | PP(C-1) | PP(C-1) | PP(C-1) | PP(C-1) | PP(C-1) |
|  |  | amount | wt % | 15 | 10 | 10 | 10 | 10 | 10 | 10 |
|  |  | Other components | — | — | — | — | — | — | — | — |
|  |  | amount | wt % | — | — | — | — | — | — | — |
|  |  | Tm(C) - Tm(Al) | ° C. | 32 | 31 | 31 | 31 | 31 | 31 | 31 |
|  | Innermost layer | Component (K) | — | PP(K-16) | PP(K-16) | PP(K-17) | PP(K-18) | PP(K-19) | PP(K-20) | PP(K-16) |
|  |  | amount | wt % | 70 | 80 | 70 | 70 | 70 | 70 | 70 |
|  |  | Component (H) | — | PE(H-1) | PE(H-3) | PE(H-1) | PE(H-1) | PE(H-1) | PE(H-1) | PE(H-2) |
|  |  | amount | wt % | 20 | 20 | 20 | 20 | 20 | 20 | 20 |
|  |  | Component (I) | — | PP(I-1) | — | PP(I-1) | PP(I-1) | PP(I-1) | PP(I-1) | PP(I-1) |
|  |  | amount | wt % | 10 | — | 10 | 10 | 10 | 10 | 10 |
|  |  | Other components | — | — | — | — | — | — | — | — |
|  |  | amount | wt % | — | — | — | — | — | — | — |
|  |  | Tm(C) - Tm(Al) | ° C. | 26 | — | 19 | 22 | 53 | 0 | 26 |
|  |  | S(0) | wt % | 1.3 | 1.1 | 1.5 | 1.1 | 1.3 | 1.5 | 1.4 |
| Film properties after 30 minutes of heat treatment at 121° C. | Appearance |  | — | ○ | ○— | ○ | ○ | ○ | ○— | ○ |
|  | Total haze |  | % | 15 | 15 | 13 | 13 | 16 | 17 | 15 |
|  | Tensile modulus | MD | MPa | 209 | 235 | 238 | 241 | 241 | 240 | 235 |
|  | Heat-sealing strength | 125° C. | gf/10 mm | 1764 | 2101 | 1860 | 1930 | 1908 | 1936 | 1870 |
|  |  | 130° C. |  | 2902 | 3018 | 2949 | 2879 | 2889 | 2850 | 2912 |
|  |  | 135° C. |  | 3208 | 3124 | 3238 | 3194 | 3221 | 3181 | 3195 |
|  |  | 140° C. |  | 3433 | 3451 | 3332 | 3415 | 3357 | 3415 | 3388 |
|  |  | 145° C. |  | 3593 | 3512 | 3576 | 3554 | 3569 | 3610 | 3540 |
|  |  | 150° C. |  | 4564 | 4681 | 4617 | 4607 | 4529 | 4596 | 4632 |
|  |  | 155° C. |  | 5206 | 5123 | 5205 | 5184 | 5249 | 5166 | 5193 |
|  |  | 160° C. |  | 5356 | 5234 | 5261 | 5262 | 5310 | 5284 | 5309 |
|  | Cumulative bag drop test | 50 cm | — | ○○/○○ | ○○/○○ | ○○/○○ | ○○/○○ | ○○/○○ | ○○/○○ | ○○/○○ |
|  |  | 100 cm |  | ○○/○○ | ○○/○○ | ○○/○○ | ○○/○○ | ○○/○○ | ○○/○○ | ○○/○○ |
|  |  | 150 cm |  | ○○/○○ | X/X | X/○X | ○X/X | X/○X | ○X/X | X/○X |
|  |  | 200 cm |  | ○○/○○ | —/— | —/— | —/— | —/— | —/— | —/— |

TABLE 49

|  |  |  |  | EX 132 | EX 133 | EX 134 | EX 135 |
|---|---|---|---|---|---|---|---|
| Layer compositions and resin formulations | Outer layer | Component (D) | — | PP(D-1) | PP(D-1) | PP(D-1) | PP(D-1) |
|  |  | amount | wt % | 100 | 100 | 100 | 100 |
|  |  | Component (D3) | — | — | — | — | — |
|  |  | amount | wt % | — | — | — | — |
|  |  | Other components | — | — | — | — | — |
|  |  | amount | wt % | — | — | — | — |
|  | Inner layer | Component (A) | — | PP(A-1) | PP(A-1) | PP(A-1) | PP(A-1) |
|  |  | amount | wt % | 60 | 50 | 70 | 70 |
|  |  | Component (B) | — | PE(B-1) | PE(B-1) | PE(B-1) | PE(B-1) |
|  |  | amount | wt % | 20 | 20 | 20 | 20 |
|  |  | Component (C) | — | PP(C-1) | PP(C-1) | PP(C-1) | PP(C-1) |
|  |  | amount | wt % | 10 | 10 | 10 | 10 |
|  |  | Other components | — | 7125 | 7125 | — | — |
|  |  | amount | wt % | 10 | 20 | — | — |
|  |  | Tm(C) - Tm(Al) | ° C. | 31 | 31 | 31 | 31 |
|  | Innermost layer | Component (K) | — | PP(K-16) | PP(K-16) | PP(K-16) | PP(K-16) |
|  |  | amount | wt % | 70 | 70 | 60 | 60 |
|  |  | Component (H) | — | PE(H-1) | PE(H-1) | PE(H-1) | PE(H-1) |
|  |  | amount | wt % | 20 | 20 | 20 | 10 |
|  |  | Component (I) | — | PP(I-1) | PP(I-1) | PP(I-1) | PP(I-1) |
|  |  | amount | wt % | 10 | 10 | 10 | 30 |
|  |  | Other components | — | — | — | 7125 | — |
|  |  | amount | wt % | — | — | 10 | — |
|  |  | Tm(C) - Tm(Al) | ° C. | 26 | 26 | 26 | 26 |
|  |  | S(0) | wt % | 1.3 | 1.3 | 10 | 1.1 |
| Film properties after 30 minutes | Appearance |  | — | ○ | ○ | ○ | ○ |
|  | Total haze |  | % | 12 | 11 | 12 | 21 |
|  | Tensile modulus | MD | MPa | 231 | 196 | 228 | 312 |

TABLE 49-continued

|  |  |  |  | EX 132 | EX 133 | EX 134 | EX 135 |
|---|---|---|---|---|---|---|---|
| of heat treatment at 121° C. | Heat-sealing strength | 125° C. | gf/10 mm | 1771 | 1533 | 2095 | 416 |
|  |  | 130° C. |  | 2859 | 2764 | 3309 | 769 |
|  |  | 135° C. |  | 3661 | 3425 | 3518 | 1301 |
|  |  | 140° C. |  | 3698 | 3734 | 3653 | 1786 |
|  |  | 145° C. |  | 3966 | 3981 | 3884 | 1854 |
|  |  | 150° C. |  | 5047 | 5058 | 5043 | 1941 |
|  |  | 155° C. |  | 5683 | 5759 | 5689 | 2070 |
|  |  | 160° C. |  | 5794 | 5736 | 5785 | 2620 |
|  | Cumulative bag drop test | 50 cm | — | ○○/○○ | ○○/○○ | ○○/○○ | ○○/○○ |
|  |  | 100 cm |  | ○○/○○ | ○○/○○ | ○○/○○ | ○○/○○ |
|  |  | 150 cm |  | ○X/○○ | ○○/○○ | ○X/○○ | X/X |
|  |  | 200 cm |  | —/X | ○X/○X | —/X | —/— |

TABLE 50

|  |  |  |  | Comp. Ex. 19 | Comp. Ex. 20 | Comp. Ex. 21 | Comp. Ex. 22 | Comp. Ex. 23 | Comp. Ex. 24 | Comp. Ex. 25 |
|---|---|---|---|---|---|---|---|---|---|---|
| Layer compositions and resin formulations | Outer layer | Component (D) | — | PP(D-1) | PP(D-1) | PP(D-1) | PP(D-1) | PP(D-1) | PP(D-1) | PP(D-1) |
|  |  | amount | wt % | 100 | 100 | 100 | 100 | 100 | 100 | 100 |
|  |  | Component (D3) | — | — | — | — | — | — | — | — |
|  |  | amount | wt % | — | — | — | — | — | — | — |
|  |  | Other components | — | — | — | — | — | — | — | — |
|  |  | amount | wt % | — | — | — | — | — | — | — |
|  | Inner layer | Component (A) | — | PP(A-1) | PP(A-1) | PP(A-1) | PP(A-1) | PP(A-10) | PP(A-14) | PP(A-1) |
|  |  | amount | wt % | 100 | 50 | 70 | 50 | 70 | 70 | 70 |
|  |  | Component (B) | — | — | PE(B-1) | — | PE(B-1) | PE(B-1) | PE(B-1) | PE(B-7) |
|  |  | amount | wt % | — | 50 | — | 40 | 20 | 20 | 20 |
|  |  | Component (C) | — | — | — | PP(C-1) | PP(C-1) | PP(C-1) | PP(C-1) | PP(C-1) |
|  |  | amount | wt % | — | — | 30 | 10 | 10 | 10 | 10 |
|  |  | Other components | — | — | — | — | — | — | — | — |
|  |  | amount | wt % | — | — | — | — | — | — | — |
|  |  | Tm(C) - Tm(A1) | ° C. | — | — | 31 | 31 | 41 | 31 | 31 |
|  | Innermost layer | Component (K) | — | PP(K-16) | PP(K-16) | PP(K-16) | PP(K-16) | PP(K-16) | PP(K-16) | PP(K-16) |
|  |  | amount | wt % | 70 | 70 | 70 | 70 | 70 | 70 | 70 |
|  |  | Component (H) | — | PE(H-1) | PE(H-1) | PE(H-1) | PE(H-1) | PE(H-1) | PE(H-1) | PE(H-1) |
|  |  | amount | wt % | 20 | 20 | 20 | 20 | 20 | 20 | 20 |
|  |  | Component (I) | — | PP(I-1) | PP(I-1) | PP(I-1) | PP(I-1) | PP(I-1) | PP(I-1) | PP(I-1) |
|  |  | amount | wt % | 10 | 10 | 10 | 10 | 10 | 10 | 10 |
|  |  | Other components | — | — | — | — | — | — | — | — |
|  |  | amount | wt % | — | — | — | — | — | — | — |
|  |  | Tm(C) - Tm(A1) | ° C. | 26 | 26 | 26 | 26 | 26 | 26 | 26 |
|  |  | S(0) | wt % | 1.3 | 1.3 | 1.3 | 1.3 | 1.3 | 1.3 | 1.3 |
| Film properties after 30 minutes of heat treatment at 121° C. | Appearance |  | — | ○ | Pockmarked pattern arose due to inadequate heat resistance; good samples could not be obtained | ○ | Δ | ○ | ○ | ○ |
|  | Total haze |  | % | 10 |  | 28 | 27 | 15 | 13 | 35 |
|  | Tensile modulus | MD | MPa | 235 |  | 332 | 219 | 240 | 293 | 262 |
|  | Heat-sealing strength | 125° C. | gf/10 mm | 1578 |  | 1977 | 1249 | 1896 | 1862 | 1869 |
|  |  | 130° C. |  | 2192 |  | 2406 | 2002 | 2553 | 2588 | 2820 |
|  |  | 135° C. |  | 2844 |  | 2787 | 2609 | 3213 | 3226 | 3196 |
|  |  | 140° C. |  | 3281 |  | 3224 | 3291 | 3514 | 3507 | 3377 |
|  |  | 145° C. |  | 3481 |  | 3383 | 4063 | 3670 | 3667 | 3572 |
|  |  | 150° C. |  | 4491 |  | 3884 | 4265 | 4701 | 4727 | 4534 |
|  |  | 155° C. |  | 4482 |  | 4473 | 4434 | 5065 | 5053 | 5217 |
|  |  | 160° C. |  | 4689 |  | 4622 | 4627 | 5182 | 5187 | 5321 |
|  | Cumulative bag drop test | 50 cm | — | X/X |  | X/X | ○○/○○ | ○○/○○ | ○○/○○ | X/○X |
|  |  | 100 cm |  | —/— |  | —/— | ○X/○○ | ○○/○X | ○X/○X | —/— |
|  |  | 150 cm |  | —/— |  | —/— | —/○X | ○X/— | ○X/— | —/— |
|  |  | 200 cm |  | —/— |  | —/— | —/— | —/— | —/— | —/— |

TABLE 51

|  |  |  |  | Comp. Ex. 26 | Comp. Ex. 27 |
|---|---|---|---|---|---|
| Layer compositions and resin formulations | Outer layer | Component (D) | — | PP(D-1) | PP(D-5) |
|  |  | amount | wt % | 100 | 100 |
|  |  | Component (D3) | — | — | — |
|  |  | amount | wt % | — | — |
|  |  | Other components | — | — | — |
|  |  | amount | wt % | — | — |

TABLE 51-continued

|  |  |  |  | Comp. Ex. 26 | Comp. Ex. 27 |
|---|---|---|---|---|---|
|  | Inner layer | Component (A) | — | PP(A-1) | PP(A-1) |
|  |  | amount | wt % | 70 | 70 |
|  |  | Component (B) | — | PE(B-8) | PE(B-1) |
|  |  | amount | wt % | 20 | 20 |
|  |  | Component (C) | — | PP(C-1) | PP(C-1) |
|  |  | amount | wt % | 10 | 10 |
|  |  | Other components | — | — | — |
|  |  | amount | wt % | — | — |
|  |  | Tm(C)-Tm(Al) | ° C. | 31 | 31 |
|  | Innermost layer | Component (K) | — | PP(K-16) | PP(K-16) |
|  |  | amount | wt % | 70 | 70 |
|  |  | Component (H) | — | PE(H-1) | PE(H-1) |
|  |  | amount | wt % | 20 | 20 |
|  |  | Component (I) | — | PP(I-1) | PP(I-1) |
|  |  | amount | wt % | 10 | 10 |
|  |  | Other components | — | — | — |
|  |  | amount | wt % | — | — |
|  |  | Tm(C)-Tm(Al) | ° C. | 26 | 26 |
|  |  | S(0) | wt % | 1.3 | 1.3 |
| Film properties after 30 minutes of heat treatment at 121° C. | Appearance | — | — | ○ | Pockmarked pattern arose due to inadequate heat resistance; good samples were not obtained |
|  | Total haze |  | % | 26 |  |
|  | Tensile modulus | MD | MPa | 287 |  |
|  | Heat-sealing strength | 125° C. | gf/10 mm | 1600 |  |
|  |  | 130° C. |  | 2123 |  |
|  |  | 135° C. |  | 2877 |  |
|  |  | 140° C. |  | 3386 |  |
|  |  | 145° C. |  | 3570 |  |
|  |  | 150° C. |  | 4633 |  |
|  |  | 155° C. |  | 5200 |  |
|  |  | 160° C. |  | 5259 |  |
|  | Cumulative bag drop test | 50 cm |  | — |  |
|  |  | 100 cm |  | ○○/○○ |  |
|  |  |  |  | ○○/○○ |  |
|  |  | 150 cm |  | ○X/X |  |
|  |  | 200 cm |  | —/— |  |

TABLE 52

|  |  |  |  | Ref. Ex. 24 | Ref. Ex. 25 | Ref. Ex. 26 | Ref. Ex. 27 | Ref. Ex. 28 | Ref. Ex. 29 | Ref. Ex. 30 |
|---|---|---|---|---|---|---|---|---|---|---|
| Layer compositions and resin formulations | Outer layer | Component (D) | — | PP(D-1) | PP(D-1) | PP(D-1) | PP(D-1) | PP(D-4) | PP(D-1) | PP(D-1) |
|  |  | amount | wt % | 100 | 100 | 100 | 100 | 90 | 100 | 100 |
|  |  | Component (D3) | — | — | — | — | — | — | PE(D3-2) | — |
|  |  | amount | wt % | — | — | — | — | 10 | — | — |
|  |  | Other components | — | — | — | — | — | — | — | — |
|  |  | amount | wt % | — | — | — | — | — | — | — |
|  | Inner layer | Component (A) | — | PP(A-1) | PP(A-1) | PP(A-1) | PP(A-1) | PP(A-1) | PP(A-1) | PP(A-1) |
|  |  | amount | wt % | 60 | 70 | 70 | 70 | 70 | 70 | 70 |
|  |  | Component (B) | — | PE(B-1) | PE(B-1) | PE(B-1) | PE(B-1) | PE(B-1) | PE(B-1) | PE(B-1) |
|  |  | amount | wt % | 10 | 20 | 20 | 20 | 20 | 20 | 20 |
|  |  | Component (C) | — | PP(C-1) | PP(C-6) | PP(C-7) | PP(C-8) | PP(C-1) | PP(C-1) | PP(C-1) |
|  |  | amount | wt % | 30 | 10 | 10 | 10 | 10 | 10 | 10 |
|  |  | Other components | — | — | — | — | — | — | — | — |
|  |  | amount | wt % | — | — | — | — | — | — | — |
|  |  | Tm(C) - Tm(Al) | ° C. | 31 | 5 | −5 | 31 | 31 | 31 | 31 |
|  | Innermost layer | Component (K) | — | PP(K-16) | PP(K-16) | PP(K-16) | PP(K-16) | PP(K-16) | PP(K-16) | PP(K-16) |
|  |  | amount | wt % | 70 | 70 | 70 | 70 | 70 | 100 | 50 |
|  |  | Component (H) | — | PE(H-1) | PE(H-1) | PE(H-1) | PE(H-1) | PE(H-1) | — | PE(H-1) |
|  |  | amount | wt % | 20 | 20 | 20 | 20 | 20 | — | 50 |
|  |  | Component (I) | — | PP(I-1) | PP(I-1) | PP(I-1) | PP(I-1) | PP(I-1) | — | — |
|  |  | amount | wt % | 10 | 10 | 10 | 10 | 10 | — | — |
|  |  | Other components | — | — | — | — | — | — | — | — |
|  |  | amount | wt % | — | — | — | — | — | — | — |
|  |  | Tm(C) - Tm(Al) | ° C. | 26 | 26 | 26 | 26 | 26 | — | — |
|  |  | S(0) | wt % | 1.3 | 1.3 | 1.3 | 1.3 | 1.3 | 1.3 | 1.5 |
| Film properties after 30 minutes of heat treatment at 121° C. | Appearance | — | — | ○ | ○ | ○ | ○ | ○ | Δ | Internal fusion due to inadequate heat resistance occurred during steriliza- |
|  | Total haze |  | % | 28 | 14 | 14 | 21 | 28 | 29 |  |
|  | Tensile modulus | MD | MPa | 326 | 225 | 220 | 306 | 234 | 230 |  |
|  | Heat-sealing strength | 125° C. | gf/10 mm | 1256 | 1729 | 1678 | 1374 | 1603 | 2019 |  |
|  |  | 130° C. |  | 1985 | 2670 | 2698 | 1893 | 2728 | 3041 |  |
|  |  | 135° C. |  | 2593 | 2971 | 3032 | 2610 | 3407 | 3391 |  |
|  |  | 140° C. |  | 3291 | 3177 | 3159 | 3549 | 3418 | 3321 |  |
|  |  | 145° C. |  | 4022 | 3377 | 3363 | 3631 | 3437 | 3594 |  |

TABLE 52-continued

|  |  |  | Ref. Ex. 24 | Ref. Ex. 25 | Ref. Ex. 26 | Ref. Ex. 27 | Ref. Ex. 28 | Ref. Ex. 29 | Ref. Ex. 30 |
|---|---|---|---|---|---|---|---|---|---|
|  |  | 150° C. | 4278 | 4357 | 4358 | 4099 | 4441 | 4538 | tion; |
|  |  | 155° C. | 4405 | 5015 | 5005 | 4719 | 5003 | 5023 | could |
|  |  | 160° C. | 4625 | 5150 | 5122 | 5045 | 5122 | 5285 | not be |
|  | Cumulative | 50 cm | — | X/X | ○○/X | ○X/○X | ○○/○○ | ○○/○○ | XX | evaluated |
|  | bag drop | 100 cm |  | —/— | ○X/— | —/— | ○X/○○ | ○○/○○ | —/— |
|  | test | 150 cm |  | —/— | —/— | —/— | —/X | ○○/○○ | —/— |
|  |  | 200 cm |  | —/— | —/— | —/— | —/— | ○○/○○ | —/— |

TABLE 53

|  |  |  |  | Ref. Ex. 31 | Ref. Ex. 32 | Ref. Ex. 33 | Ref. Ex. 34 | Ref. Ex. 35 | Ref. Ex. 36 | Ref. Ex. 37 |
|---|---|---|---|---|---|---|---|---|---|---|
| Layer compositions and resin formulations | Outer layer | Component (D) | — | PP(D-1) | PP(D-1) | PP(D-1) | PP(D-1) | PP(D-1) | PP(D-1) | PP(D-1) |
|  |  | amount | wt % | 100 | 100 | 100 | 100 | 100 | 100 | 100 |
|  |  | Component (D3) | — | — | — | — | — | — | — | — |
|  |  | amount | wt % | — | — | — | — | — | — | — |
|  |  | Other components | — | — | — | — | — | — | — | — |
|  |  | amount | wt % | — | — | — | — | — | — | — |
|  | Inner layer | Component (A) | — | PP(A-1) | PP(A-1) | PP(A-1) | PP(A-1) | PP(A-1) | PP(A-1) | PP(A-1) |
|  |  | amount | wt % | 70 | 70 | 70 | 70 | 70 | 70 | 70 |
|  |  | Component (B) | — | PE(B-1) | PE(B-1) | PE(B-1) | PE(B-1) | PE(B-1) | PE(B-1) | PE(B-1) |
|  |  | amount | wt % | 20 | 20 | 20 | 20 | 20 | 20 | 20 |
|  |  | Component (C) | — | PP(C-1) | PP(C-1) | PP(C-1) | PP(C-1) | PP(C-1) | PP(C-1) | PP(C-1) |
|  |  | amount | wt % | 10 | 10 | 10 | 10 | 10 | 10 | 10 |
|  |  | Other components | — | — | — | — | — | — | — | — |
|  |  | amount | wt % | — | — | — | — | — | — | — |
|  |  | Tm(C) − Tm(Al) | ° C. | 31 | 31 | 31 | 31 | 31 | 31 | 31 |
|  | Innermost layer | Component (K) | — | PP(K-16) | PP(K-16) | PP(K-21) | PP(K-22) | PP(K-23) | PP(K-24) | PP(K-25) |
|  |  | amount | wt % | 70 | 40 | 70 | 70 | 70 | 70 | 70 |
|  |  | Component (H) | — | — | PE(H-1) | PE(H-1) | PE(H-1) | PE(H-1) | PE(H-1) | PE(H-1) |
|  |  | amount | wt % | — | 50 | 20 | 20 | 20 | 20 | 20 |
|  |  | Component (I) | — | PP(I-1) | PP(I-1) | PP(I-1) | PP(I-1) | PP(I-1) | PP(I-1) | PP(I-1) |
|  |  | amount | wt % | 30 | 10 | 10 | 10 | 10 | 10 | 10 |
|  |  | Other components | — | — | — | — | — | — | — | — |
|  |  | amount | wt % | — | — | — | — | — | — | — |
|  |  | Tm(C) − Tm(Al) | ° C. | 26 | 26 | 26 | — | 26 | 26 | 53 |
|  |  | S(0) | wt % | 1 | 1.3 | 0.4 | 2.2 | 0.8 | 1.9 | 1.3 |
| Film properties after 30 minutes of heat treatment at 121° C. | Appearance |  | — | ○ | Internal fusion due to inadequate heat resistance occurred during sterilization; could not be evaluated | ○ | Internal fusion due to inadequate heat resistance occurred during sterilization; could not be evaluated | ○ | Internal fusion due to inadequate heat resistance occurred during sterilization; could not be evaluated | Internal fusion due to inadequate heat resistance occurred during sterilization; could not be evaluated |
|  | Total haze |  | % | 22 |  | 22 |  | 21 |  |  |
|  | Tensile modulus | MD | MPa | 318 |  | 329 |  | 319 |  |  |
|  | Heat-sealing strength | 125° C. | gf/10 mm | 233 |  | 2065 |  | 1905 |  |  |
|  |  | 130° C. |  | 633 |  | 3008 |  | 2854 |  |  |
|  |  | 135° C. |  | 1069 |  | 3226 |  | 3153 |  |  |
|  |  | 140° C. |  | 1724 |  | 3507 |  | 3439 |  |  |
|  |  | 145° C. |  | 1805 |  | 3689 |  | 3535 |  |  |
|  |  | 150° C. |  | 2055 |  | 4475 |  | 4611 |  |  |
|  |  | 155° C. |  | 2162 |  | 4874 |  | 5143 |  |  |
|  |  | 160° C. |  | 2548 |  | 5032 |  | 5306 |  |  |
|  | Cumulative bag drop test | 50 cm |  | X/X |  | ○○/○○ |  | ○○/○○ |  |  |
|  |  | 100 cm |  | —/— |  | ○○/○X |  | ○X/○○ |  |  |
|  |  | 150 cm |  | —/— |  | X/— |  | —/○X |  |  |
|  |  | 200 cm |  | —/— |  | —/— |  | —/— |  |  |

TABLE 54

|  |  |  |  | Ref. Ex. 38 | Ref. Ex. 39 | Ref. Ex. 40 | Ref. Ex. 41 | Ref. Ex. 42 | Ref. Ex. 43 |
|---|---|---|---|---|---|---|---|---|---|
| Layer compositions and resin formulations | Outer layer | Component (D) | — | PP(D-1) | PP(D-1) | PP(D-1) | PP(D-1) | PP(D-1) | PP(D-1) |
|  |  | amount | wt % | 100 | 100 | 100 | 100 | 100 | 100 |
|  |  | Component (D3) | — | — | — | — | — | — | — |
|  |  | amount | wt % | — | — | — | — | — | — |
|  |  | Other components | — | — | — | — | — | — | — |
|  |  | amount | wt % | — | — | — | — | — | — |

TABLE 54-continued

|  |  |  |  | Ref. Ex. 38 | Ref. Ex. 39 | Ref. Ex. 40 | Ref. Ex. 41 | Ref. Ex. 42 | Ref. Ex. 43 |
|---|---|---|---|---|---|---|---|---|---|
|  | Inner layer | Component (A) | — | PP(A-1) | PP(A-1) | PP(A-1) | PP(A-1) | PP(A-1) | PP(A-1) |
|  |  | amount | wt % | 70 | 70 | 70 | 70 | 70 | 70 |
|  |  | Component (B) | — | PE(B-1) | PE(B-1) | PE(B-1) | PE(B-1) | PE(B-1) | PE(B-1) |
|  |  | amount | wt % | 20 | 20 | 20 | 20 | 20 | 20 |
|  |  | Component (C) | — | PP(C-1) | PP(C-1) | PP(C-1) | PP(C-1) | PP(C-1) | PP(C-1) |
|  |  | amount | wt % | 10 | 10 | 10 | 10 | 10 | 10 |
|  |  | Other components | — | — | — | — | — | — | — |
|  |  | amount | wt % | — | — | — | — | — | — |
|  |  | Tm(C) - Tm(Al) | °C. | 31 | 31 | 31 | 31 | 31 | 31 |
|  | Innermost layer | Component (K) | — | PP(K-26) | PP(K-27) | PP(K-28) | PP(K-16) | PP(K-16) | PP(K-16) |
|  |  | amount | wt % | 70 | 70 | 70 | 70 | 70 | 70 |
|  |  | Component (H) | — | PE(H-1) | PE(H-1) | PE(H-1) | PE(H-5) | PE(H-1) | PE(H-1) |
|  |  | amount | wt % | 20 | 20 | 20 | 20 | 20 | 20 |
|  |  | Component (I) | — | PP(I-1) | PP(I-1) | PP(I-1) | PP(I-1) | PP(I-4) | PP(I-5) |
|  |  | amount | wt % | 10 | 10 | 10 | 10 | 10 | 10 |
|  |  | Other components | — | — | — | — | — | — | — |
|  |  | amount | wt % | — | — | — | — | — | — |
|  |  | Tm(C) - Tm(Al) | °C. | 0 | 26 | 26 | 26 | 0 | −10 |
|  |  | S(0) | wt % | 1.4 | 0.4 | 13.4 | 1.2 | 1.3 | 1.3 |
| Film properties after 30 minutes of heat treatment at 121° C. | Appearance | | — | ○ | ○ | Δ | ○ | Internal fusion due to inadequate heat resistance occurred during sterilization; could not be evaluated | Internal fusion due to inadequate heat resistance occurred during sterilization; could not be evaluated |
|  | Total haze | | % | 31 | 28 | 29 | 28 | | |
|  | Tensile modulus | MD | MPa | 478 | 251 | 230 | 251 | | |
|  | Heat-sealing strength | 125° C. | gf/10 mm | 65 | 1597 | 1875 | 1629 | | |
|  |  | 130° C. |  | 251 | 2791 | 2867 | 2778 | | |
|  |  | 135° C. |  | 516 | 3058 | 3306 | 3039 | | |
|  |  | 140° C. |  | 771 | 3313 | 3303 | 3249 | | |
|  |  | 145° C. |  | 1353 | 3461 | 3554 | 3465 | | |
|  |  | 150° C. |  | 1636 | 4497 | 4569 | 4342 | | |
|  |  | 155° C. |  | 2129 | 4964 | 5021 | 4911 | | |
|  |  | 160° C. |  | 2846 | 4840 | 5252 | 4868 | | |
|  | Cumulative bag drop test | 50 cm | — | X/X | ○○/X | ○○/○○ | ○○/X | | |
|  |  | 100 cm |  | —/— | ○X/— | ○○/○○ | ○X/— | | |
|  |  | 150 cm |  | —/— | —/— | ○X/X | —/— | | |
|  |  | 200 cm |  | —/— | —/— | —/— | —/— | | |

TABLE 55

|  |  |  |  | EX 136 | EX 137 | EX 138 | EX 139 | EX 140 | EX 141 | EX 142 |
|---|---|---|---|---|---|---|---|---|---|---|
| Layer compositions and resin formulations | Outer layer | Component (D) | — | PP(D-1) | PP(D-1) | PP(D-1) | PP(D-1) | PP(D-1) | PP(D-1) | PP(D-1) |
|  |  | amount | wt % | 100 | 100 | 100 | 100 | 100 | 100 | 100 |
|  |  | Component (D3) | — | — | — | — | — | — | — | — |
|  |  | amount | wt % | — | — | — | — | — | — | — |
|  |  | Other components | — | — | — | — | — | — | — | — |
|  |  | amount | wt % | — | — | — | — | — | — | — |
|  | Inner layer | Component (A) | — | PP(A-18) | PP(A-18) | PP(A-19) | PP(A-20) | PP(A-21) | PP(A-22) | PP(A-23) |
|  |  | amount | wt % | 80 | 70 | 70 | 70 | 70 | 70 | 70 |
|  |  | Component (B) | — | PE(B-3) | PE(B-1) | PE(B-1) | PE(B-1) | PE(B-1) | PE(B-1) | PE(B-1) |
|  |  | amount | wt % | 20 | 20 | 20 | 20 | 20 | 20 | 20 |
|  |  | Component (C) | — | — | PP(C-1) | PP(C-1) | PP(C-1) | PP(C-1) | PP(C-1) | PP(C-1) |
|  |  | amount | wt % | — | 10 | 10 | 10 | 10 | 10 | 10 |
|  |  | Other components | — | — | — | — | — | — | — | — |
|  |  | amount | wt % | — | — | — | — | — | — | — |
|  |  | Tm(C) - Tm(Al) | °C. | — | 26 | 26 | 26 | 19 | 22 | 19 |
|  | Innermost layer | Component (K) | — | PP(K-1) | PP(K-1) | PP(K-1) | PP(K-1) | PP(K-1) | PP(K-1) | PP(K-1) |
|  |  | amount | wt % | 70 | 70 | 70 | 70 | 70 | 70 | 70 |
|  |  | Component (H) | — | PE(H-1) | PE(H-1) | PE(H-1) | PE(H-1) | PE(H-1) | PE(H-1) | PE(H-1) |
|  |  | amount | wt % | 20 | 20 | 20 | 20 | 20 | 20 | 20 |
|  |  | Component (I) | — | PP(I-1) | PP(I-1) | PP(I-1) | PP(I-1) | PP(I-1) | PP(I-1) | PP(I-1) |
|  |  | amount | wt % | 10 | 10 | 10 | 10 | 10 | 10 | 10 |
|  |  | Other components | — | — | — | — | — | — | — | — |
|  |  | amount | wt % | — | — | — | — | — | — | — |
|  |  | Tm(C) - Tm(Al) | °C. | 31 | 31 | 31 | 31 | 31 | 31 | 31 |
|  |  | S(0) | wt % | 2.2 | 2.2 | 2.2 | 2.2 | 2.2 | 2.2 | 2.2 |
| Film properties after 30 minutes of heat | Appearance | | — | ○ | ○ | ○ | ○ | ○ | ○ | ○ |
|  | Total haze | | % | 19 | 13 | 13 | 13 | 16 | 17 | 17 |
|  | Tensile modulus | MD | MPa | 200 | 240 | 238 | 241 | 260 | 251 | 255 |
|  | Heat- | 125° C. | gf/10 | 1024 | 1837 | 1896 | 1852 | 1839 | 1838 | 1863 |

TABLE 55-continued

|  |  |  |  | EX 136 | EX 137 | EX 138 | EX 139 | EX 140 | EX 141 | EX 142 |
|---|---|---|---|---|---|---|---|---|---|---|
| treatment at 121° C. | sealing strength | 130° C. | mm | 2456 | 2845 | 2895 | 2836 | 2872 | 2840 | 2891 |
|  |  | 135° C. |  | 3009 | 3190 | 3181 | 3175 | 3110 | 3189 | 3153 |
|  |  | 140° C. |  | 3254 | 3354 | 3312 | 3357 | 3379 | 3383 | 3400 |
|  |  | 145° C. |  | 3345 | 3520 | 3507 | 3533 | 3536 | 3531 | 3572 |
|  |  | 150° C. |  | 4157 | 4563 | 4577 | 4543 | 4503 | 4577 | 4578 |
|  |  | 155° C. |  | 4412 | 5165 | 5142 | 5133 | 5112 | 5172 | 5170 |
|  |  | 160° C. |  | 4351 | 5259 | 5211 | 5247 | 5240 | 5286 | 5271 |
|  | Cumulative bag drop test | 50 cm | — | ○○/○○ | ○○/○○ | ○○/○○ | ○○/○○ | ○○/○○ | ○○/○○ | ○○/○○ |
|  |  | 100 cm |  | ○○/○○ | ○○/○○ | ○○/○○ | ○○/○○ | ○○/○○ | ○○/○○ | ○○/○○ |
|  |  | 150 cm |  | X/X | X/○X | X/○X | ○X/X | X/○X | ○X/X | ○X/X |
|  |  | 200 cm |  | —/— | —/— | —/— | —/— | —/— | —/— | —/— |

TABLE 56

|  |  |  |  | EX 143 | EX 144 | EX 145 | EX 146 | EX 147 | EX 148 | EX 149 |
|---|---|---|---|---|---|---|---|---|---|---|
| Layer compositions and resin formulations | Outer layer | Component (D) | — | PP(D-1) | PP(D-1) | PP(D-1) | PP(D-1) | PP(D-1) | PP(D-1) | PP(D-1) |
|  |  | amount | wt % | 100 | 100 | 100 | 100 | 100 | 100 | 100 |
|  |  | Component (D3) | — | — | — | — | — | — | — | — |
|  |  | amount | wt % | — | — | — | — | — | — | — |
|  |  | Other components | — | — | — | — | — | — | — | — |
|  |  | amount | wt % | — | — | — | — | — | — | — |
|  | Inner layer | Component (A) | — | PP(A-18) | PP(A-18) | PP(A-18) | PP(A-18) | PP(A-18) | PP(A-18) | PP(A-18) |
|  |  | amount | wt % | 70 | 70 | 70 | 70 | 70 | 70 | 70 |
|  |  | Component (B) | — | PE(B-2) | PE(B-3) | PE(B-4) | PE(B-5) | PE(B-6) | PE(B-1) | PE(B-1) |
|  |  | amount | wt % | 20 | 20 | 20 | 20 | 20 | 20 | 20 |
|  |  | Component (C) | — | PP(C-1) | PP(C-1) | PP(C-1) | PP(C-1) | PP(C-1) | PP(C-2) | PP(C-3) |
|  |  | amount | wt % | 10 | 10 | 10 | 10 | 10 | 10 | 10 |
|  |  | Other components | — | — | — | — | — | — | — | — |
|  |  | amount | wt % | — | — | — | — | — | — | — |
|  |  | Tm(C) - Tm(Al) | ° C. | 26 | 26 | 26 | 26 | 26 | 26 | 26 |
|  | Innermost layer | Component (K) | — | PP(K-1) | PP(K-1) | PP(K-1) | PP(K-1) | PP(K-1) | PP(K-1) | PP(K-1) |
|  |  | amount | wt % | 70 | 70 | 70 | 70 | 70 | 70 | 70 |
|  |  | Component (H) | — | PE(H-1) | PE(H-1) | PE(H-1) | PE(H-1) | PE(H-1) | PE(H-1) | PE(H-1) |
|  |  | amount | wt % | 20 | 20 | 20 | 20 | 20 | 20 | 20 |
|  |  | Component (I) | — | PP(I-1) | PP(I-1) | PP(I-1) | PP(I-1) | PP(I-1) | PP(I-1) | PP(I-1) |
|  |  | amount | wt % | 10 | 10 | 10 | 10 | 10 | 10 | 10 |
|  |  | Other components | — | — | — | — | — | — | — | — |
|  |  | amount | wt % | — | — | — | — | — | — | — |
|  |  | Tm(C) - Tm(Al) | ° C. | 31 | 31 | 31 | 31 | 31 | 31 | 31 |
|  |  | S(0) | wt % | 2.2 | 2.2 | 2.2 | 2.2 | 2.2 | 2.2 | 2.2 |
| Film properties after 30 minutes of heat treatment at 121° C. | Appearance |  | — | ○ | ○ | ○ | ○ | ○ | ○ | ○ |
|  | Total haze |  | % | 15 | 13 | 15 | 13 | 13 | 13 | 13 |
|  | Tensile modulus | MD | MPa | 235 | 244 | 247 | 241 | 242 | 242 | 239 |
|  | Heat-sealing strength | 125° C. | gf/10 | 1802 | 1851 | 1816 | 1807 | 1881 | 1835 | 1895 |
|  |  | 130° C. | mm | 2871 | 2881 | 2814 | 2822 | 2899 | 2874 | 2830 |
|  |  | 135° C. |  | 3133 | 3173 | 3106 | 3123 | 3151 | 3118 | 3134 |
|  |  | 140° C. |  | 3336 | 3337 | 3312 | 3310 | 3358 | 3303 | 3306 |
|  |  | 145° C. |  | 3501 | 3553 | 3544 | 3539 | 3503 | 3575 | 3579 |
|  |  | 150° C. |  | 4586 | 4585 | 4600 | 4515 | 4511 | 4518 | 4517 |
|  |  | 155° C. |  | 5130 | 5109 | 5110 | 5110 | 5166 | 5177 | 5143 |
|  |  | 160° C. |  | 5249 | 5226 | 5300 | 5227 | 5267 | 5265 | 5246 |
|  | Cumulative bag drop test | 50 cm | — | ○○/○○ | ○○/○○ | ○○/○○ | ○○/○○ | ○○/○○ | ○○/○○ | ○○/○○ |
|  |  | 100 cm |  | ○○/○○ | ○○/○○ | ○○/○○ | ○○/○○ | ○○/○○ | ○○/○○ | ○○/○○ |
|  |  | 150 cm |  | X/○X | X/○X | X/○X | ○X/X | X/○X | ○X/X | X/○X |
|  |  | 200 cm |  | —/— | —/— | —/— | —/— | —/— | —/— | —/— |

TABLE 57

|  |  |  |  | EX 150 | EX 151 | EX 152 | EX 153 | EX 154 | EX 155 | EX 156 |
|---|---|---|---|---|---|---|---|---|---|---|
| Layer compositions and resin formulations | Outer layer | Component (D) | — | PP(D-1) | PP(D-1) | PP(D-2) | PP(D-3) | PP(D-4) | PP(D-4) | PP(D-4) |
|  |  | amount | wt % | 100 | 100 | 100 | 100 | 100 | 90 | 100 |
|  |  | Component (D3) | — | — | — | — | — | — | PE(D3-1) | — |
|  |  | amount | wt % | — | — | — | — | — | 10 | — |
|  |  | Other components | — | — | — | — | — | — | — | — |
|  |  | amount | wt % | — | — | — | — | — | — | — |

TABLE 57-continued

|  |  |  |  | EX 150 | EX 151 | EX 152 | EX 153 | EX 154 | EX 155 | EX 156 |
|---|---|---|---|---|---|---|---|---|---|---|
|  | Inner layer | Component (A) | — | PP(A-18) | PP(A-18) | PP(A-18) | PP(A-18) | PP(A-18) | PP(A-18) | PP(A-18) |
|  |  | amount | wt % | 70 | 65 | 70 | 70 | 70 | 70 | 65 |
|  |  | Component (B) | — | PE(B-1) | PE(B-1) | PE(B-1) | PE(B-1) | PE(B-1) | PE(B-1) | PE(B-1) |
|  |  | amount | wt % | 20 | 20 | 20 | 20 | 20 | 20 | 20 |
|  |  | Component (C) | — | PP(C-4) | PP(C-5) | PP(C-1) | PP(C-1) | PP(C-1) | PP(C-1) | PP(C-5) |
|  |  | amount | wt % | 10 | 15 | 10 | 10 | 10 | 10 | 15 |
|  |  | Other components | — | — | — | — | — | — | — | — |
|  |  | amount | wt % | — | — | — | — | — | — | — |
|  |  | Tm(C) - Tm(Al) | ° C. | 26 | 27 | 26 | 26 | 26 | 26 | 27 |
|  | Innermost layer | Component (K) | — | PP(K-1) | PP(K-1) | PP(K-1) | PP(K-1) | PP(K-1) | PP(K-1) | PP(K-1) |
|  |  | amount | wt % | 70 | 70 | 70 | 70 | 70 | 70 | 70 |
|  |  | Component (H) | — | PE(H-1) | PE(H-1) | PE(H-1) | PE(H-1) | PE(H-1) | PE(H-1) | PE(H-1) |
|  |  | amount | wt % | 20 | 20 | 20 | 20 | 20 | 20 | 20 |
|  |  | Component (I) | — | PP(I-1) | PP(I-1) | PP(I-1) | PP(I-1) | PP(I-1) | PP(I-1) | PP(I-1) |
|  |  | amount | wt % | 10 | 10 | 10 | 10 | 10 | 10 | 10 |
|  |  | Other components | — | — | — | — | — | — | — | — |
|  |  | amount | wt % | — | — | — | — | — | — | — |
|  |  | Tm(C) - Tm(Al) | ° C. | 31 | 31 | 31 | 31 | 31 | 31 | 31 |
|  |  | S(0) | wt % | 2.2 | 2.2 | 2.2 | 2.2 | 2.2 | 2.2 | 2.2 |
| Film properties after 30 minutes of heat treatment at 121° C. | Appearance | | — | ○ | ○ | ○ | ○ | ○ | ○ | ○ |
|  | Total haze | | % | 13 | 12 | 13 | 15 | 16 | 12 | 15 |
|  | Tensile modulus | MD | MPa | 245 | 232 | 262 | 270 | 221 | 215 | 209 |
|  | Heat-sealing strength | 125° C. | gf/10 mm | 1817 | 1866 | 1760 | 1726 | 1507 | 1394 | 1706 |
|  |  | 130° C. |  | 2844 | 2889 | 2845 | 2851 | 2632 | 2519 | 2871 |
|  |  | 135° C. |  | 3177 | 3171 | 3131 | 3128 | 3012 | 3198 | 3148 |
|  |  | 140° C. |  | 3388 | 3354 | 3398 | 3322 | 3103 | 3209 | 3399 |
|  |  | 145° C. |  | 3526 | 3572 | 3501 | 3560 | 3341 | 3228 | 3559 |
|  |  | 150° C. |  | 4510 | 4505 | 4575 | 4564 | 4345 | 4232 | 4503 |
|  |  | 155° C. |  | 5190 | 5186 | 5119 | 5126 | 4907 | 4794 | 5160 |
|  |  | 160° C. |  | 5255 | 5201 | 5220 | 5245 | 5026 | 4913 | 5298 |
|  | Cumulative bag drop test | 50 cm | — | ○○/○○ | ○○/○○ | ○○/○○ | ○○/○○ | ○○/○○ | ○○/○○ | ○○/○○ |
|  |  | 100 cm |  | ○○/○○ | ○○/○○ | ○○/○○ | ○○/○○ | ○○/○○ | ○○/○○ | ○○/○○ |
|  |  | 150 cm |  | ○X/X | X/○○ | ○○/○○ | ○○/○○ | ○○/○○ | ○○/○○ | ○○/○○ |
|  |  | 200 cm |  | —/— | —/X | ○○/○○ | ○○/○○ | ○○/○○ | ○○/○○ | ○○/○○ |

TABLE 58

|  |  |  |  | EX 157 | EX 158 | EX 159 | EX 160 | EX 161 | EX 162 | EX 163 |
|---|---|---|---|---|---|---|---|---|---|---|
| Layer compositions and resin formulations | Outer layer | Component (D) | — | PP(D-1) | PP(D-1) | PP(D-1) | PP(D-1) | PP(D-1) | PP(D-1) | PP(D-1) |
|  |  | amount | wt % | 100 | 100 | 100 | 100 | 100 | 100 | 100 |
|  |  | Component (D3) | — | — | — | — | — | — | — | — |
|  |  | amount | wt % | — | — | — | — | — | — | — |
|  |  | Other components | — | — | — | — | — | — | — | — |
|  |  | amount | wt % | — | — | — | — | — | — | — |
|  | Inner layer | Component (A) | — | PP(A-18) | PP(A-18) | PP(A-18) | PP(A-18) | PP(A-18) | PP(A-18) | PP(A-18) |
|  |  | amount | wt % | 70 | 70 | 70 | 70 | 70 | 70 | 70 |
|  |  | Component (B) | — | PE(B-1) | PE(B-1) | PE(B-1) | PE(B-1) | PE(B-1) | PE(B-1) | PE(B-1) |
|  |  | amount | wt % | 20 | 20 | 20 | 20 | 20 | 20 | 20 |
|  |  | Component (C) | — | PP(C-1) | PP(C-1) | PP(C-1) | PP(C-1) | PP(C-1) | PP(C-1) | PP(C-1) |
|  |  | amount | wt % | 10 | 10 | 10 | 10 | 10 | 10 | 10 |
|  |  | Other components | — | — | — | — | — | — | — | — |
|  |  | amount | wt % | — | — | — | — | — | — | — |
|  |  | Tm(C) - Tm(Al) | ° C. | 26 | 26 | 26 | 26 | 26 | 26 | 26 |
|  | Innermost layer | Component (K) | — | PP(K-6) | PP(K-7) | PP(K-8) | PP(K-9) | PP(K-10) | PP(K-11) | PP(K-12) |
|  |  | amount | wt % | 70 | 70 | 70 | 70 | 70 | 70 | 70 |
|  |  | Component (H) | — | PE(H-1) | PE(H-1) | PE(H-1) | PE(H-1) | PE(H-1) | PE(H-1) | PE(H-1) |
|  |  | amount | wt % | 20 | 20 | 20 | 20 | 20 | 20 | 20 |
|  |  | Component (I) | — | PP(I-1) | PP(I-1) | PP(I-1) | PP(I-1) | PP(I-1) | PP(I-1) | PP(I-1) |
|  |  | amount | wt % | 10 | 10 | 10 | 10 | 10 | 10 | 10 |
|  |  | Other components | — | — | — | — | — | — | — | — |
|  |  | amount | wt % | — | — | — | — | — | — | — |
|  |  | Tm(C) - Tm(Al) | ° C. | 31 | 31 | 31 | 31 | 41 | 21 | 31 |
|  |  | S(0) | wt % | 2.2 | 2.2 | 2.2 | 2.2 | 2.4 | 2.1 | 2.2 |
| Film properties after 30 minutes of heat treatment at 121° C. | Appearance | | — | ○ | ○ | ○ | ○ | ○ | ○ | ○ |
|  | Total haze % | | % | 12 | 14 | 13 | 13 | 13 | 14 | 13 |
|  | Tensile modulus | MD | MPa | 242 | 235 | 240 | 240 | 237 | 241 | 234 |
|  | Heat-sealing strength | 125° C. | gf/10 mm | 1802 | 1858 | 1835 | 1858 | 2019 | 1684 | 1868 |
|  |  | 130° C. |  | 2831 | 2878 | 2874 | 2807 | 2983 | 2563 | 2811 |
|  |  | 135° C. |  | 3164 | 3163 | 3152 | 3103 | 3183 | 3109 | 3134 |
|  |  | 140° C. |  | 3350 | 3338 | 3350 | 3399 | 3492 | 3461 | 3391 |
|  |  | 145° C. |  | 3511 | 3584 | 3576 | 3549 | 3673 | 3627 | 3503 |

TABLE 58-continued

|  |  |  | EX 157 | EX 158 | EX 159 | EX 160 | EX 161 | EX 162 | EX 163 |
|---|---|---|---|---|---|---|---|---|---|
|  |  | 150° C. | 4551 | 4539 | 4568 | 4541 | 4428 | 4361 | 4557 |
|  |  | 155° C. | 5137 | 5117 | 5132 | 5162 | 4829 | 4718 | 5102 |
|  |  | 160° C. | 5283 | 5208 | 5299 | 5252 | 5019 | 4911 | 5257 |
|  | Cumulative | 50 cm | — | ○○/○○ | ○○/○○ | ○○/○○ | ○○/○○ | ○○/○○ | ○○/○○ |
|  | bag drop | 100 cm |  | ○○/○○ | ○○/○○ | ○○/○○ | ○○/○○ | ○○/○○ | ○○/○○ |
|  | test | 150 cm |  | X/○X | ○X/X | ○X/X | X/X | X/X | X/X |
|  |  | 200 cm |  | —/— | —/— | —/— | —/— | —/— | —/— |

TABLE 59

|  |  |  |  | EX 164 | EX 165 | EX 166 | EX 167 | EX 168 | EX 169 | EX 170 |
|---|---|---|---|---|---|---|---|---|---|---|
| Layer compositions and resin formulations | Outer layer | Component (D) | — | PP(D-1) | PP(D-1) | PP(D-1) | PP(D-2) | PP(D-1) | PP(D-1) | PP(D-1) |
|  |  | amount | wt % | 100 | 100 | 100 | 80 | 100 | 100 | 100 |
|  |  | Component (D3) | — | — | — | — | — | — | — | — |
|  |  | amount | wt % | — | — | — | — | — | — | — |
|  |  | Other components | — | — | — | — | 7125 | — | — | — |
|  |  | amount | wt % | — | — | — | 20 | — | — | — |
|  | Inner layer | Component (A) | — | PP(A-18) | PP(A-18) | PP(A-18) | PP(A-18) | PP(A-18) | PP(A-18) | PP(A-18) |
|  |  | amount | wt % | 70 | 70 | 70 | 70 | 60 | 50 | 70 |
|  |  | Component (B) | — | PE(B-1) | PE(B-1) | PE(B-1) | PE(B-1) | PE(B-1) | PE(B-1) | PE(B-1) |
|  |  | amount | wt % | 20 | 20 | 20 | 20 | 20 | 20 | 20 |
|  |  | Component (C) | — | PP(C-1) | PP(C-1) | PP(C-1) | PP(C-1) | PP(C-1) | PP(C-1) | PP(C-1) |
|  |  | amount | wt % | 10 | 10 | 10 | 10 | 10 | 10 | 10 |
|  |  | Other components | — | — | — | — | — | 7125 | 7125 | — |
|  |  | amount | wt % | — | — | — | — | 10 | 20 | — |
|  |  | Tm(C) - Tm(Al) | ° C. | 26 | 26 | 26 | 26 | 26 | 26 | 26 |
|  | Innermost layer | Component (K) | — | PP(K-1) | PP(K-1) | PP(K-1) | PP(K-1) | PP(K-1) | PP(K-1) | PP(K-1) |
|  |  | amount | wt % | 70 | 70 | 65 | 70 | 70 | 70 | 60 |
|  |  | Component (H) | — | PE(H-4) | PE(H-1) | PE(H-1) | PE(H-1) | PE(H-1) | PE(H-1) | PE(H-1) |
|  |  | amount | wt % | 20 | 20 | 20 | 20 | 20 | 20 | 20 |
|  |  | Component (I) | — | PP(I-1) | PP(I-2) | PP(I-3) | PP(I-1) | PP(I-1) | PP(I-1) | PP(I-1) |
|  |  | amount | wt % | 10 | 10 | 15 | 10 | 10 | 10 | 10 |
|  |  | Other components | — | — | — | — | — | — | — | 7125 |
|  |  | amount | wt % | — | — | — | — | — | — | 10 |
|  |  | Tm(C) - Tm(Al) | ° C. | 31 | 31 | 32 | 31 | 31 | 31 | 31 |
|  |  | S(0) | wt % | 2.1 | 2.2 | 7 | 2.2 | 2.2 | 2.2 | 11 |
| Film properties after 30 minutes of heat treatment at 121° C. | Appearance | | — | ○ | ○ | ○ | ○ | ○ | ○ | ○ |
|  | Total haze | | % | 15 | 13 | 12 | 12 | 12 | 11 | 12 |
|  | Tensile modulus | MD | MPa | 248 | 244 | 231 | 254 | 231 | 196 | 228 |
|  | Heat-sealing strength | 125° C. | gf/10 mm | 1817 | 1881 | 1838 | 1841 | 1583 | 1394 | 1904 |
|  |  | 130° C. |  | 2820 | 2821 | 2881 | 2805 | 2576 | 2494 | 2988 |
|  |  | 135° C. |  | 3175 | 3106 | 3199 | 3166 | 3298 | 3103 | 3189 |
|  |  | 140° C. |  | 3313 | 3358 | 3362 | 3371 | 3337 | 3380 | 3325 |
|  |  | 145° C. |  | 3555 | 3572 | 3592 | 3576 | 3598 | 3591 | 3531 |
|  |  | 150° C. |  | 4591 | 4586 | 4567 | 4544 | 4565 | 4571 | 4572 |
|  |  | 155° C. |  | 5183 | 5145 | 5131 | 5148 | 5166 | 5200 | 5160 |
|  |  | 160° C. |  | 5251 | 5219 | 5239 | 5274 | 5251 | 5215 | 5246 |
|  | Cumulative bag drop test | 50 cm | — | ○○/○○ | ○○/○○ | ○○/○○ | ○○/○○ | ○○/○○ | ○○/○○ | ○○/○○ |
|  |  | 100 cm |  | ○○/○○ | ○○/○○ | ○○/○○ | ○○/○○ | ○○/○○ | ○○/○○ | ○○/○○ |
|  |  | 150 cm |  | ○X/X | X/○X | ○X/X | ○○/○○ | ○X/○○ | ○○/○○ | ○X/○○ |
|  |  | 200 cm |  | —/— | —/— | —/— | ○○/○○ | —/X | ○X/○X | —/X |

TABLE 60

|  |  |  |  | Comp. Ex. 28 | Comp. Ex. 29 | Comp. Ex. 30 | Comp. Ex. 31 | Comp. Ex. 32 | Comp. Ex. 33 | Comp. Ex. 34 |
|---|---|---|---|---|---|---|---|---|---|---|
| Layer compositions and resin formulations | Outer layer | Component (D) | — | PP(D-1) | PP(D-1) | PP(D-1) | PP(D-1) | PP(D-1) | PP(D-1) | PP(D-1) |
|  |  | amount | wt % | 100 | 100 | 100 | 100 | 100 | 100 | 100 |
|  |  | Component (D3) | — | — | — | — | — | — | — | — |
|  |  | amount | wt % | — | — | — | — | — | — | — |
|  |  | Other components | — | — | — | — | — | — | — | — |
|  |  | amount | wt % | — | — | — | — | — | — | — |
|  | Inner layer | Component (A) | — | PP(A-18) | PP(A-18) | PP(A-18) | PP(A-18) | PP(A-24) | PP(A-25) | PP(A-26) |
|  |  | amount | wt % | 100 | 50 | 70 | 50 | 70 | 70 | 70 |
|  |  | Component (B) | — | — | PE(B-1) | — | PE(B-1) | PE(B-1) | PE(B-1) | PE(B-1) |
|  |  | amount | wt % | — | 50 | — | 40 | 20 | 20 | 20 |

TABLE 60-continued

|  |  |  |  | Comp. Ex. 28 | Comp. Ex. 29 | Comp. Ex. 30 | Comp. Ex. 31 | Comp. Ex. 32 | Comp. Ex. 33 | Comp. Ex. 34 |
|---|---|---|---|---|---|---|---|---|---|---|
|  |  | Component (C) | — | — | — | PP(C-1) | PP(C-1) | PP(C-1) | PP(C-1) | PP(C-1) |
|  |  | amount | wt % | — | — | 30 | 10 | 10 | 10 | 10 |
|  |  | Other components | — | — | — | — | — | — | — | — |
|  |  | amount | wt % | — | — | — | — | — | — | — |
|  |  | Tm(C) - Tm(Al) | ° C. | — | — | 26 | 26 | 26 | 26 | 26 |
|  | Innermost layer | Component (K) | — | PP(K-1) | PP(K-1) | PP(K-1) | PP(K-1) | PP(K-1) | PP(K-1) | PP(K-1) |
|  |  | amount | wt % | 70 | 70 | 70 | 70 | 70 | 70 | 70 |
|  |  | Component (H) | — | PE(H-1) | PE(H-1) | PE(H-1) | PE(H-1) | PE(H-1) | PE(H-1) | PE(H-1) |
|  |  | amount | wt % | 20 | 20 | 20 | 20 | 20 | 20 | 20 |
|  |  | Component (I) | — | PP(I-1) | PP(I-1) | PP(I-1) | PP(I-1) | PP(I-1) | PP(I-1) | PP(I-1) |
|  |  | amount | wt % | 10 | 10 | 10 | 10 | 10 | 10 | 10 |
|  |  | Other components | — | — | — | — | — | — | — | — |
|  |  | amount | wt % | — | — | — | — | — | — | — |
|  |  | Tm(C) - Tm(Al) | ° C. | 31 | 31 | 31 | 31 | 31 | 31 | 31 |
|  |  | S(0) | wt % | 2.2 | 2.2 | 2.2 | 2.2 | 2.2 | 2.2 | 2.2 |
| Film properties after 30 minutes of heat treatment at 121° C. | Appearance | | — | ○ | Pockmarked pattern | ○ | Δ | ○ | Pockmarked pattern | ○ |
| | Total haze | | % | 10 | | 28 | 27 | 19 | | 17 |
| | Tensile modulus | MD | MPa | 235 | arose due to inadequate heat resistance; good samples could not be obtained | 332 | 219 | 348 | arose due to inadequate heat resistance; good samples could not be obtained | 329 |
| | Heat-sealing strength | 125° C. | gf/10 mm | 1578 | | 1948 | 1232 | 1923 | | 1766 |
| | | 130° C. | | 2193 | | 2383 | 1984 | 2302 | | 2145 |
| | | 135° C. | | 2984 | | 2784 | 2589 | 2941 | | 2784 |
| | | 140° C. | | 3378 | | 3193 | 3290 | 3674 | | 3517 |
| | | 145° C. | | 3543 | | 3348 | 4019 | 4239 | | 4082 |
| | | 150° C. | | 4382 | | 3847 | 4239 | 4402 | | 4245 |
| | | 155° C. | | 4763 | | 4431 | 4402 | 4629 | | 4472 |
| | | 160° C. | | 4689 | | 4589 | 4593 | 4897 | | 4740 |
| | Cumulative bag drop test | 50 cm | — | X/X | | X/X | ○○/○○ | ○○/○○ | | ○○/○○ |
| | | 100 cm | | —/— | | —/— | ○○/○X | X/X | | X/X |
| | | 150 cm | | —/— | | —/— | ○X/— | —/— | | —/— |
| | | 200 cm | | —/— | | —/— | —/— | —/— | | —/— |

TABLE 61

|  |  |  |  | Comp. Ex. 35 | Comp. Ex. 36 | Comp. Ex. 37 | Comp. Ex. 38 | Comp. Ex. 39 | Comp. Ex. 40 | Comp. Ex. 41 |
|---|---|---|---|---|---|---|---|---|---|---|
| Layer compositions and resin formulations | Outer layer | Component (D) | — | PP(D-1) | PP(D-1) | PP(D-1) | PP(D-1) | PP(D-1) | PP(D-1) | PP(D-1) |
| | | amount | wt % | 100 | 100 | 100 | 100 | 100 | 100 | 100 |
| | | Component (D3) | — | — | — | — | — | — | — | — |
| | | amount | wt % | — | — | — | — | — | — | — |
| | | Other components | — | — | — | — | — | — | — | — |
| | | amount | wt % | — | — | — | — | — | — | — |
| | Inner layer | Component (A) | — | PP(A-27) | PP(A-28) | PP(A-29) | PP(A-30) | PP(A-31) | PP(A-32) | PP(A-33) |
| | | amount | wt % | 70 | 70 | 70 | 70 | 70 | 70 | 70 |
| | | Component (B) | — | PE(B-1) | PE(B-1) | PE(B-1) | PE(B-1) | PE(B-1) | PE(B-1) | PE(B-1) |
| | | amount | wt % | 20 | 20 | 20 | 20 | 20 | 20 | 20 |
| | | Component (C) | — | PP(C-1) | PP(C-1) | PP(C-1) | PP(C-1) | PP(C-1) | PP(C-1) | PP(C-1) |
| | | amount | wt % | 10 | 10 | 10 | 10 | 10 | 10 | 10 |
| | | Other components | — | — | — | — | — | — | — | — |
| | | amount | wt % | — | — | — | — | — | — | — |
| | | Tm(C) - Tm(Al) | ° C. | 26 | 53 | 0 | 0 | 26 | 26 | 26 |
| | Innermost layer | Component (K) | — | PP(K-1) | PP(K-1) | PP(K-1) | PP(K-1) | PP(K-1) | PP(K-1) | PP(K-1) |
| | | amount | wt % | 70 | 70 | 70 | 70 | 70 | 70 | 70 |
| | | Component (H) | — | PE(H-1) | PE(H-1) | PE(H-1) | PE(H-1) | PE(H-1) | PE(H-1) | PE(H-1) |
| | | amount | wt % | 20 | 20 | 20 | 20 | 20 | 20 | 20 |
| | | Component (I) | — | PP(I-1) | PP(I-1) | PP(I-1) | PP(I-1) | PP(I-1) | PP(I-1) | PP(I-1) |
| | | amount | wt % | 10 | 10 | 10 | 10 | 10 | 10 | 10 |
| | | Other components | — | — | — | — | — | — | — | — |
| | | amount | wt % | — | — | — | — | — | — | — |
| | | Tm(C) - Tm(Al) | ° C. | 31 | 31 | 31 | 31 | 31 | 31 | 31 |
| | | S(0) | wt % | 2.2 | 2.2 | 2.2 | 2.2 | 2.2 | 2.2 | 2.2 |
| Film properties after 30 minutes of heat treatment at 121° C. | Appearance | | — | Pockmarked pattern | Pockmarked pattern | ○ | Due to unstable film thickness, good samples could not be obtained | ○ | ○ | Due to unstable film thickness, good samples could not be obtained |
| | Total haze | | % | arose due to inadequate heat resistance; good samples could not be obtained | arose due to inadequate heat resistance; good samples could not be obtained | 34 | | 18 | 36 | |
| | Tensile modulus | MD | MPa | | | 546 | | 476 | 262 | |
| | Heat-sealing strength | 125° C. | gf/10 mm | | | 1942 | | 1841 | 1830 | |
| | | 130° C. | | | | 2321 | | 2906 | 2895 | |
| | | 135° C. | | | | 2960 | | 3161 | 3150 | |
| | | 140° C. | | | | 3693 | | 3362 | 3351 | |
| | | 145° C. | | | | 4258 | | 3542 | 3531 | |
| | | 150° C. | | | | 4421 | | 4564 | 4553 | |
| | | 155° C. | | | | 4648 | | 5207 | 5196 | |
| | | 160° C. | | | | 4916 | | 5302 | 5291 | |

TABLE 61-continued

|  |  |  | Comp. Ex. 35 | Comp. Ex. 36 | Comp. Ex. 37 | Comp. Ex. 38 | Comp. Ex. 39 | Comp. Ex. 40 | Comp. Ex. 41 |
|---|---|---|---|---|---|---|---|---|---|
| Cumulative bag drop test | 50 cm |  | — |  | X/○X | —/— | ○○/○○ | ○○/○○ |  |
|  | 100 cm |  |  |  | —/— |  | ○X/X | ○○/○○ |  |
|  | 150 cm |  |  |  | —/— |  | —/— | ○X/X |  |
|  | 200 cm |  |  |  | —/— |  | —/— | —/— |  |

TABLE 62

|  |  |  |  | Comp. Ex. 42 | Comp. Ex. 43 | Comp. Ex. 44 |
|---|---|---|---|---|---|---|
| Layer compositions and resin formulations | Outer layer | Component (D) | — | PP(D-1) | PP(D-1) | PP(D-5) |
|  |  | amount | wt % | 100 | 100 | 100 |
|  |  | Component (D3) | — | — | — | — |
|  |  | amount | wt % | — | — | — |
|  |  | Other components | — | — | — | — |
|  |  | amount | wt % | — | — | — |
|  | Inner layer | Component (A) | — | PP(A-18) | PP(A-18) | PP(A-18) |
|  |  | amount | wt % | 70 | 70 | 70 |
|  |  | Component (B) | — | PE(B-7) | PE(B-8) | PE(B-1) |
|  |  | amount | wt % | 20 | 20 | 20 |
|  |  | Component (C) | — | PP(C-1) | PP(C-1) | PP(C-1) |
|  |  | amount | wt % | 10 | 10 | 10 |
|  |  | Other components | — | — | — | — |
|  |  | amount | wt % | — | — | — |
|  |  | Tm(C) - Tm(A1) | °C. | 26 | 26 | 26 |
|  | Innermost layer | Component (K) | — | PP(K-1) | PP(K-1) | PP(K-1) |
|  |  | amount | wt % | 70 | 70 | 70 |
|  |  | Component (H) | — | PE(H-1) | PE(H-1) | PE(H-1) |
|  |  | amount | wt % | 20 | 20 | 20 |
|  |  | Component (I) | — | PP(I-1) | PP(I-1) | PP(I-1) |
|  |  | amount | wt % | 10 | 10 | 10 |
|  |  | Other components | — | — | — | — |
|  |  | amount | wt % | — | — | — |
|  |  | Tm(C) - Tm(A1) | °C. | 31 | 31 | 31 |
|  |  | S(0) | wt % | 2.2 | 2.2 | 2.2 |
| Film properties after 30 minutes of heat treatment at 121°C. | Appearance | — |  | ○ | ○ | Pockmarked pattern arose due to inadequate heat resistance; good samples could not be obtained |
|  | Total haze |  | % | 35 | 26 |  |
|  | Tensile modulus | MD | MPa | 262 | 287 |  |
|  | Heat-sealing strength | 125° C. | gf/10 mm | 1815 | 1569 |  |
|  |  | 130° C. |  | 2805 | 2094 |  |
|  |  | 135° C. |  | 3146 | 2864 |  |
|  |  | 140° C. |  | 3345 | 3353 |  |
|  |  | 145° C. |  | 3520 | 3508 |  |
|  |  | 150° C. |  | 4503 | 4571 |  |
|  |  | 155° C. |  | 5177 | 5163 |  |
|  |  | 160° C. |  | 5263 | 5221 |  |
|  | Cumulative bag drop test | 50 cm |  | — | X/○X | ○○/○○ |
|  |  | 100 cm |  |  | —/— | ○○/○○ |
|  |  | 150 cm |  |  | —/— | ○X/X |
|  |  | 200 cm |  |  | —/— | —/— |

TABLE 63

|  |  |  |  | Ref. Ex. 44 | Ref. Ex. 45 | Ref. Ex. 46 | Ref. Ex. 47 | Ref. Ex. 48 | Ref. Ex. 49 | Ref. Ex. 50 |
|---|---|---|---|---|---|---|---|---|---|---|
| Layer compositions and resin formulations | Outer layer | Component (D) | — | PP(D-1) | PP(D-1) | PP(D-1) | PP(D-1) | PP(D-4) | PP(D-1) | PP(D-1) |
|  |  | amount | wt % | 100 | 100 | 100 | 100 | 90 | 100 | 100 |
|  |  | Component (D3) | — | — | — | — | — | PE(D3-2) | — | — |
|  |  | amount | wt % | — | — | — | — | 10 | — | — |
|  |  | Other components | — | — | — | — | — | — | — | — |
|  |  | amount | wt % | — | — | — | — | — | — | — |
|  | Inner layer | Component (A) | — | PP(A-18) | PP(A-18) | PP(A-18) | PP(A-18) | PP(A-18) | PP(A-18) | PP(A-18) |
|  |  | amount | wt % | 60 | 70 | 70 | 70 | 70 | 70 | 70 |
|  |  | Component (B) | — | PE(B-1) | PE(B-1) | PE(B-1) | PE(B-1) | PE(B-1) | PE(B-1) | PE(B-1) |
|  |  | amount | wt % | 10 | 20 | 20 | 20 | 20 | 20 | 20 |
|  |  | Component (C) | — | PP(C-1) | PP(C-6) | PP(C-7) | PP(C-8) | PP(C-1) | PP(C-1) | PP(C-1) |

TABLE 63-continued

|  |  |  |  | Ref. Ex. 44 | Ref. Ex. 45 | Ref. Ex. 46 | Ref. Ex. 47 | Ref. Ex. 48 | Ref. Ex. 49 | Ref. Ex. 50 |
|---|---|---|---|---|---|---|---|---|---|---|
|  |  | amount | wt % | 30 | 10 | 10 | 10 | 10 | 10 | 10 |
|  |  | Other components | — | — | — | — | — | — | — | — |
|  |  | amount | wt % | — | — | — | — | — | — | — |
|  |  | Tm(C) - Tm(Al) | ° C. | 26 | 0 | −10 | 26 | 26 | 26 | 26 |
|  | Innermost layer | Component (K) | — | PP(K-1) | PP(K-1) | PP(K-1) | PP(K-1) | PP(K-1) | PP(K-1) | PP(K-1) |
|  |  | amount | wt % | 70 | 70 | 70 | 70 | 70 | 100 | 50 |
|  |  | Component (H) | — | PE(H-1) | PE(H-1) | PE(H-1) | PE(H-1) | PE(H-1) | — | PE(H-1) |
|  |  | amount | wt % | 20 | 20 | 20 | 20 | 20 | — | 50 |
|  |  | Component (I) | — | PP(I-1) | PP(I-1) | PP(I-1) | PP(I-1) | PP(I-1) | — | — |
|  |  | amount | wt % | 10 | 10 | 10 | 10 | 10 | — | — |
|  |  | Other components | — | — | — | — | — | — | — | — |
|  |  | amount | wt % | — | — | — | — | — | — | — |
|  |  | Tm(C) - Tm(Al) | ° C. | 31 | 31 | 31 | 31 | 31 | — | — |
|  |  | S(0) | wt % | 2.2 | 2.2 | 2.2 | 2.2 | 2.2 | 2.6 | 2.4 |
| Film properties after 30 minutes of heat treatment at 121° C. | Appearance |  | — | ○ | ○ | ○ | ○ | ○ | Δ | Internal fusion due to inadequate heat resistance occurred during sterilization; could not be evaluated |
|  | Total haze |  | % | 28 | 14 | 14 | 21 | 28 | 29 |  |
|  | Tensile modulus | MD | MPa | 326 | 225 | 220 | 306 | 234 | 230 |  |
|  | Heat-sealing strength | 125° C. | gf/10 mm | 1854 | 1675 | 1655 | 1345 | 1592 | 2005 |  |
|  |  | 130° C. |  | 2593 | 2618 | 2638 | 1875 | 2717 | 3066 |  |
|  |  | 135° C. |  | 3584 | 2915 | 2977 | 2589 | 3396 | 3372 |  |
|  |  | 140° C. |  | 3573 | 3131 | 3129 | 3499 | 3407 | 3336 |  |
|  |  | 145° C. |  | 4292 | 3356 | 3321 | 3569 | 3426 | 3562 |  |
|  |  | 150° C. |  | 4593 | 4314 | 4303 | 4082 | 4430 | 4515 |  |
|  |  | 155° C. |  | 4738 | 4955 | 4976 | 4684 | 4992 | 5013 |  |
|  |  | 160° C. |  | 4983 | 5093 | 5095 | 4987 | 5111 | 5289 |  |
|  | Cumulative bag drop test | 50 cm | — | X/X | ○○/X | ○X/○X | ○○/○○ | ○○/○○ | X/X |  |
|  |  | 100 cm |  | —/— | ○X/— | —/— | ○X/○○ | ○○/○○ | —/— |  |
|  |  | 150 cm |  | —/— | —/— | —/— | —/X | ○○/○○ | —/— |  |
|  |  | 200 cm |  | —/— | —/— | —/— | —/— | ○○/○○ | —/— |  |

TABLE 64

|  |  |  |  | Ref. Ex. 51 | Ref. Ex. 52 | Ref. Ex. 53 | Ref. Ex. 54 | Ref. Ex. 55 | Ref. Ex. 56 |
|---|---|---|---|---|---|---|---|---|---|
| Layer compositions and resin formulations | Outer layer | Component (D) | — | PP(D-1) | PP(D-1) | PP(D-1) | PP(D-1) | PP(D-1) | PP(D-1) |
|  |  | amount | wt % | 100 | 100 | 100 | 100 | 100 | 100 |
|  |  | Component (D3) | — | — | — | — | — | — | — |
|  |  | amount | wt % | — | — | — | — | — | — |
|  |  | Other components | — | — | — | — | — | — | — |
|  |  | amount | wt % | — | — | — | — | — | — |
|  | Inner layer | Component (A) | — | PP(A-18) | PP(A-18) | PP(A-18) | PP(A-18) | PP(A-18) | PP(A-18) |
|  |  | amount | wt % | 70 | 70 | 70 | 70 | 70 | 70 |
|  |  | Component (B) | — | PE(B-1) | PE(B-1) | PE(B-1) | PE(B-1) | PE(B-1) | PE(B-1) |
|  |  | amount | wt % | 20 | 20 | 20 | 20 | 20 | 20 |
|  |  | Component (C) | — | PP(C-1) | PP(C-1) | PP(C-1) | PP(C-1) | PP(C-1) | PP(C-1) |
|  |  | amount | wt % | 10 | 10 | 10 | 10 | 10 | 10 |
|  |  | Other components | — | — | — | — | — | — | — |
|  |  | amount | wt % | — | — | — | — | — | — |
|  |  | Tm(C) - Tm(Al) | ° C. | 26 | 26 | 26 | 26 | 26 | 26 |
|  | Innermost layer | Component (K) | — | PP(K-1) | PP(K-1) | PP(K-1) | PP(K-1) | PP(K-1) | PP(K-1) |
|  |  | amount | wt % | 70 | 40 | 60 | 70 | 70 | 70 |
|  |  | Component (H) | — | — | PE(H-1) | PE(H-1) | PE(H-5) | PE(H-1) | PE(H-1) |
|  |  | amount | wt % | — | 50 | 10 | 20 | 20 | 20 |
|  |  | Component (I) | — | PP(I-1) | PP(I-1) | PP(I-1) | PP(I-1) | PP(I-4) | PP(I-5) |
|  |  | amount | wt % | 30 | 10 | 30 | 10 | 10 | 10 |
|  |  | Other components | — | — | — | — | — | — | — |
|  |  | amount | wt % | — | — | — | — | — | — |
|  |  | Tm(C) - Tm(Al) | ° C. | 31 | 31 | 31 | 31 | 5 | −5 |
|  |  | S(0) | wt % | 1.9 | 2.1 | 1.8 | 2.1 | 2.2 | 2.2 |
| Film properties after 30 minutes of heat treatment at 121° C. | Appearance |  | — | ○ | Internal fusion due to inadequate heat resistance occurred during sterilization; could not be | ○ | ○ | Internal fusion due to inadequate heat resistance occurred during sterilization; could | Internal fusion due to inadequate heat resistance occurred during sterilization; could |
|  | Total haze |  | % | 22 |  | 21 | 28 |  |  |
|  | Tensile modulus | MD | MPa | 318 |  | 312 | 251 |  |  |
|  | Heat-sealing strength | 125° C. | gf/10 mm | 194 |  | 382 | 1582 |  |  |
|  |  | 130° C. |  | 583 |  | 732 | 2748 |  |  |
|  |  | 135° C. |  | 1038 |  | 1294 | 3019 |  |  |
|  |  | 140° C. |  | 1674 |  | 1753 | 3281 |  |  |
|  |  | 145° C. |  | 1758 |  | 1832 | 3428 |  |  |
|  |  | 150° C. |  | 2019 |  | 1932 | 4471 |  |  |
|  |  | 155° C. |  | 2109 |  | 2019 | 4918 |  |  |
|  |  | 160° C. |  | 2538 |  | 2567 | 4819 | not be | not be |

TABLE 64-continued

|  |  |  | Ref. Ex. 51 | Ref. Ex. 52 | Ref. Ex. 53 | Ref. Ex. 54 | Ref. Ex. 55 | Ref. Ex. 56 |
|---|---|---|---|---|---|---|---|---|
| Cumulative bag drop test | 50 cm | — | X/X | evaluated | X/X | ○○/X | evaluated | evaluated |
|  | 100 cm |  | —/— |  | —/— | ○X/— |  |  |
|  | 150 cm |  | —/— |  | —/— | —/— |  |  |
|  | 200 cm |  | —/— |  | —/— | —/— |  |  |

TABLE 65

|  |  |  |  | EX 171 | EX 172 | EX 173 | EX 174 | EX 175 | EX 176 | EX 177 |
|---|---|---|---|---|---|---|---|---|---|---|
| Layer compositions and resin formulations | Outer layer | Component (D) | — | PP(D-1) | PP(D-1) | PP(D-1) | PP(D-1) | PP(D-1) | PP(D-1) | PP(D-1) |
|  |  | amount | wt % | 100 | 100 | 100 | 100 | 100 | 100 | 100 |
|  |  | Component (D3) | — | — | — | — | — | — | — | — |
|  |  | amount | wt % | — | — | — | — | — | — | — |
|  |  | Other components | — | — | — | — | — | — | — | — |
|  |  | amount | wt % | — | — | — | — | — | — | — |
|  | Inner layer | Component (A) | — | PP(A-18) | PP(A-18) | PP(A-19) | PP(A-20) | PP(A-21) | PP(A-22) | PP(A-23) |
|  |  | amount | wt % | 80 | 70 | 70 | 70 | 70 | 70 | 70 |
|  |  | Component (B) | — | PE(B-3) | PE(B-1) | PE(B-1) | PE(B-1) | PE(B-1) | PE(B-1) | PE(B-1) |
|  |  | amount | wt % | 20 | 20 | 20 | 20 | 20 | 20 | 20 |
|  |  | Component (C) | — | — | PP(C-1) | PP(C-1) | PP(C-1) | PP(C-1) | PP(C-1) | PP(C-1) |
|  |  | amount | wt % | — | 10 | 10 | 10 | 10 | 10 | 10 |
|  |  | Other components | — | — | — | — | — | — | — | — |
|  |  | amount | wt % | — | — | — | — | — | — | — |
|  |  | Tm(C) - Tm(Al) | ° C. | — | 26 | 26 | 26 | 19 | 22 | 19 |
|  | Innermost layer | Component (E) | — | PP(E-1) | PP(E-1) | PP(E-1) | PP(E-1) | PP(E-1) | PP(E-1) | PP(E-1) |
|  |  | amount | wt % | 90 | 90 | 90 | 90 | 90 | 90 | 90 |
|  |  | Component (F) | — | PE(F-1) | PE(F-1) | PE(F-1) | PE(F-1) | PE(F-1) | PE(F-1) | PE(F-1) |
|  |  | amount | wt % | 10 | 10 | 10 | 10 | 10 | 10 | 10 |
|  |  | Component (I) | — | — | — | — | — | — | — | — |
|  |  | amount | wt % | — | — | — | — | — | — | — |
|  |  | Other components | — | — | — | — | — | — | — | — |
|  |  | amount | wt % | — | — | — | — | — | — | — |
|  |  | Tm(C) - Tm(Al) | ° C. |  |  |  |  |  |  |  |
|  |  | S(0) | wt % | 0.2 | 0.2 | 0.2 | 0.2 | 0.2 | 0.2 | 0.2 |
| Film properties after 30 minutes of heat treatment at 121° C. | Appearance |  | — | ○ | ○ | ○ | ○ | ○ | ○ | ○ |
|  | Total haze |  | % | 18 | 12 | 12 | 12 | 16 | 17 | 17 |
|  | Tensile modulus | MD | MPa | 240 | 280 | 278 | 281 | 310 | 305 | 308 |
|  | Heat-sealing strength | 125° C. | gf/10 mm | 784 | 1547 | 1578 | 1557 | 1568 | 1553 | 1582 |
|  |  | 130° C. |  | 2240 | 2588 | 2622 | 2588 | 2616 | 2587 | 2618 |
|  |  | 135° C. |  | 3190 | 3578 | 3612 | 3580 | 3616 | 3588 | 3614 |
|  |  | 140° C. |  | 3400 | 3492 | 3518 | 3478 | 3501 | 3476 | 3516 |
|  |  | 145° C. |  | 3694 | 4183 | 4198 | 4164 | 4196 | 4163 | 4201 |
|  |  | 150° C. |  | 3981 | 4533 | 4555 | 4539 | 4554 | 4525 | 4547 |
|  |  | 155° C. |  | 4129 | 5138 | 5172 | 5138 | 5155 | 5121 | 5138 |
|  |  | 160° C. |  | 4351 | 5259 | 5259 | 5259 | 5259 | 5259 | 5259 |
|  | Cumulative bag drop test | 50 cm | — | ○○/○○ | ○○/○○ | ○○/○○ | ○○/○○ | ○○/○○ | ○○/○○ | ○○/○○ |
|  |  | 100 cm |  | ○○/○○ | ○○/○○ | ○○/○○ | ○○/○○ | ○○/○○ | ○○/○○ | ○○/○○ |
|  |  | 150 cm |  | X/X | X/○X | X/○X | ○X/X | X/○X | ○X/X | ○X/X |
|  |  | 200 cm |  | —/— | —/— | —/— | —/— | —/— | —/— | —/— |

TABLE 66

|  |  |  |  | EX 178 | EX 179 | EX 180 | EX 181 | EX 182 | EX 183 | EX 184 |
|---|---|---|---|---|---|---|---|---|---|---|
| Layer compositions and resin formulations | Outer layer | Component (D) | — | PP(D-1) | PP(D-1) | PP(D-1) | PP(D-1) | PP(D-1) | PP(D-1) | PP(D-1) |
|  |  | amount | wt % | 100 | 100 | 100 | 100 | 100 | 100 | 100 |
|  |  | Component (D3) | — | — | — | — | — | — | — | — |
|  |  | amount | wt % | — | — | — | — | — | — | — |
|  |  | Other components | — | — | — | — | — | — | — | — |
|  |  | amount | wt % | — | — | — | — | — | — | — |
|  | Inner layer | Component (A) | — | PP(A-18) | PP(A-18) | PP(A-18) | PP(A-18) | PP(A-18) | PP(A-18) | PP(A-18) |
|  |  | amount | wt % | 70 | 70 | 70 | 70 | 70 | 70 | 70 |
|  |  | Component (B) | — | PE(B-2) | PE(B-3) | PE(B-4) | PE(B-5) | PE(B-6) | PE(B-1) | PE(B-1) |
|  |  | amount | wt % | 20 | 20 | 20 | 20 | 20 | 20 | 20 |
|  |  | Component (C) | — | PP(C-1) | PP(C-1) | PP(C-1) | PP(C-1) | PP(C-1) | PP(C-2) | PP(C-3) |
|  |  | amount | wt % | 10 | 10 | 10 | 10 | 10 | 10 | 10 |
|  |  | Other components | — | — | — | — | — | — | — | — |
|  |  | amount | wt % | — | — | — | — | — | — | — |
|  |  | Tm(C) - Tm(Al) | ° C. | 26 | 26 | 26 | 26 | 26 | 26 | 26 |

TABLE 66-continued

|  |  |  |  | EX 178 | EX 179 | EX 180 | EX 181 | EX 182 | EX 183 | EX 184 |
|---|---|---|---|---|---|---|---|---|---|---|
|  | Innermost layer | Component (E) | — | PP(E-1) | PP(E-1) | PP(E-1) | PP(E-1) | PP(E-1) | PP(E-1) | PP(E-1) |
|  |  | amount | wt % | 90 | 90 | 90 | 90 | 90 | 90 | 90 |
|  |  | Component (F) | — | PE(F-1) | PE(F-1) | PE(F-1) | PE(F-1) | PE(F-1) | PE(F-1) | PE(F-1) |
|  |  | amount | wt % | 10 | 10 | 10 | 10 | 10 | 10 | 10 |
|  |  | Component (I) | — |  |  |  |  |  |  |  |
|  |  | amount | wt % |  |  |  |  |  |  |  |
|  |  | Other components | — | — | — | — | — | — | — | — |
|  |  | amount | wt % | — | — | — | — | — | — | — |
|  |  | Tm(C) - Tm(Al) | ° C. |  |  |  |  |  |  |  |
|  |  | S(0) | wt % | 0.2 | 0.2 | 0.2 | 0.2 | 0.2 | 0.2 | 0.2 |
| Film properties after 30 minutes of heat treatment at 121° C. | Appearance |  | — | ○ | ○ | ○ | ○ | ○ | ○ | ○ |
|  | Total haze |  | % | 15 | 12 | 15 | 12 | 12 | 12 | 12 |
|  | Tensile modulus | MD | MPa | 275 | 284 | 287 | 281 | 282 | 282 | 279 |
|  | Heat-sealing strength | 125° C. | gf/10 mm | 1543 | 1570 | 1547 | 1559 | 1546 | 1577 | 1559 |
|  |  | 130° C. |  | 2586 | 2614 | 2584 | 2606 | 2579 | 2616 | 2592 |
|  |  | 135° C. |  | 3572 | 3606 | 3575 | 3608 | 3584 | 3604 | 3571 |
|  |  | 140° C. |  | 3484 | 3515 | 3475 | 3500 | 3470 | 3508 | 3493 |
|  |  | 145° C. |  | 4177 | 4197 | 4163 | 4189 | 4161 | 4193 | 4186 |
|  |  | 150° C. |  | 4529 | 4548 | 4530 | 4552 | 4515 | 4539 | 4529 |
|  |  | 155° C. |  | 5129 | 5170 | 5130 | 5149 | 5113 | 5129 | 5144 |
|  |  | 160° C. |  | 5257 | 5253 | 5257 | 5257 | 5253 | 5251 | 5263 |
|  | Cumulative bag drop test | 50 cm | — | ○○/○○ | ○○/○○ | ○○/○○ | ○○/○○ | ○○/○○ | ○○/○○ | ○○/○○ |
|  |  | 100 cm |  | ○○/○○ | ○○/○○ | ○○/○○ | ○○/○○ | ○○/○○ | ○○/○○ | ○○/○○ |
|  |  | 150 cm |  | X/○X | X/○X | X/○X | ○X/X | X/○X | ○X/X | X/○X |
|  |  | 200 cm |  | —/— | —/— | —/— | —/— | —/— | —/— | —/— |

TABLE 67

|  |  |  |  | EX 185 | EX 186 | EX 187 | EX 188 | EX 189 | EX 190 | EX 191 |
|---|---|---|---|---|---|---|---|---|---|---|
| Layer compositions and resin formulations | Outer layer | Component (D) | — | PP(D-1) | PP(D-1) | PP(D-2) | PP(D-3) | PP(D-4) | PP(D-4) | PP(D-4) |
|  |  | amount | wt % | 100 | 100 | 100 | 100 | 100 | 90 | 100 |
|  |  | Component (D3) | — | — | — | — | — | — | PE(D3-1) | — |
|  |  | amount | wt % | — | — | — | — | — | 10 | — |
|  |  | Other components | — | — | — | — | — | — | — | — |
|  |  | amount | wt % | — | — | — | — | — | — | — |
|  | Inner layer | Component (A) | — | PP(A-18) | PP(A-18) | PP(A-18) | PP(A-18) | PP(A-18) | PP(A-18) | PP(A-18) |
|  |  | amount | wt % | 70 | 65 | 70 | 70 | 70 | 70 | 65 |
|  |  | Component (B) | — | PE(B-1) | PE(B-1) | PE(B-1) | PE(B-1) | PE(B-1) | PE(B-1) | PE(B-1) |
|  |  | amount | wt % | 20 | 20 | 20 | 20 | 20 | 20 | 20 |
|  |  | Component (C) | — | PP(C-4) | PP(C-5) | PP(C-1) | PP(C-1) | PP(C-1) | PP(C-1) | PP(C-5) |
|  |  | amount | wt % | 10 | 15 | 10 | 10 | 10 | 10 | 15 |
|  |  | Other components | — | — | — | — | — | — | — | — |
|  |  | amount | wt % | — | — | — | — | — | — | — |
|  |  | Tm(C) - Tm(Al) | ° C. | 26 | 27 | 26 | 26 | 26 | 26 | 27 |
|  | Innermost layer | Component (E) | — | PP(E-1) | PP(E-1) | PP(E-1) | PP(E-1) | PP(E-1) | PP(E-1) | PP(E-1) |
|  |  | amount | wt % | 90 | 90 | 90 | 90 | 90 | 90 | 90 |
|  |  | Component (F) | — | PE(F-1) | PE(F-1) | PE(F-1) | PE(F-1) | PE(F-1) | PE(F-1) | PE(F-1) |
|  |  | amount | wt % | 10 | 10 | 10 | 10 | 10 | 10 | 10 |
|  |  | Component (I) | — |  |  |  |  |  |  |  |
|  |  | amount | wt % |  |  |  |  |  |  |  |
|  |  | Other components | — | — | — | — | — | — | — | — |
|  |  | amount | wt % | — | — | — | — | — | — | — |
|  |  | Tm(C) - Tm(Al) | ° C. |  |  |  |  |  |  |  |
|  |  | S(0) | wt % | 0.2 | 0.2 | 0.2 | 0.2 | 0.2 | 0.2 | 0.2 |
| Film properties after 30 minutes of heat treatment at 121° C. | Appearance |  | — | ○ | ○ | ○ | ○ | ○ | ○ | ○ |
|  | Total haze |  | % | 12 | 11 | 12 | 14 | 15 | 11 | 14 |
|  | Tensile modulus | MD | MPa | 285 | 272 | 290 | 297 | 241 | 251 | 249 |
|  | Heat-sealing strength | 125° C. | gf/10 mm | 1576 | 1555 | 1771 | 1737 | 1354 | 1245 | 1354 |
|  |  | 130° C. |  | 2624 | 2586 | 2856 | 2862 | 2345 | 2215 | 2354 |
|  |  | 135° C. |  | 3613 | 3582 | 3415 | 3139 | 3154 | 3057 | 3057 |
|  |  | 140° C. |  | 3516 | 3482 | 3409 | 3333 | 3245 | 3220 | 3410 |
|  |  | 145° C. |  | 4191 | 4160 | 4015 | 4152 | 4123 | 4135 | 4187 |
|  |  | 150° C. |  | 4556 | 4539 | 4478 | 4575 | 4623 | 4587 | 4514 |
|  |  | 155° C. |  | 5172 | 5141 | 5130 | 5137 | 5014 | 5045 | 5171 |
|  |  | 160° C. |  | 5259 | 5253 | 5231 | 5256 | 5037 | 4924 | 5309 |
|  | Cumulative bag drop test | 50 cm | — | ○○/○○ | ○○/○○ | ○○/○○ | ○○/○○ | ○○/○○ | ○○/○○ | ○○/○○ |
|  |  | 100 cm |  | ○○/○○ | ○○/○○ | ○○/○○ | ○○/○○ | ○○/○○ | ○○/○○ | ○○/○○ |
|  |  | 150 cm |  | ○X/X | X/○○ | ○○/○○ | ○○/○○ | ○○/○○ | ○○/○○ | ○○/○○ |
|  |  | 200 cm |  | —/— | —/X | ○○/○○ | ○○/○○ | ○○/○○ | ○○/○○ | ○○/○○ |

TABLE 68

| | | | | EX 192 | EX 193 | EX 194 | EX 195 | EX 196 | EX 197 | EX 198 |
|---|---|---|---|---|---|---|---|---|---|---|
| Layer compositions and resin formulations | Outer layer | Component (D) | — | PP(D-1) | PP(D-1) | PP(D-1) | PP(D-1) | PP(D-1) | PP(D-2) | PP(D-1) |
| | | amount | wt % | 100 | 100 | 100 | 100 | 100 | 80 | 100 |
| | | Component (D3) | — | — | — | — | — | — | — | — |
| | | amount | wt % | — | — | — | — | — | — | — |
| | | Other components | — | — | — | — | — | — | 7125 | — |
| | | amount | wt % | — | — | — | — | — | 20 | — |
| | Inner layer | Component (A) | — | PP(A-18) | PP(A-18) | PP(A-18) | PP(A-18) | PP(A-18) | PP(A-18) | PP(A-18) |
| | | amount | wt % | 70 | 70 | 70 | 70 | 70 | 70 | 60 |
| | | Component (B) | — | PE(B-1) | PE(B-1) | PE(B-1) | PE(B-1) | PE(B-1) | PE(B-1) | PE(B-1) |
| | | amount | wt % | 20 | 20 | 20 | 20 | 20 | 20 | 20 |
| | | Component (C) | — | PP(C-1) | PP(C-1) | PP(C-1) | PP(C-1) | PP(C-1) | PP(C-1) | PP(C-1) |
| | | amount | wt % | 10 | 10 | 10 | 10 | 10 | 10 | 10 |
| | | Other components | — | — | — | — | — | — | — | 7125 |
| | | amount | wt % | — | — | — | — | — | — | 10 |
| | | Tm(C) - Tm(Al) | ° C. | 26 | 26 | 26 | 26 | 26 | 26 | 26 |
| | Innermost layer | Component (E) | — | PP(E-2) | PP(E-3) | PP(E-1) | PP(K-1) | PP(K-1) | PP(E-1) | PP(E-1) |
| | | amount | wt % | 90 | 90 | 90 | 85 | 90 | 90 | 90 |
| | | Component (F) | — | PE(F-1) | PE(F-1) | PE(F-2) | PE(F-3) | PE(F-4) | PE(F-1) | PE(F-1) |
| | | amount | wt % | 10 | 10 | 10 | 15 | 10 | 10 | 10 |
| | | Component (I) | — | — | — | — | — | — | — | — |
| | | amount | wt % | — | — | — | — | — | — | — |
| | | Other components | — | — | — | — | — | — | — | — |
| | | amount | wt % | — | — | — | — | — | — | — |
| | | Tm(C) - Tm(Al) | ° C. | — | — | — | — | — | — | — |
| | | S(0) | wt % | 0.2 | 0.6 | 0.2 | 0.2 | 0.1 | 0.2 | 0.2 |
| Film properties after 30 minutes of heat treatment at 121° C. | Appearance | | — | ○ | ○— | ○ | ○ | ○ | ○ | ○ |
| | Total haze | | % | 13 | 17 | 15 | 13 | 15 | 11 | 11 |
| | Tensile modulus | MD | MPa | 281 | 285 | 281 | 282 | 280 | 284 | 271 |
| | Heat-sealing strength | 125° C. | gf/10 mm | 1357 | 1204 | 1751 | 1557 | 1574 | 2043 | 1812 |
| | | 130° C. | | 2467 | 2541 | 2578 | 2645 | 2579 | 3162 | 2866 |
| | | 135° C. | | 3321 | 3245 | 3415 | 3616 | 3487 | 3487 | 3669 |
| | | 140° C. | | 3481 | 3415 | 3561 | 3610 | 3510 | 3803 | 3714 |
| | | 145° C. | | 4177 | 4098 | 4015 | 4065 | 4305 | 3981 | 3972 |
| | | 150° C. | | 4468 | 4457 | 4456 | 4457 | 4135 | 5082 | 5059 |
| | | 155° C. | | 5079 | 5018 | 5018 | 5015 | 5124 | 5718 | 5737 |
| | | 160° C. | | 5124 | 5157 | 5187 | 5112 | 5210 | 5816 | 5794 |
| | Cumulative bag drop test | 50 cm | — | ○○/○○ | ○○/○○ | ○○/○○ | ○○/○○ | ○○/○○ | ○○/○○ | ○○/○○ |
| | | 100 cm | | ○○/○○ | ○○/○○ | ○○/○○ | ○○/○○ | ○○/○○ | ○○/○○ | ○○/○○ |
| | | 150 cm | | X/○X | X/○X | ○X/X | X/○X | ○X/X | ○○/○○ | ○X/○○ |
| | | 200 cm | | —/— | —/— | —/— | —/— | —/— | ○○/○○ | —/X |

TABLE 69

| | | | | EX 199 | EX 200 |
|---|---|---|---|---|---|
| Layer compositions and resin formulations | Outer layer | Component (D) | — | PP(D-1) | PP(D-1) |
| | | amount | wt % | 100 | 100 |
| | | Component (D3) | — | — | — |
| | | amount | wt % | — | — |
| | | Other components | — | — | — |
| | | amount | wt % | — | — |
| | Inner layer | Component (A) | — | PP(A-18) | PP(A-18) |
| | | amount | wt % | 70 | 70 |
| | | Component (B) | — | PE(B-1) | PE(B-1) |
| | | amount | wt % | 20 | 20 |
| | | Component (C) | — | PP(C-1) | PP(C-1) |
| | | amount | wt % | 10 | 10 |
| | | Other components | — | 7125 | — |
| | | amount | wt % | 20 | — |
| | | Tm(C)-Tm(Al) | ° C. | 26 | 26 |
| | Innermost layer | Component (E) | — | PP(E-1) | PP(E-1) |
| | | amount | wt % | 90 | 85 |
| | | Component (F) | — | PE(F-1) | PE(F-1) |
| | | amount | wt % | 10 | 5 |
| | | Component (I) | — | — | — |
| | | amount | wt % | — | — |
| | | Other components | — | — | 7125 |
| | | amount | wt % | — | 10 |
| | | Tm(C)-Tm(Al) | ° C. | — | — |
| | | S(0) | wt % | 0.2 | 8.9 |
| Film properties after 30 minutes | Appearance | | — | ○ | ○ |
| | Total haze | | % | 10 | 11 |

TABLE 69-continued

|  |  |  |  | EX 199 | EX 200 |
|---|---|---|---|---|---|
| of heat treatment at 121° C. | Tensile modulus | MD | MPa | 234 | 268 |
|  | Heat-sealing strength | 125° C. | gf/10 mm | 1565 | 2170 |
|  |  | 130° C. |  | 2824 | 3362 |
|  |  | 135° C. |  | 3483 | 3541 |
|  |  | 140° C. |  | 3754 | 3679 |
|  |  | 145° C. |  | 4032 | 3934 |
|  |  | 150° C. |  | 5112 | 5032 |
|  |  | 155° C. |  | 5779 | 5740 |
|  |  | 160° C. |  | 5763 | 5790 |
|  | Cumulative bag drop test | 50 cm |  | — | ○○/○○ |
|  |  | 100 cm |  | ○○/○○ | ○○/○○ |
|  |  | 150 cm |  | ○○/○○ | ○X/○○ |
|  |  | 200 cm |  | ○X/○X | —/X |

TABLE 70

|  |  |  |  | Comp. Ex. 45 | Comp. Ex. 46 | Comp. Ex. 47 | Comp. Ex. 48 | Comp. Ex. 49 | Comp. Ex. 40 | Comp. Ex. 51 |
|---|---|---|---|---|---|---|---|---|---|---|
| Layer compositions and resin formulations | Outer layer | Component (D) | — | PP(D-1) | PP(D-1) | PP(D-1) | PP(D-1) | PP(D-1) | PP(D-1) | PP(D-1) |
|  |  | amount | wt % | 100 | 100 | 100 | 100 | 100 | 100 | 100 |
|  |  | Component (D3) | — | — | — | — | — | — | — | — |
|  |  | amount | wt % | — | — | — | — | — | — | — |
|  |  | Other components | — | — | — | — | — | — | — | — |
|  |  | amount | wt % | — | — | — | — | — | — | — |
|  | Inner layer | Component (A) | — | PP(A-18) | PP(A-18) | PP(A-18) | PP(A-18) | PP(A-24) | PP(A-25) | PP(A-26) |
|  |  | amount | wt % | 100 | 50 | 70 | 40 | 70 | 70 | 70 |
|  |  | Component (B) | — | — | PE(B-1) | — | PE(B-1) | PE(B-1) | PE(B-1) | PE(B-1) |
|  |  | amount | wt % | — | 50 | — | 50 | 20 | 20 | 20 |
|  |  | Component (C) | — | — | — | PP(C-1) | PP(C-1) | PP(C-1) | PP(C-1) | PP(C-1) |
|  |  | amount | wt % | — | — | 30 | 10 | 10 | 10 | 10 |
|  |  | Other components | — | — | — | — | — | — | — | — |
|  |  | amount | wt % | — | — | — | — | — | — | — |
|  |  | Tm(C) - Tm(Al) | ° C. | — | — | 26 | 26 | 26 | — | 26 |
|  | Innermost layer | Component (E) | — | PP(E-1) | PP(E-1) | PP(E-1) | PP(E-1) | PP(E-1) | PP(E-1) | PP(E-1) |
|  |  | amount | wt % | 90 | 90 | 90 | 90 | 90 | 90 | 90 |
|  |  | Component F | — | PE(F-1) | PE(F-1) | PE(F-1) | PE(F-1) | PE(F-1) | PE(F-1) | PE(F-1) |
|  |  | amount | wt % | 10 | 10 | 10 | 10 | 10 | 10 | 10 |
|  |  | Component (I) | — |  |  |  |  |  |  |  |
|  |  | amount | wt % |  |  |  |  |  |  |  |
|  |  | Other components | — | — | — | — | — | — | — | — |
|  |  | amount | wt % | — | — | — | — | — | — | — |
|  |  | Tm(C) - Tm(Al) | ° C. |  |  |  |  |  |  |  |
|  |  | S(0) | wt % | 0.2 | 0.2 | 0.2 | 0.2 | 0.2 | 0.2 | 0.2 |
| Film properties after 30 minutes of heat treatment at 121° C. | Appearance | — | ○ | Pockmarked pattern arose due to inadequate heat resistance; good samples could not be obtained | ○ | Δ | ○ | Pockmarked pattern arose due to inadequate heat resistance; good samples could not be obtained | ○ |  |
|  | Total haze | % | 9 | 27 | 22 | 19 | 17 |  |
|  | Tensile modulus | MD | MPa | 276 | 345 | 263 | 388 | 269 |  |
|  | Heat-sealing strength | 125° C. | gf/10 mm | 1290 | 1784 | 1391 | 1938 | 1673 |  |
|  |  | 130° C. | mm | 2193 | 2681 | 1985 | 2302 | 2511 |  |
|  |  | 135° C. |  | 3342 | 3492 | 2976 | 2941 | 2789 |  |
|  |  | 140° C. |  | 3378 | 3193 | 3269 | 3674 | 3517 |  |
|  |  | 145° C. |  | 3543 | 3348 | 4002 | 4239 | 4082 |  |
|  |  | 150° C. |  | 4382 | 4594 | 4239 | 4402 | 4329 |  |
|  |  | 155° C. |  | 4763 | 4841 | 4722 | 4781 | 4472 |  |
|  |  | 160° C. |  | 4689 | 5297 | 5201 | 5297 | 4740 |  |
|  | Cumulative bag drop test | 50 cm | — | X/X | X/X | ○○/○○ | X/X | ○○/○○ |  |
|  |  | 100 cm |  | —/— | —/— | ○○/○X | X/X | X/X |  |
|  |  | 150 cm |  | —/— | —/— | ○X/— | —/— | —/— |  |
|  |  | 200 cm |  | —/— | —/— | —/— | —/— | —/— |  |

TABLE 71

|  |  |  |  | Ref. Ex. 52 | Ref. Ex. 53 | Ref. Ex. 54 | Ref. Ex. 55 | Ref. Ex. 56 | Ref. Ex. 57 | Ref. Ex. 58 |
|---|---|---|---|---|---|---|---|---|---|---|
| Layer compositions and resin | Outer layer | Component (D) | — | PP(D-1) | PP(D-1) | PP(D-1) | PP(D-1) | PP(D-1) | PP(D-1) | PP(D-1) |
|  |  | amount | wt % | 100 | 100 | 100 | 100 | 100 | 100 | 100 |
|  |  | Component (D3) | — | — | — | — | — | — | — | — |

TABLE 71-continued

|  |  |  |  | Ref. Ex. 52 | Ref. Ex. 53 | Ref. Ex. 54 | Ref. Ex. 55 | Ref. Ex. 56 | Ref. Ex. 57 | Ref. Ex. 58 |
|---|---|---|---|---|---|---|---|---|---|---|
| formulations |  | Other components amount | wt % | — — | — — | — — | — — | — — | — — | — — |
|  | Inner layer | Component (A) amount | — wt % | PP(A-27) 70 | PP(A-28) 70 | PP(A-29) 70 | PP(A-30) 70 | PP(A-31) 70 | PP(A-32) 70 | PP(A-33) 70 |
|  |  | Component (B) amount | — wt % | PE(B-1) 20 | PE(B-1) 20 | PE(B-1) 20 | PE(B-1) 20 | PE(B-1) 20 | PE(B-1) 20 | PE(B-1) 20 |
|  |  | Component (C) amount | — wt % | PP(C-1) 10 | PP(C-1) 10 | PP(C-1) 10 | PP(C-1) 10 | PP(C-1) 10 | PP(C-1) 10 | PP(C-1) 10 |
|  |  | Other components amount | — wt % | — — | — — | — — | — — | — — | — — | — — |
|  |  | Tm(C) - Tm(Al) | ° C. | 26 | 53 | 0 | 0 | 26 | 26 | 26 |
|  | Innermost layer | Component (E) amount | — wt % | PP(E-1) 90 | PP(E-1) 90 | PP(E-1) 90 | PP(E-1) 90 | PP(E-1) 90 | PP(E-1) 90 | PP(E-1) 90 |
|  |  | Component (F) amount | — wt % | PE(F-1) 10 | PE(F-1) 10 | PE(F-1) 10 | PE(F-1) 10 | PE(F-1) 10 | PE(F-1) 10 | PE(F-1) 10 |
|  |  | Component (I) amount | — wt % |  |  |  |  |  |  |  |
|  |  | Other components amount | — wt % | — — | — — | — — | — — | — — | — — | — — |
|  |  | Tm(C) - Tm(Al) | ° C. |  |  |  |  |  |  |  |
|  |  | S(0) | wt % | 0.2 | 0.2 | 0.2 | 0.2 | 0.2 | 0.2 | 0.2 |
| Film properties after 30 minutes of heat treatment at 121° C. | Appearance Total haze Tensile modulus Heat-sealing strength | MD 125° C. 130° C. 135° C. 140° C. 145° C. 150° C. 155° C. 160° C. | — % MPa gf/10 mm | Pockmarked pattern arose due to inadequate heat resistance; good samples could not be obtained | Pockmarked pattern arose due to inadequate heat resistance; good samples could not be obtained | ○ 34 612 1971 2513 3453 3693 4258 4421 4648 4916 | Due to unstable film thickness, good samples could not be obtained | ○ 18 512 1571 2499 3456 3362 3542 4564 5207 5302 | ○ 36 297 1548 2532 3421 3351 3531 4553 5196 5291 | Due to unstable film thickness, good samples could not be obtained |
|  | Cumulative bag drop test | 50 cm 100 cm 150 cm 200 cm | — |  |  | X/○X —/— —/— —/— |  | ○○/○○ ○X/X —/— —/— | ○○/○○ ○○/○○ ○X/X —/— |  |

TABLE 72

|  |  |  |  | Comp. Ex. 59 | Comp. Ex. 60 | Comp. Ex. 61 |
|---|---|---|---|---|---|---|
| Layer compositions and resin formulations | Outer layer | Component (D) amount | — wt % | PP(D-1) 100 | PP(D-1) 100 | PP(D-5) 100 |
|  |  | Component (D3) amount | — wt % | — — | — — | — — |
|  |  | Other components amount | — wt % | — — | — — | — — |
|  | Inner layer | Component (A) amount | — wt % | PP(A-18) 70 | PP(A-18) 70 | PP(A-18) 70 |
|  |  | Component (B) amount | — wt % | PE(B-7) 20 | PE(B-8) 20 | PE(B-1) 20 |
|  |  | Component (C) amount | — wt % | PP(C-1) 10 | PP(C-1) 10 | PP(C-1) 10 |
|  |  | Other components amount | — wt % | — — | — — | — — |
|  |  | Tm(C) - Tm(Al) | ° C. | 26 | 26 | 26 |
|  | Innermost layer | Component (E) amount | — wt % | PP(E-1) 90 | PP(E-1) 90 | PP(E-1) 90 |
|  |  | Component (F) amount | — wt % | PE(F-1) 10 | PE(F-1) 10 | PE(F-1) 10 |
|  |  | Component (I) amount | — wt % |  |  |  |
|  |  | Other components amount | — wt % | — — | — — | — — |
|  |  | Tm(C) - Tm(Al) | ° C. |  |  |  |
|  |  | S(0) | wt % | 0.2 | 0.2 | 0.2 |
| Film properties after 30 minutes | Appearance Total haze Tensile modulus | — % MD MPa | ○ 34 297 | ○ 35 329 | Pockmarked pattern arose due to |

TABLE 72-continued

|  |  |  |  | Comp. Ex. 59 | Comp. Ex. 60 | Comp. Ex. 61 |
|---|---|---|---|---|---|---|
| of heat treatment at 121° C. | Heat-sealing strength | 125° C. | gf/10 mm | 1567 | 1558 | inadequate heat resistance; good samples could not be obtained |
|  |  | 130° C. |  | 2621 | 2595 |  |
|  |  | 135° C. |  | 3622 | 3585 |  |
|  |  | 140° C. |  | 3501 | 3485 |  |
|  |  | 145° C. |  | 4198 | 4166 |  |
|  |  | 150° C. |  | 4554 | 4519 |  |
|  |  | 155° C. |  | 5155 | 5123 |  |
|  |  | 160° C. |  | 5254 | 5262 |  |
|  | Cumulative bag drop test | 50 cm | — | X/○X | ○○/○○ |  |
|  |  | 100 cm |  | —/— | ○○/○○ |  |
|  |  | 150 cm |  | —/— | ○X/X |  |
|  |  | 200 cm |  | —/— | —/— |  |

TABLE 73

|  |  |  |  | Ref. Ex. 57 | Ref. Ex. 58 | Ref. Ex. 59 | Ref. Ex. 60 | Ref. Ex. 61 | Ref. Ex. 62 | Ref. Ex. 63 |
|---|---|---|---|---|---|---|---|---|---|---|
| Layer compositions and resin formulations | Outer layer | Component (D) | — | PP(D-1) | PP(D-1) | PP(D-1) | PP(D-1) | PP(D-4) | PP(D-1) | PP(D-1) |
|  |  | amount | wt % | 100 | 100 | 100 | 100 | 90 | 100 | 100 |
|  |  | Component (D3) | — | — | — | — | — | PE(D3-2) | — | — |
|  |  | amount | wt % | — | — | — | — | 10 | — | — |
|  |  | Other components | — | — | — | — | — | — | — | — |
|  |  | amount | wt % | — | — | — | — | — | — | — |
|  | Inner layer | Component (A) | — | PP(A-18) | PP(A-18) | PP(A-18) | PP(A-18) | PP(A-18) | PP(A-18) | PP(A-18) |
|  |  | amount | wt % | 60 | 70 | 70 | 70 | 70 | 70 | 70 |
|  |  | Component (B) | — | PE(B-1) | PE(B-1) | PE(B-1) | PE(B-1) | PE(B-1) | PE(B-1) | PE(B-1) |
|  |  | amount | wt % | 10 | 20 | 20 | 20 | 20 | 20 | 20 |
|  |  | Component (C) | — | PP(C-1) | PP(C-6) | PP(C-7) | PP(C-8) | PP(C-1) | PP(C-1) | PP(C-1) |
|  |  | amount | wt % | 30 | 10 | 10 | 10 | 10 | 10 | 10 |
|  |  | Other components | — | — | — | — | — | — | — | — |
|  |  | amount | wt % | — | — | — | — | — | — | — |
|  |  | Tm(C) - Tm(A1) | ° C. | 26 | 0 | −10 | 26 | 26 | 26 | 26 |
|  | Innermost layer | Component (E) | — | PP(E-1) | PP(E-1) | PP(E-1) | PP(E-1) | PP(E-1) | PP(E-1) | PP(E-1) |
|  |  | amount | wt % | 90 | 90 | 90 | 90 | 90 | 100 | 70 |
|  |  | Component (F) | — | PE(F-1) | PE(F-1) | PE(F-1) | PE(F-1) | PE(F-1) | — | PE(F-1) |
|  |  | amount | wt % | 10 | 10 | 10 | 10 | 10 | — | 30 |
|  |  | Component (I) | — |  |  |  |  |  | — | — |
|  |  | amount | wt % |  |  |  |  |  | — | — |
|  |  | Other components | — | — | — | — | — | — | — | — |
|  |  | amount | wt % | — | — | — | — | — | — | — |
|  |  | Tm(C) - Tm(A1) | ° C. |  |  |  |  |  |  |  |
|  |  | S(0) | wt % | 0.2 | 0.2 | 0.2 | 0.2 | 0.2 | 0 | 0.6 |
| Film properties after 30 minutes of heat treatment at 121° C. | Appearance |  | — | ○ | ○ | ○ | ○ | ○ | ○ | Internal fusion due to inadequate heat resistance occurred during sterilization; could not be evaluated |
|  | Total haze |  | % | 27 | 13 | 13 | 21 | 28 | 9 |  |
|  | Tensile modulus | MD | MPa | 361 | 265 | 359 | 348 | 274 | 284 |  |
|  | Heat-sealing strength | 125° C. | gf/10 mm | 1812 | 1574 | 1560 | 1578 | 1457 | 75 |  |
|  |  | 130° C. |  | 2593 | 2611 | 2602 | 2632 | 2485 | 456 |  |
|  |  | 135° C. |  | 3584 | 3610 | 3588 | 3614 | 3153 | 3184 |  |
|  |  | 140° C. |  | 3573 | 3518 | 3497 | 3516 | 3418 | 3256 |  |
|  |  | 145° C. |  | 4292 | 4208 | 4192 | 4196 | 4087 | 3645 |  |
|  |  | 150° C. |  | 4593 | 4548 | 4541 | 4560 | 4441 | 4312 |  |
|  |  | 155° C. |  | 4981 | 5135 | 5147 | 5180 | 5003 | 4821 |  |
|  |  | 160° C. |  | 5297 | 5257 | 5268 | 5266 | 5122 | 4415 |  |
|  | Cumulative bag drop test | 50 cm | — | X/X | ○○/X | ○X/○X | ○○/○○ | ○○/○○ | X/X |  |
|  |  | 100 cm |  | —/— | ○X/— | —/— | ○X/○○ | ○○/○○ | —/— |  |
|  |  | 150 cm |  | —/— | —/— | —/— | —/X | ○○/○○ | —/— |  |
|  |  | 200 cm |  | —/— | —/— | —/— | —/— | ○○/○○ | —/— |  |

TABLE 74

|  |  |  |  | Ref. Ex. 64 | Ref. Ex. 65 | Ref. Ex. 66 |
|---|---|---|---|---|---|---|
| Layer compositions and resin formulations | Outer layer | Component (D) | — | PP(D-1) | PP(D-1) | PP(D-1) |
|  |  | amount | wt % | 100 | 100 | 100 |
|  |  | Component (D3) | — | — | — | — |
|  |  | amount | wt % | — | — | — |
|  |  | Other components | — | — | — | — |
|  |  | amount | wt % | — | — | — |

TABLE 74-continued

|  |  |  |  | Ref. Ex. 64 | Ref. Ex. 65 | Ref. Ex. 66 |
|---|---|---|---|---|---|---|
|  | Inner layer | Component (A) | — | PP(A-18) | PP(A-18) | PP(A-18) |
|  |  | amount | wt % | 70 | 70 | 70 |
|  |  | Component (B) | — | PE(B-1) | PE(B-1) | PE(B-1) |
|  |  | amount | wt % | 20 | 20 | 20 |
|  |  | Component (C) | — | PP(C-1) | PP(C-1) | PP(C-1) |
|  |  | amount | wt % | 10 | 10 | 10 |
|  |  | Other components | — | — | — | — |
|  |  | amount | wt % | — | — | — |
|  |  | Tm(C) - Tm(Al) | ° C. | 26 | 26 | 26 |
|  | Innermost layer | Component (E) | — | PP(E-4) | PP(E-5) | PP(E-1) |
|  |  | amount | wt % | 90 | 90 | 90 |
|  |  | Component (F) | — | PE(F-1) | PE(F-1) | PE(F-5) |
|  |  | amount | wt % | 10 | 10 | 10 |
|  |  | Component (I) | — | — | — | — |
|  |  | amount | wt % | — | — | — |
|  |  | Other components | — | — | — | — |
|  |  | amount | wt % | — | — | — |
|  |  | Tm(C) - Tm(Al) | ° C. | — | — | — |
|  |  | S(0) | wt % | 0.3 | 0.4 | 0.1 |
| Film properties after 30 minutes of heat treatment at 121° C. | Appearance |  | — | Internal fusion due to inadequate heat resistance occurred during sterilization; could not be evaluated | ○ | ○ |
|  | Total haze |  | % |  | 19 | 27 |
|  | Tensile modulus | MD | MPa |  | 501 | 285 |
|  | Heat-sealing strength | 125° C. | gf/10 mm |  | 19 | 1154 |
|  |  | 130° C. |  |  | 251 | 1357 |
|  |  | 135° C. |  |  | 445 | 3125 |
|  |  | 140° C. |  |  | 784 | 3245 |
|  |  | 145° C. |  |  | 1354 | 3548 |
|  |  | 150° C. |  |  | 1568 | 4315 |
|  |  | 155° C. |  |  | 2150 | 4987 |
|  |  | 160° C. |  |  | 2991 | 5102 |
|  | Cumulative bag drop test | 50 cm | — |  | X/X | ○○/○○ |
|  |  | 100 cm |  |  | —/— | X/X |
|  |  | 150 cm |  |  | —/— | —/— |
|  |  | 200 cm |  |  | —/— | —/— |

TABLE 75

|  |  |  |  | EX 201 | EX 202 | EX 203 | EX 204 | EX 205 | EX 206 | EX 207 |
|---|---|---|---|---|---|---|---|---|---|---|
| Layer compositions and resin formulations | Outer layer | Component (D) | — | PP(D-1) | PP(D-1) | PP(D-1) | PP(D-1) | PP(D-1) | PP(D-1) | PP(D-1) |
|  |  | amount | wt % | 100 | 100 | 100 | 100 | 100 | 100 | 100 |
|  |  | Component (D3) | — | — | — | — | — | — | — | — |
|  |  | amount | wt % | — | — | — | — | — | — | — |
|  |  | Other components | — | — | — | — | — | — | — | — |
|  |  | amount | wt % | — | — | — | — | — | — | — |
|  | Inner layer | Component (A) | — | PP(A-18) | PP(A-18) | PP(A-18) | PP(A-19) | PP(A-20) | PP(A-21) | PP(A-22) |
|  |  | amount | wt % | 80 | 70 | 70 | 70 | 70 | 70 | 70 |
|  |  | Component (B) | — | PE(B-3) | PE(B-3) | PE(B-1) | PE(B-1) | PE(B-1) | PE(B-1) | PE(B-1) |
|  |  | amount | wt % | 20 | 20 | 20 | 20 | 20 | 20 | 20 |
|  |  | Component (C) | — | — | — | PP(C-2) | PP(C-1) | PP(C-1) | PP(C-1) | PP(C-1) |
|  |  | amount | wt % | — | — | 10 | 10 | 10 | 10 | 10 |
|  |  | Other components | — | — | — | — | — | — | — | — |
|  |  | amount | wt % | — | — | — | — | — | — | — |
|  |  | Tm(C) - Tm(Al) | ° C. | — | 31 | 26 | 26 | 26 | 19 | 22 |
|  | Innermost layer | Component (K) | — | — | — | PP(K-16) | PP(K-16) | PP(K-16) | PP(K-16) | PP(K-16) |
|  |  | amount | wt % | — | — | 70 | 70 | 70 | 70 | 70 |
|  |  | Component (H) | — | — | — | PE(H-1) | PE(H-1) | PE(H-1) | PE(H-1) | PE(H-1) |
|  |  | amount | wt % | — | — | 20 | 20 | 20 | 20 | 20 |
|  |  | Component (I) | — | — | — | PP(I-1) | PP(I-1) | PP(I-1) | PP(I-1) | PP(I-1) |
|  |  | amount | wt % | — | — | 10 | 10 | 10 | 10 | 10 |
|  |  | Other components | — | — | — | — | — | — | — | — |
|  |  | amount | wt % | — | — | — | — | — | — | — |
|  |  | Tm(C) - Tm(Al) | ° C. | — | 31 | 26 | 26 | 26 | 26 | 26 |
|  |  | S(0) | wt % | 1.6 | 2.2 | 1.3 | 1.3 | 1.3 | 1.3 | 1.3 |
| Film properties after 30 minutes of heat treatment at 121° C. | Appearance |  | — | ○— | ○ | ○ | ○ | ○ | ○ | ○ |
|  | Total haze |  | % | 19 | 14 | 13 | 13 | 13 | 16 | 17 |
|  | Tensile modulus | MD | MPa | 195 | 255 | 240 | 238 | 241 | 261 | 250 |
|  | Heat-sealing strength | 125° C. | gf/10 mm | 1350 | 1732 | 1878 | 1816 | 1874 | 1881 | 1875 |
|  |  | 130° C. |  | 2546 | 2792 | 2840 | 2897 | 2843 | 2867 | 2808 |
|  |  | 135° C. |  | 3041 | 3102 | 3131 | 3184 | 3181 | 3185 | 3162 |
|  |  | 140° C. |  | 3154 | 3320 | 3315 | 3320 | 3382 | 3327 | 3376 |

TABLE 75-continued

|  |  |  | EX 201 | EX 202 | EX 203 | EX 204 | EX 205 | EX 206 | EX 207 |
|---|---|---|---|---|---|---|---|---|---|
|  |  | 145° C. | 3477 | 3700 | 3572 | 3550 | 3534 | 3524 | 3563 |
|  |  | 150° C. | 3844 | 4751 | 4599 | 4594 | 4567 | 4501 | 4573 |
|  |  | 155° C. | 3910 | 5104 | 5196 | 5167 | 5128 | 5196 | 5124 |
|  |  | 160° C. | 4098 | 5211 | 5275 | 5207 | 5227 | 5286 | 5262 |
|  | Cumulative bag drop test | 50 cm | — | ○○/○○ | ○○/○○ | ○○/○○ | ○○/○○ | ○○/○○ | ○○/○○ |
|  |  | 100 cm |  | ○○/○○ | ○○/○○ | ○○/○○ | ○○/○○ | ○○/○○ | ○○/○○ |
|  |  | 150 cm | X/X | ○X/○X | X/○X | X/○X | ○X/X | X/○X | ○X/X |
|  |  | 200 cm | —/— | —/— | —/— | —/— | —/— | —/— | —/— |

TABLE 76

|  |  |  |  |  | EX 208 | EX 209 | EX 210 | EX 211 | EX 212 | EX 213 | EX 214 |
|---|---|---|---|---|---|---|---|---|---|---|---|
| Layer compositions and resin formulations | Outer layer | Component (D) | — |  | PP(D-1) | PP(D-1) | PP(D-1) | PP(D-1) | PP(D-1) | PP(D-1) | PP(D-1) |
|  |  | amount | wt % | | 100 | 100 | 100 | 100 | 100 | 100 | 100 |
|  |  | Component (D3) | — | | — | — | — | — | — | — | — |
|  |  | amount | wt % | | — | — | — | — | — | — | — |
|  |  | Other components | — | | — | — | — | — | — | — | — |
|  |  | amount | wt % | | — | — | — | — | — | — | — |
|  | Inner layer | Component (A) | — | | PP(A-23) | PP(A-18) | PP(A-18) | PP(A-18) | PP(A-18) | PP(A-18) | PP(A-18) |
|  |  | amount | wt % | | 70 | 70 | 70 | 70 | 70 | 70 | 70 |
|  |  | Component (B) | — | | PE(B-1) | PE(B-2) | PE(B-3) | PE(B-4) | PE(B-5) | PE(B-6) | PE(B-1) |
|  |  | amount | wt % | | 20 | 20 | 20 | 20 | 20 | 20 | 20 |
|  |  | Component (C) | — | | PP(C-1) | PP(C-1) | PP(C-1) | PP(C-1) | PP(C-1) | PP(C-1) | PP(C-2) |
|  |  | amount | wt % | | 10 | 10 | 10 | 10 | 10 | 10 | 10 |
|  |  | Other components | — | | — | — | — | — | — | — | — |
|  |  | amount | wt % | | — | — | — | — | — | — | — |
|  |  | Tm(C) - Tm(A1) | ° C. | | 19 | 26 | 26 | 26 | 26 | 26 | 26 |
|  | Innermost layer | Component (K) | — | | PP(K-16) | PP(K-16) | PP(K-16) | PP(K-16) | PP(K-16) | PP(K-16) | PP(K-16) |
|  |  | amount | wt % | | 70 | 70 | 70 | 70 | 70 | 70 | 70 |
|  |  | Component (H) | — | | PE(H-1) | PE(H-1) | PE(H-1) | PE(H-1) | PE(H-1) | PE(H-1) | PE(H-1) |
|  |  | amount | wt % | | 20 | 20 | 20 | 20 | 20 | 20 | 20 |
|  |  | Component (I) | — | | PP(I-1) | PP(I-1) | PP(I-1) | PP(I-1) | PP(I-1) | PP(I-1) | PP(I-1) |
|  |  | amount | wt % | | 10 | 10 | 10 | 10 | 10 | 10 | 10 |
|  |  | Other components | — | | — | — | — | — | — | — | — |
|  |  | amount | wt % | | — | — | — | — | — | — | — |
|  |  | Tm(C) - Tm(A1) | ° C. | | 26 | 26 | 26 | 26 | 26 | 26 | 26 |
|  |  | S(0) | wt % | | 1.3 | 1.3 | 1.3 | 1.3 | 1.3 | 1.3 | 1.3 |
| Film properties after 30 minutes of heat treatment at 121° C. | Appearance |  | — | | ○ | ○ | ○ | ○ | ○ | ○ | ○ |
|  | Total haze |  | % | | 17 | 15 | 13 | 15 | 13 | 13 | 13 |
|  | Tensile modulus | MD | MPa | | 255 | 235 | 244 | 247 | 241 | 242 | 242 |
|  | Heat-sealing strength | 125° C. | gf/10 mm | | 1844 | 1814 | 1863 | 1828 | 1819 | 1893 | 1847 |
|  |  | 130° C. | | | 2891 | 2883 | 2893 | 2826 | 2834 | 2911 | 2886 |
|  |  | 135° C. | | | 3149 | 3145 | 3185 | 3118 | 3135 | 3163 | 3130 |
|  |  | 140° C. | | | 3395 | 3348 | 3349 | 3324 | 3322 | 3370 | 3315 |
|  |  | 145° C. | | | 3566 | 3513 | 3565 | 3556 | 3551 | 3515 | 3587 |
|  |  | 150° C. | | | 4562 | 4598 | 4597 | 4612 | 4527 | 4523 | 4530 |
|  |  | 155° C. | | | 5181 | 5142 | 5121 | 5122 | 5122 | 5178 | 5189 |
|  |  | 160° C. | | | 5268 | 5261 | 5238 | 5312 | 5239 | 5279 | 5277 |
|  | Cumulative bag drop test | 50 cm | | — | ○○/○○ | ○○/○○ | ○○/○○ | ○○/○○ | ○○/○○ | ○○/○○ | ○○/○○ |
|  |  | 100 cm | | | ○○/○○ | ○○/○○ | ○○/○○ | ○○/○○ | ○○/○○ | ○○/○○ | ○○/○○ |
|  |  | 150 cm | | | ○X/X | X/○X | X/○X | X/○X | ○X/X | X/○X | ○X/X |
|  |  | 200 cm | | | —/— | —/— | —/— | —/— | —/— | —/— | —/— |

TABLE 77

|  |  |  |  | EX 215 | EX 216 | EX 217 | EX 218 | EX 219 | EX 220 | EX 221 |
|---|---|---|---|---|---|---|---|---|---|---|
| Layer compositions and resin formulations | Outer layer | Component (D) | — | PP(D-1) | PP(D-1) | PP(D-1) | PP(D-2) | PP(D-3) | PP(D-4) | PP(D-4) |
|  |  | amount | wt % | 100 | 100 | 100 | 100 | 100 | 100 | 90 |
|  |  | Component (D3) | — | — | — | — | — | — | — | PE(D3-2) |
|  |  | amount | wt % | — | — | — | — | — | — | 10 |
|  |  | Other components | — | — | — | — | — | — | — | — |
|  |  | amount | wt % | — | — | — | — | — | — | — |
|  | Inner layer | Component (A) | — | PP(A-18) | PP(A-18) | PP(A-18) | PP(A-18) | PP(A-18) | PP(A-18) | PP(A-18) |
|  |  | amount | wt % | 70 | 70 | 65 | 70 | 70 | 70 | 70 |
|  |  | Component (B) | — | PE(B-1) | PE(B-1) | PE(B-1) | PE(B-1) | PE(B-1) | PE(B-1) | PE(B-1) |
|  |  | amount | wt % | 20 | 20 | 20 | 20 | 20 | 20 | 20 |

TABLE 77-continued

|  |  |  |  | EX 215 | EX 216 | EX 217 | EX 218 | EX 219 | EX 220 | EX 221 |
|---|---|---|---|---|---|---|---|---|---|---|
|  |  | Component (C) | — | PP(C-3) | PP(C-4) | PP(C-5) | PP(C-1) | PP(C-1) | PP(C-1) | PP(C-1) |
|  |  | amount | wt % | 10 | 10 | 15 | 10 | 10 | 10 | 10 |
|  |  | Other components | — | — | — | — | — | — | — | — |
|  |  | amount | wt % | — | — | — | — | — | — | — |
|  |  | Tm(C) - Tm(Al) | ° C. | 26 | 26 | 27 | 26 | 26 | 26 | 26 |
|  | Innermost | Component (K) | — | PP(K-16) | PP(K-16) | PP(K-16) | PP(K-16) | PP(K-16) | PP(K-16) | PP(K-16) |
|  | layer | amount | wt % | 70 | 70 | 70 | 70 | 70 | 70 | 70 |
|  |  | Component (H) | — | PE(H-1) | PE(H-1) | PE(H-1) | PE(H-1) | PE(H-1) | PE(H-1) | PE(H-1) |
|  |  | amount | wt % | 20 | 20 | 20 | 20 | 20 | 20 | 20 |
|  |  | Component (I) | — | PP(I-1) | PP(I-1) | PP(I-1) | PP(I-1) | PP(I-1) | PP(I-1) | PP(I-1) |
|  |  | amount | wt % | 10 | 10 | 10 | 10 | 10 | 10 | 10 |
|  |  | Other components | — | — | — | — | — | — | — | — |
|  |  | amount | wt % | — | — | — | — | — | — | — |
|  |  | Tm(C) - Tm(Al) | ° C. | 26 | 26 | 26 | 26 | 26 | 26 | 26 |
|  |  | S(0) | wt % | 1.3 | 1.3 | 1.3 | 1.3 | 1.3 | 1.3 | 1.3 |
| Film | Appearance |  | — | ○ | ○ | ○ | ○ | ○ | ○ | ○ |
| properties | Total haze |  | % | 13 | 13 | 12 | 13 | 15 | 16 | 12 |
| after 30 | Tensile | MD | MPa | 239 | 245 | 232 | 262 | 270 | 221 | 215 |
| minutes | modulus |  |  |  |  |  |  |  |  |  |
| of heat | Heat- | 125° C. | gf/10 | 1907 | 1829 | 1878 | 1771 | 1737 | 1518 | 1405 |
| treatment at | sealing | 130° C. | mm | 2842 | 2856 | 2901 | 2856 | 2862 | 2643 | 2530 |
| 121° C. | strength | 135° C. |  | 3146 | 3189 | 3183 | 3142 | 3139 | 3023 | 3209 |
|  |  | 140° C. |  | 3318 | 3400 | 3366 | 3409 | 3333 | 3114 | 3220 |
|  |  | 145° C. |  | 3591 | 3538 | 3584 | 3512 | 3571 | 3352 | 3239 |
|  |  | 150° C. |  | 4529 | 4522 | 4517 | 4586 | 4575 | 4356 | 4243 |
|  |  | 155° C. |  | 5155 | 5202 | 5198 | 5130 | 5137 | 4918 | 4805 |
|  |  | 160° C. |  | 5258 | 5267 | 5213 | 5231 | 5256 | 5037 | 4924 |
|  | Cumulative | 50 cm | — | ○○/○○ | ○○/○○ | ○○/○○ | ○○/○○ | ○○/○○ | ○○/○○ | ○○/○○ |
|  | bag drop | 100 cm |  | ○○/○○ | ○○/○○ | ○○/○○ | ○○/○○ | ○○/○○ | ○○/○○ | ○○/○○ |
|  | test | 150 cm |  | X/○X | ○X/X | X/○○ | ○○/○○ | ○○/○○ | ○○/○○ | ○○/○○ |
|  |  | 200 cm |  | —/— | —/— | —/X | ○○/○○ | ○○/○○ | ○○/○○ | ○○/○○ |

TABLE 78

|  |  |  |  | EX 222 | EX 223 | EX 224 | EX 225 | EX 226 | EX 227 | EX 228 |
|---|---|---|---|---|---|---|---|---|---|---|
| Layer | Outer | Component (D) | — | PP(D-1) | PP(D-1) | PP(D-1) | PP(D-1) | PP(D-1) | PP(D-1) | PP(D-2) |
| compositions | layer | amount | wt % | 100 | 100 | 100 | 100 | 100 | 100 | 80 |
| and resin |  | Component (D3) | — | — | — | — | — | — | — | — |
| formulations |  | amount | wt % | — | — | — | — | — | — | — |
|  |  | Other components | — | — | — | — | — | — | — | 7125 |
|  |  | amount | wt % | — | — | — | — | — | — | 20 |
|  | Inner | Component (A) | — | PP(A-18) | PP(A-18) | PP(A-18) | PP(A-18) | PP(A-18) | PP(A-18) | PP(A-18) |
|  | layer | amount | wt % | 70 | 70 | 70 | 70 | 70 | 70 | 70 |
|  |  | Component (B) | — | PE(B-1) | PE(B-1) | PE(B-1) | PE(B-1) | PE(B-1) | PE(B-1) | PE(B-2) |
|  |  | amount | wt % | 20 | 20 | 20 | 20 | 20 | 20 | 20 |
|  |  | Component (C) | — | PP(C-1) | PP(C-1) | PP(C-1) | PP(C-1) | PP(C-1) | PP(C-1) | PP(C-1) |
|  |  | amount | wt % | 10 | 10 | 10 | 10 | 10 | 10 | 10 |
|  |  | Other components | — | — | — | — | — | — | — | — |
|  |  | amount | wt % | — | — | — | — | — | — | — |
|  |  | Tm(C) - Tm(Al) | ° C. | 26 | 26 | 26 | 26 | 26 | 26 | 26 |
|  | Innermost | Component (K) | — | PP(K-20) | PP(K-16) | PP(K-16) | PP(K-16) | PP(K-16) | PP(K-16) | PP(K-16) |
|  | layer | amount | wt % | 70 | 70 | 70 | 70 | 70 | 65 | 70 |
|  |  | Component (H) | — | PE(H-1) | PE(H-2) | PE(H-3) | PE(H-4) | PE(H-1) | PE(H-1) | PE(H-1) |
|  |  | amount | wt % | 20 | 20 | 20 | 20 | 20 | 20 | 20 |
|  |  | Component (I) | — | PP(I-1) | PP(I-1) | PP(I-1) | PP(I-1) | PP(I-2) | PP(I-3) | PP(I-1) |
|  |  | amount | wt % | 10 | 10 | 10 | 10 | 10 | 15 | 10 |
|  |  | Other components | — | — | — | — | — | — | — | — |
|  |  | amount | wt % | — | — | — | — | — | — | — |
|  |  | Tm(C) - Tm(Al) | ° C. | 0 | 26 | 26 | 26 | 26 | 27 | 26 |
|  |  | S(0) | wt % | 1.5 | 1.4 | 1.3 | 1.2 | 1.3 | 6.5 | 1.3 |
| Film | Appearance |  | — | ○ | ○ | ○ | ○ | ○ | ○ | ○ |
| properties | Total haze |  | % | 17 | 15 | 13 | 15 | 13 | 12 | 12 |
| after 30 | Tensile | MD | MPa | 240 | 235 | 244 | 247 | 242 | 232 | 254 |
| minutes | modulus |  |  |  |  |  |  |  |  |  |
| of heat | Heat- | 125° C. | gf/10 | 1886 | 1821 | 1870 | 1835 | 1854 | 1885 | 2023 |
| treatment at | sealing | 130° C. | mm | 2819 | 2890 | 2900 | 2833 | 2893 | 2908 | 3077 |
| 121° C. | strength | 135° C. |  | 3173 | 3152 | 3192 | 3125 | 3137 | 3190 | 3476 |
|  |  | 140° C. |  | 3387 | 3355 | 3356 | 3331 | 3322 | 3373 | 3706 |
|  |  | 145° C. |  | 3574 | 3520 | 3572 | 3563 | 3594 | 3591 | 3928 |
|  |  | 150° C. |  | 4584 | 4605 | 4604 | 4619 | 4537 | 4524 | 4995 |
|  |  | 155° C. |  | 5135 | 5149 | 5128 | 5129 | 5196 | 5205 | 5655 |
|  |  | 160° C. |  | 5273 | 5268 | 5245 | 5319 | 5284 | 5220 | 5798 |

TABLE 78-continued

|   |   |   | EX 222 | EX 223 | EX 224 | EX 225 | EX 226 | EX 227 | EX 228 |
|---|---|---|---|---|---|---|---|---|---|
| Cumulative bag drop test | 50 cm | — | ○○/○○ | ○○/○○ | ○○/○○ | ○○/○○ | ○○/○○ | ○○/○○ | ○○/○○ |
|  | 100 cm |  | ○○/○○ | ○○/○○ | ○○/○○ | ○○/○○ | ○○/○○ | ○○/○○ | ○○/○○ |
|  | 150 cm |  | ○X/X | X/○X | X/○X | X/○X | ○X/X | X/○○ | ○○/○○ |
|  | 200 cm |  | —/— | —/— | —/— | —/— | —/— | —/X | ○○/○○ |

TABLE 79

|   |   |   |   | Comp. Ex. 62 | Comp. Ex. 63 | Comp. Ex. 64 | Comp. Ex. 65 | Comp. Ex. 66 | Comp. Ex. 67 | Comp. Ex. 68 |
|---|---|---|---|---|---|---|---|---|---|---|
| Layer compositions and resin formulations | Outer layer | Component (D) | — | PP(D-1) | PP(D-1) | PP(D-1) | PP(D-1) | PP(D-1) | PP(D-1) | PP(D-1) |
|  |  | amount | wt % | 100 | 100 | 100 | 100 | 100 | 100 | 100 |
|  |  | Component (D3) | — | — | — | — | — | — | — | — |
|  |  | amount | wt % | — | — | — | — | — | — | — |
|  |  | Other components | — | — | — | — | — | — | — | — |
|  |  | amount | wt % | — | — | — | — | — | — | — |
|  | Inner layer | Component (A) | — | PP(A-18) | PP(A-18) | PP(A-18) | PP(A-18) | PP(A-24) | PP(A-25) | PP(A-26) |
|  |  | amount | wt % | 100 | 50 | 70 | 50 | 70 | 70 | 70 |
|  |  | Component (B) | — | — | PE(B-1) | — | PE(B-1) | PE(B-1) | PE(B-1) | PE(B-1) |
|  |  | amount | wt % | — | 50 | — | 40 | 20 | 20 | 20 |
|  |  | Component (C) | — | — | — | PP(C-1) | PP(C-1) | PP(C-1) | PP(C-1) | PP(C-1) |
|  |  | amount | wt % | — | — | 30 | 10 | 10 | 10 | 10 |
|  |  | Other components | — | — | — | — | — | — | — | — |
|  |  | amount | wt % | — | — | — | — | — | — | — |
|  |  | Tm(C) - Tm(Al) | ° C. | — | — | 26 | 26 | 26 | — | 26 |
|  | Innermost layer | Component (K) | — | PP(K-16) | PP(K-16) | PP(K-16) | PP(K-16) | PP(K-16) | PP(K-16) | PP(K-16) |
|  |  | amount | wt % | 70 | 70 | 70 | 70 | 70 | 70 | 70 |
|  |  | Component (H) | — | PE(H-1) | PE(H-1) | PE(H-1) | PE(H-1) | PE(H-1) | PE(H-1) | PE(H-1) |
|  |  | amount | wt % | 20 | 20 | 20 | 20 | 20 | 20 | 20 |
|  |  | Component (I) | — | PP(I-1) | PP(I-1) | PP(I-1) | PP(I-1) | PP(I-1) | PP(I-1) | PP(I-1) |
|  |  | amount | wt % | 10 | 10 | 10 | 10 | 10 | 10 | 10 |
|  |  | Other components | — | — | — | — | — | — | — | — |
|  |  | amount | wt % | — | — | — | — | — | — | — |
|  |  | Tm(C) - Tm(Al) | ° C. | 26 | 26 | 26 | 26 | 26 | 26 | 26 |
|  |  | S(0) | wt % | 1.3 | 1.3 | 1.3 | 1.3 | 1.3 | 1.3 | 1.3 |
| Film properties after 30 minutes of heat treatment at 121° C. | Appearance |  | — | ○ | Pockmarked pattern arose due to inadequate heat resistance; good samples could not be obtained | ○ | Δ | ○ | Pockmarked pattern arose due to inadequate heat resistance; good samples could not be obtained | ○ |
|  | Total haze |  | % | 10 |  | 28 | 27 | 19 |  | 17 |
|  | Tensile modulus | MD | MPa | 235 |  | 332 | 219 | 348 |  | 329 |
|  | Heat-sealing strength | 125° C. | gf/10 mm | 1562 |  | 1932 | 1216 | 1907 |  | 1750 |
|  |  | 130° C. |  | 2177 |  | 2367 | 1968 | 2286 |  | 2129 |
|  |  | 135° C. |  | 2968 |  | 2768 | 2573 | 2925 |  | 2768 |
|  |  | 140° C. |  | 3362 |  | 3177 | 3274 | 3658 |  | 3501 |
|  |  | 145° C. |  | 3527 |  | 3332 | 4003 | 4223 |  | 4066 |
|  |  | 150° C. |  | 4366 |  | 3831 | 4223 | 4386 |  | 4229 |
|  |  | 155° C. |  | 4747 |  | 4415 | 4386 | 4613 |  | 4456 |
|  |  | 160° C. |  | 4673 |  | 4573 | 4577 | 4881 |  | 4724 |
|  | Cumulative bag drop test | 50 cm | — | X/X | —/— | X/X | ○○/○○ | X/X | —/— | ○○/○○ |
|  |  | 100 cm |  | —/— | —/— | —/— | ○○/○○ | X/X | —/— | X/X |
|  |  | 150 cm |  | —/— | —/— | —/— | ○X/— | —/— | —/— | —/— |
|  |  | 200 cm |  | —/— | —/— | —/— | —/— | —/— | —/— | —/— |

TABLE 80

|   |   |   |   | Comp. Ex. 69 | Comp. Ex. 70 | Comp. Ex. 71 | Comp. Ex. 72 | Comp. Ex. 73 | Comp. Ex. 74 | Comp. Ex. 75 |
|---|---|---|---|---|---|---|---|---|---|---|
| Layer compositions and resin formulations | Outer layer | Component (D) | — | PP(D-1) | PP(D-1) | PP(D-1) | PP(D-1) | PP(D-1) | PP(D-1) | PP(D-1) |
|  |  | amount | wt % | 100 | 100 | 100 | 100 | 100 | 100 | 100 |
|  |  | Component (D3) | — | — | — | — | — | — | — | — |
|  |  | amount | wt % | — | — | — | — | — | — | — |
|  |  | Other components | — | — | — | — | — | — | — | — |
|  |  | amount | wt % | — | — | — | — | — | — | — |
|  | Inner layer | Component (A) | — | PP(A-27) | PP(A-28) | PP(A-29) | PP(A-30) | PP(A-31) | PP(A-32) | PP(A-33) |
|  |  | amount | wt % | 70 | 70 | 70 | 70 | 70 | 70 | 70 |
|  |  | Component (B) | — | PE(B-1) | PE(B-1) | PE(B-1) | PE(B-1) | PE(B-1) | PE(B-1) | PE(B-1) |
|  |  | amount | wt % | 20 | 20 | 20 | 20 | 20 | 20 | 20 |
|  |  | Component (C) | — | PP(C-1) | PP(C-1) | PP(C-1) | PP(C-1) | PP(C-1) | PP(C-1) | PP(C-1) |
|  |  | amount | wt % | 10 | 10 | 10 | 10 | 10 | 10 | 10 |
|  |  | Other components | — | — | — | — | — | — | — | — |
|  |  | amount | wt % | — | — | — | — | — | — | — |
|  |  | Tm(C) - Tm(Al) | ° C. | 26 | 53 | 0 | 0 | 26 | 26 | 26 |

TABLE 80-continued

| | | | | Comp. Ex. 69 | Comp. Ex. 70 | Comp. Ex. 71 | Comp. Ex. 72 | Comp. Ex. 73 | Comp. Ex. 74 | Comp. Ex. 75 |
|---|---|---|---|---|---|---|---|---|---|---|
| | Innermost layer | Component (K) | — | PP(K-16) | PP(K-16) | PP(K-16) | PP(K-16) | PP(K-16) | PP(K-16) | PP(K-16) |
| | | amount | wt % | 70 | 70 | 70 | 70 | 70 | 70 | 70 |
| | | Component (H) | — | PE(H-1) | PE(H-1) | PE(H-1) | PE(H-1) | PE(H-1) | PE(H-1) | PE(H-1) |
| | | amount | wt % | 20 | 20 | 20 | 20 | 20 | 20 | 20 |
| | | Component (I) | — | PP(I-1) | PP(I-1) | PP(I-1) | PP(I-1) | PP(I-1) | PP(I-1) | PP(I-1) |
| | | amount | wt % | 10 | 10 | 10 | 10 | 10 | 10 | 10 |
| | | Other components | — | — | — | — | — | — | — | — |
| | | amount | wt % | — | — | — | — | — | — | — |
| | | Tm(C) - Tm(Al) | ° C. | 26 | 26 | 26 | 26 | 26 | 26 | 26 |
| | | S(0) | wt % | 1.3 | 1.3 | 1.3 | 1.3 | 1.3 | 1.3 | 1.3 |
| Film properties after 30 minutes of heat treatment at 121° C. | Appearance | | — | Pockmarked pattern arose due to inadequate heat resistance; good samples could not be obtained | Pockmarked pattern arose due to inadequate heat resistance; good samples could not be obtained | ○ | Due to unstable film thickness, good samples could not be obtained | ○ | ○ | Due to unstable film thickness, good samples could not be obtained |
| | Total haze | | % | | | 34 | | 18 | 36 | |
| | Tensile modulus | MD | MPa | | | 546 | | 476 | 262 | |
| | Heat-sealing strength | 125° C. | gf/10 mm | | | 1926 | | 1825 | 1814 | |
| | | 130° C. | | | | 2305 | | 2890 | 2879 | |
| | | 135° C. | | | | 2944 | | 3145 | 3134 | |
| | | 140° C. | | | | 3677 | | 3346 | 3335 | |
| | | 145° C. | | | | 4242 | | 3526 | 3515 | |
| | | 150° C. | | | | 4405 | | 4548 | 4537 | |
| | | 155° C. | | | | 4632 | | 5191 | 5180 | |
| | | 160° C. | | | | 4900 | | 5286 | 5275 | |
| | Cumulative bag drop test | 50 cm | — | | | X/○X | ○○/○○ | ○○/○○ | | |
| | | 100 cm | | | | —/— | ○X/X | ○○/○○ | | |
| | | 150 cm | | | | —/— | —/— | ○X/X | | |
| | | 200 cm | | | | —/— | —/— | —/— | | |

TABLE 81

| | | | | Comp. Ex. 76 | Comp. Ex. 77 | Comp. Ex. 78 |
|---|---|---|---|---|---|---|
| Layer compositions and resin formulations | Outer layer | Component (D) | — | PP(D-1) | PP(D-1) | PP(D-5) |
| | | amount | wt % | 100 | 100 | 100 |
| | | Component (D3) | — | — | — | — |
| | | amount | wt % | — | — | — |
| | | Other components | — | — | — | — |
| | | amount | wt % | — | — | — |
| | Inner layer | Component (A) | — | PP(A-18) | PP(A-18) | PP(A-18) |
| | | amount | wt % | 70 | 70 | 70 |
| | | Component (B) | — | PE(B-7) | PE(B-8) | PE(B-1) |
| | | amount | wt % | 20 | 20 | 20 |
| | | Component (C) | — | PP(C-1) | PP(C-1) | PP(C-1) |
| | | amount | wt % | 10 | 10 | 10 |
| | | Other components | — | — | — | — |
| | | amount | wt % | — | — | — |
| | | Tm(C) - Tm(Al) | ° C. | 26 | 26 | 26 |
| | Innermost layer | Component (K) | — | PP(K-16) | PP(K-16) | PP(K-16) |
| | | amount | wt % | 70 | 70 | 70 |
| | | Component (H) | — | PE(H-1) | PE(H-1) | PE(H-1) |
| | | amount | wt % | 20 | 20 | 20 |
| | | Component (I) | — | PP(I-1) | PP(I-1) | PP(I-1) |
| | | amount | wt % | 10 | 10 | 10 |
| | | Other components | — | — | — | — |
| | | amount | wt % | — | — | — |
| | | Tm(C) - Tm(Al) | ° C. | 26 | 26 | 26 |
| | | S(0) | wt % | 1.3 | 1.3 | 1.3 |
| Film properties after 30 minutes of heat treatment at 121° C. | Appearance | | — | ○ | ○ | Pockmarked pattern arose due to inadequate heat resistance; good samples could not be obtained |
| | Total haze | | % | 35 | 26 | |
| | Tensile modulus | MD | MPa | 262 | 287 | |
| | Heat-sealing strength | 125° C. | gf/10 mm | 1827 | 1581 | |
| | | 130° C. | | 2817 | 2106 | |
| | | 135° C. | | 3158 | 2876 | |
| | | 140° C. | | 3357 | 3365 | |
| | | 145° C. | | 3532 | 3520 | |
| | | 150° C. | | 4515 | 4583 | |
| | | 155° C. | | 5189 | 5175 | |
| | | 160° C. | | 5275 | 5233 | |
| | Cumulative bag drop test | 50 cm | — | X/○X | ○○/○○ | |
| | | 100 cm | | —/— | ○○/○○ | |
| | | 150 cm | | —/— | ○X/X | |
| | | 200 cm | | —/— | —/— | |

TABLE 82

|  |  |  |  | Ref. Ex. 67 | Ref. Ex. 68 | Ref. Ex. 69 | Ref. Ex. 70 | Ref. Ex. 71 | Ref. Ex. 72 | Ref. Ex. 73 |
|---|---|---|---|---|---|---|---|---|---|---|
| Layer compositions and resin formulations | Outer layer | Component (D) | — | PP(D-1) | PP(D-1) | PP(D-1) | PP(D-1) | PP(D-4) | PP(D-1) | PP(D-1) |
|  |  | amount | wt % | 100 | 100 | 100 | 100 | 90 | 100 | 100 |
|  |  | Component (D3) | — | — | — | — | — | PE(D3-2) | — | — |
|  |  | amount | wt % | — | — | — | — | 10 | — | — |
|  |  | Other components | — | — | — | — | — | — | — | — |
|  |  | amount | wt % | — | — | — | — | — | — | — |
|  | Inner layer | Component (A) | — | PP(A-18) | PP(A-18) | PP(A-18) | PP(A-18) | PP(A-18) | PP(A-18) | PP(A-18) |
|  |  | amount | wt % | 60 | 70 | 70 | 70 | 70 | 70 | 70 |
|  |  | Component (B) | — | PE(B-1) | PE(B-1) | PE(B-1) | PE(B-1) | PE(B-1) | PE(B-1) | PE(B-1) |
|  |  | amount | wt % | 10 | 20 | 20 | 20 | 20 | 20 | 20 |
|  |  | Component (C) | — | PP(C-1) | PP(C-6) | PP(C-7) | PP(C-8) | PP(C-1) | PP(C-1) | PP(C-1) |
|  |  | amount | wt % | 30 | 10 | 10 | 10 | 10 | 10 | 10 |
|  |  | Other components | — | — | — | — | — | — | — | — |
|  |  | amount | wt % | — | — | — | — | — | — | — |
|  |  | Tm(C) - Tm(Al) | ° C. | 26 | 0 | −10 | 26 | 26 | 26 | 26 |
|  | Innermost layer | Component (K) | — | PP(K-16) | PP(K-16) | PP(K-16) | PP(K-16) | PP(K-16) | PP(K-16) | PP(K-16) |
|  |  | amount | wt % | 70 | 70 | 70 | 70 | 70 | 100 | 50 |
|  |  | Component (H) | — | PE(H-1) | PE(H-1) | PE(H-1) | PE(H-1) | PE(H-1) | — | PE(H-1) |
|  |  | amount | wt % | 20 | 20 | 20 | 20 | 20 | — | 50 |
|  |  | Component (I) | — | PP(I-1) | PP(I-1) | PP(I-1) | PP(I-1) | PP(I-1) | — | — |
|  |  | amount | wt % | 10 | 10 | 10 | 10 | 10 | — | — |
|  |  | Other components | — | — | — | — | — | — | — | — |
|  |  | amount | wt % | — | — | — | — | — | — | — |
|  |  | Tm(C) - Tm(Al) | ° C. | 26 | 26 | 26 | 26 | 26 | — | — |
|  |  | S(0) | wt % | 1.3 | 1.3 | 1.3 | 1.3 | 1.3 | 1.3 | 1.5 |
| Film properties after 30 minutes of heat treatment at 121° C. | Appearance |  | — | ○ | ○ | ○ | ○ | ○ | Δ | Internal fusion due to inadequate heat resistance occurred during sterilization; could not be evaluated |
|  | Total haze |  | % | 28 | 14 | 14 | 21 | 28 | 29 |  |
|  | Tensile modulus | MD | MPa | 326 | 225 | 220 | 306 | 234 | 229 |  |
|  | Heat-sealing strength | 125° C. | gf/10 mm | 1838 | 1687 | 1667 | 1357 | 1603 | 2011 |  |
|  |  | 130° C. |  | 2577 | 2630 | 2650 | 1887 | 2728 | 3076 |  |
|  |  | 135° C. |  | 3568 | 2927 | 2989 | 2601 | 3407 | 3382 |  |
|  |  | 140° C. |  | 3557 | 3143 | 3141 | 3511 | 3418 | 3345 |  |
|  |  | 145° C. |  | 4276 | 3368 | 3333 | 3581 | 3437 | 3572 |  |
|  |  | 150° C. |  | 4577 | 4326 | 4315 | 4094 | 4441 | 4518 |  |
|  |  | 155° C. |  | 4722 | 4967 | 4988 | 4696 | 5003 | 5019 |  |
|  |  | 160° C. |  | 4967 | 5105 | 5107 | 4999 | 5122 | 5291 |  |
|  | Cumulative bag drop test | 50 cm | — | X/X | ○○/X | ○X/○X | ○○/○○ | ○○/○○ | X/X |  |
|  |  | 100 cm |  | —/— | ○X/— | —/— | ○X/○○ | ○○/○○ | —/— |  |
|  |  | 150 cm |  | —/— | —/— | —/— | —/X | ○○/○○ | —/— |  |
|  |  | 200 cm |  | —/— | —/— | —/— | —/— | ○○/○○ | —/— |  |

TABLE 83

|  |  |  |  | Ref. Ex. 74 | Ref. Ex. 75 | Ref. Ex. 76 | Ref. Ex. 77 | Ref. Ex. 78 | Ref. Ex. 79 | Ref. Ex. 80 |
|---|---|---|---|---|---|---|---|---|---|---|
| Layer compositions and resin formulations | Outer layer | Component (D) | — | PP(D-1) | PP(D-1) | PP(D-1) | PP(D-1) | PP(D-1) | PP(D-1) | PP(D-1) |
|  |  | amount | wt % | 100 | 100 | 100 | 100 | 100 | 100 | 100 |
|  |  | Component (D3) | — | — | — | — | — | — | — | — |
|  |  | amount | wt % | — | — | — | — | — | — | — |
|  |  | Other components | — | — | — | — | — | — | — | — |
|  |  | amount | wt % | — | — | — | — | — | — | — |
|  | Inner layer | Component (A) | — | PP(A-18) | PP(A-18) | PP(A-18) | PP(A-18) | PP(A-18) | PP(A-18) | PP(A-18) |
|  |  | amount | wt % | 70 | 70 | 70 | 70 | 70 | 70 | 70 |
|  |  | Component (B) | — | PE(B-1) | PE(B-1) | PE(B-1) | PE(B-1) | PE(B-1) | PE(B-1) | PE(B-1) |
|  |  | amount | wt % | 20 | 20 | 20 | 20 | 20 | 20 | 20 |
|  |  | Component (C) | — | PP(C-1) | PP(C-1) | PP(C-1) | PP(C-1) | PP(C-1) | PP(C-1) | PP(C-1) |
|  |  | amount | wt % | 10 | 10 | 10 | 10 | 10 | 10 | 10 |
|  |  | Other components | — | — | — | — | — | — | — | — |
|  |  | amount | wt % | — | — | — | — | — | — | — |
|  |  | Tm(C) - Tm(Al) | ° C. | 26 | 26 | 26 | 26 | 26 | 26 | 26 |
|  | Innermost layer | Component (K) | — | PP(K-16) | PP(K-16) | PP(K-16) | PP(K-21) | PP(K-22) | PP(K-23) | PP(K-24) |
|  |  | amount | wt % | 70 | 40 | 60 | 70 | 70 | 70 | 70 |
|  |  | Component (H) | — | — | PE(H-1) | PE(H-1) | PE(H-1) | PE(H-1) | PE(H-1) | PE(H-1) |
|  |  | amount | wt % | — | 50 | 10 | 20 | 20 | 20 | 20 |
|  |  | Component (I) | — | PP(I-1) | PP(I-1) | PP(I-1) | PP(I-1) | PP(I-1) | PP(I-1) | PP(I-1) |
|  |  | amount | wt % | 30 | 10 | 30 | 10 | 10 | 10 | 10 |
|  |  | Other components | — | — | — | — | — | — | — | — |
|  |  | amount | wt % | — | — | — | — | — | — | — |
|  |  | Tm(C) - Tm(Al) | ° C. | 26 | 26 | 26 | 26 | — | 26 | 26 |
|  |  | S(0) | wt % | 1 | 1.3 | 1.1 | 0.4 | 2.2 | 0.8 | 1.9 |

TABLE 83-continued

|  |  |  |  | Ref. Ex. 74 | Ref. Ex. 75 | Ref. Ex. 76 | Ref. Ex. 77 | Ref. Ex. 78 | Ref. Ex. 79 | Ref. Ex. 80 |
|---|---|---|---|---|---|---|---|---|---|---|
| Film properties after 30 minutes of heat treatment at 121° C. | Appearance | | — | ◯ | Internal fusion due to inadequate heat resistance occurred during sterilization; could not be evaluated | ◯ | ◯ | Internal fusion due to inadequate heat resistance occurred during sterilization; could not be evaluated | ◯ | Internal fusion due to inadequate heat resistance occurred during sterilization; could not be evaluated |
| | Total haze | | % | 22 | | 21 | 22 | | 21 | |
| | Tensile modulus | MD | MPa | 318 | | 312 | 329 | | 319 | |
| | Heat-sealing strength | 125° C. | gf/10 mm | 198 | | 386 | 2023 | | 1872 | |
| | | 130° C. | | 587 | | 736 | 2987 | | 2815 | |
| | | 135° C. | | 1042 | | 1298 | 3187 | | 3138 | |
| | | 140° C. | | 1678 | | 1757 | 3496 | | 3395 | |
| | | 145° C. | | 1762 | | 1836 | 3677 | | 3507 | |
| | | 150° C. | | 2023 | | 1936 | 4432 | | 4561 | |
| | | 155° C. | | 2113 | | 2023 | 4833 | | 5106 | |
| | | 160° C. | | 2542 | | 2571 | 5023 | | 5261 | |
| | Cumulative bag drop test | 50 cm | — | X/X | | X/X | ◯◯/◯◯ | | ◯◯/◯◯ | |
| | | 100 cm | | —/— | | —/— | ◯◯/◯X | | ◯X/◯◯ | |
| | | 150 cm | | —/— | | —/— | X/— | | —/◯X | |
| | | 200 cm | | —/— | | —/— | —/— | | —/— | |

TABLE 84

|  |  |  |  | Ref. Ex. 81 | Ref. Ex. 82 | Ref. Ex. 83 | Ref. Ex. 84 | Ref. Ex. 85 | Ref. Ex. 86 | Ref. Ex. 87 |
|---|---|---|---|---|---|---|---|---|---|---|
| Layer compositions and resin formulations | Outer layer | Component (D) | — | PP(D-1) | PP(D-1) | PP(D-1) | PP(D-1) | PP(D-1) | PP(D-1) | PP(D-1) |
| | | amount | wt % | 100 | 100 | 100 | 100 | 100 | 100 | 100 |
| | | Component (D3) | — | — | — | — | — | — | — | — |
| | | amount | wt % | — | — | — | — | — | — | — |
| | | Other components | — | — | — | — | — | — | — | — |
| | | amount | wt % | — | — | — | — | — | — | — |
| | Inner layer | Component (A) | — | PP(A-18) | PP(A-18) | PP(A-18) | PP(A-18) | PP(A-18) | PP(A-18) | PP(A-18) |
| | | amount | wt % | 70 | 70 | 70 | 70 | 70 | 70 | 70 |
| | | Component (B) | — | PE(B-1) | PE(B-1) | PE(B-1) | PE(B-1) | PE(B-1) | PE(B-1) | PE(B-1) |
| | | amount | wt % | 20 | 20 | 20 | 20 | 20 | 20 | 20 |
| | | Component (C) | — | PP(C-1) | PP(C-1) | PP(C-1) | PP(C-1) | PP(C-1) | PP(C-1) | PP(C-1) |
| | | amount | wt % | 10 | 10 | 10 | 10 | 10 | 10 | 10 |
| | | Other components | — | — | — | — | — | — | — | — |
| | | amount | wt % | — | — | — | — | — | — | — |
| | | Tm(C) - Tm(Al) | ° C. | 26 | 26 | 26 | 26 | 26 | 26 | 26 |
| | Innermost layer | Component (K) | — | PP(K-25) | PP(K-26) | PP(K-27) | PP(K-28) | PP(K-16) | PP(K-16) | PP(K-16) |
| | | amount | wt % | 70 | 70 | 70 | 70 | 70 | 70 | 70 |
| | | Component (H) | — | PE(H-1) | PE(H-1) | PE(H-1) | PE(H-1) | PE(H-5) | PE(H-1) | PE(H-1) |
| | | amount | wt % | 20 | 20 | 20 | 20 | 20 | 20 | 20 |
| | | Component (I) | — | PP(I-1) | PP(I-1) | PP(I-1) | PP(I-1) | PP(I-1) | PP(I-4) | PP(I-5) |
| | | amount | wt % | 10 | 10 | 10 | 10 | 10 | 10 | 10 |
| | | Other components | — | — | — | — | — | — | — | — |
| | | amount | wt % | — | — | — | — | — | — | — |
| | | Tm(C) - Tm(Al) | ° C. | 53 | 0 | 26 | 26 | 26 | 0 | −10 |
| | | S(0) | wt % | 1.3 | 1.4 | 0.4 | 13.4 | 1.2 | 1.3 | 1.3 |
| Film properties after 30 minutes of heat treatment at 121° C. | Appearance | | — | Internal fusion due to inadequate heat resistance occurred during sterilization; could not be evaluated | ◯ | ◯ | Δ | ◯ | Internal fusion due to inadequate heat resistance occurred during sterilization; could not be evaluated | Internal fusion due to inadequate heat resistance occurred during sterilization; could not be evaluated |
| | Total haze | | % | | 31 | 28 | 29 | 28 | | |
| | Tensile modulus | MD | MPa | | 478 | 251 | 230 | 251 | | |
| | Heat-sealing strength | 125° C. | gf/10 mm | | 18 | 1586 | 1874 | 1582 | | |
| | | 130° C. | | | 248 | 2752 | 2855 | 2748 | | |
| | | 135° C. | | | 489 | 3023 | 3290 | 3011 | | |
| | | 140° C. | | | 742 | 3285 | 3302 | 3201 | | |
| | | 145° C. | | | 1349 | 3432 | 3548 | 3428 | | |
| | | 150° C. | | | 1592 | 4475 | 4529 | 4339 | | |
| | | 155° C. | | | 2091 | 4922 | 5011 | 4872 | | |
| | | 160° C. | | | 2819 | 4823 | 5251 | 4819 | | |
| | Cumulative bag drop test | 50 cm | — | X/X | ◯◯/X | ◯◯/◯◯ | ◯◯/X | | | |
| | | 100 cm | | —/— | ◯X/— | ◯◯/◯◯ | ◯X/— | | | |
| | | 150 cm | | —/— | —/— | ◯X/X | —/— | | | |
| | | 200 cm | | —/— | —/— | —/— | —/— | | | |

Regarding Working Examples 1 to 228

The multilayer propylene sheets obtained within the scope of this application had excellent flexibility, transparency, heat resistance, low-temperature impact resistance, low-temperature heat sealability and cleanliness.

Regarding Comparative Examples 1 to 78

Because the propylene multilayer sheets obtained outside the scope of this application had a poor flexibility, discharging of the contents was difficult without forming air vents, in addition to which the sheets had a poor hand. Also, the transparency was poor, making it difficult to check the contents.

Because a sufficient heat resistance could not be retained, internal fusion occurred in the sterilization step and a pockmarked pattern (spotted pattern) and wrinkles arose, worsening the appearance. A satisfactory low-temperature impact resistance was not obtained, as a result of which breakage tended to occur when, for example, bags made from the sheets were dropped during low-temperature transport or storage. Other problems were the inability to obtain a sufficient low-temperature heat sealability, which worsened productivity, and the need for high-temperature heat-sealing treatment, which worsened the energy efficiency.

Regarding Reference Examples 1 to 66

In cases where use was made of additional, desirable ingredients which may also be included in this application, it is apparent that differences in performance arose as a result of the additional ingredients used.

Upon considering and contrasting the above working examples of the invention with the comparative examples and, if necessary, the reference examples, it is apparent that multilayer propylene resin sheets which are obtained from the novel combinations of propylene resin composition according to the invention and which satisfy the various provisions of the invention have excellent flexibility, transparency, heat resistance, low-temperature impact resistance, low-temperature heat sealability and cleanliness, have a good sheet formability that discourages appearance defects such as interface roughness and thickness fluctuations from arising during multilayer sheet formation, and do not readily give rise to problems such as molten resin flow and a reduction in thickness even under harsh heat-sealing conditions. Hence, multilayer propylene resin sheets of excellent strength and appearance can be obtained.

Industrial Applicability

The multilayer propylene resin sheets of the invention have an excellent flexibility, transparency, heat resistance, low-temperature impact resistance, low-temperature heat sealability and cleanliness, possess a fabricability that minimizes the occurrence of appearance defects such as interfacial roughness and thickness fluctuations during multilayer formation and, because they do not readily give rise to molten resin flow and a reduction in thickness even under harsh heat sealing conditions, exhibit an excellent bag breaking strength. Heat-treatable packaging material obtained using such a sheet will be highly useful in IV bag and retort packaging bag applications.

The invention claimed is:

1. A multilayer propylene resin sheet of at least three layers comprising an inner layer, an outer layer and an innermost layer in order of the outer layer, the inner layer, and the innermost layer, wherein:
    (1) the inner layer is made of a propylene resin composition (X) which comprises:
        (A) from 45 to 89 wt % of the propylene resin composition (A),
        a) the propylene resin composition (A) comprising:
            (i) from 30 to 70 wt % of a propylene-α-olefin random copolymer component (A1) with a melting peak temperature (Tm (A1)) of from 125 to 145° C., and
            (ii) from 30 to 70 wt % of a propylene-ethylene random copolymer component (A2) with an ethylene content (E [A2]) of from 7 to 17 wt % and obtained with a metallocene catalyst,
        b) has a melt flow rate (MFR (A), at 230° C. and 2.16 kg) in a range of from 0.5 to 20 g/10 min, and
        c) has a single peak at or below 0° C. on a temperature — loss tangent (tan δ) curve obtained by dynamic mechanical analysis (DMA), and representing a glass transition observed in a range of from −60 to 20° C.,
    (B) from 10 to 30 wt % of the ethylene-α-olefin copolymer (B); wherein the ethylene-α-olefin copolymer (B):
        a) has a density in a range of from 0.860 to 0.910 g/cm$^3$, and
        b) has a melt flow rate (MFR (B), at 190° C. and 2.16 kg) in a range of from 0.1 to 20 g/10 min, and
    (C) from 1 to 25 wt % of a propylene resin (C), and the propylene resin (C):
        a) has a melting peak temperature (Tm (C)) which is at least 6° C. higher than the melting peak temperature (Tm (A1)) of the propylene-α-olefin random copolymer component (A1), and
        b) has a melt flow rate (MFR (C), at 230° C. and 2.16 kg) in a range of from 0.5 to 30 g/10 min; and
    (2) the outer layer is made of a propylene resin composition (Y) comprising
        (D) a propylene resin having a melting peak temperature (Tm (D)) in a range of from 135 to 170° C.; and
    (3) the innermost layer is made of propylene resin composition (Z) having a soluble content of 15 wt % or less, at or below 0° C. (S0), as measured in o-dichlorobenzene by temperature rising elution fractionation (TREF); and the propylene resin composition (Z) comprises:
        a) a propylene resin composition (Z1) comprising from 80 to 99 wt % of a propylene-α-olefin copolymer (E) having a melting peak temperature (Tm (E)) of from 130 to 145° C., and from 1 to 20 wt % of an ethylene-α-olefin copolymer (F) which has an ethylene component as the major component and having a density of from 0.860 to 0.910 g/cm$^3$; or
        b) a propylene resin composition (Z2) comprising:
            (i) from 60 to 90 wt % of a propylene resin composition (G) which comprises from 30 to 70 wt % of a propylene-α-olefin random copolymer component (G1) having a melting peak temperature (Tm (G1)) in a range of from 125 to 145° C., and from 70 to 30 wt % of a propylene-ethylene random copolymer component (G2) having an ethylene content (E(G2)) of from 7 to 17 wt % and obtained with a metallocene catalyst; and
            (ii) from 40 to 10 wt % of an ethylene-α-olefin copolymer (H) having a density in a range of from 0.860 to 0.910 g/cm$^3$, and
    (4) the multilayer propylene resin sheet has a heat-sealing temperature of 145° C. or below and a heat-sealing strength of 3,000 gf/10mm or more.

2. The multilayer propylene resin sheet of claim 1, wherein the propylene-α-olefin random copolymer component (A1) is obtained with a metallocene catalyst.

3. The multilayer propylene resin sheet of claim 1, wherein the propylene-α-olefin random copolymer component (A1) and the propylene-ethylene random copolymer component (A2) are obtained by successive polymerization with a metallocene catalyst, the successive polymerization comprising:
    (1) polymerizing from 50 to 60 wt % of the propylene-α-olefin random copolymer component (A1), and then
    (2) polymerizing from 40 to 50 wt % of the propylene-ethylene random copolymer component (A2),
    wherein the propylene-ethylene random copolymer component (A2) has an ethylene content (E [A2]) of from 8 to 14 wt %.

4. The multilayer propylene resin sheet of claim 1, wherein:
   a) the propylene resin composition (Z) comprises a propylene resin composition (Z2) comprising:
      (1) from 45 to 89 wt % of a propylene resin composition (G)
      (2) from 10 to 30 wt % of an ethylene-α-olefin copolymer (H), and
      (3) from 1 to 25 wt % of a propylene resin (I)
   b) the propylene resin composition (G) comprises:
      (1) from 30 to 70 wt % of a propylene-α-olefin random copolymer component (G1) with a melting peak temperature (Tm (G1)) in a range of from 125 to 145° C., and
      (2) from 70 to 30 wt % of a propylene-ethylene random copolymer component (G2) with an ethylene content (E[G2]) from 7 to 17 wt % and obtained with a metallocene catalyst,
   c) the ethylene-α-olefin copolymer (H) has a density in a range of from 0.860 to 0.910 g/cm$^3$, and
   d) the propylene resin (I) has a melting peak temperature (Tm(I)) which is at least 6° C. higher than the melting peak temperature (Tm(G1)) of the propylene-α-olefin random copolymer component (G1).

5. The multilayer propylene resin sheet of claim 1, wherein the propylene resin composition (G) has a single peak at or below 0° C. on a temperature-loss tangent (tan δ) curve obtained by dynamic mechanical analysis (DMA), and representing a glass transition observed in a range of from −60 to 20° C.

6. The multilayer propylene resin sheet of claim 1, wherein the propylene-α-olefin random copolymer component (G1) is obtained with a metallocene catalyst.

7. The multilayer propylene resin sheet claim 1, wherein the propylene-α-olefin random copolymer component (G1) and the propylene-ethylene random copolymer component (G2) are obtained by successive polymerization with a metallocene catalyst, the successive polymerization comprising:
   (1) polymerizing from 50 to 60 wt % of the propylene-a-olefin random copolymer component (G1), and then
   (2) polymerizing from 40 to 50 wt % of the propylene-ethylene random copolymer component (G2) with an ethylene content (E[G2]) from 8 to 14 wt %.

8. A heat-treatable packaging material, comprising the multilayer propylene resin sheet of claim 1.

9. The heat-treatable packaging material of claim 8, which is an IV bag.

\* \* \* \* \*